United States Patent
Tsurumi

(10) Patent No.: US 8,305,457 B2
(45) Date of Patent: Nov. 6, 2012

(54) IMAGE PROCESSING APPARATUS, DYNAMIC PICTURE REPRODUCTION APPARATUS, AND PROCESSING METHOD AND PROGRAM FOR THE SAME

(75) Inventor: Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 322 days.

(21) Appl. No.: 12/524,887

(22) PCT Filed: Dec. 17, 2008

(86) PCT No.: PCT/JP2008/072934
§ 371 (c)(1),
(2), (4) Date: Jul. 29, 2009

(87) PCT Pub. No.: WO2009/081806
PCT Pub. Date: Jul. 2, 2009

(65) Prior Publication Data
US 2010/0118161 A1     May 13, 2010

(30) Foreign Application Priority Data
Dec. 21, 2007    (JP) ................................. 2007-330796

(51) Int. Cl.
*H04N 5/228* (2006.01)
(52) U.S. Cl. ............... 348/222.1; 348/220.1; 348/223.1; 348/229.1
(58) Field of Classification Search ............... 348/220.1, 348/222.1, 223.1, 229.1
See application file for complete search history.

(56) References Cited

U.S. PATENT DOCUMENTS

| | | |
|---|---|---|
| 5,469,274 A | 11/1995 | Iwasaki et al. |
| 5,649,032 A | 7/1997 | Burt et al. |
| 5,657,402 A | 8/1997 | Bender et al. |
| 5,706,416 A | 1/1998 | Mann et al. |
| 5,920,657 A | 7/1999 | Bender et al. |

(Continued)

FOREIGN PATENT DOCUMENTS

EP    2 180 702 A1    4/2010

(Continued)

OTHER PUBLICATIONS

U.S. Appl. No. 12/447,923, filed Apr. 30, 2009, Tsurumi.

(Continued)

*Primary Examiner* — Yogesh Aggarwal
(74) *Attorney, Agent, or Firm* — Oblon, Spivak, McClelland, Maier & Neustadt, L.L.P.

(57) ABSTRACT

A dynamic picture storage section (200) stores a picked up dynamic picture picked up by an image pickup apparatus. A metadata storage section (210) stores transformation information for transforming, with reference to at least one of picked up images, a different picked up image. An arrangement information calculation section (230) calculates a display range for a synthesized image based on the transformation information and calculates an arrangement position and a size for a top image in an image memory (250) such that the display range is smaller than the size of the storage region of the image memory (250). An image transformation section (240) arranges the top image at the arrangement position and with the size calculated by the arrangement information calculation section (230) in the image memory (250) and synthesizes the transformed picked up images with history images to form a synthesized image. Consequently, where a dynamic picture picked up by the image pickup apparatus is to be accessed, the contents of the dynamic picture can be grasped readily.

23 Claims, 62 Drawing Sheets

U.S. PATENT DOCUMENTS

| | | | |
|---|---|---|---|
| 5,991,444 A | 11/1999 | Burt et al. | |
| 5,999,662 A | 12/1999 | Burt et al. | |
| 6,393,163 B1 | 5/2002 | Burt et al. | |
| 6,885,406 B2 * | 4/2005 | Yui et al. | 348/564 |
| 6,895,126 B2 | 5/2005 | Di Bernardo et al. | |
| 7,327,494 B2 | 2/2008 | Aiso | |
| 2001/0005208 A1 | 6/2001 | Minami et al. | |
| 2002/0126890 A1 * | 9/2002 | Katayama et al. | 382/154 |
| 2004/0150657 A1 | 8/2004 | Wittenburg et al. | |
| 2005/0041156 A1 | 2/2005 | Kondo et al. | |
| 2006/0109283 A1 | 5/2006 | Shipman et al. | |
| 2007/0008499 A1 | 1/2007 | Iketani et al. | |
| 2007/0103544 A1 | 5/2007 | Nakazawa | |
| 2007/0237506 A1 * | 10/2007 | Minema et al. | 396/52 |
| 2008/0050035 A1 * | 2/2008 | Tsurumi | 382/276 |

FOREIGN PATENT DOCUMENTS

| | | |
|---|---|---|
| JP | 5 260264 | 10/1993 |
| JP | 9 62861 | 3/1997 |
| JP | 11 120353 | 4/1999 |
| JP | 11 134352 | 5/1999 |
| JP | 11 289517 | 10/1999 |
| JP | 2002 359798 | 12/2002 |
| JP | 2003 323170 | 11/2003 |
| JP | 2004 222025 | 8/2004 |
| JP | 2004 266670 | 9/2004 |
| JP | 2005-210428 | 8/2005 |
| JP | 2005 217874 | 8/2005 |
| JP | 2007 183588 | 7/2007 |
| WO | 2005 024723 | 3/2005 |
| WO | 2005 032125 | 4/2005 |

OTHER PUBLICATIONS

U.S. Appl. No. 12/526,058, Aug. 6, 2009, Tsurumi.
U.S. Appl. No. 12/524,777, filed Jul. 28, 2009, Fukumoto, et al.
U.S. Appl. No. 12/524,734, filed Jul. 28, 2009, Tsurumi.
U.S. Appl. No. 12/524,757, filed Jul. 28, 2009, Tsurumi.
U.S. Appl. No. 12/524,383, filed Jul. 24, 2009, Wang et al.
U.S. Appl. No. 12/565,499, filed Sep. 23, 2009, Tsurumi.
European Search Report issued Oct. 21, 2011, in Patent Application No. 08865505.5.

* cited by examiner

FIG. 4
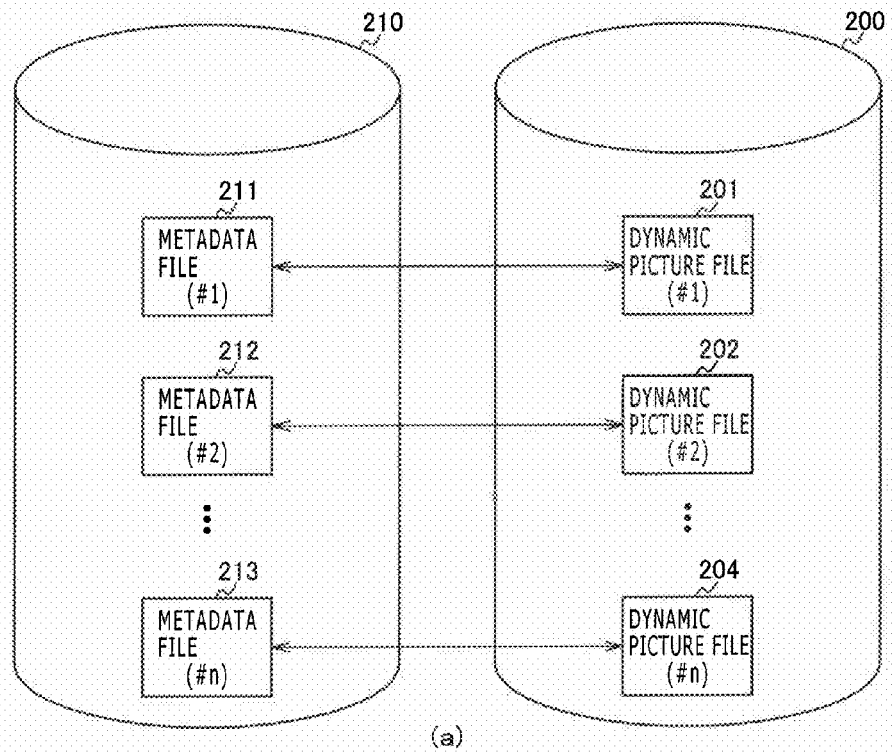
(a)
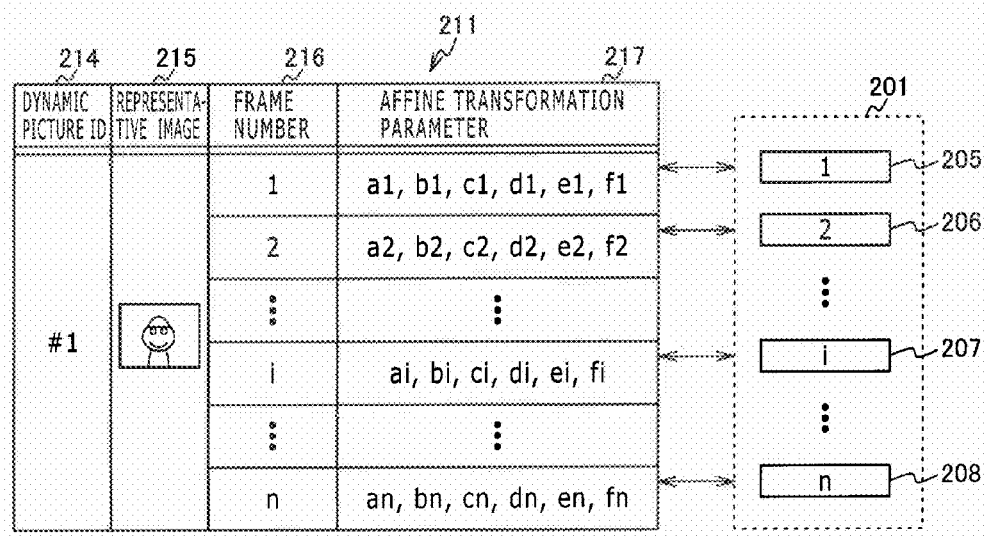
(b)

FIG.7
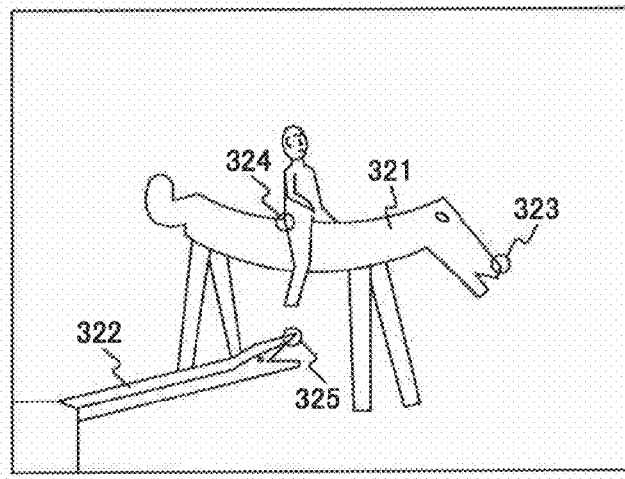
(a)
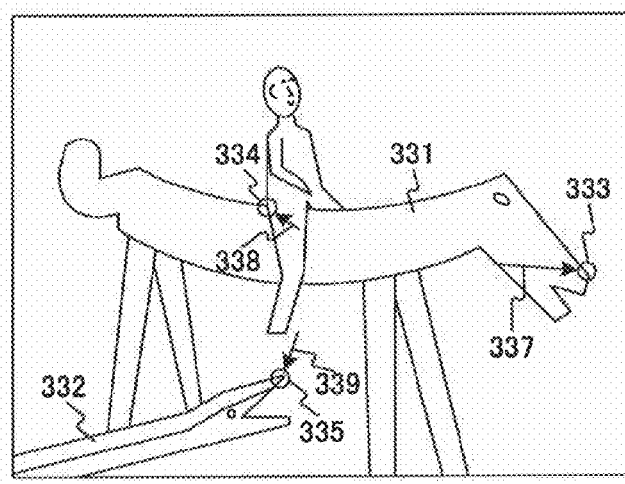
(b)
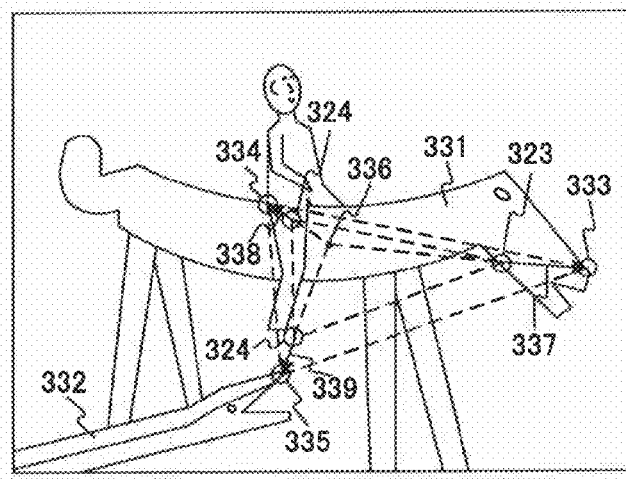
(c)

FIG.9
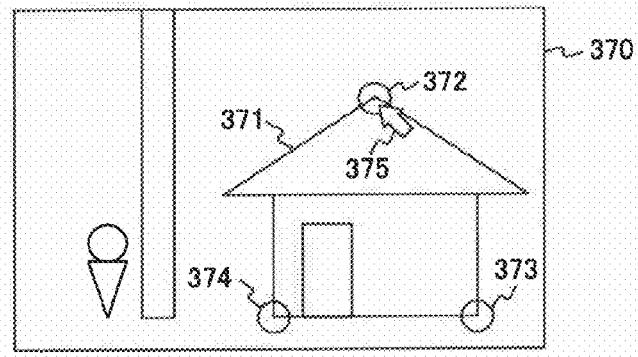
(a)
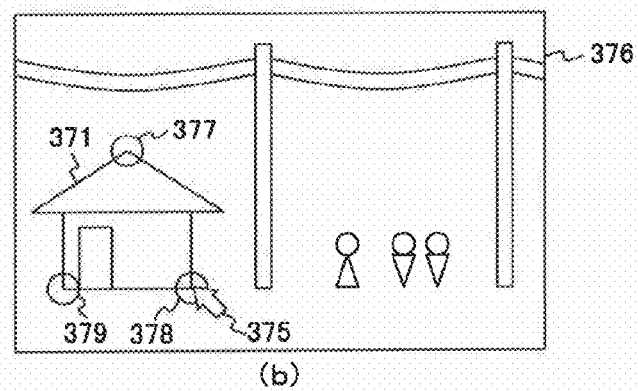
(b)
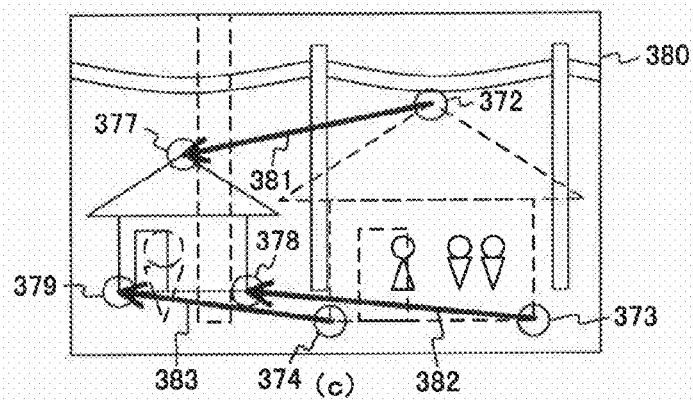
(c)
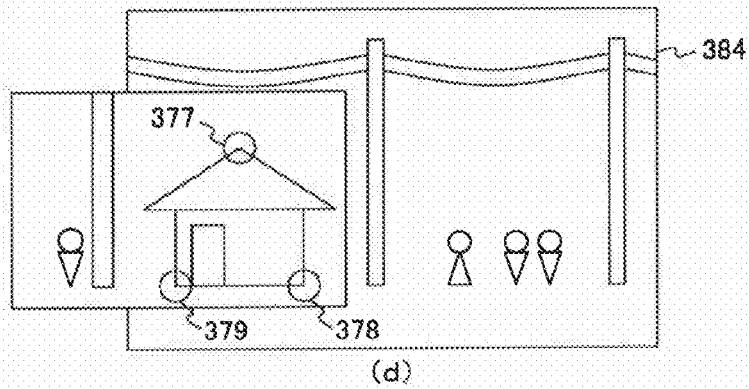
(d)

FIG.22
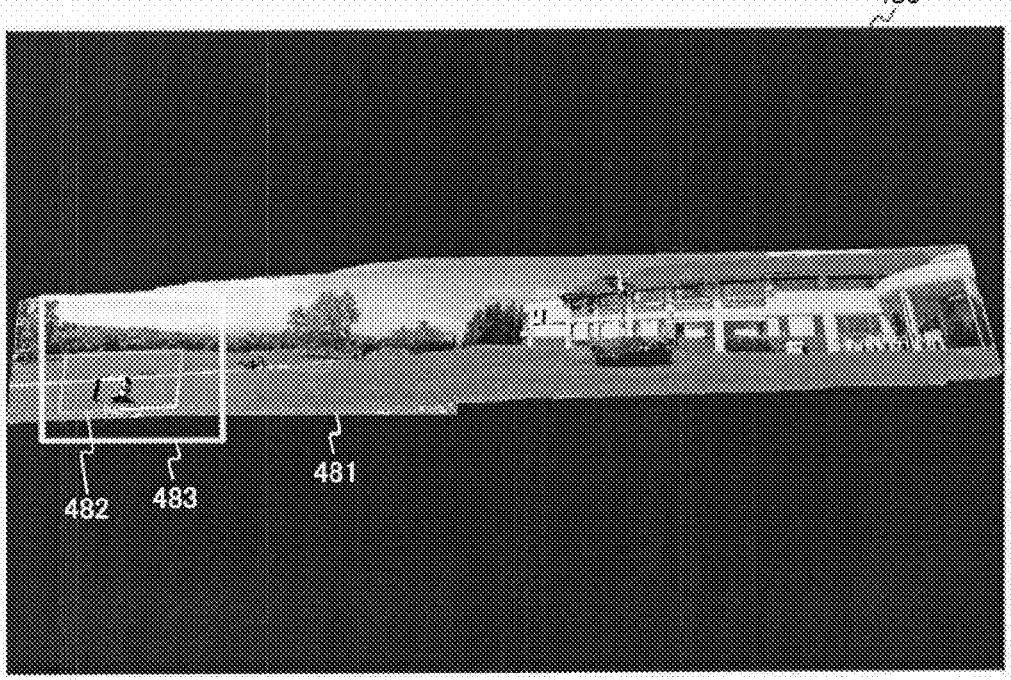
(a)
(b)

FIG.23
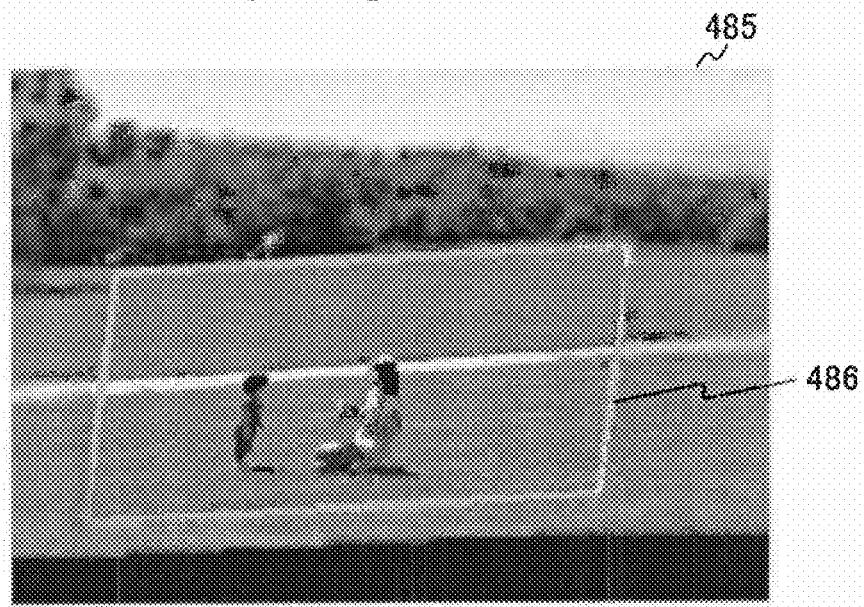
(a)
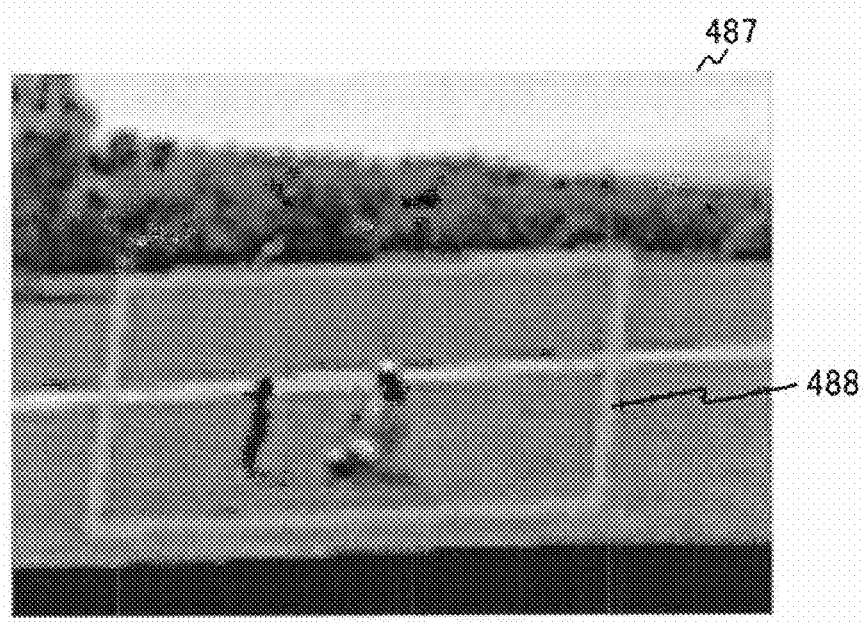
(b)

FIG. 24
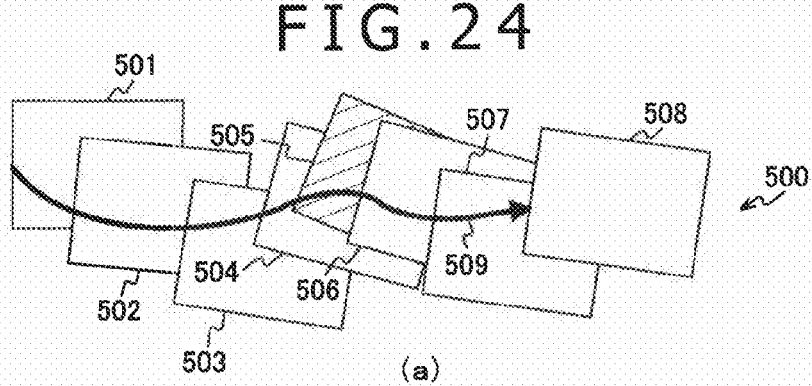
(a)
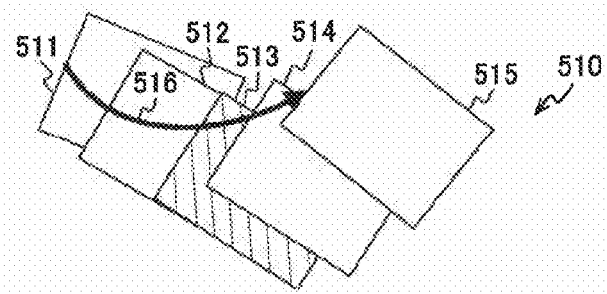
(b)
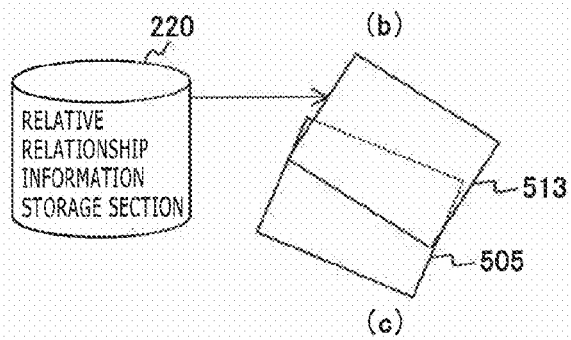
(c)
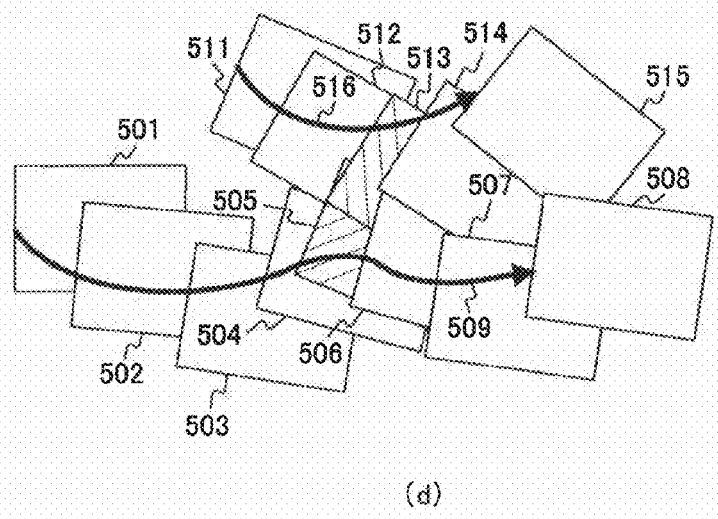
(d)

FIG. 26
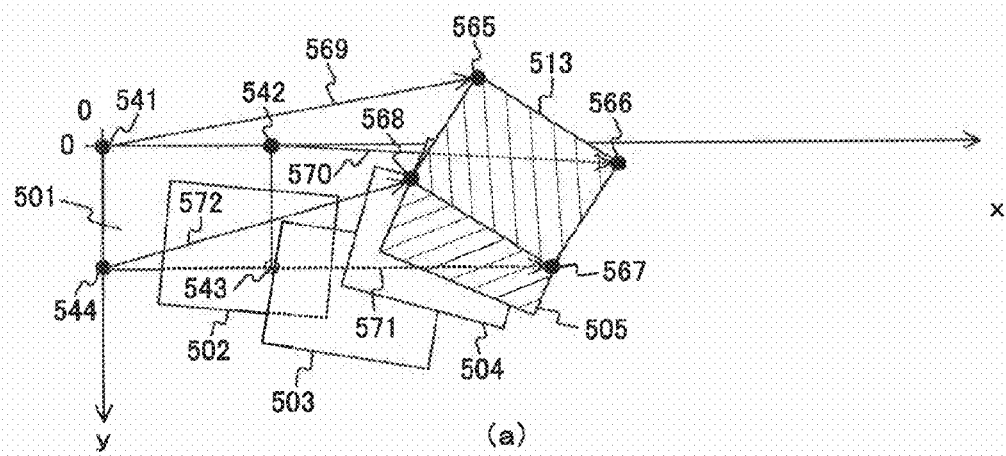
(a)
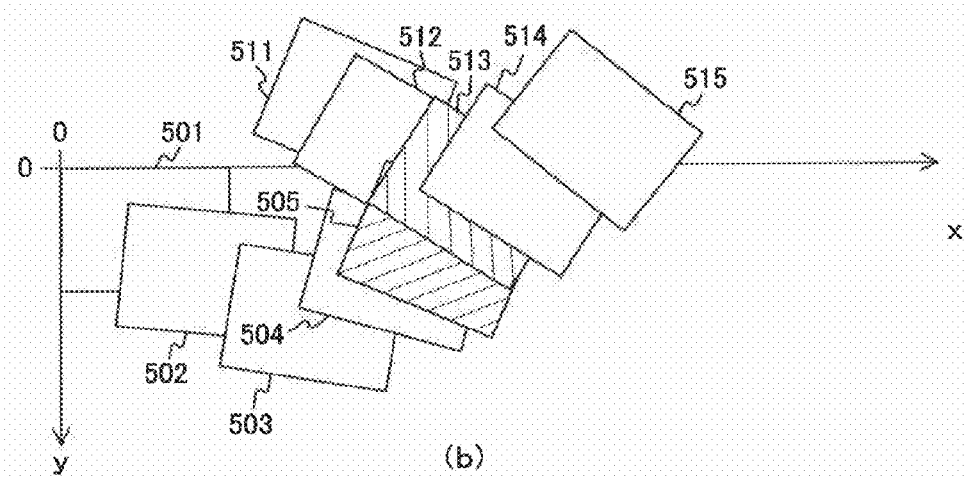
(b)
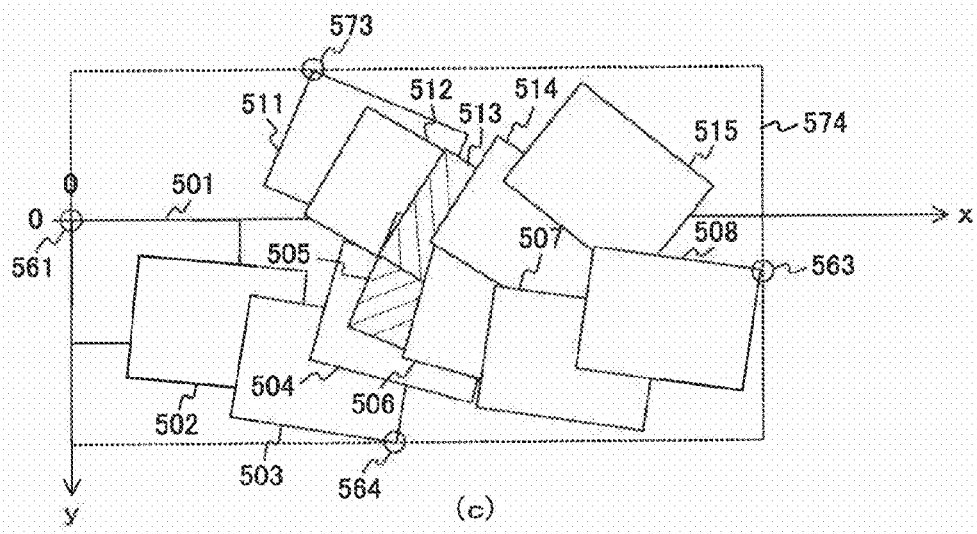
(c)

FIG. 28
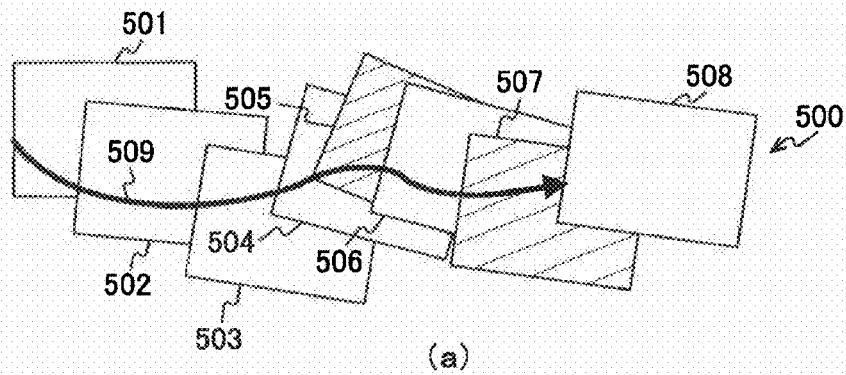
(a)
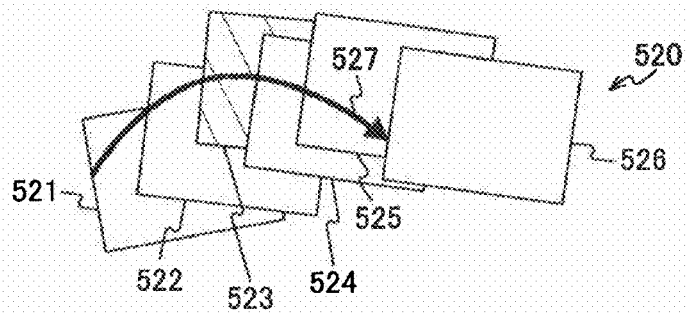
(b)
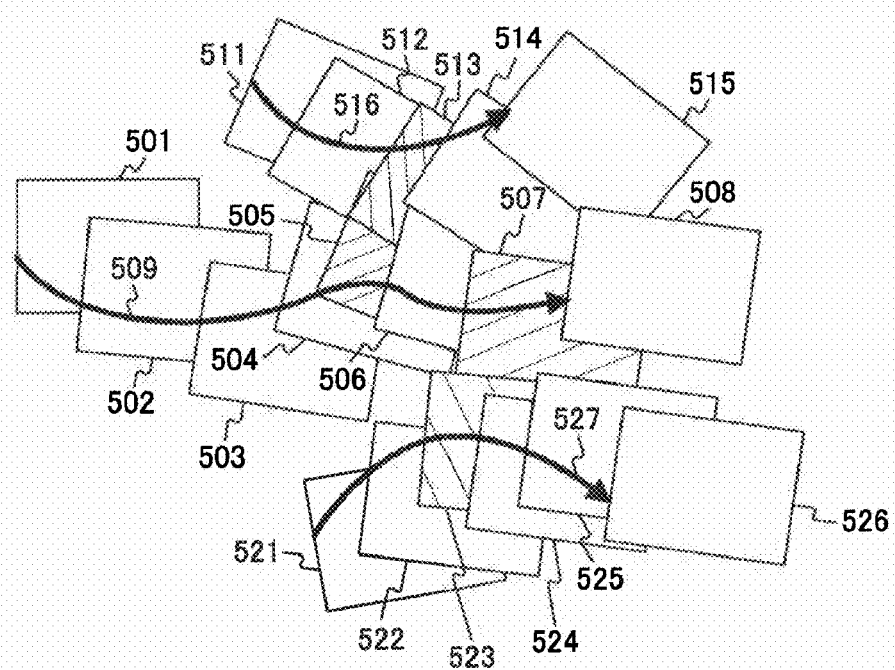
(c)

FIG.29
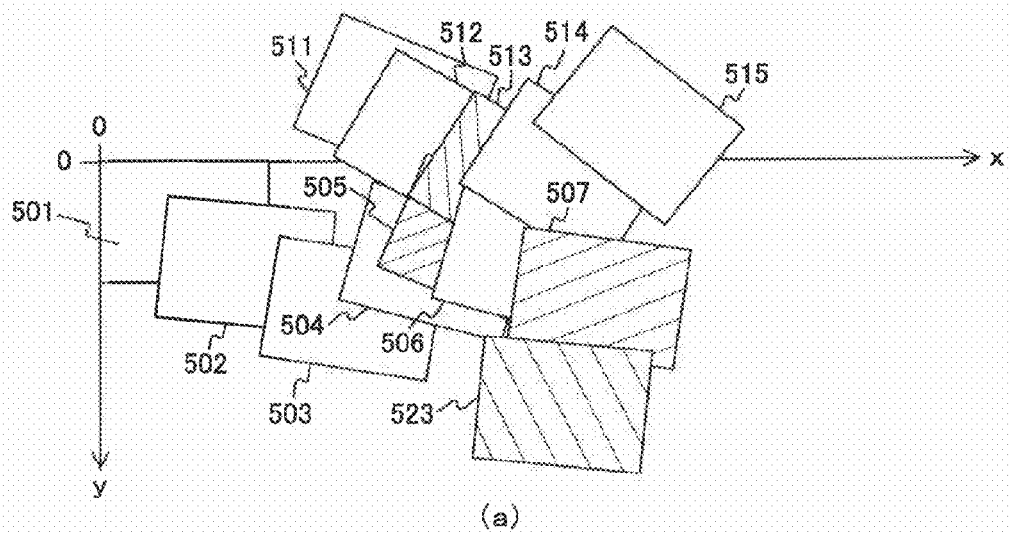
(a)
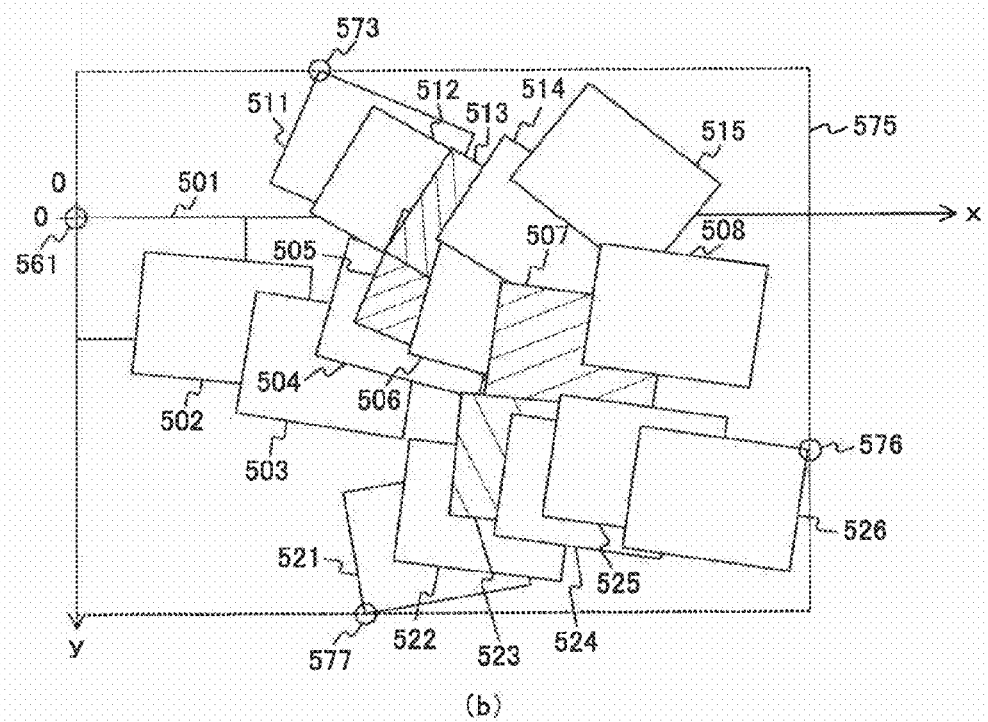
(b)

FIG.30
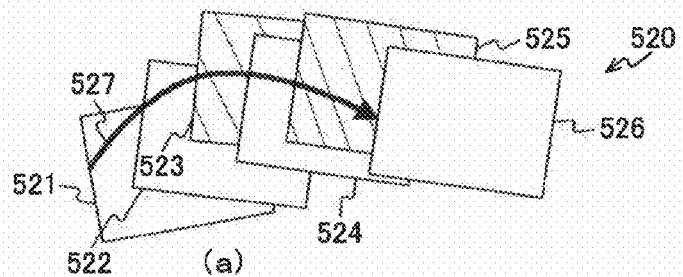
(a)
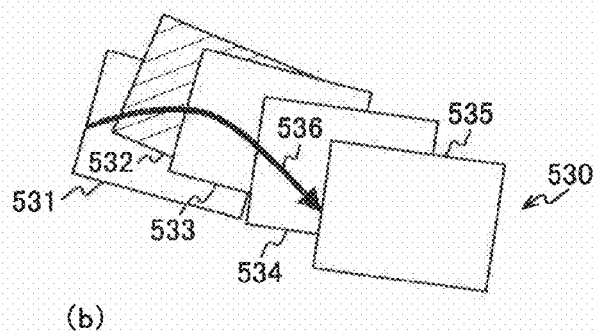
(b)
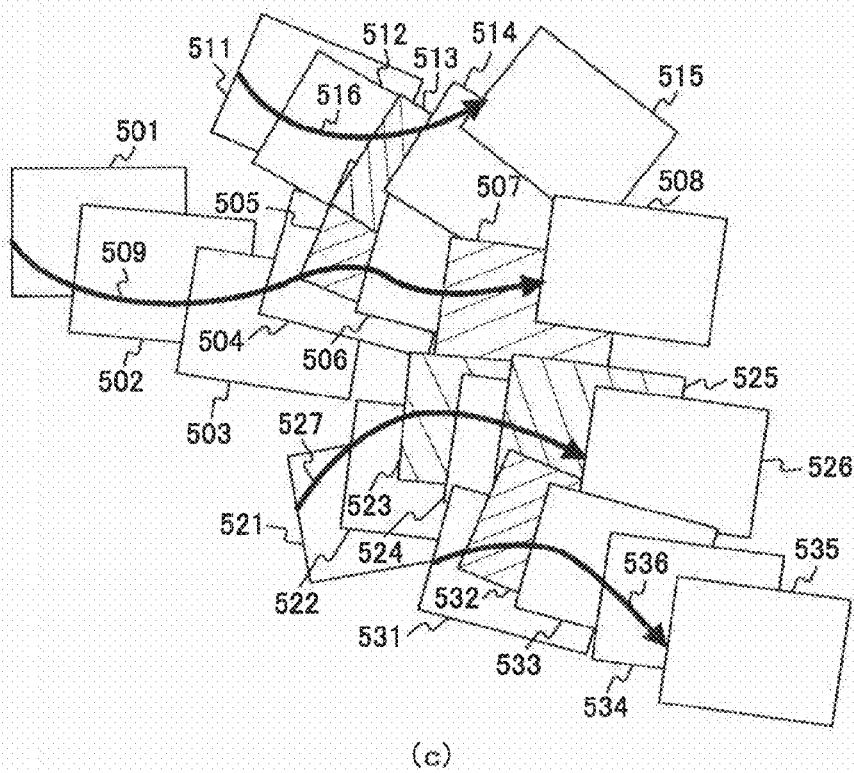
(c)

FIG.32
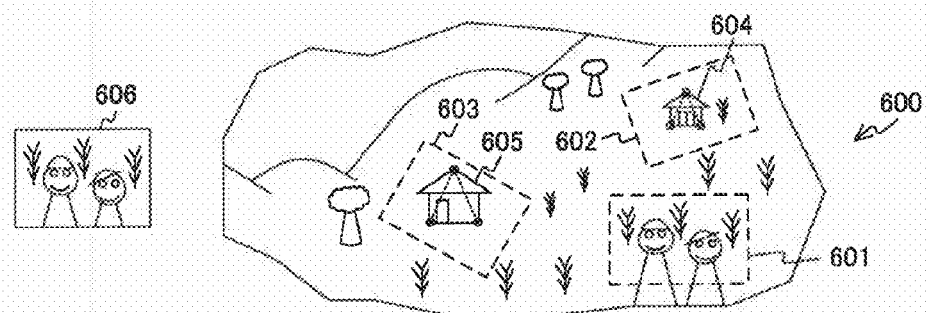
(a)
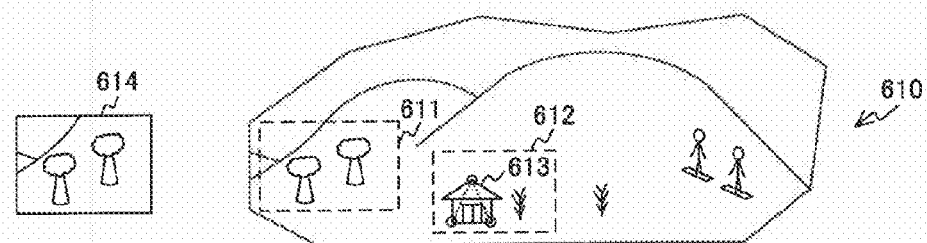
(b)
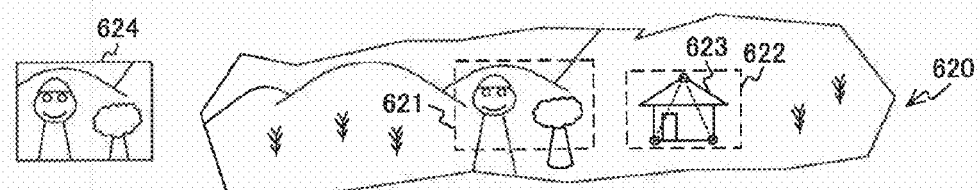
(c)
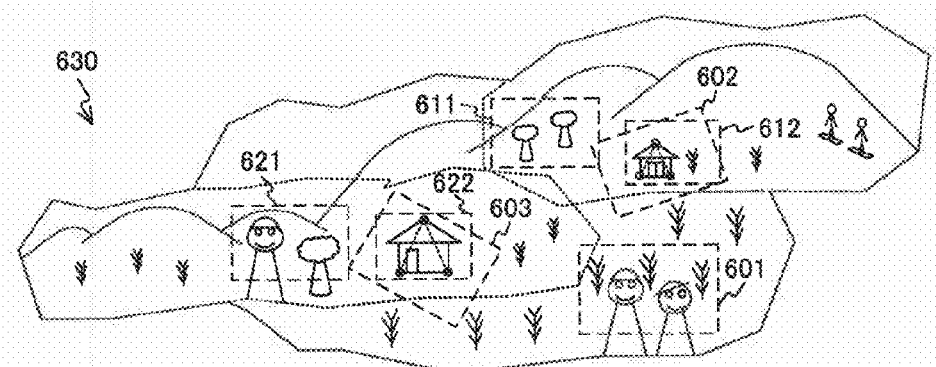
(d)

FIG. 42
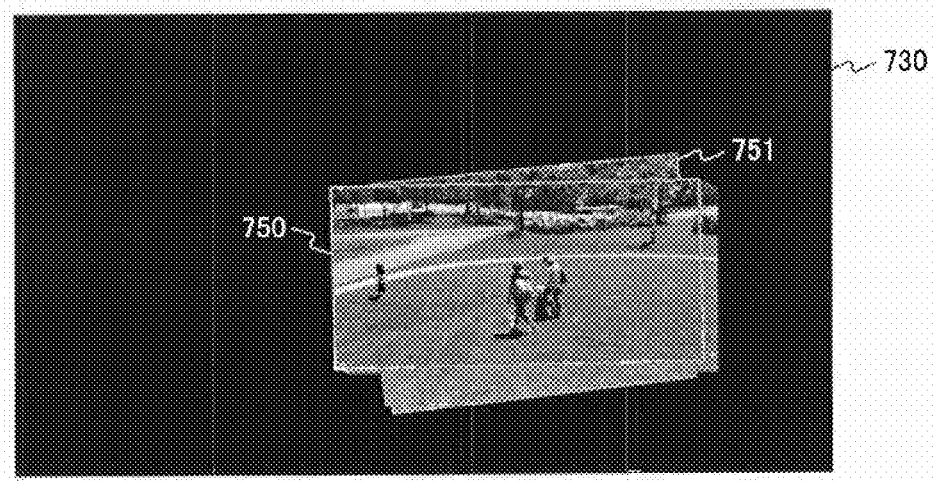
(a)
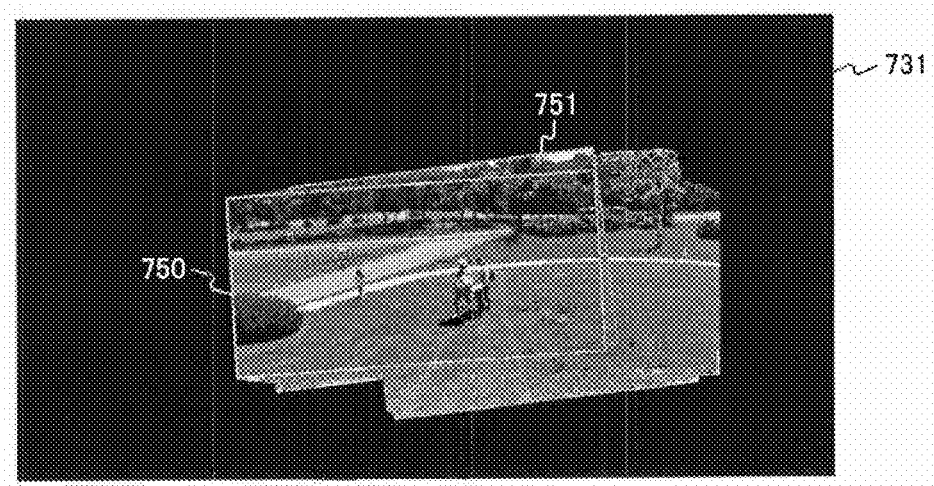
(b)
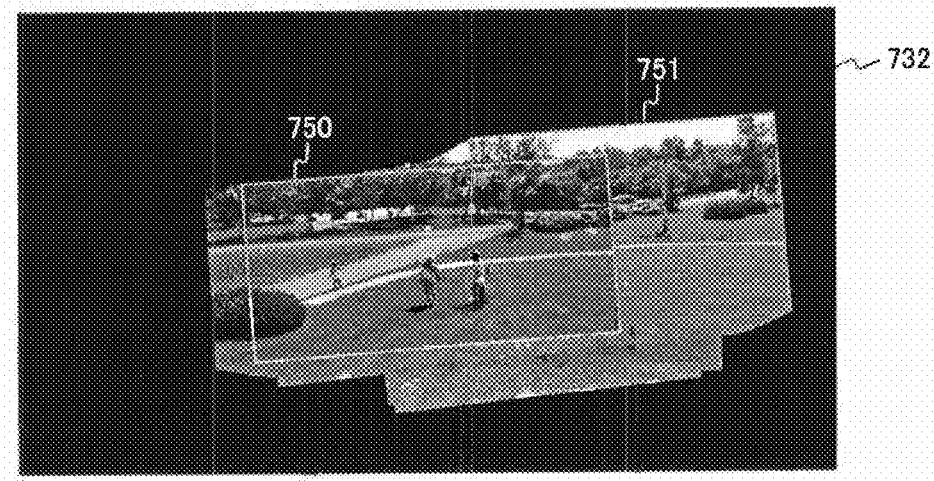
(c)

FIG.43
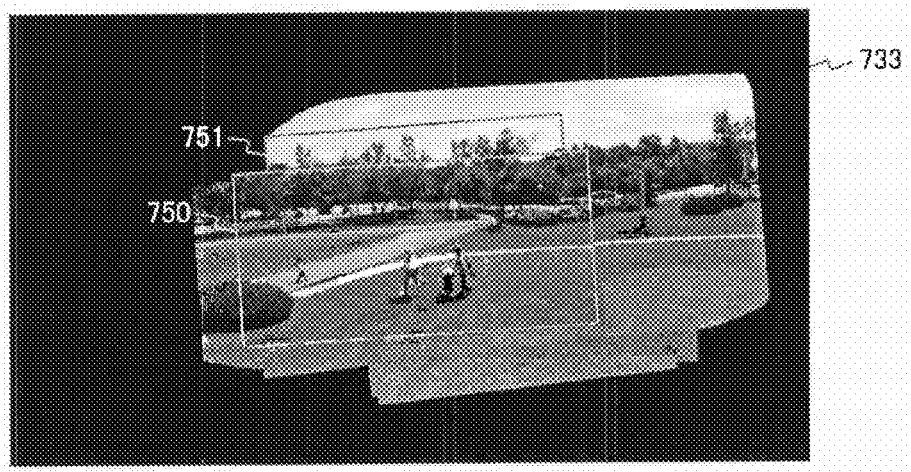
(a)
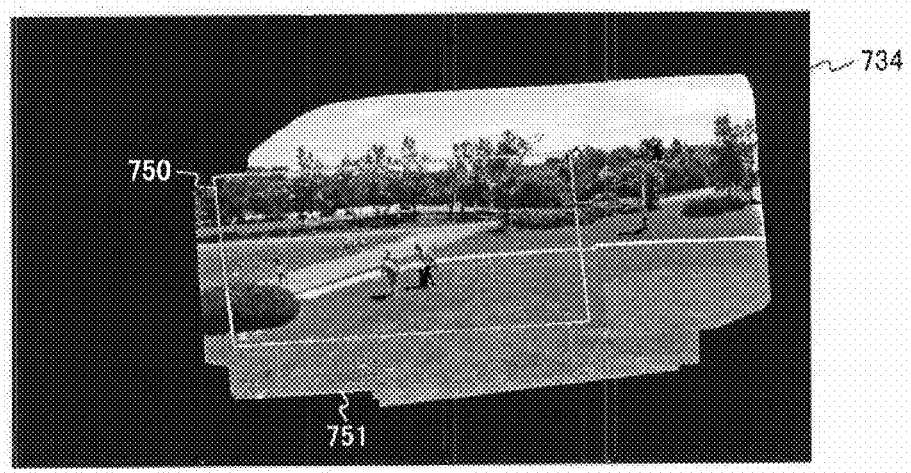
(b)
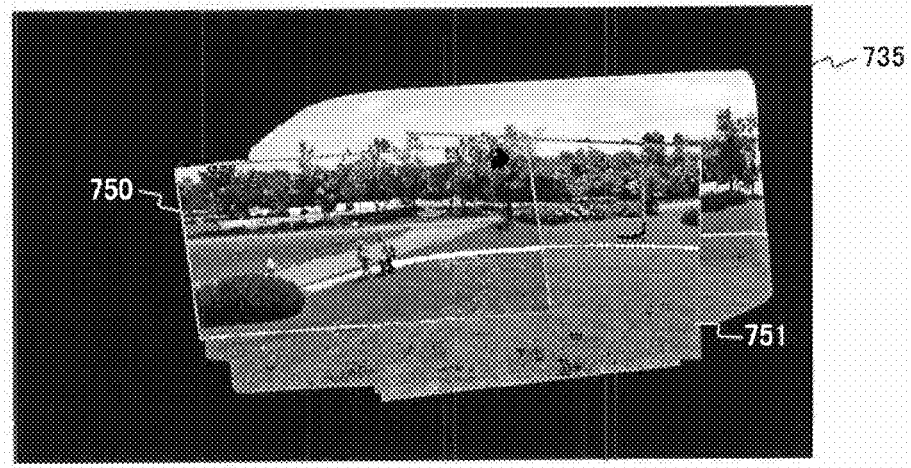
(c)

FIG.44
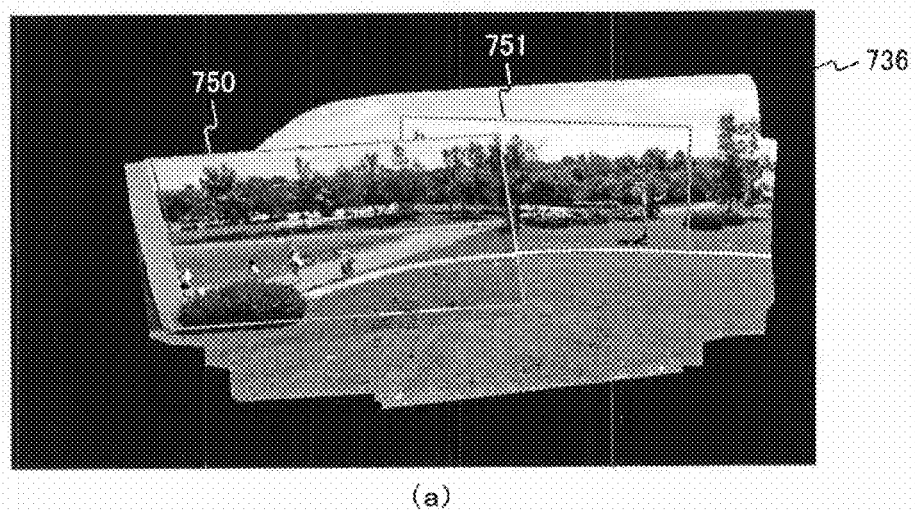
(a)
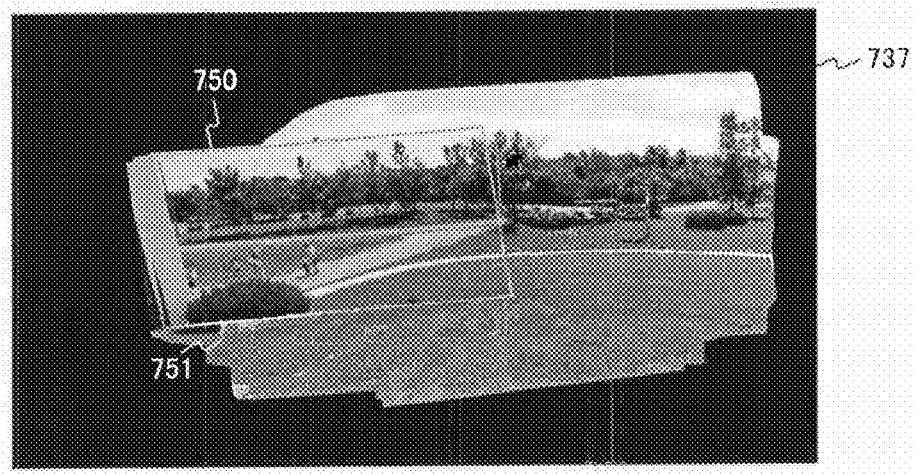
(b)
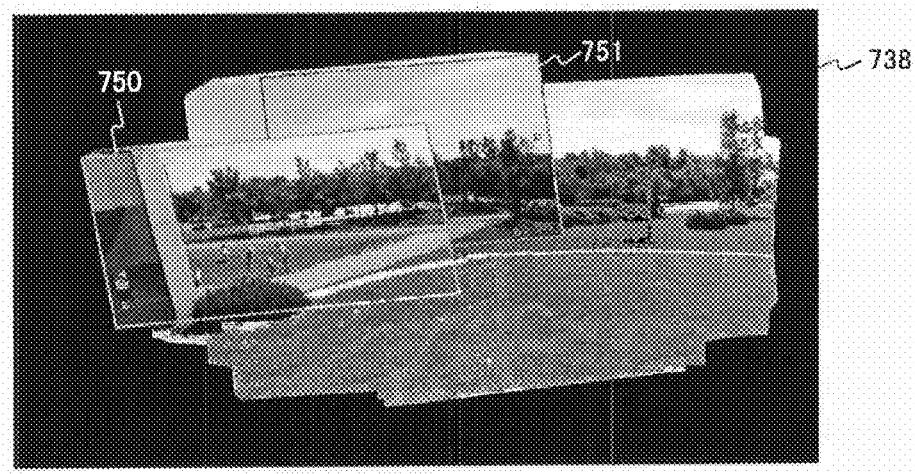
(c)

FIG.45
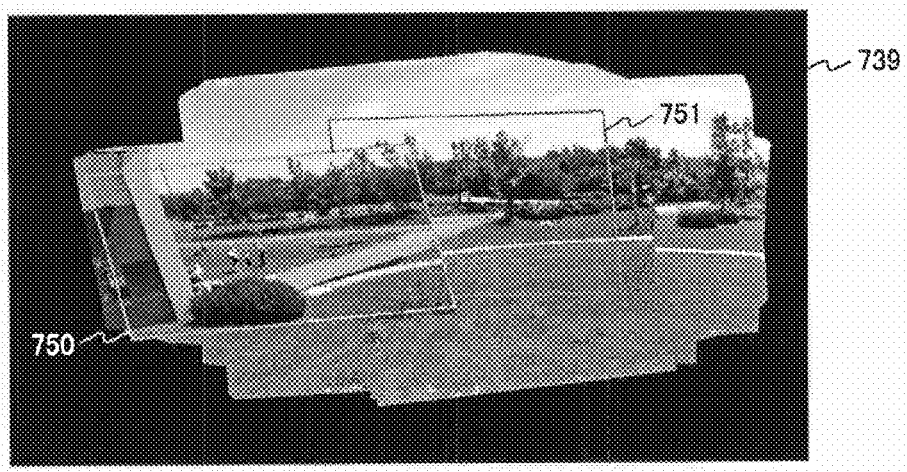
(a)
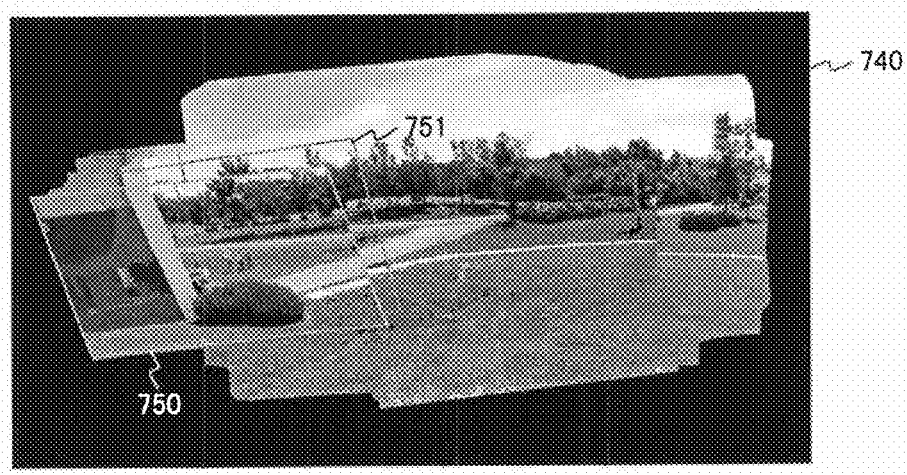
(b)
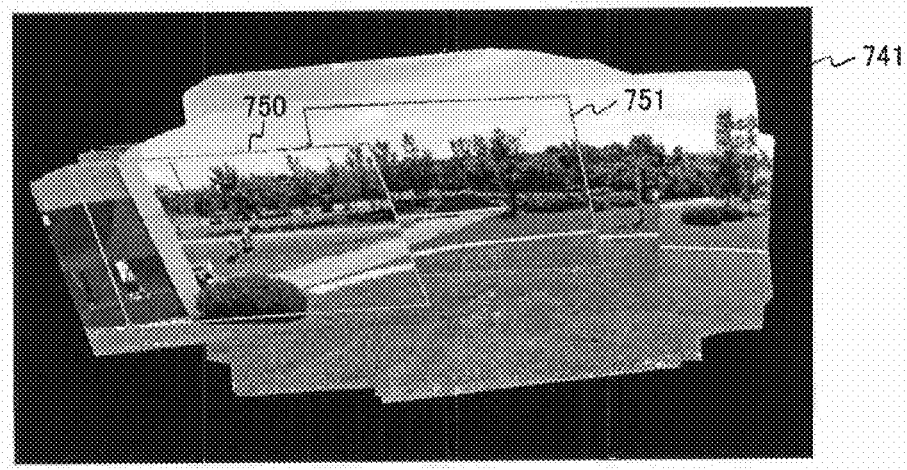
(c)

FIG.46
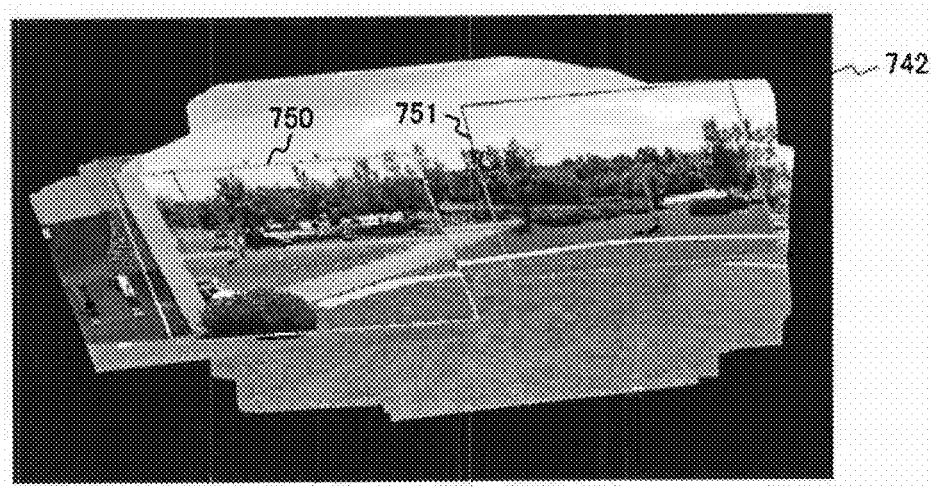
(a)
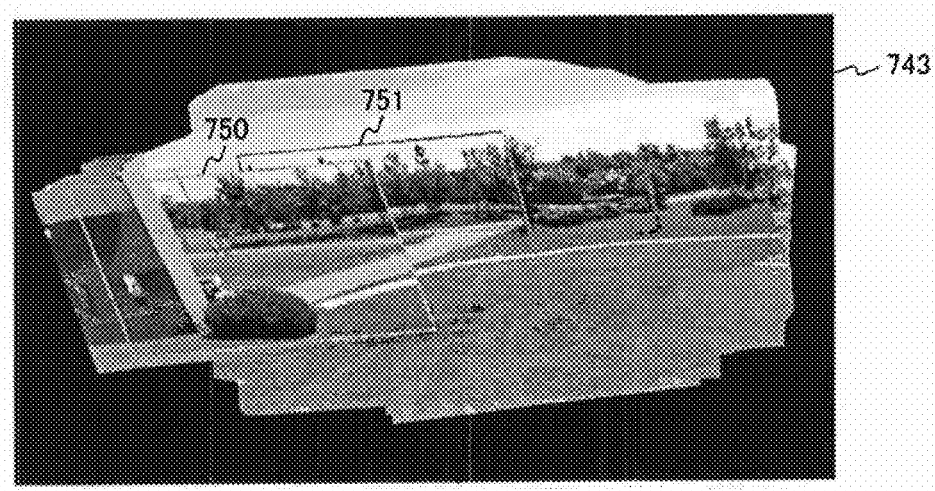
(b)
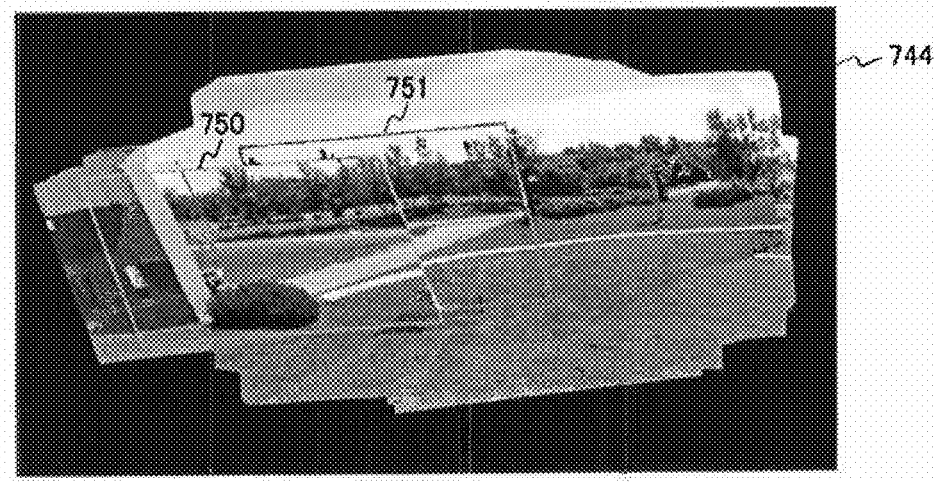
(c)

⇩ SIMD MATHEMATICAL OPERATION 827　　　　828　　　　829

| A1 | | B1 | | C1 |
| A2 | + | B2 | = | C2 |
| A3 | | B3 | | C3 |
| A4 | | B4 | | C4 |

(b)

FIG.57
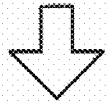
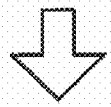
RESULT OUTPUT

Figure 60:
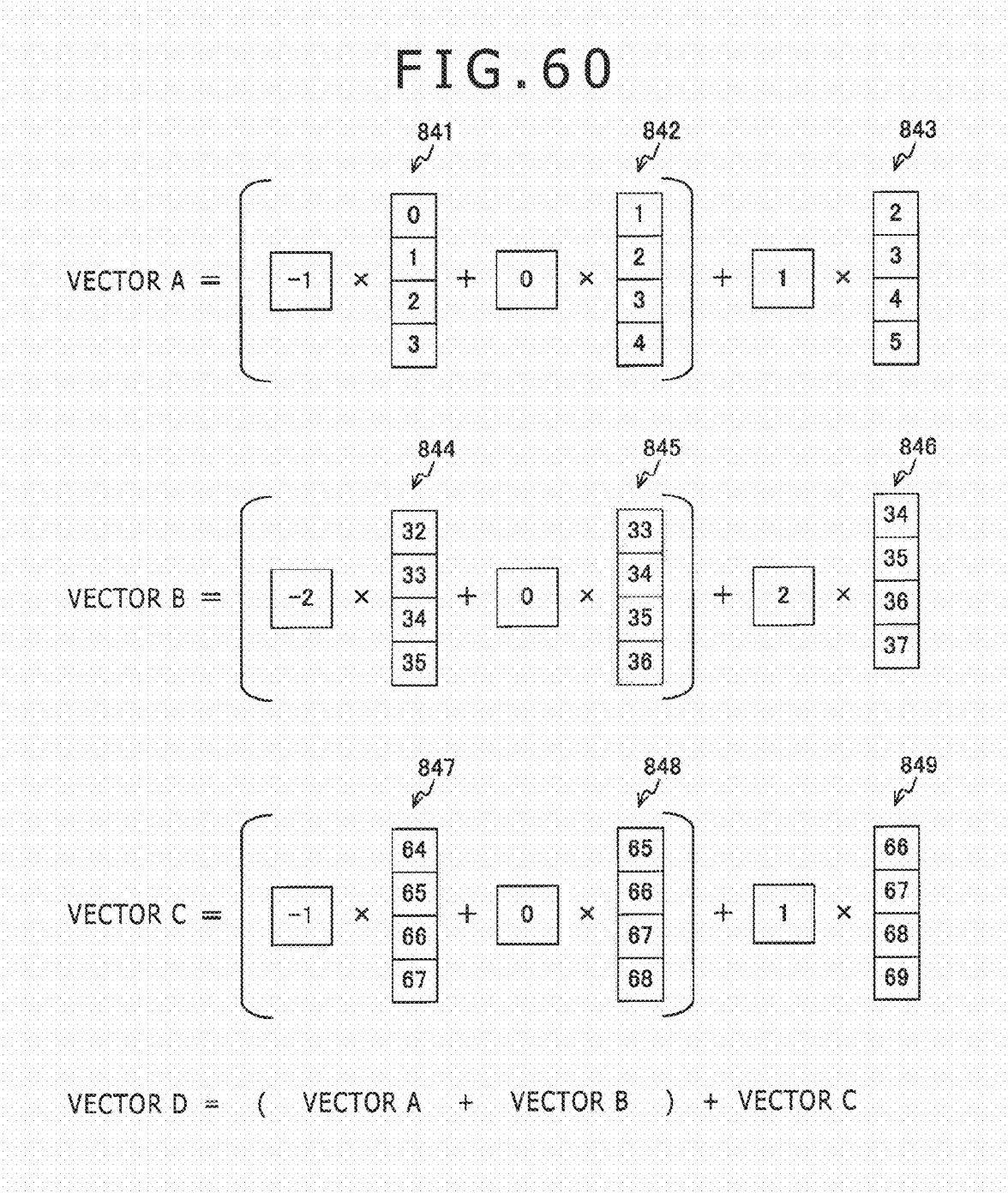

VECTOR A = [ -1 × [0,1,2,3]₈₄₁ + 0 × [1,2,3,4]₈₄₂ + 1 × [2,3,4,5]₈₄₃ ]

VECTOR B = [ -2 × [32,33,34,35]₈₄₄ + 0 × [33,34,35,36]₈₄₅ + 2 × [34,35,36,37]₈₄₆ ]

VECTOR C = [ -1 × [64,65,66,67]₈₄₇ + 0 × [65,66,67,68]₈₄₈ + 1 × [66,67,68,69]₈₄₉ ]

VECTOR D = ( VECTOR A + VECTOR B ) + VECTOR C

IMAGE PROCESSING APPARATUS, DYNAMIC PICTURE REPRODUCTION APPARATUS, AND PROCESSING METHOD AND PROGRAM FOR THE SAME

TECHNICAL FIELD

This invention relates to an image processing apparatus, and particularly to an image processing apparatus and a dynamic picture reproduction apparatus which can reproduce dynamic pictures and a processing method for them as well as a program for causing a computer to execute the method.

BACKGROUND ART

In recent years, a digital video camera has been popularized. Therefore, for example, in an event of a kindergarten to which a child attends, a manner of the event is often imaged by the father, the mother or the like of the child using a digital video camera. Where an image is picked up in such an event as just described by the father, mother or the like, although the image is frequently picked up with the child centered therein, also an image of a scene of the event or the like is often picked up suitably such that a manner of the event can be recognized.

A dynamic picture picked up in this manner can be reproduced, for example, using a dynamic picture reproduction apparatus by a display apparatus of the same in a home. For example, where a dynamic picture picked up with a child of the user positioned at the center is accessed, dynamic pictures in which the child of the user is included principally are reproduced. However, where the reproduction time is long, if dynamic pictures of the same object are continuously accessed, then the interest of the accessing person in the dynamic picture being reproduced sometimes decreases in accordance with lapse of the reproduction time. Therefore, it is a possible idea to display some other image or the like which is associated with the image being currently displayed in order to promote the interest of the accessing person.

For example, an image display method has been proposed wherein, together with a dynamic picture image, a video index (still picture) is displayed through scrolling display in accordance with the progress of the dynamic picture image (for example, refer to Japanese Patent Laid-Open No. Hei 11-289517 (FIG. 7)).

DISCLOSURE OF INVENTION

According to the related art described above, since still picture images in the past, at present, and in the future with reference to a dynamic picture image are displayed as video indices, the still picture images in the past, at present, and in the future can be accessed together with a dynamic picture image being currently displayed. Therefore, for example, in a case wherein a dynamic picture picked up in an event of a kindergarten to which a child of an accessing person attends, even where the child of the accessing person is displayed as a dynamic picture image at present, a scene or the like of the event associated with the dynamic picture image at present is sometimes displayed as a still picture in the past or in the future. In this instance, since the accessing person can watch also the scene of the event or the like while observing a manner of the child of the accessing person, the accessing person can easily grasp the manner of the event, and the interest of the accessing person can be raised.

However, in the related art described above, in a case wherein a child of an accessing person is displayed as a dynamic picture at present, as a still picture image in the past or in the future, contents substantially same as those of the dynamic picture at present are sometimes displayed while a scene or the like of the event is not displayed. In such an instance, it is significant to maintain the interest of the accessing person in the dynamic picture.

Therefore, it is a possible idea to transform, in order that the accessing person can suitably grasp a manner around the key person while an accessing person accesses the key figure of an object of image pickup, images which form the dynamic picture based on movement information of the image pickup apparatus and successively reproduce the images after the transformation while synthesizing them. In a case wherein images which form the dynamic picture are reproduced while synchronized in this manner, the synthesized image is displayed over a wider range than that where an ordinary dynamic picture is displayed. In a case wherein a synthesized image is displayed in a wider range in this manner, there is the possibility that part of an image may be hidden during reproduction and the accessing person may not be able to grasp the contents of the dynamic picture. Therefore, it is significant to display an image appropriately during reproduction so that the contents of the dynamic picture are grasped readily.

It is an object of the present invention to make it possible, where a dynamic picture picked up by an image pickup apparatus is to be accessed, to allow the contents of the dynamic picture to be grasped readily.

The present invention has been made to solve the subject described above, and according to a first aspect of the present invention, there are provided an image processing apparatus including dynamic picture storage means for storing a picked up dynamic picture picked up by an image pickup apparatus, transformation information storage means for storing transformation information for transforming a second picked up images which is positioned, with reference to a first picked up image which forms the picked up dynamic picture, following the first picked up image on a time axis of the picked up dynamic picture for each second picked up image, image storage means for storing history images including the picked up images positioned preceding to the second picked up image on the time axis, arrangement information calculation means for calculating a display range formed from the picked up images to be transformed based on the transformation information regarding the picked up images which form the picked up dynamic picture and calculating arrangement information of a third picked up image, which is at least one of the picked up images, on the image storage means based on the display range, image transformation means for transforming the second picked up image based on the transformation information, and image synthesis means for synthesizing the transformed second picked up image on the history images including the third picked up image arranged in the image storage means based on the calculated arrangement information and storing the synthesized second picked up image as a new history image into the image storage means, and a processing method for the image processing apparatus as well as a program for causing a computer to execute the method. This brings the following operation. In particular, a display range formed from the picked up images is calculated based on the transformation information regarding the picked up images, and arrangement information of a predetermined picked up image on the image storage means is calculated based on the display region. Then, the picked up image is transformed based on the transformation information, and the transformed picked up image is synthesized with the history images to produce a new history image.

Further, according to this first aspect, the dynamic picture storage means may store a first picked up dynamic picture and a second picked up dynamic picture as the picked up dynamic picture, and the transformation information storage means may store first transformation information which is the transformation information regarding the first picked up dynamic picture and second transformation information which is the transformation information regarding the second picked up dynamic picture for each picked up image. The image processing apparatus further include relative relationship information storage means for storing relative relationship information representative of a relative positional relationship between at least one of the picked up images which form the first picked up dynamic picture and at least one of the picked up images which form the second picked up dynamic picture, and object image transformation information calculation means for calculating object image transformation information to be used, where at least one of the picked up images which form the first picked up dynamic picture is determined as a reference image and the picked up images which form the second dynamic picture are determined as object images, for transformation of the object images based on the relative relationship information, first transformation information, and second transformation information. The image transformation means transforms the object image based on the object image transformation information and the second transformation information and transforms the picked up images which form the first picked up dynamic picture based on the first transformation information. The arrangement information calculation means calculates the display range based on the object image transformation information, first transformation information, and second transformation information and calculates the arrangement information based on the display range. The image synthesis means synthesizes the picked up images which form the transformed first picked up dynamic picture and the object images into the history image. This brings the following operation. In particular, object image transformation information to be used for the transformation of the object images is calculated based on the relative relationship information, first transformation information and second transformation information, and the object images are transformed based on the object image transformation information and the second transformation information. Further, the picked up images which form the first picked up dynamic picture are transformed based on the first transformation information, and a display range is calculated based on the object image transformation information, first transformation information and second transformation information. Further, arrangement information is calculated based on the display range, and the picked up images which form the transformed first picked up dynamic picture and the history images are synthesized into the history image.

Furthermore, according to this first aspect, the dynamic picture storage means may store a plurality of picked up dynamic pictures including the first picked up dynamic picture and the second picked up dynamic picture, and the image processing apparatus may further include display means for displaying the new history image, operation acceptance means for accepting a selection operation for selecting at least one of the picked up dynamic pictures stored in the dynamic picture storage means, and display control means for controlling, when a selection operation to select the first picked up dynamic picture or the second picked up dynamic picture is accepted by the operation acceptance means, the display means to display that synthesis by the image synthesis means of the first picked up dynamic picture and the second picked up dynamic picture is possible. This brings the following operation. In particular, if a selection operation to select the first picked up dynamic picture or the second picked up dynamic picture is accepted, then it is displayed that synthesis of the first picked up dynamic picture and the second picked up dynamic picture is possible.

Further, according to this first aspect, the display control means may control the display means to display marks representative of the picked up dynamic pictures stored in the dynamic picture storage means individually for the picked up dynamic pictures, control, when a selection operation to select the first picked up dynamic picture is accepted by the operation acceptance means, the display means to display the mark representative of the second picked up dynamic picture in a mode different from that of the other marks, and control, when a selection operation to select the second picked up dynamic picture is accepted by the operation acceptance means, the display means to display the mark representative of the first picked up dynamic picture in a mode different from that of the other marks. This brings the following operation. In particular, where a mark representative of a picked up dynamic picture is displayed for each picked up dynamic picture, if a selection operation to select the first picked up dynamic image is accepted, then the mark representative of the second picked up dynamic picture is displayed in a mode different from that of the other marks. On the other hand, if a selection operation to select the second picked up dynamic picture is accepted, then the mark representative of the first picked up dynamic picture is displayed in a mode different from that of the other marks.

Further, according to this first aspect, the arrangement information calculation means may calculate the arrangement information based on the size of the storage region of the image storage means and the display range. This brings an operation that arrangement information is calculated based on the size of the storage region of the image storage means and the display region.

Further, according to this first aspect, the arrangement information calculation means may calculate the arrangement position and the size of the third picked up image in the image storage means such that the display range is smaller than the size of the storage region in the image storage means. This brings an operation that the arrangement position and the size of a predetermined picked up image in the image storage means are calculated such that the display range is smaller than the size of the storage region in the image storage means.

Meanwhile, according to a second aspect of the present invention, there are provided an image processing apparatus including image synthesis means for synthesizing, based on movement information of an image pickup apparatus upon image pickup, picked up images which form a picked up dynamic picture picked up by the image pickup apparatus to form a synthesized image, display means for displaying the synthesized image in a predetermined display region, and arrangement information calculation means for calculating arrangement information of at least one of the picked up images in the display region based on the movement information, the image synthesis means synthesizing the picked up images based on the calculated arrangement information, and a processing method for the image processing apparatus as well as a program for causing a computer to execute the method. This brings the following operation. In particular, based on movement information of the image pickup apparatus upon image pickup, picked up images which form the picked up dynamic picture are synthesized to form a synthesized image, and arrangement information of a predetermined picked up image in the display region is calculated based on the movement information. Then, the picked up images are synthesized based on the calculated arrangement information.

Further, according to a third aspect of the present invention, there are provided a dynamic picture reproduction apparatus including dynamic picture storage means for storing a picked up dynamic picture picked up by an image pickup apparatus, transformation information storage means for storing transformation information for transforming a second picked up images which is positioned, with reference to a first picked up image which forms the picked up dynamic picture, following the first picked up image on a time axis of the picked up dynamic picture for each second picked up image, image storage means for storing history images including the picked up images positioned preceding to the second picked up image on the time axis of the picked up dynamic picture, arrangement information calculation means for calculating a display range formed from the picked up images to be transformed based on the transformation information regarding the picked up images which form the picked up dynamic picture and calculating arrangement information of a third picked up image, which is at least one of the picked up images, on the image storage means based on the display range, image transformation means for transforming the second picked up image based on the transformation information, image synthesis means for synthesizing the transformed second picked up image on the history images including the third picked up image arranged in the image storage means based on the calculated arrangement information and storing the synthesized second picked up image as a new history image into the image storage means, and display control means for controlling display means to successively display the new history image, and a processing method for the dynamic picture reproduction apparatus as well as a program for causing a computer to execute the method. This brings the following operation. In particular, based on transformation information regarding picked up images, a display range formed from the picked up images is calculated, and arrangement information of a predetermined picked up image in the image storage means is calculated based on the display range. Then, the picked up image is transformed based on the transformation information, and the transformed picked up image is synthesized with the history images to form a new history image. Then, the new history image is successively displayed.

According to the present invention, a superior effect that, where a dynamic picture picked up by an image pickup apparatus is to be accessed, the contents of the dynamic picture can be grasped readily can be achieved.

BRIEF DESCRIPTION OF DRAWINGS

FIG. 4 is views schematically showing files recorded in a dynamic picture storage section 200 and a metadata storage section 210 in the embodiment of the present invention.

FIG. 7 is views showing images simplified by omitting the background and so forth from the images corresponding to the frames which form a dynamic picture.

FIG. 9 is views schematically illustrating an affine transformation parameter calculation method for calculating an affine transformation parameter regarding two images by selecting a coincident point included in the images and synthesis of the two images based on the selected coincident point.

FIG. 22 is views showing a display example (image 480) in a case wherein a dynamic picture picked up by a camera is reproduced and an image 484 before a current image 482 of the image 480 is affine-transformed.

FIG. 23 is views showing an image 485 where an image region surrounded by a framework 483 shown in FIG. 22 is displayed in an enlarged scale and an image 487 stored in a display memory 270 in a state wherein a current image after affine transformation is stored into an image memory 250.

FIG. 24 is views schematically illustrating an example of synthesis where two dynamic pictures are synthesized.

FIG. 26 is views illustrating an outline of a size calculation method of a synthesized image produced by synthesis of images which form a dynamic picture in a case wherein the size of the synthesized image is calculated.

FIG. 28 is views schematically illustrating an example of synthesis where three dynamic pictures are synthesized.

FIG. 29 is views illustrating an outline of a size calculation method of a synthesized image produced by synthesis of images which form a dynamic picture in a case wherein the size of the synthesized image is calculated.

FIG. 30 is views schematically illustrating an example of synthesis in a case wherein four dynamic pictures are synthesized.

FIG. 32 is views schematically illustrating a relationship between a representative image representative of a dynamic picture and a synthesized image produced in regard to the dynamic picture and showing a synthesized image produced in regard to a plurality of dynamic pictures.

FIG. 42 is views illustrating an example of transition of a plurality of dynamic pictures picked up by a camera.

FIG. 43 is views illustrating another example of transition of a plurality of dynamic pictures picked up by a camera.

FIG. 44 is views illustrating a further example of transition of a plurality of dynamic pictures picked up by a camera.

FIG. 45 is views illustrating yet another example of transition of a plurality of dynamic pictures picked up by a camera.

FIG. 46 is views illustrating a yet further example of transition of a plurality of dynamic pictures picked up by a camera.

FIG. 55 is views illustrating an outline of a mathematical operation method wherein processes for a plurality of data are carried out in accordance with individual instructions and an outline of SIMD mathematical operation wherein a process for a plurality of data is carried out in accordance with a single instruction.

FIG. 57 is a view schematically illustrating a data structure and a flow of processes for image data stored in a main memory 781 in the embodiment of the present invention where a filtering process is carried out using a Sobel filter 830.

FIG. 59 is a view schematically illustrating a vector production method for producing nine vectors from image data stored in a first buffer 831 where a filtering process is carried out using the Sobel filter 830 in the embodiment of the present invention.

FIG. 60 is views schematically illustrating a vector mathematical operation method for carrying out vector mathematical operation using an SIMD instruction regarding vector data 841 to 849 where a filtering process is carried out using the Sobel filter 830 in the embodiment of the present invention.

BEST MODE FOR CARRYING OUT THE INVENTION

In the following, an embodiment of the present invention is described in detail with reference to the drawings.

Figure 1:
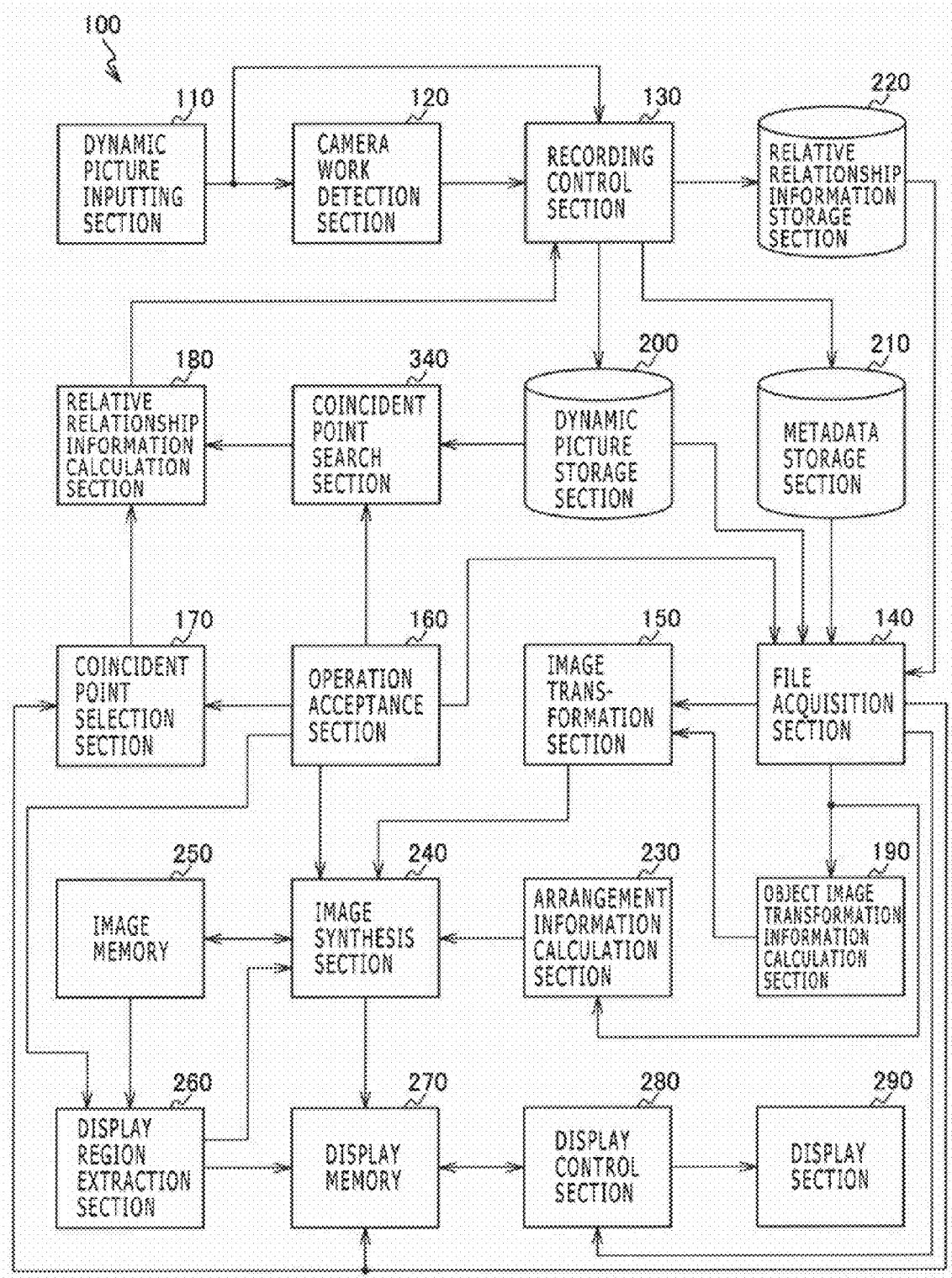
FIG. 1 is a block diagram showing an example of a functional configuration of an image processing apparatus 100 according to an embodiment of the present invention.

FIG. 1 is a block diagram showing an example of a functional configuration of an image processing apparatus 100 according to the embodiment of the present invention. The image processing apparatus 100 includes a dynamic picture inputting section 110, a camera work detection section 120, a recording control section 130, a file acquisition section 140, an image transformation section 150, an operation acceptance section 160, a coincident point selection section 170, a relative relationship information calculation section 180, an object image transformation information calculation section 190, a dynamic picture storage section 200, a metadata storage section 210, a relative relationship information storage section 220, an arrangement information calculation section 230, an image synthesis section 240, an image memory 250, a display region extraction section 260, a display memory 270, a display control section 280, a display section 290, and a coincident point search section 340. The image processing apparatus 100 can be implemented by a personal computer which can extract characteristic amounts by an image analysis from a dynamic picture picked up by an image pickup apparatus such as, for example, a digital video camera and carry out various image processes using the extracted characteristic amounts.

The dynamic picture inputting section 110 is a dynamic picture inputting section configured to input dynamic pictures picked up by an image pickup apparatus (hereinafter referred to merely as "camera") such as a digital video camera and outputs the inputted dynamic pictures to the camera work detection section 120.

The camera work detection section 120 analyzes the dynamic pictures outputted from the dynamic picture inputting section 110 to detect movement information (camera work) of the camera upon image pickup and outputs affine transformation parameters (camera work parameters) calculated based on the movement information of the camera to the recording control section 130. In particular, the camera work detection section 120 extracts characteristic points from each of images which form dynamic pictures and extract an optical flow (motion vector) regarding each of the characteristic points. Then, the camera work detection section 120 analyzes the extracted optical flows regarding the characteristic points to select those characteristic points which indicate a dominant movement and estimates the movement of the camera based on the optical flows regarding the characteristic points which indicate the dominant movement. Here, the dominant movement signifies an orderly movement indicated by a comparatively great number of optical flows from among optical flows regarding a plurality of characteristic points. It is to be noted that the camera work detection section 120 is described in detail with reference to FIG. 2.

The recording control section 130 records dynamic pictures outputted from the dynamic picture inputting section 110 as a dynamic picture file into the dynamic picture storage section 200 and records affine transformation parameters outputted from the camera work detection section 120 as a metadata file into the metadata storage section 210 in an associated relationship with corresponding dynamic pictures and frames. Further, the recording control section 130 records the affine transformation parameters outputted from the relative relationship information calculation section 180 into the relative relationship information storage section 220 in an associated relationship with dynamic pictures and frames corresponding to the affine transformation parameters.

The dynamic picture storage section 200 stores dynamic pictures outputted from the dynamic picture inputting section 110 as a dynamic picture file under the control of the recording control section 130. Further, the dynamic picture storage section 200 supplies the dynamic picture file in accordance with a request from the file acquisition section 140 to the file acquisition section 140 and supplies at least two dynamic picture files in accordance with a request from the coincident point search section 340 to the coincident point search section 340. It is to be noted that dynamic picture files stored in the dynamic picture storage section 200 are hereinafter described with reference to FIGS. 4 and 5.

The metadata storage section 210 stores affine transformation parameters outputted from the camera work detection section 120 as a metadata file under the control of the recording control section 130. Further, the metadata storage section 210 supplies the metadata file to the file acquisition section 140 in accordance with a request from the file acquisition section 140. It is to be noted that metadata files stored in the metadata storage section 210 are hereinafter described in detail with reference to FIG. 4.

The relative relationship information storage section 220 stores affine transformation parameters outputted from the relative relationship information calculation section 180 and corresponding dynamic pictures and frames in an associated relationship with each other as a relative relationship metadata file under the control of the recording control section 130. Further, the relative relationship information storage section 220 supplies a relative relationship metadata file to the file acquisition section 140 in accordance with a request from the file acquisition section 140. It is to be noted that a relative relationship metadata file stored in the relative relationship information storage section 220 is hereinafter described in detail with reference to FIG. 5.

The file acquisition section 140 acquires at least one of files stored in the dynamic picture storage section 200, metadata storage section 210 or relative relationship information storage section 220 in response to an operation input accepted by the operation acceptance section 160, and supplies information of the acquired file or files to the associated sections. In particular, if an instruction operation to display a representative image representative of a dynamic picture is accepted by the operation acceptance section 160, then the file acquisition section 140 acquires a metadata file stored in the metadata storage section 210 and outputs a representative image stored in the metadata to the display control section 280. On the other hand, if a selection operation to select a representative image displayed on the display section 290 is accepted by the operation acceptance section 160, then the file acquisition section 140 acquires a dynamic picture file stored in the dynamic picture storage section 200 in an associated relationship with the selected representative image, a metadata file stored in the metadata storage section 210 in an associated relationship with the dynamic picture file, and all relative relationship metadata files stored in the relative relationship information storage section 220 in an associated relationship with the dynamic picture file and outputs a dynamic picture of the acquired dynamic picture file and affine transformation parameters of the metadata file to the image transformation section 150. Further, the file acquisition section 140 outputs the contents of the acquired metadata file and relative relationship metadata files to the object image transformation information calculation section 190 and the arrangement information calculation section 230. Further, the file acquisition section 140 outputs the other dynamic picture IDs included in the acquired relative relationship metadata files to the display control section 280. Further, if an instruction operation to reproduce a dynamic picture in a normal manner is accepted by the operation acceptance section 160, then the file acquisition section 140 acquires the designated dynamic picture file stored in the dynamic picture storage section 200 and outputs a dynamic picture of the dynamic picture file to the coincident point selection section 170 and the display memory 270.

The image transformation section 150 carries out affine transformation of images, which form dynamic pictures of a dynamic picture file outputted from the file acquisition section 140, for each frame using affine transformation data corresponding to the images, and outputs the affine-transformed images to the image synthesis section 240. Here, if synthesis reproduction of a plurality of dynamic pictures is selected or if a different dynamic picture is selected during synthesis reproduction of a dynamic picture, the image transformation section 150 determines one of the plural dynamic pictures of an object of reproduction as a reference dynamic picture and carries out affine transformation of the reference dynamic picture for each frame using affine transformation parameters corresponding to the images which form the reference dynamic picture. Meanwhile, as regards the other dynamic pictures than the reference dynamic picture from among the plural dynamic pictures which are an object of reproduction, the image transformation section 150 carries out affine transformation for each frame using object image transformation information (affine transformation parameters) calculated by the object image transformation information calculation section 190 and affine transformation parameters corresponding to the images which form the dynamic pictures. It is to be noted that such image transformation is described in detail with reference to FIGS. 11 to 21 and so forth. Further, a transformation method for the other dynamic pictures is hereinafter described in detail with reference to FIG. 24 and so forth.

The operation acceptance section 160 includes a keyboard including various inputting keys and a mouse (pointing device), and outputs, if an operation input from the mouse and so forth is accepted, the contents of the accepted operation input to the file acquisition section 140, coincident point selection section 170, image synthesis section 240, display region extraction section 260 or coincident point search section 340. It is to be noted that, at least part of the operation acceptance section 160 and the display section 290 may be formed integrally as a touch panel. Here, as operations of the mouse, for example, "left click" signifies that the left side button on the mouse is depressed once; "right click" signifies that the right side button of the mouse is depressed once; and "double click" signifies that the left side button of the mouse is successively depressed twice. Further, "left drag" signifies that the mouse is moved while the left side button of the mouse is kept depressed; "right drag" signifies that the mouse is moved while the right side button of the mouse is kept depressed; and "drop" signifies that the button is released after the drag to move the object during the drag or the like.

The coincident point selection section 170 selects, when an operation input of a designation operation of designating a coincident point is accepted by the operation acceptance section 160, a coincident point of images which form a dynamic picture of a dynamic picture file outputted from the file acquisition section 140. Where at least three coincident points are selected with regard to one image, the coincident point selection section 170 outputs the positions and the selection order of the selected coincident points and the images of an object of selection to the relative relationship information calculation section 180. The selection operation of coincident points may be carried out simultaneously for a plurality of images or may be carried out successively for each one dynamic picture.

The coincident point search section 340 searches, where an operation input for producing relative relationship information regarding at least two dynamic pictures in a plurality of dynamic files stored in the dynamic picture storage section 200 is accepted by the operation acceptance section 160, for at least three coincident points regarding the images which form the designated plural dynamic pictures, and outputs the images including the positions of the searched out coincident points to the relative relationship information calculation section 180. The search for coincident points can be implemented, for example, by using a technique for general object recognition or the like (for example, refer to Japanese Patent Laid-Open No. 2002-65399) by which an article included in an image can be recognized irrespective of the size of the image. Further, the coincident point search section 340 is described in detail with reference to FIG. 3.

The relative relationship information calculation section 180 calculates, based on at least two images and at least three coincident points of the images outputted from the coincident point selection section 170 or the coincident point search section 340, affine transformation parameters as relative relationship information regarding the images, and outputs the calculated affine transformation parameters and a dynamic picture ID and frame numbers of the images used for the calculation of the affine transformation parameters to the recording control section 130. It is to be noted that the calculation of the affine transformation parameters regarding the images are described in detail with reference to FIGS. 9 and 10. Further, while, in the embodiment of the present invention, an example wherein affine transformation parameters are used as relative relationship information is described, some other image transformation information such as projection transformation parameters may be used. It is to be noted that the affine transformation parameters can be determined by calculation using vectors at three points, and projection transformation parameters can be determined by calculation using vectors at four points.

If synthesis reproduction of a plurality of dynamic pictures is selected or if a different dynamic picture is selected during synthesis reproduction of a dynamic picture, the object image transformation information calculation section 190 calculates, based on affine transformation parameters of a metadata file and a relative relationship metadata file outputted from the file acquisition section 140, object image transformation information to be used for transformation of the object images. Then, the object image transformation information calculation section 190 outputs the calculated object image transformation information to the image transformation section 150. As a reference image for one dynamic picture, for example, an image corresponding to a top frame among images which form one dynamic picture can be used. Further, the object image transformation information is, for example, affine transformation parameters used for transformation of object image with respect to the reference image. It is to be noted that the calculation of the object image transformation information is described in detail with reference to FIG. 24 and so forth.

If synthesis reproduction of one dynamic picture is selected, then the arrangement information calculation section 230 calculates the size of a synthesized image (display range of the synthesized image) produced from the one dynamic picture of an object of reproduction based on affine transformation parameters of the metadata file outputted from the file acquisition section 140, and calculates arrangement information in the image memory 250 of at least one image which forms the one dynamic picture of the object of reproduction based on the calculated size of the synthesized image. Further, if synthesis reproduction of a plurality of dynamic pictures is selected or if a different dynamic picture is selected during synthesis reproduction of a dynamic picture, then the arrangement information calculation section 230 calculates the size of a synthesized image to be produced from the plural dynamic pictures of an object of reproduction based on affine transformation parameters of the metadata file and the relative relationship metadata files outputted from the file acquisition section 140, and calculates arrangement information in the image memory 250 of at least one image which forms the plural dynamic pictures of the object of reproduction based on the calculated size of the synthesized image. Then, the arrangement information calculation section 230 outputs the calculated arrangement information in the image memory 250 to the image synthesis section 240. As an image which makes an object of calculation of the arrangement information, for example, an image corresponding to the top frame among images which form one dynamic picture can be used. Further, in the description of the embodiment of the present invention, the arrangement information is described taking an arrangement position and a size of an image in the image memory 250 as an example. It is to be noted that calculation of the arrangement position and the size of a reference image are described in detail with reference to FIGS. 25 and 26 and so forth.

The image synthesis section 240 synthesizes images by overwriting an image after affine transformation by the image transformation section 150 on a synthesis image corresponding to frames up to the immediately preceding frame retained in the image memory 250 and stores the synthesized new synthesis image into the image memory 250. Further, where a plurality of dynamic pictures are selected, the image synthesis section 240 synthesizes images by overwriting the images affine-transformed by the image transformation section 150 with reference to the reference image on the synthesis images corresponding to the frames up to the immediately preceding frame retained in the image memory 250, and stores the synthesized new synthesis image into the image memory 250. It is to be noted that the image synthesis section 240 synthesizes images by overwriting a current image after affine transformation by the image transformation section 150 on the synthesis image retained in the display memory 270 based on the position of the current image in the display region outputted from the display region extraction section 260. Further, also where a plurality of dynamic pictures are selected, the image synthesis section 240 similarly synthesizes images by overwriting the individual current images after affine transformation by the image transformation section 150 on the synthesis image retained in the display memory 270 based on the positions of the current images in the display region outputted from the display region extraction section 260. Here, the size of the current image synthesized in the display memory 270 is determined based on the value of the display magnification. It is to be noted that the synthesis of a current image in the display memory 270 is described in detail with reference to FIG. 21 and so forth. It is to be noted that the reproduction starting position of a plurality of dynamic pictures may be determined individually in response to the arrangement position and the size calculated by the arrangement information calculation section 230. It is to be noted that such image synthesis is described in detail with reference to FIGS. 11 to 26 and so forth. Here, the image synthesis section 240 compresses the image after the affine transformation by the image transformation section 150 and overwrites the compressed image on the synthesized image stored in the image memory 250 to make the current image, which is to be overwritten on the synthesized image stored in the display memory 270, a picked up image of a resolution higher than that of the non-compressed image or compressed history images. Consequently, the history images when the synthesized image is to be outputted can be compressed images, and the current image can be a picked up image of a resolution higher than that of the non-compressed image or compressed history images.

The image memory 250 is a work buffer for retaining a synthesis image synthesized by the image synthesis section 240 and supplies the retained synthesis image to the image synthesis section 240 or the display region extraction section 260. In other words, the image memory 250 is an image memory for retaining history images.

The display region extraction section 260 extracts, from a synthesis image retained in the image memory 250, an image existing in a range of a display region which is a region of an object of display and stores the extracted image into the display memory 270. It is to be noted that the extraction of an image included in the range of the display region is described in detail with reference to FIGS. 20 and 21, and the calculation of the position of a current image in the display region is described in detail with reference to FIG. 21.

The display memory 270 is a displaying buffer for retaining an image extracted from the image memory 250 by the display region extraction section 260, and an image retained in the display memory 270 is displayed on the display section 290.

The display control section 280 controls the display section 290 to successively display synthesized images stored in the display memory 270 for each frame. Further, the display control section 280 controls the display section 290 to display a representative image representative of each dynamic picture based on the contents of the metadata file outputted from the file acquisition section 140. Further, the display control section 280 displays, based on the contents of the relative relationship metadata files outputted from the file acquisition section 140, representative images corresponding to dynamic picture IDs stored in the relative relationship metadata files commonly to the dynamic picture being currently reproduced from among the representative images representative of the individual dynamic pictures by adding marks such as a thick frame.

The display section 290 displays a synthesis image stored in the display memory 270 and a list of representative images under the control of the display control section 280. For example, the display section 290 can be implemented by a display unit of a personal computer or a television set. It is to be noted that display examples of a synthesis image are described in detail with reference to FIGS. 42 to 46 and so forth. Here, where a coincident point of images which form a dynamic picture is selected, a cursor (mouse pointer) which moves in response to a movement of the mouse is displayed in the screen image displayed on the display section 290 as shown in (a) and (b) of FIG. 9.

Figure 2:
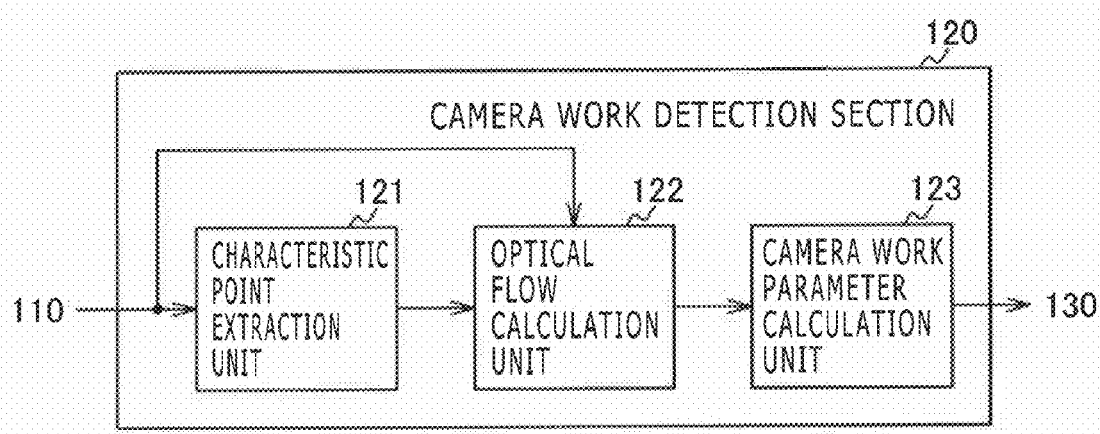
FIG. 2 is a block diagram showing an example of a functional configuration of a camera work detection section 120 in the embodiment of the present invention.

FIG. 2 is a block diagram showing an example of a functional configuration of the camera work detection section 120 in the embodiment of the present invention. The camera work detection section 120 includes a characteristic point extraction unit 121, an optical flow calculation unit 122 and a camera work parameter calculation unit 123.

The characteristic point extraction unit 121 extracts characteristic points from an image corresponding to a frame which forms a dynamic picture outputted from the dynamic picture inputting section 110 and outputs the extracted characteristic points to the optical flow calculation unit 122. Here, the characteristic point extraction unit 121 extracts, regarding a frame at the top of frames which form a dynamic picture outputted from the dynamic picture inputting section 110, characteristic points from an entire image, but, regarding frames other than the top frame, characteristic points from a regional portion picked up newly in comparison with an image corresponding to the immediately preceding frame. It is to be noted that, as a characteristic point, for example, a point at which the gradient is high on an edge in a vertical direction or a horizontal direction (the point is generally called "corner point." In the following description, the point is referred to as "corner point") can be extracted. This corner point is a characteristic point tough against calculation of an optical flow and can be determined using edge detection. It is to be noted that the extraction of a corner point is described in detail with reference to FIGS. 6 and 7. Further, in this example, while the characteristic point extraction unit 121 extracts, regarding the top frame, characteristic points from the entire image and, regarding the frames other than the top frame, characteristic points from a regional portion picked up newly in comparison with the immediately preceding image, also regarding the frames other than the top frame, characteristic points may be extracted from the entire image.

The optical flow calculation unit 122 calculates an optical flow for each characteristic point outputted from the characteristic point extraction unit 121 and outputs the optical flow determined by the calculation to the camera work parameter calculation unit 123. In particular, the optical flow calculation unit 122 compares two successive frames (current frame and immediately preceding frame) which form a dynamic picture outputted from the dynamic picture inputting section 110 with each other to determine optical flows corresponding to individual characteristic points of the image corresponding to the immediately preceding frame as optical flows of the current frame. Further, an optical flow is determined for each of frames which form a dynamic picture. It is to be noted that, as a detection method for detecting an optical flow, such detection methods as a slope method and a block matching method can be used. It is to be noted that the calculation of an optical flow is described in detail with reference to FIGS. 6 and 7.

The camera work parameter calculation unit 123 uses optical flows corresponding to characteristic points outputted from the optical flow calculation unit 122 to carry out a camera work parameter calculation process of calculating camera work parameters, and outputs calculated camera work parameters to the recording control section 130. Here, in the embodiment of the present invention, images of a plurality of dynamic pictures of an object of reproduction are transformed and displayed in conformity with a movement of the camera. In order to carry out the transformation of the images, a movement of the camera is extracted using the optical flows calculated by the optical flow calculation unit 122, and camera work parameters (transformation parameters) are calculated based on the extracted movement. It is to be noted that, in the embodiment of the present invention, an example wherein, as an image transformation method for transforming an image which forms a dynamic picture of an object reproduction, affine transformation is used is described. Further, an example wherein, as camera work parameters, affine transformation parameters corresponding to an inverse matrix to a matrix of affine transformation parameters calculated based on optical flows are used is described. In particular, in the embodiment of the present invention, the affine transform parameters to be used as transformation information are defined as affine transformation parameters which correspond not to an affine matrix which represents movements of characteristic points between successive images but to an affine matrix which represents, where one of successive images is determined as a reference image, to where an image next to the reference image moves. Further, although an example wherein affine transformation parameters are used as camera work parameters is described, some other image transformation method such as projection transformation may be used. It is to be noted that affine transformation parameters can be determined by calculation using vectors at three points. Meanwhile, projection transformation parameters can be determined by calculation using vectors at four points. Here, camera work parameters are transformation information for transforming, using at least one of picked up images which form a picked up dynamic picture as a reference, the other picked up images, and at least includes position information and posture information described in accordance with the coordinate system of the camera. In other words, camera work parameters include information relating to the position and the posture of the camera where image pickup is carried out by an image pickup person. Further, a movement of the camera by an operation of the image pickup person such as, for example, zoom-in, zoom-out, panning, tilting or rotation can be estimated based on affine transformation parameters determined by the camera work parameter calculation unit 123. It is to be noted that the calculation of an affine transformation parameter is described in detail with reference to FIGS. 6 and 7.

Figure 3:
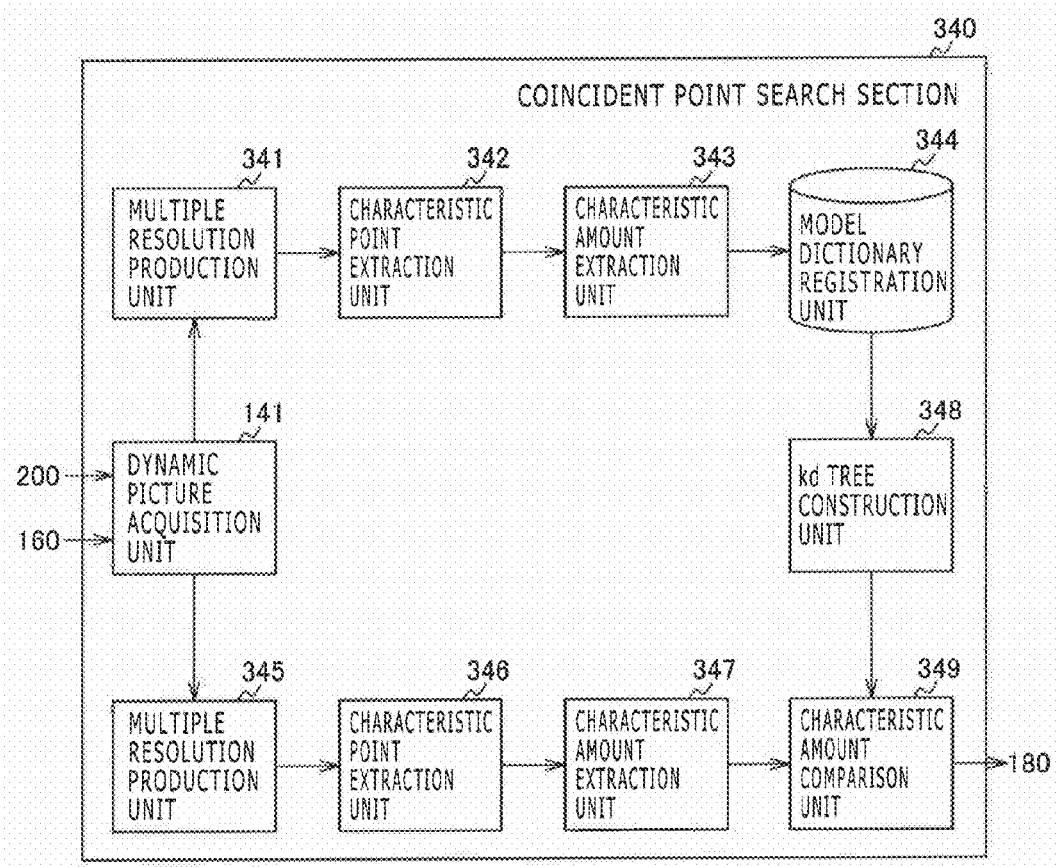
FIG. 3 is a block diagram showing an example of a functional configuration of a coincident point search section 340 in the embodiment of the present invention.

FIG. 3 is a block diagram showing an example of a functional configuration of the coincident point search section 340 in the embodiment of the present invention. The coincident point search section 340 includes a dynamic picture acquisition unit 141, a multiple resolution production unit 341, a characteristic point extraction unit 342, a characteristic amount extraction unit 343, a model dictionary registration unit 344, a multiple resolution production unit 345, a characteristic point extraction unit 346, a characteristic amount extraction unit 347, a kd tree construction unit 348, and a characteristic amount comparison unit 349. And, the coincident point search section 340 calculates a partial coincidence degree between frames which form a plurality of dynamic pictures and automatically associates the plural dynamic pictures with each other based on the calculated coincidence degree.

The dynamic picture acquisition unit 141 acquires two dynamic picture files stored in the dynamic picture storage section 200 in response to an operation input for dynamic picture acquisition from the operation acceptance section 160, and outputs images which form one of the acquired dynamic picture files for each frame to the multiple resolution production unit 341. Further, the dynamic picture acquisition unit 141 outputs images which form the other dynamic picture files for each frame to the multiple resolution production unit 345.

The multiple resolution production unit 341 lowers the resolution of an image outputted from the dynamic picture acquisition unit 141 at a ratio determined in advance to produce a multiple resolution image formed from images of a plurality of different resolutions with finer accuracy than upon recognition, and outputs the produced multiple resolution image to the characteristic point extraction unit 342.

The characteristic point extraction unit 342 extracts characteristic points from images of different resolutions of a multiple resolution image outputted from the multiple resolution production unit 341 and outputs the extracted characteristic points to the characteristic amount extraction unit 343. For the extraction method of characteristic points, for example, a method similar to a characteristic point extraction method by the characteristic point extraction unit 121 shown in FIG. 2 can be used.

The characteristic amount extraction unit 343 extracts at least two local characteristic amounts at characteristic points outputted from the characteristic point extraction unit 342 and registers the extracted characteristic amounts into the model dictionary registration unit 344. Here, the two local characteristic amounts extracted by the characteristic amount extraction unit 343 include a direction histogram of the concentration gradient in the proximity of the characteristic point extracted as a first type characteristic amount and a dimension degeneration concentration gradient vector extracted as a second type characteristic amount.

The model dictionary registration unit 344 registers characteristic amounts outputted from the characteristic amount extraction unit 343 and supplies the registered characteristic amounts to the kd tree construction unit 348.

The multiple resolution production unit 345 lowers the resolution of an image outputted from the dynamic picture acquisition unit 141 at a ratio determined in advance to produce a multiple resolution image formed from a plurality of images of different resolutions with accuracy rougher than that upon learning and outputs the produced multiple resolution image to the characteristic point extraction unit 346.

The characteristic point extraction unit 346 extracts characteristic points from each of images of different resolutions of a multiple resolution image outputted from the multiple resolution production unit 345 and outputs the extracted characteristic points to the characteristic amount extraction unit 343. For this extraction method of characteristic points, for example, a method similar to that of the characteristic point extraction unit 342 can be used.

The characteristic amount extraction unit 347 extracts at least two local characteristic amounts at characteristic points outputted from the characteristic point extraction unit 342 and outputs the extracted characteristic amounts to the characteristic amount comparison unit 349. For the characteristic amount extraction, for example, a method similar to that of the characteristic amount extraction unit 343 can be used.

The kd tree construction unit 348 constructs a kd tree for use for comparison of characteristic amounts by the characteristic amount comparison unit 349 based on characteristic amounts registered in the model dictionary registration unit 344, and outputs the constructed kd tree to the characteristic amount comparison unit 349. Here, where characteristic amounts are to be compared by the characteristic amount comparison unit 349, the characteristic amount comparison unit 349 compares characteristic point characteristic amounts extracted from the characteristic amount extraction unit 347 and characteristic point characteristic amounts registered in the model dictionary registration unit 344 with each other to search for a combination of a characteristic point characteristic amount extracted from the characteristic amount extraction unit 347 and a similar characteristic point characteristic amount registered in the model dictionary registration unit 344. The simplest method as the characteristic amount comparison method is the total inspection. In particular, a method of carrying out calculation of the characteristic amount similarity degree of each of characteristic point characteristic amounts extracted from the characteristic amount extraction unit 347 to the characteristic point characteristic amounts registered in the model dictionary registration unit 344 and selecting, based on the calculated similarity degrees, a combination of similar characteristic point characteristic amounts is the simplest method. However, the method by the total search requires long processing time. Therefore, in the embodiment of the present invention, in order to search for data at a high speed from a large amount of data group, an example which uses a tree search method which uses a data structure called kd tree (J. H. Friedman, J. L. Bentley and R. A. Finkel: "An algorithm for finding best matches in logarithmic expected time," ACM Transaction on Mathematical Software, Vol. 3, No. 3, pp. 209-226, September 1977) is described. The kd tree is a tree which has a k-dimensional tree structure. It is to be noted that, in the embodiment of the present invention, a 36$d$ tree (k=36) of characteristic amounts of the type 1 and an 18$d$ tree (k=18) of characteristic amounts of the type 2 are constructed. In each leaf (terminal node) of the constructed tree, one characteristic point characteristic amount is retained together with information of a label or the like for reference with regard to of which characteristic point the characteristic amount is, from which one of the scales the characteristic point is extracted, of which one of images of a multiple resolution image group the scales are and of which frame the multiple resolution image group is.

The characteristic amount comparison unit 349 compares characteristic point characteristic amounts extracted from the characteristic amount extraction unit 347 with characteristic point characteristic amounts represented as a Kd tree constructed by the kd tree construction unit 348 with each other to carry out k-NN (k Nearest Neighbor) search to calculate the similarity degree to search for a combination of similar characteristic point characteristic amounts and outputs the position of the characteristic point corresponding to the searched out combination of the characteristic point characteristic amounts as a coincident point to the relative relationship information calculation section 180. Here, characteristic amounts regarding one or a plurality of dynamic pictures may be registered in advance in the model dictionary registration unit 344 such that the dynamic picture acquisition unit 141 successively acquires other dynamic picture files stored in the dynamic picture storage section 200 to successively search for a coincident point between the registered dynamic pictures and the other dynamic pictures. Or, the coincident point search section 340 may successively acquire the dynamic picture files stored in the dynamic picture storage section 200 to automatically and successively search for a coincident point regarding the dynamic picture files stored in the dynamic picture storage section 200. It is to be noted that the coincident point of an object of the search is described in detail with reference to FIG. 10.

FIG. 4 is views schematically showing files recorded in the dynamic picture storage section 200 and the metadata storage section 210 in the embodiment of the present invention. In (a) of FIG. 4, dynamic picture files 201 to 204 stored in the dynamic picture storage section 200 and metadata files 211 to 213 stored in an associated relationship with the dynamic picture files 201 to 204 in the metadata storage section 210 are illustrated. Here, it is assumed that a dynamic picture ID which is identification information for identifying each of the dynamic picture files stored in the dynamic picture storage section 200 is applied to each dynamic picture file. For example, "#1" is applied to the dynamic picture file 201; "#2" is applied to the dynamic picture file 202; and "#n" is applied to the dynamic picture file 204.

(b) of FIG. 4 is a view schematically illustrating the dynamic picture file 201 stored in the dynamic picture storage section 200 and the metadata file 211 stored in an associated relationship with the dynamic picture file 201 in the metadata storage section 210. Here, the dynamic picture file 201 is a file of dynamic pictures formed from n frames, and the n frames are denoted as frames "1" 205 to "n" 208.

Meanwhile, a dynamic picture ID 214, a representative image 215, a frame number 216 and an affine transformation parameter 217 are stored in an associated relationship with each other into the metadata file 211.

The dynamic picture ID 214 is a dynamic picture IC applied to a corresponding dynamic picture file, and, for example, "#1" applied to the dynamic picture file 201 is stored in the dynamic picture ID 214.

The representative image 215 is an image representative of a dynamic picture of a corresponding dynamic picture file, and for example, at least one image extracted from the dynamic picture file is placed as the representative image 215. For example, the top image corresponding to the top frame which forms the dynamic picture file is extracted, and this top image is placed as the representative image. It is to be noted that some other mark representative of the dynamic picture (for example, an icon produced from an animation) may be placed as the representative image, or a plurality of images extracted from the dynamic picture file may be placed. In the description of the embodiment of the present invention, an example wherein such representative images are displayed to select a desired dynamic picture is described.

The frame number 216 is a serial number of each of frames which form a dynamic picture of a corresponding dynamic picture file, and, for example, "1" to "n" corresponding to the frames "1" 205 to "n" 208 which form a dynamic picture of the dynamic picture file 201 are placed in the frame number 215.

The affine transformation parameter 217 is an affine transformation parameter calculated for each frame of a dynamic picture corresponding to the frame number 216. It is to be noted that affine transform parameters 217 "a1, b1, c1, d1, e1, f1" corresponding to "1" of the frame number 216 are affine transform parameters of a unit matrix. Further, "am, bm, cm, dm, em, fm" of the affine transformation parameter 217 corresponding to "m (m is an integer equal to or higher than two)" of the frame number 215 are affine transformation parameters for the frame "m−1" immediately preceding to the frame "m."

Figure 5:
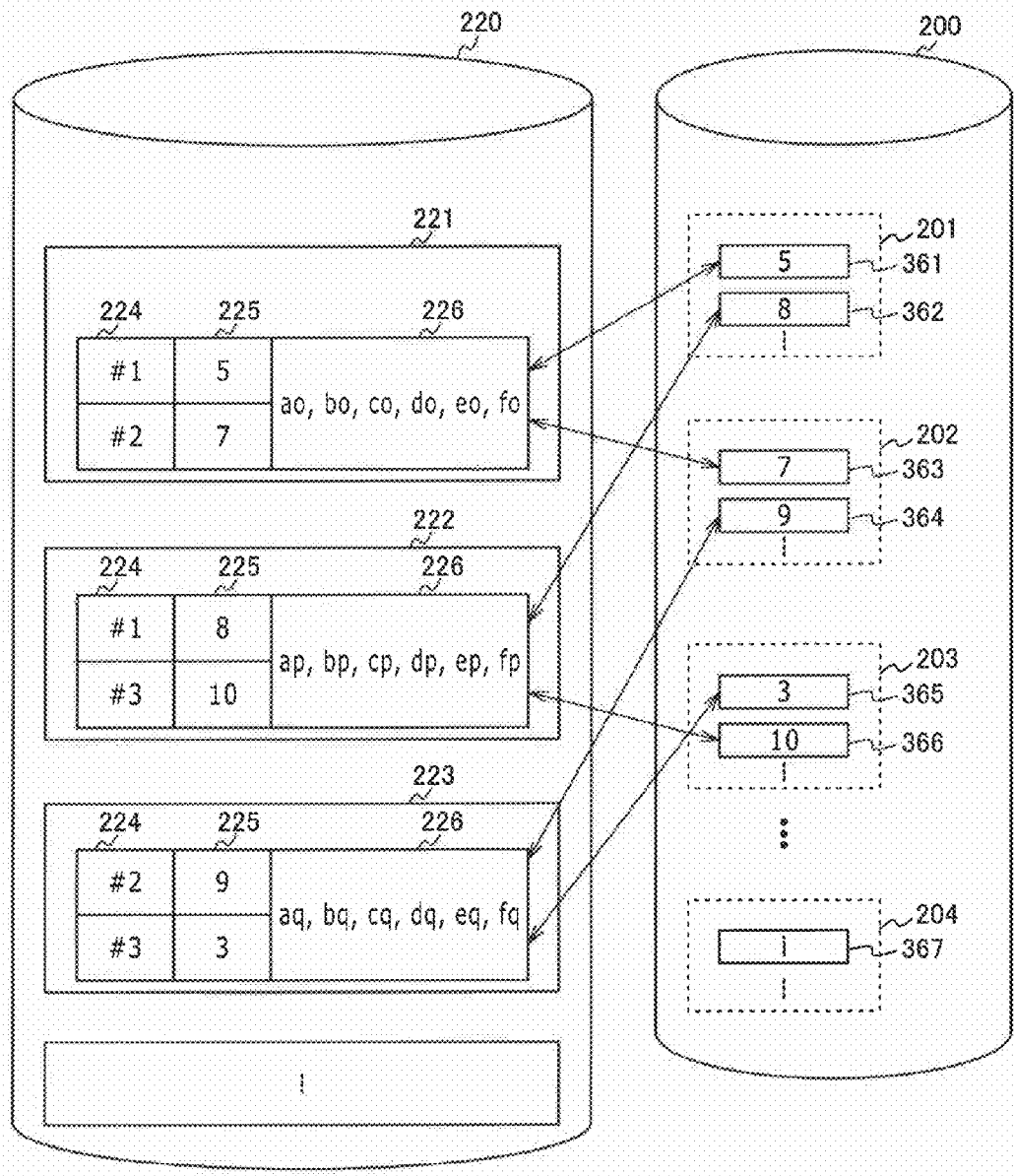
FIG. 5 is a view schematically showing files recorded in the dynamic picture storage section 200 and a relative relationship information storage section 220 in the embodiment of the present invention.

FIG. 5 is a view schematically showing files recorded in the dynamic picture storage section 200 and the relative relationship information storage section 220 in the embodiment of the present invention. In the present example, the dynamic picture files 201 to 204 stored in the dynamic picture storage section 200 and relative relationship metadata files 221 to 223 stored in an associated relationship with the dynamic picture files 201 to 204 in the relative relationship information storage section 220 are schematically illustrated. In the present example, an example is described wherein frames "5" 361 and "8" 362 which form the dynamic picture file (#1) 201, frames "7" 363 and "9" 364 which form the dynamic picture file (#2) 202 and frames "3" 365 and "10" 366 which form the dynamic picture file (#3) 203 are stored in an associated relationship with the relative relationship metadata files 221 to 223 stored in the relative relationship information storage section 220. It is to be noted that description of dynamic picture files stored in the dynamic picture storage section 200 is omitted here because they are the same as the dynamic picture files shown in FIG. 4.

In the relative relationship metadata files 221 to 223, a dynamic picture ID 224, a frame number 225 and an affine transformation parameter 226 are stored in an associated relationship with each other.

The dynamic picture ID 224 is a dynamic picture ID applied to two dynamic picture files corresponding to two images which individually include at least three coincident points, and, for example, in the relative relationship metadata file 221, "#1" applied to the dynamic picture file 201 and "#2" applied to the dynamic picture file 202 are stored.

The frame number 225 is a serial number of two frames corresponding to two images including at least three coincident points, and, for example, in the relative relationship metadata file 221, the frame number "5" of the frame which forms a dynamic picture of the dynamic picture file 201 and the frame number "7" of a frame which forms a dynamic picture of the dynamic picture file 202 are placed.

The affine transformation parameter 226 indicates affine transformation parameters calculated for at least two images corresponding to the dynamic picture ID 224 and the frame number 225, and, for example, in the relative relationship metadata file 221, "ao, bo, co, do, eo, fo" are placed as affine transformation parameters corresponding to the frame "5" which forms a dynamic picture of the dynamic picture file 201 and the frame "7" which forms a dynamic picture of the dynamic picture file 202. It is to be noted that, in the embodiment of the present invention, the affine transformation parameter 226 indicates affine transformation parameters in a case wherein an image corresponding to a frame number on the lower side shown in FIG. 5 from between the corresponding dynamic picture ID 224 and frame number 225 is determined as a reference image and another frame number of the upper side is determined as an object image. For example, the affine transformation parameter 226 placed in the relative relationship metadata file 221 indicates affine transform parameters for the frame "7" 363 which forms a dynamic picture of the dynamic picture file (#2) 202 of the frame "5" 361 which forms a dynamic picture of the dynamic picture file (#1) 201.

Now, a detection method of detecting an affine transformation parameter to be used for image transformation is described in detail with reference to the drawings.

Figure 6:
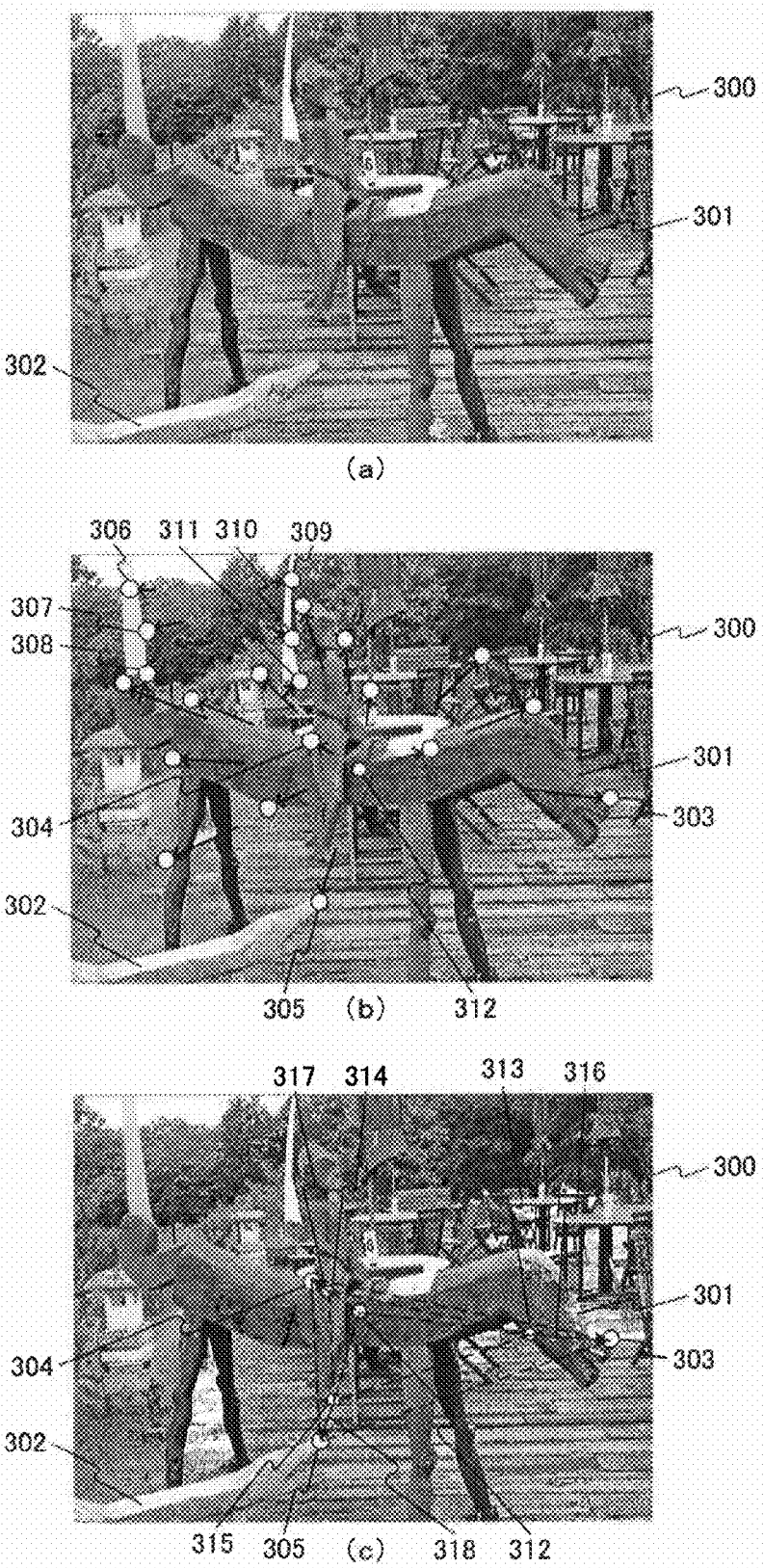
FIG. 6 is views showing an example of images corresponding to frames which form a dynamic picture.

(a) to (c) of FIG. 6 are views showing an example of images corresponding to frames which form a dynamic picture. (a) of FIG. 7 is a view showing an image simplified by omitting the background and so forth from an image corresponding to a frame preceding by one to a frame corresponding to an image 300 shown in FIG. 6. Meanwhile, (b) and (c) of FIG. 7 are views showing images simplified by omitting the background and so forth from the image 300 shown in FIG. 6.

The images 300, 320 and 330 shown in FIGS. 6 and 7 include images 301, 321 and 331 of a horse on which a person mounts and images 302, 322 and 332 of a snake lying in front of the images 301, 321 and 331 of the horse. Further, as shown in FIG. 6, a flag, chairs and so forth exist on the background of the images, and the flag is trailing by wind.

The image 320 shown in (a) of FIG. 7 is an image obtained by simplifying an image corresponding to a frame preceding by one to a frame corresponding to the image 300, 330 shown in (a) to (c) of FIG. 6 and (b) and (c) of FIG. 7. Further, the images 320 and 330 corresponding to two successive frames are images indicative of transition where the size of an image pickup object in a screen image gradually increases. In particular, upon image pickup of the images, a zoom-in operation which is an operation of gradually making the image pickup object in the screen image larger is carried out.

The embodiment of the present invention is described below taking a method wherein characteristic points are detected from an image which forms a dynamic picture and optical flows corresponding to the characteristic points are used to calculate affine transformation parameters as an example. Further, the present example is described in regard to a case wherein a corner point is used as a characteristic point.

Here, in (a) to (c) of FIG. 7, description is given taking a method wherein optical flows corresponding to three corner points detected from the images 320 and 330 are used to calculate affine transformation parameters as an example.

For example, it is assumed that, in the image 320 shown in (a) of FIG. 7, a corner point 323 in the proximity of the mouth of the image 321 of a horse, another corner point 324 in the proximity of the hip of the person of the image 321 of the horse and a further corner point 325 in the proximity of the mouth of the image 322 of the snake are detected. In this instance, from the image 330 shown in (b) of FIG. 7, optical flows 337, 338 and 339 for the corner points 323, 324 and 325 of the image 320 are detected by a slope method, a block matching method or the like. Then, based on the detected optical flows 337, 338 and 339, the corner points 333, 334 and 335 corresponding to the corner points 323, 324 and 325 of the image 320 are detected.

Here, for example, since the images 321 and 331 of the horse and the images 322 and 332 of the snake included in the images 320 and 330 shown in (a) and (b) of FIG. 7 do not move independently of a movement of the camera since they are placed on the surface of the earth. Therefore, a movement of the camera can be estimated accurately based on optical flows determined in regard to corner points detected from the images 321 and 331 of the horse or the images 322 and 332 of the snake. For example, it can be estimated that the image 330 is an image obtained by expanding the image 320 with respect to the center provided at a point 336. Consequently, it can be decided that the movement of the camera upon image pickup of the image 330 is a zoom-in operation centered at the point 336. In this manner, if corner points are detected with regard to a physical solid which does not move independently of a movement of the camera, then the movement of the camera which has fixed regularity can be detected accurately based on optical flows determined with regard to the corner points. Therefore, affine transformation parameters can be determined by calculation using the optical flows determined with regard to the corner points.

However, it is considered that an image sometimes includes a physical solid which moves independently of the movement of the camera like a flag trailing by wind. For example, the image 300 shown in FIG. 6 includes a flag which is trailing by wind. If corner points are detected from a physical solid which moves independently of the movement of the camera like a flag trailing by wind in this manner and optical flows determined with regard to the corner points are used to estimate the movement of the camera, then the movement of the camera cannot be estimated accurately.

For example, each optical flow detected from the image 300 shown in (b) of FIG. 6 is indicated by an arrow mark, and a corner point detected from the optical flow is indicated by a round mark with a blank inside at an end of the arrow mark. Here, corner points 303 to 305 are corner points corresponding to the corner points 333 to 335 shown in (b) and (c) of FIG. 7. Meanwhile, corner points 306 to 311 are corner points detected with regard to the flag which exists on the background with respect to the image 301 of the horse. Then, since the flag is trailing by wind, a movement of the flag by an influence of the wind is detected as an optical flow. In particular, the optical flows corresponding to the corner points 306 to 311 are detected in regard to the flag which moves independently of the movement of the camera. Therefore, if three optical flows used for calculation of affine transformation parameters include an optical flow corresponding to at least one corner point from among the corner points 306 to 311, then an accurate movement of the camera cannot be detected. In this instance, accurate affine transformation parameters cannot be calculated.

As described above, for example, optical flows regarding a physical solid which moves independently of the movement of the camera (optical flows corresponding to the corner points 306 to 311 shown in (b) of FIG. 6) and optical flows having fixed regularity in a relation to the movement of the camera (optical flows other than the optical flows corresponding to the corner points 306 to 311 shown in (b) of FIG. 6) are sometimes detected from picked up images.

Therefore, in the embodiment of the present invention, an example wherein an affine transformation parameter calculation process for calculating affine transformation parameters based on three optical flows is carried out several times to determine a plurality of affine transformation parameters and optimum affine transformation parameters are selected from among the plural affine transformation parameters is described. It is to be noted that, in this example, it is assumed that the size of a moving physical solid included in each of images which form a dynamic picture is comparatively small with respect to the area of the images.

Here, the affine transformation is described briefly. Where the position of a source of movement on a two-dimensional system is represented by (x, y) and the position of a destination of the movement after the affine transformation on the two-dimensional system is represented by (x', y'), the determinant of the affine transformation can be represented by the following expression 1:

[Expression 1]

$$[x'\ y'\ 1] = [x\ y\ 1]\begin{bmatrix} a & d & 0 \\ b & e & 0 \\ c & f & 1 \end{bmatrix} \quad \text{(expression 1)}$$

Here, a to f are affine transformation parameters. Further, the affine matrix AM depending upon the affine transformation parameters can be determined by the following expression. Further, a zoom component XZ in the X direction, a zoom component YZ in the Y direction, a translation component XT in the X direction, a translation component YT in the Y direction and a rotation component R can be individually determined by the following expressions. It is to be noted that, in the case of a unit matrix, a=e=1, b=c=d=f=0.

$$AM = \begin{bmatrix} a & b & c \\ d & e & f \end{bmatrix} \quad \text{[Expression 2]}$$

$$XZ = \sqrt{a^2 + d^2}$$

$$YZ = \sqrt{b^2 + e^2}$$

$$XT = c$$

$$YT = f$$

$$R = \tan^{-1}\left[\frac{d}{a}\right]$$

Now, a calculation method of an affine transformation parameter is described.

First, three characteristic points are selected from among characteristic points in which optical flows are detected in an image corresponding to a current frame which is one of frames which form a dynamic picture. For example, three corner points are selected at random from among corner points (indicated by a round mark with a blank inside) detected from the image 300 shown in (b) of FIG. 6. It is to be noted that, where a projection transformation parameter is used as a camera work parameter, four characteristic points are selected at random.

Then, affine transformation parameters are calculated using three optical flows corresponding to the selected three characteristic points. For example, affine transformation parameters are calculated using optical flows (indicated by arrow marks connected to round marks with a blank inside) corresponding to three corner points selected from among the corner points (indicated by round marks with a blank inside) of the image 300 shown in (b) of FIG. 6. The affine transformation parameters can be determined using the expression 1.

Then, based on the determined affine transformation parameters, a score of the affine transformation parameters is calculated. In particular, the position of destinations of the movement of all characteristic points of an image corresponding to a frame immediately preceding to the current frame is determined using the determined affine transformation parameters. Then, the positions of the characteristic points determined using the affine transformation parameters and the positions of the characteristic points detected from the current frame are compared with each other to calculate a difference value of the positions of the two characteristic points corresponding to each other for each characteristic point. As the difference value, for example, the absolute distance between the positions of the two characteristic points corresponding to each other is calculated. Then, the calculated difference value and a threshold value set in advance are compared with each other for each characteristic point to determine the number of those characteristic points whose difference value is lower than the threshold value as a score of the affine transformation parameters. In this manner, a process of selecting three characteristic points at random from among characteristic points whose optical flow is detected and calculating the score of the affine transformation parameters based on the optical flows corresponding to these characteristic points in this manner is repeated by a predetermined number of times to calculate a plurality of scores of the affine transformation parameters. The predetermined number of times may be set suitably in response to the type of an image of an object of comparison, the processing capacity of the image processing apparatus 100 and so forth, or a fixed value may be used. As the predetermined number of times, for example, approximately 20 times may be set taking the processing capacity of the image processing apparatus 100 into consideration.

For example, a case is considered wherein three corner points other than the corner points 306 to 311 are selected from among corner points detected from the image 300 shown in (b) of FIG. 6. If affine transformation parameters are calculated using three optical flows corresponding to the three corner points selected in this manner, then since the three optical flows have fixed regularity as described hereinabove, affine transformation parameters with which an image corresponding to the immediately preceding frame is transformed in accordance with a fixed rule are determined. Therefore, a difference value determined with regard to the corner points other than the corner points 306 to 311 between the position of a corner point determined using the affine transformation parameters and the position of a corner point detected from the current frame has a comparatively low value. Therefore, the score of the affine transformation parameters has a comparatively high value.

On the other hand, another case is considered wherein three corner points including at least one of the corner points 306 to 311 are selected from among the corner points detected from the image 300 shown in (b) of FIG. 6. If affine transformation parameters are calculated using three optical flows corresponding to the three corner points selected in this manner, then since the three optical flows include an optical flow which does not have the fixed regularity, affine transformation parameters with which the image corresponding to the immediately preceding frame is transformed in accordance with the fixed rule are determined. Therefore, the difference value determined between the position of a corner point determined using the affine transformation parameters and the position of a corner point detected from the current frame exhibits a comparatively high value at an arbitrary corner point. Therefore, the score of the affine transformation parameters exhibits a low value.

Then, the affine transformation parameter which exhibits the highest value of the score among the scores of the determined plural affine transformation parameters is selected as a representative affine transformation parameter. Then, an inverse matrix to a matrix of the selected representative affine transformation parameters is calculated, and the affine transformation parameters of the inverse matrix are recorded in an associated relationship with the current frame into the metadata storage section 210.

As described above, even where each of images which form a dynamic picture includes a physical solid which is moving (moving physical solid) such as a person or a car, where the size of the moving physical solid with respect to the area of the image is comparatively small, a movement of the camera can be extracted without being influenced by the moving physical solid.

Further, by extracting a movement of the camera, it is possible to estimate a movement considered to be caused intentionally by an image pickup person such as zoom-in, zoom-out, panning, tilting or rotation.

Now, operation of the image processing apparatus 100 according to the embodiment of the present invention is described with reference to the drawings.

Figure 8:
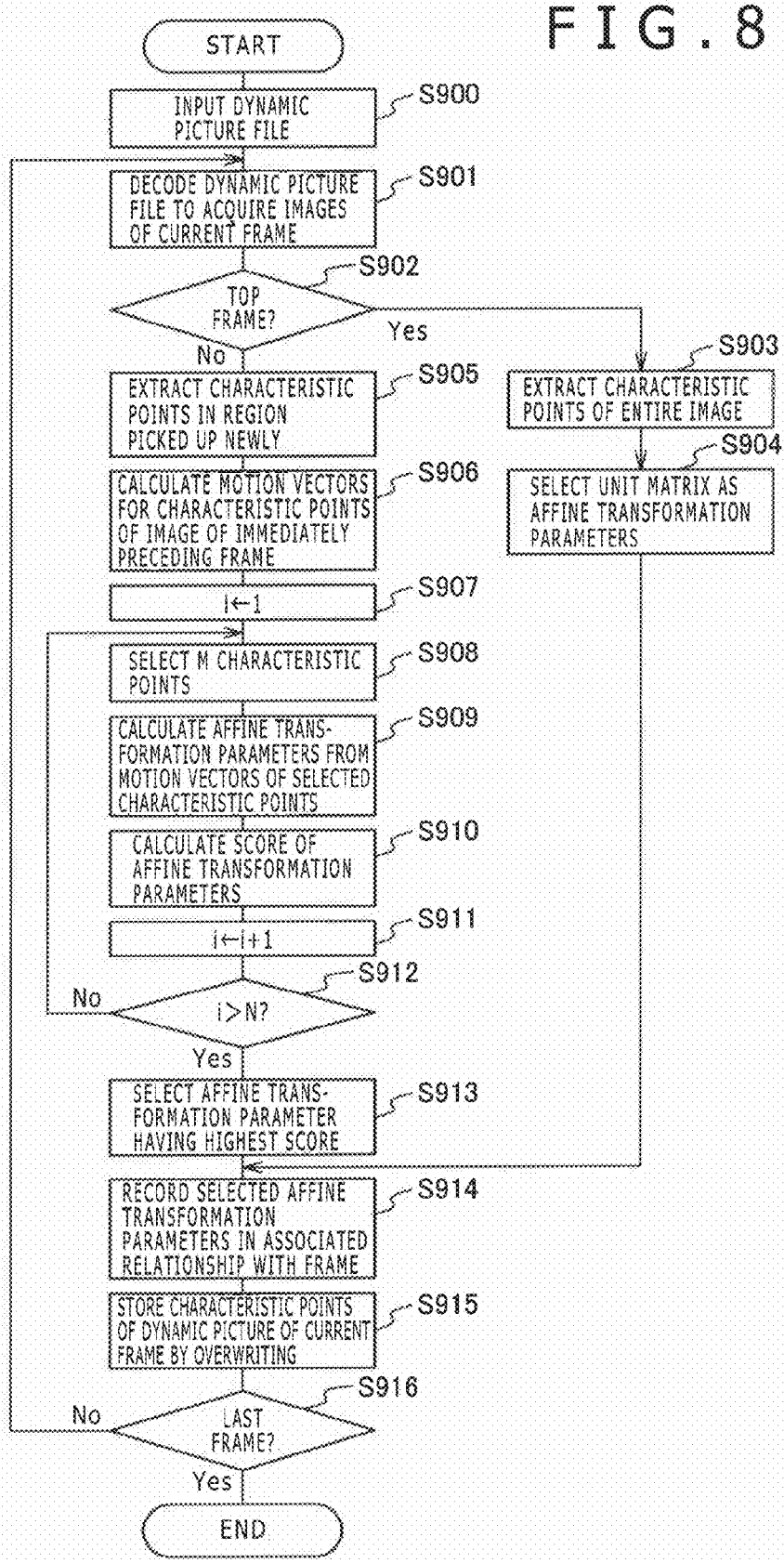
FIG. 8 is a flow chart illustrating a processing procedure of an affine transformation parameter detection process by the image processing apparatus 100 in the embodiment of the present invention.

FIG. 8 is a flow chart illustrating a processing procedure of an affine transformation parameter detection process by the image processing apparatus 100 according to the embodiment of the present invention.

First, a dynamic picture file is inputted to the dynamic picture inputting section 110 (step S900). Then, the dynamic picture file inputted to the dynamic picture inputting section 110 is decoded, and images of one frame are acquired in an order of a time series (step S901). Then, it is decided whether or not the acquired one frame is the top frame of the dynamic picture file inputted to the dynamic picture inputting section 110 (step S902). If the acquired one frame is the top frame (step S902), then characteristic points are extracted from the entire images corresponding to the top frame (step S903). For example, a plurality of corner points of the images are extracted as seen in (b) of FIG. 6. Then, affine transformation parameters of a unit matrix are selected as affine transformation parameters (step S904), whereafter the processing advances to step S914.

On the other hand, if the acquired one frame is not the top frame (step S902), then characteristic points are extracted from a region picked up newly with reference to an image corresponding to the immediately preceding frame (step S905). In particular, since characteristic points extracted already from the images corresponding to the immediately preceding frames can be determined from the optical flows corresponding to the characteristic points, they are not extracted from the images corresponding to the current frame.

Then, optical flows regarding the characteristic points extracted from the images corresponding to the immediately preceding frame are calculated (step S906). In particular, optical flows regarding the corner points are calculated as seen in (b) of FIG. 6.

Thereafter, the variable i is initialized to "1" (step S907). Then, M characteristic points are selected from among the characteristic points with regard to which the optical flows are detected (step S908). For example, where affine transformation parameters are used as camera work parameters, three characteristic points are selected at random. On the other hand, if projection transformation parameters are used as camera work parameters, four characteristic points are selected at random. Then, affine transformation parameters are calculated based on the M optical flows calculated corresponding to the selected M characteristic points (step S909).

Then, the score of the affine transformation parameters is calculated based on the affine transformation parameters determined by the calculation (step S910). In particular, the affine transformation parameters determined by the calculation are used to determine the position of the destination of movement of all characteristic points in the images corresponding to the immediately preceding frame. Then, the positions of the characteristic points determined using the affine transformation parameters and the positions of the characteristic points of the images corresponding to the current frame determined upon the calculation of the optical flows at step S906 are compared with each other to calculate the difference value between the positions of each two corresponding characteristic points for each characteristic point. As the difference value, for example, the absolute distance between each two corresponding positions is calculated. Then, the calculated difference values and a threshold value set in advance are compared with each other for each characteristic point, and the number of those characteristic points whose difference value is lower than the threshold value is determined as a score of the affine transformation parameters.

Then, "1" is added to the variable i (step S911), and it is decided whether or not the variable i is higher than a constant N (step S912). If the variable i is lower than the constant N (step S912), then the processing returns to step S908 to repeat the score calculation process of affine transformation parameters (steps S908 to S910). For example, 20 can be used as the constant N.

On the other hand, if the variable i is higher than the constant N (step S912), then those affine transformation parameters whose score has the highest value from among the determined scores of the affine transformation parameters are selected as representative affine transformation parameters (step S913). Then, the affine transformation parameters of an inverse matrix to the matrix of the selected representative affine transformation parameters are recorded in an associated relationship with the current frame into the metadata storage section 210 (step S914). It is to be noted that, if the current frame is the top frame, the affine transformation parameters of the selected unit matrix are recorded in an associated relationship with the top frame into the metadata storage section 210. Then, the images corresponding to the current frame and the characteristic points of the images are stored by overwriting (step S915).

Then, it is decided whether or not the current frame is the last frame of the dynamic picture file inputted to the dynamic picture inputting section 110 (step S916). If the current frame is not the last frame, (step S916), then the processing returns to step S901 to repeat the affine transformation parameter detection process (steps S901 to S915). On the other hand, if the current frame is the last frame (step S916), then the affine transformation parameter detection process is ended.

While, in the embodiment of the present invention, an example wherein affine transformation parameters are detected based on optical flows detected from images which form a dynamic picture is described as detection of camera work parameters, a sensor such as an acceleration sensor or a gyro sensor, or a zoom button which is used when a zooming operation is to be carried out may be provided such that the amount of movement of the camera upon image pickup is detected through the sensor or the zoom button and camera work parameters are determined based on the amount of movement of the camera. It is to be noted that, the amount of movement of the camera detected upon image pickup can be used to decide whether or not camera work parameters determined by the camera work parameter calculation unit 123 are correct. Further, the camera work parameter calculation unit 123 may detect a plurality of camera work parameters such that one of the plural camera work parameters is used based on the amount of movement of the camera detected upon image pickup.

FIG. 9 is views schematically illustrating an affine transformation parameter calculation method for calculating affine transformation parameters regarding two images by selecting coincident points included in the images and synthesis of the two images based on selected coincident points. (a) of FIG. 9 shows an image 370 which is an example of a reference image which forms one dynamic picture which is used as a reference, and (b) of FIG. 9 shows an image 376 which is an example of a comparison object image which forms another dynamic picture which is used as an object of comparison. The images 370 and 376 shown in (a) and (b) of FIG. 9 are images illustrating a state wherein two dynamic pictures including one of the images 370 and 376 are stopped during reproduction on the display section 290. In the present example, a selection method wherein, in a state wherein the dynamic picture is stopped at the display section 290, a coincident point on the image displayed upon the stopping of the dynamic picture is designated manually is illustrated schematically. (c) of FIG. 9 illustrates an example of detection of an optical flow used when coincident points selected on the images 370 and 376 are used to calculate an affine transform parameter. Meanwhile, (d) of FIG. 9 illustrates an example wherein the images 370 and 376 are synthesized based on the coincident points selected on the images 370 and 376.

It is assumed that the images 370 and 376 shown in (a) and (b) of FIG. 9 include a house 371 which is the same object. Here, where relative relationship metadata files regarding the dynamic picture including the image 370 and the dynamic picture including the image 376 are to be produced by manual operation of a user, the user would reproduce the two dynamic pictures by manual operation so that images which include the same object are displayed on the display section 290. For example, the images 370 and 376 which include the house 371 which is the same object are displayed on the display section 290. In this instance, the two images of the images 370 and 376 may be displayed on the same screen of the display section 290, or one image may be displayed successively.

For example, in the state wherein the image 370 shown in (a) of FIG. 9 is displayed on the display section 290, the user would carry out an operation input on the operation acceptance section 160 to designate an upper portion 372 of the roof of the house 371 and corner portions 373 and 374 of the lower side of the house 371 using a cursor 375. A desired portion can be designated, for example, by carrying out a left clicking operation in a state wherein the cursor 375 is superposed at the portion to be designated. Where a designation operation is carried out in this manner, for example, a round mark may be applied to a portion for which the designation operation is carried out as seen in (a) of FIG. 9 so that the user can recognize the portion. Also on the image 376 shown in (b) of FIG. 9, an upper portion 377 of the roof of the house 371 and corner portions 378 and 379 of the lower side of the house 371 are designated similarly. When the designation operations are carried out, the coincident point selection section 170 selects the designated positions as coincident points on the images and outputs the selected positions of the coincident points and the order of such designation to the relative relationship information calculation section 180 together with the images.

As shown in (a) and (b) of FIG. 9, where three coincident points are selected individually on the two images 370 and 376, the relative relationship information calculation section 180 calculates vectors based on the coincident points and uses the calculated vectors to calculate affine transformation parameters. Each of the vectors is calculated, for example, as a combination of corresponding coincident points which are selected on the two images based on the order of the designated coincident points. For example, if a designation operation is carried out in order of the upper portion 372 of the roof of the house 371 of the image 370 and the corner portions 373 and 374 of the lower side of the house 371 and then a designation operation is carried out in order of the upper portion 377 of the roof of the house 371 of the image 376 and the corner portions 378 and 379 of the lower side of the house 371, then a vector is calculated with regard to the upper portion 372 of the image 370 and the upper portion 377 of the image 376 and a vector is calculated with regard to the corner portion 373 of the image 370 and the corner portion 378 of the image 376 and then a vector is calculated with regard to the corner portion 374 of the image 370 and the corner portion 379 of the image 376. In this manner, the vectors calculated based on the coincident points selected on the images 370 and 376 are indicated by arrow marks 381 to 383 in (c) of FIG. 9. It is to be noted that, on an image 380 shown in (c) of FIG. 9, a line included in the image 370 shown in (a) of FIG. 9 is indicated by a broken line, and a line included in the image 376 shown in (b) of FIG. 9 is indicated by a solid line. The vectors calculated in this manner are used to calculate affine transformation parameters. The calculation method of affine transformation parameters is similar to the calculation method illustrated in FIGS. 6 and 7. It is to be noted that, in the embodiment of the present invention, an example wherein affine transformation parameters corresponding to an inverse matrix to a matrix of affine transformation parameters calculated using coincident points are used as relative relationship parameters is described. In other words, affine transformation parameters to be used as relative relationship metadata are defined as affine transformation parameters corresponding not to an affine transformation matrix represented by vectors between two images whose coincident points are determined but to an affine matrix which represents, where one of two images is determined as a reference image, to which position the other image moves.

It is to be noted that the relative relationship information calculation section 180 may calculate affine transformation parameters without using the designated order. For example, a vector is calculated with regard to each of combinations of the three points selected as coincident points on the images. Where three coincident points are individually selected on the two images, six combinations are available as combinations of the coincident points of the images. Then, the vectors calculated with regard to the six combinations are used to calculate six affine transformation parameters. Then, determining one of the two images as a reference image while the other image is determined as a comparison object image, the six calculated affine transformation parameters are used to successively affine transform the comparison object image. Consequently, one reference image and six affine-transformed comparison object images are produced. Then, pixels existing in the inside of a triangle having apexes at the three coincident points of the reference image and pixels existing in the inside of a triangle having apexes at the three coincident points of the affine-transformed comparison object image are compared with each other to successively calculate the difference value in luminance value between the pixels existing in the inside of the triangles. Consequently, a total value of the square values of the six difference values corresponding to the six affine transformation parameters is calculated. Then, that affine transformation parameter which exhibits the lowest difference value is selected from among the thus calculated six difference values, and the selected affine transformation parameter is determined as an affine transformation parameter regarding the two images for which the coincident point designation operation has been carried out.

Further, for example, where the affine transformation parameters calculated based on the coincident points selected on the images 370 and 376 are used to affine transform and overwrite the image 370 on the image 376, an image 384 shown in (d) of FIG. 9 is produced. By synthesizing the images 370 and 376 using the calculated affine transformation parameters in this manner, a synthesis image in which the background around the house 371 is included over a wider range than the background of the images is produced.

Figure 10:
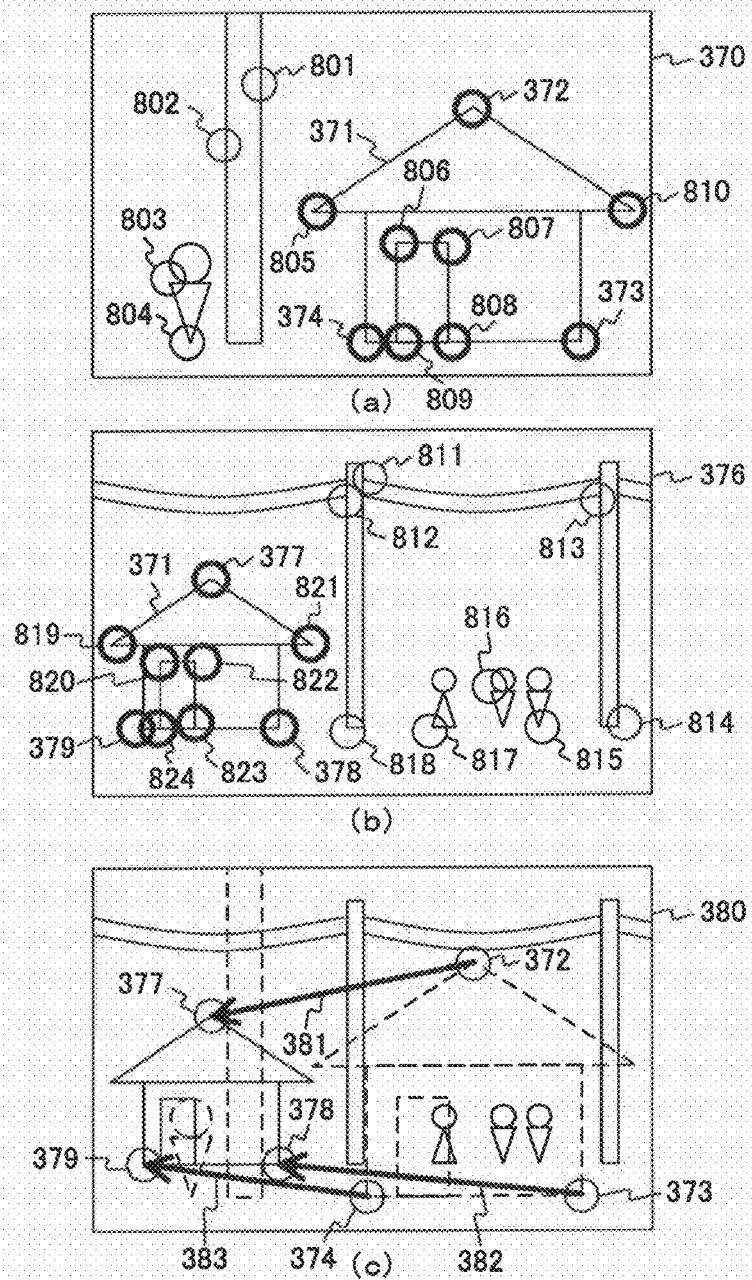
FIG. 10 is views schematically illustrating an affine transformation parameter calculation method for calculating an affine transformation parameter regarding two images by selecting a coincident point included in images.

FIG. 10 is views schematically showing an affine transformation parameter calculation method of calculating affine transformation parameters regarding two images by selecting coincident points included in the images. Here, an example wherein coincident points included in the images are searched for by the coincident point search section 340 shown in FIGS. 1 and 3 and the searched out coincident points are used to calculate affine transformation parameters regarding the two images is described. It is to be noted that images 370, 376 and 380 shown in (a) to (c) of FIG. 10 are the same as the images 370, 376 and 380 shown in (a) to (c) of FIG. 9 except that each of characteristic points searched out by the coincident point search section 340 is indicated by a round mark. As described hereinabove, the coincident point search section 340 calculates a partial coincidence degree between frames which form a dynamic picture and automatically associates the plural images with each other based on such calculated coincidence degrees. Where a search for coincident points between two dynamic pictures is carried out, for example, characteristic points 801 to 810 and 377 to 379 are extracted as characteristic points of the image 370 and characteristic points 811 to 823 and 377 to 379 are extracted as characteristic points of the image 376. Then, from among the extracted characteristic points, combinations of similar characteristic points of the images are selected. For example, on the images 370 and 376, the characteristic points 805 to 810 and 372 to 374 and the characteristic points 818 to 823 and 377 to 379 are selected. In (a) and (b) of FIG. 10, the matching characteristic points are indicated by a thick round mark. From among the characteristic points selected in this manner, three characteristic points to be used for calculation of affine transformation parameters are searched out as coincident points. For example, on the images 370 and 376, the characteristic points 372 to 374 and the characteristic points 377 to 379 are searched out as coincident points. The search for coincident points selects a combination of characteristic points which exhibit, for example, the highest score in similarity degree. Then, vectors are calculated based on the searched out coincident points, and affine transformation parameters are calculated based on the vectors. It is to be noted that the calculation of the affine transformation parameters is carried out by a method similar to the calculation method illustrated in FIG. 9.

Now, a case wherein one dynamic picture is reproduced and displayed using affine transformation parameters calculated by the camera work detection section 120 is described in detail with reference to the drawings. It is to be noted that the images shown in FIGS. 11 to 19 are simplified for description and the amount of movement between two successive frames is illustrated in an exaggerated manner.

First, a case wherein, upon image pickup of the camera, although the magnification is not varied, the direction of the lens of the camera is moved in one of the upward, downward, leftward and rightward directions from the center provided by the position of the camera is described.

Figure 11:
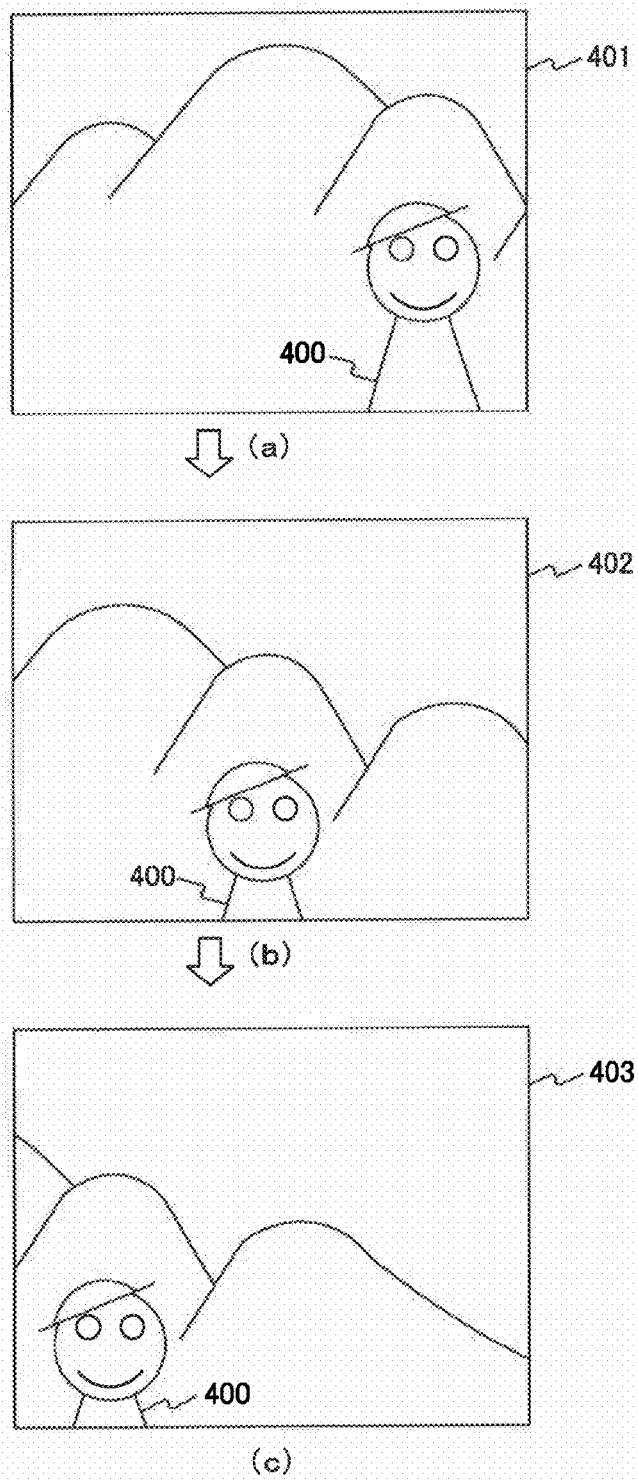
FIG. 11 is views illustrating an example of transition of dynamic pictures picked up by a camera.

FIG. 11 is views illustrating an example of transition of a dynamic picture picked up by a camera. FIG. 11 is views showing images 401 to 403 corresponding to successive frames included in a dynamic picture where an image of a person 400 is picked up on the background of mountains. In this example, a case is illustrated wherein the image pickup person carries out image pickup while the direction of the lens of the camera is moved rightwardly and upwardly. In this instance, the person 400 included in the dynamic picture picked up by the camera moves from the right side to the left side and moves to the lower side on the images which form the dynamic picture.

Figure 12:
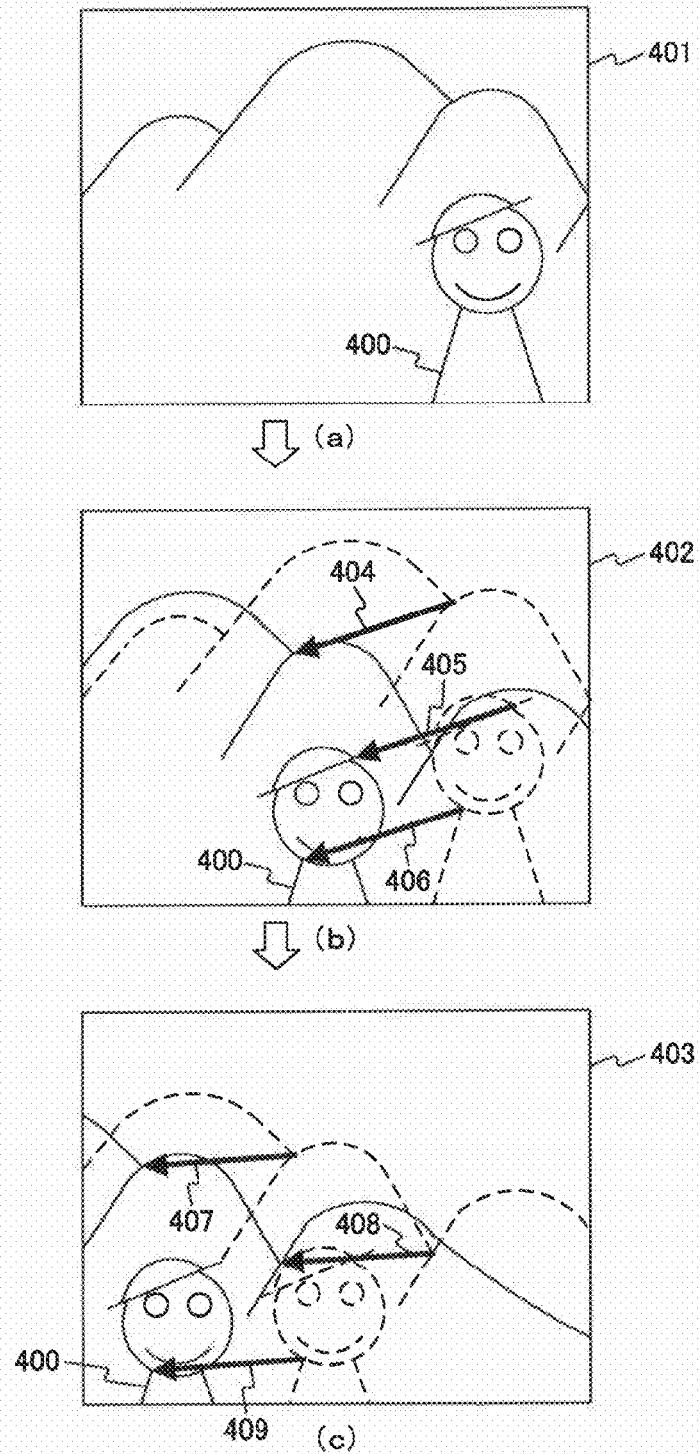
FIG. 12 is views showing images corresponding to immediately preceding frames regarding the images shown in FIG. 11 in broken lines and illustrating an optical flow detected.

FIG. 12 is views wherein an image corresponding to an immediately preceding frame is indicated by broken lines and which illustrates an example of optical flows detected. An image 401 shown in (a) of FIG. 12 is the same as the image 401 shown in (a) of FIG. 11. Meanwhile, solid line portions of an image 402 shown in (b) of FIG. 12 are the same as those of the image 402 shown in (b) of FIG. 11, and broken line portions of the image 402 shown in (b) of FIG. 12 are the same as the solid line portions of the image 401 shown in (a) of FIG. 12. Further, arrow marks 404 to 406 on the image 402 shown in (b) of FIG. 12 illustrate an example of optical flows detected from the image 402. Similarly, solid line portions of an image 403 shown in (c) of FIG. 12 are the same as the solid line portions of the image 403 shown in (c) of FIG. 11, and broken line portions of the image 403 are the same as the solid line portions of the image 402 shown in (b) of FIG. 12. Further, arrow marks 407 to 409 on the image 403 shown in (c) of FIG. 12 illustrate an example of optical flows detected from the image 403.

As shown in (b) and (c) of FIG. 12, the person 400 and the mountains of the background included in the image move in conformity with the movement of the camera. Based on optical flows detected from the movement, affine transformation parameters can be determined for each frame.

Figure 13:
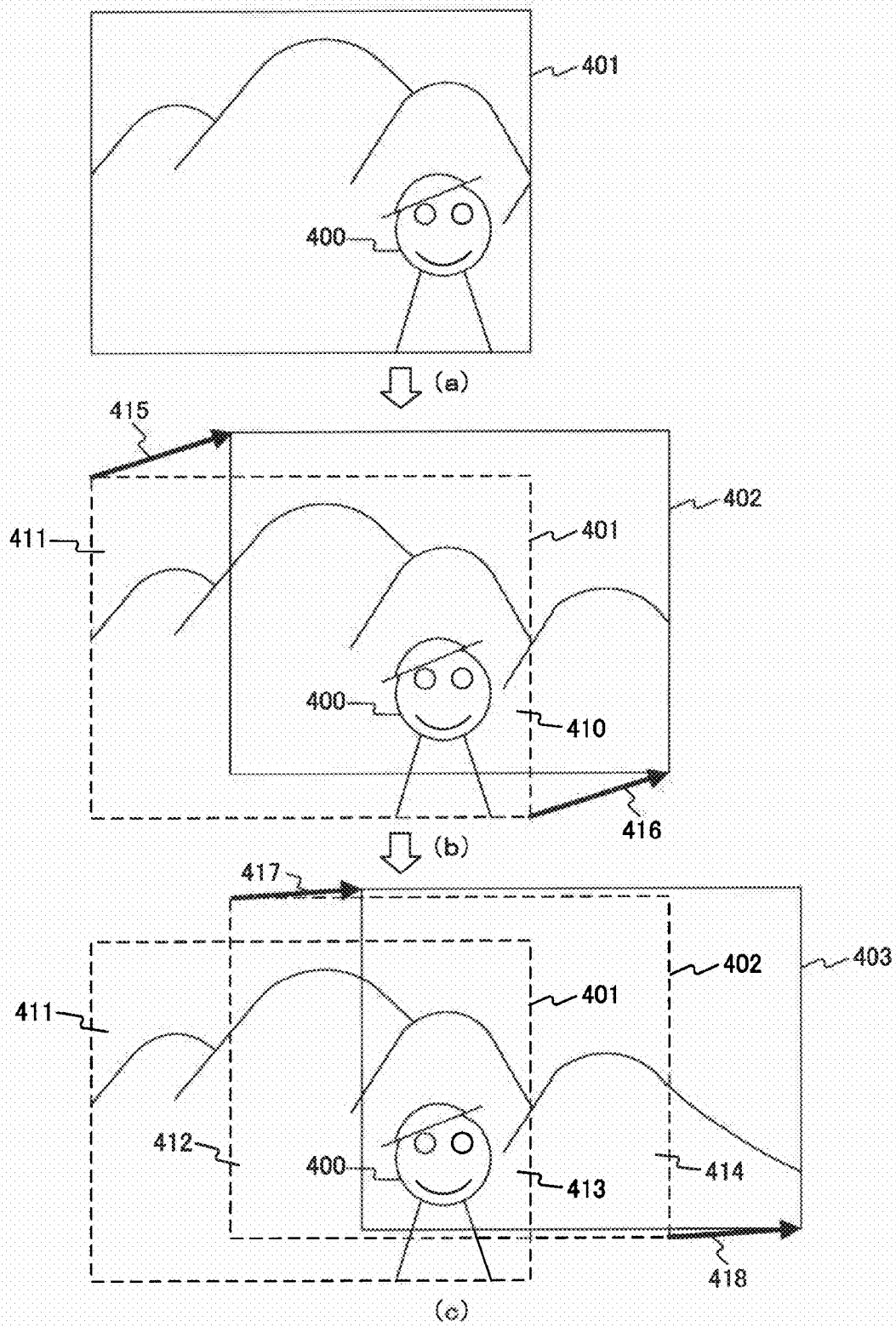
FIG. 13 is views illustrating an example of display images in a case wherein a dynamic picture including images 401 to 403 shown in FIG. 11 is reproduced.

FIG. 13 is views illustrating an example of image synthesis where dynamic pictures including the images 401 to 403 shown in FIG. 11 are reproduced while synthesized. It is to be noted that, since, in the embodiment of the present invention, images which form two dynamic pictures are synthesized, as the reproduction time goes by, the image displayed on the display section 290 becomes greater than an ordinary image. Therefore, the image displayed first is displayed in a small size in comparison with the size of the display region of the display section 290. It is to be noted that the size, position and so forth of the image to be displayed first may be designated by the user.

As shown in (a) of FIG. 13, only the image 401 corresponding to the first frame is displayed first. Here, where the matrix (matrix of 3 rows×3 columns) of affine transformation parameters corresponding to the image 401 is represented by A1, the value of A1 is determined, and the image 401 is affine transformed with the determined matrix of A1 with reference to the position and the magnitude of the image 401 of the top frame. Here, since A is a unit matrix, the position and the magnitude of the image 401 are not transformed. Then, where an image 402 corresponding to the next frame is to be displayed, the image 402 is affine transformed using affine transformation parameters associated with this frame. In particular, where the matrix of affine transformation parameters corresponding to the image 402 is represented by A2 and the matrix of the affine transformation parameters corresponding to the image 401 is represented by A1, the value of A1×A2 is determined, and the image 402 is affine transformed based on the determined matrix of A1×A2 with reference to the position and the size of the image 401 of the top frame. In the image shown in (b) of FIG. 13, only the position of the image 402 is transformed. Then, the image 402 affine transformed with the affine transformation parameters is overwritten such that it overlaps with the image 401 corresponding to the immediately preceding frame. In particular, in a region 410 which overlaps with the image 402, the image 402 is overwritten. Further, in the region of the image 401 which does not overlap with the image 402, the image of the image 401 is synthesized. In particular, where the image 402 corresponding to the second frame is displayed, an image in which the entire portion of the image 402 and the portion of the image 401 corresponding to a region 411 are synthesized is displayed as shown in (b) of FIG. 13. Further, it is possible to cause an image framework representing that the image therein is the latest image from within the displayed image to be displayed around the image corresponding to the current frame. In (b) of FIG. 13, an image framework is displayed on the image 402. Further, affine transformation parameters obtained by affine transformation of the image 402 are stored into the image transformation section 150.

Then, where the image 403 corresponding to the succeeding frame is to be displayed, affine transformation parameters associated with this frame are used to affine transform the image 403. In particular, the image 403 is affine transformed with the affine transformation parameters determined using the matrix of the affine transformation parameters corresponding to the image 403 and the matrix of the affine transformation parameters corresponding to the image 402 used for the immediately preceding affine transformation. In particular, where the matrix of the affine transformation parameters corresponding to the image 403 is represented by A3 and the matrix of the affine transformation parameters corresponding to the image 402 is represented by A2 while the matrix of the affine transformation parameters corresponding to the image 401 is represented by A1, the value of A1×A2×A3 is determined, and the image 403 is affine transformed with the determined matrix of A1×A2×A3 with reference to the position and the size of the image 401 of the top frame. In the image shown in (c) of FIG. 13, only the position of the image 403 is transformed. Then, the image 403 affine transformed with the affine transformation parameters is overwritten in such a manner as to overlap with the synthesis image of the images 401 and 402 corresponding to the preceding frames. In particular, in regions 413 and 414 in the region of the synthesis image of the images 401 and 402 which overlaps with the image 403, the image of the image 403 is overwritten. On the other hand, in the regions 411 and 412 in the region of the synthesis image of the images 401 and 402 which does not overlap with the image 403, the synthesis image of the images 401 and 402 is synthesized. In particular, where the image 403 corresponding to the third frame is to be displayed, an image wherein the entire portion of the image 403, the portion of the image 401 corresponding to the region 411 and the portion of the image 402 which corresponds to the region 412 are synthesized is displayed. Further, where an image framework representing that the image therein is the latest image in the displayed images is to be displayed around the image corresponding to the current frame, the image framework is displayed on the image 403 shown in (c) of FIG. 13. Further, the affine transformation parameters obtained by the affine transformation of the image 403 are stored into the image transformation section 150. In other words, the affine transformation parameters determined by multiplication of the matrices of the affine transformation parameters corresponding to the images 402 and 403 are stored into the image transformation section 150. In the manner, when an image corresponding to a current frame is to be affine transformed, it is affine transformed with the affine transformation parameters determined using the matrix of the affine transformation parameters corresponding to the current frame and the matrices of the affine transformation parameters corresponding to the frames up to the immediately preceding frame. The affine transformation parameters determined upon this affine transformation are stored into the image transformation section 150 and used for next affine transformation. This similarly applies also to the cases of FIGS. 16 and 19.

Now, a case wherein the magnification is varied upon image pickup of the camera although the direction of the lens of the camera is not moved is described.

Figure 14:
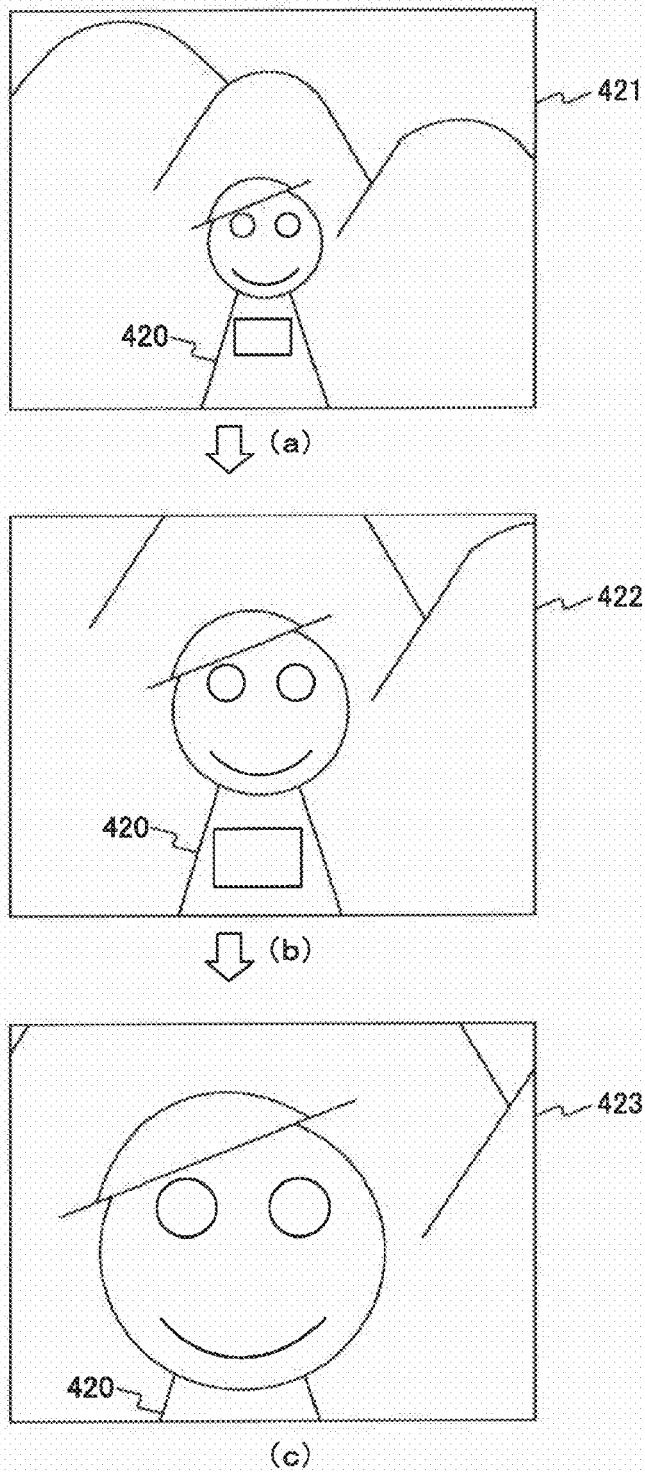
FIG. 14 is views illustrating an example of transition of dynamic pictures picked up by a camera.

FIG. 14 is views illustrating an example of transition of dynamic pictures picked up by a camera. FIG. 14 is views showing images 421 to 423 corresponding to successive frames included in the dynamic picture where an image of a person 420 is picked up on the background of mountains. In the present example, a case wherein the image pickup person carries out image pickup while successively raising the magnification of the lens of the camera is described. In this instance, the person 420 included in the dynamic picture picked up by the camera gradually becomes larger in the images which form the dynamic picture. It is to be noted that, although the position of the camera sometimes moves a little when the magnification is raised, in the present example, description is given without taking the movement of the position of the camera into consideration.

Figure 15:
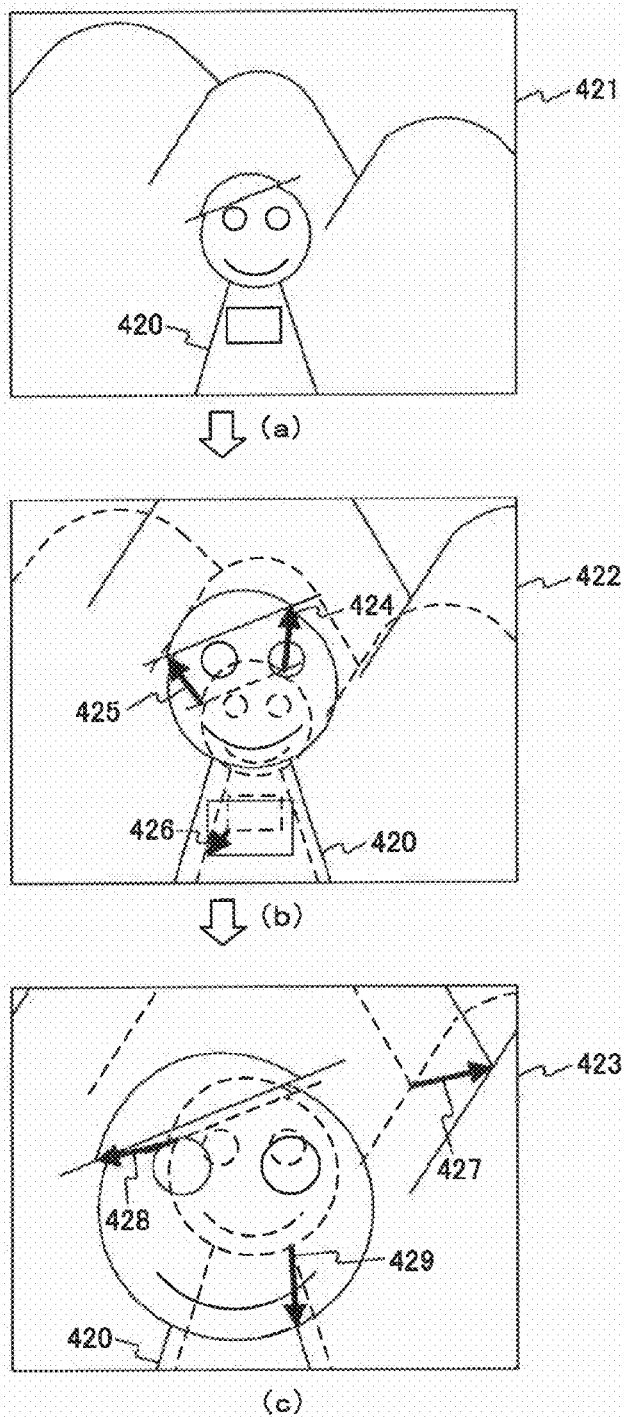
FIG. 15 is views showing images corresponding to immediately preceding frames regarding the images shown in FIG. 14 in broken lines and illustrating an optical flow detected.

FIG. 15 is views wherein an image corresponding to an immediately preceding frame in the images shown in FIG. 14 is indicated by broken lines and an example of optical flows detected is shown. An image 421 shown in (a) of FIG. 15 is the same as the image 421 shown in (a) of FIG. 14. Meanwhile, solid line portions of an image 422 shown in (b) of FIG. 15 are the same as those of the image 422 shown in (b) of FIG. 14 while broken line portions of the image 422 shown in (b) of FIG. 15 are the same as the solid line portions of the image 421 shown in (a) of FIG. 14. Further, arrow marks 424 to 426 on the image 422 shown in (b) of FIG. 15 indicate an example of optical flows detected from the image 422. Similarly, solid line portions of an image 423 shown in (c) of FIG. 15 are the same as those of the image 423 shown in (c) of FIG. 14 while broken line portions of the image 423 shown in (c) of FIG. 15 are the same as the solid line portions of the image 422 shown in (b) of FIG. 14. Further, arrow marks 427 to 429 on the image 423 shown in (c) of FIG. 15 indicate an example of optical flows detected from the image 423.

As shown in (b) and (c) of FIG. 15, the size of the person 420 and the mountains of the background included in the image varies in accordance with the variation of the magnification. Affine transformation parameters can be determined for each frame based on optical flows detected by the variation.

Figure 16:
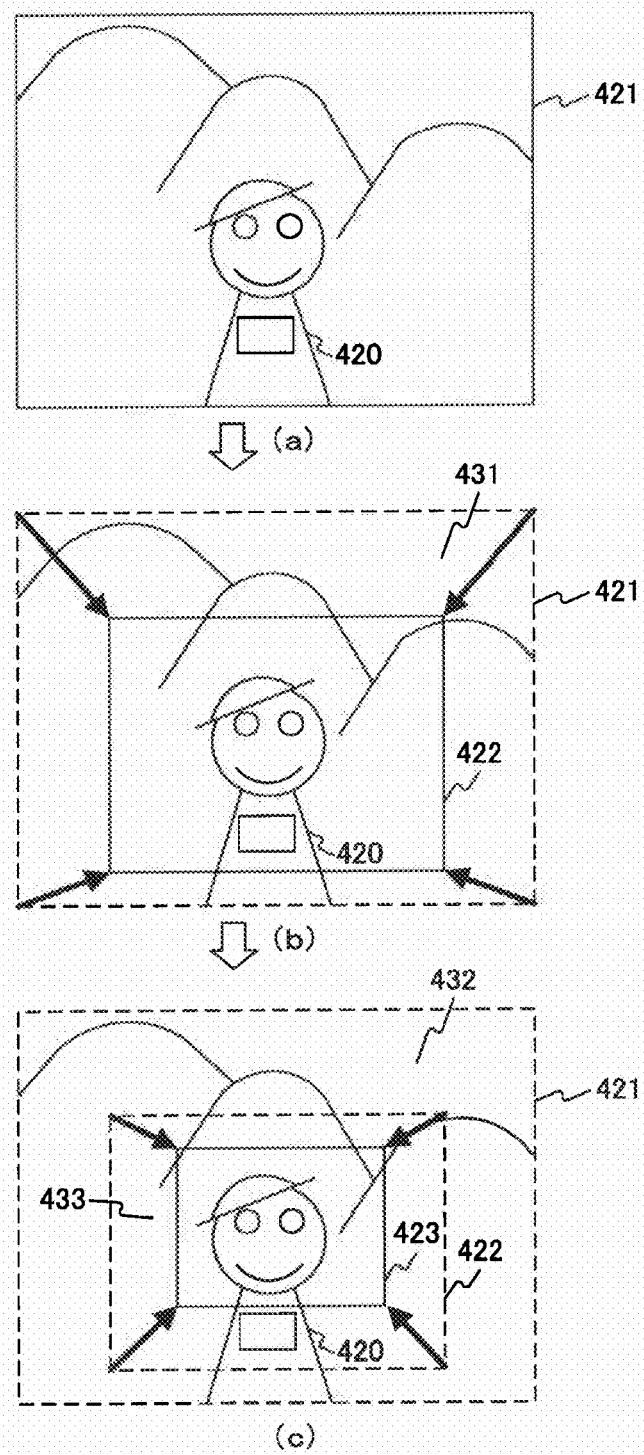
FIG. 16 is views illustrating an example of display images in a case wherein a dynamic picture including images 421 to 423 shown in FIG. 14 is reproduced.

FIG. 16 is views illustrating an example of display in a case wherein the dynamic picture including the images 421 to 423 shown in FIG. 14 is reproduced.

As shown in (a) of FIG. 16, only the image 421 corresponding to the top frame is displayed first. Then, where the image 422 corresponding to the succeeding frame is to be displayed, the image 422 is affine transformed using affine transformation parameters associated with this frame. In the case of the image shown in (b) of FIG. 16, only the size of the image 422 is transformed. Then, the image 422 affine transformed with the affine transformation parameters is overwritten in such a manner as to overlap with the image 421 corresponding to the immediately preceding frame. In particular, in a region in the region of the image 421 which overlaps with the image 422, the image of the image 422 is overwritten. In this instance, since the image 421 overlaps with the overall region of the image 422, the entire image 422 is overwritten on the image 421. On the other hand, a region 431 in the region of the image 421 which does not overlap with the image 422, the image of the image 421 is synthesized. In particular, when the image 422 corresponding to the second frame is to be displayed, an image wherein the entire portion of the image 422 and the portion of the image 421 which corresponds to the region 431 are synthesized is displayed as shown in (b) of FIG. 16. Further, an image framework indicating that the image therein is the latest image from within the display images can be displayed around the image corresponding to the current frame. In (b) of FIG. 16, the image framework is displayed on the image 422. Further, the affine transformation parameters obtained by affine transformation of the image 422 are stored into the image transformation section 150.

Thereafter, where the image 423 corresponding to the next frame is to be displayed, the image 423 is affine transformed using the affine transformation parameters associated with this frame. In particular, the image 423 is affine transformed with affine transformation parameters determined by multiplication of the matrix of the affine transformation parameters corresponding to the image 423 and the matrix of the affine transformation parameters corresponding to the image 422 used for the immediately preceding affine transformation. In the image shown in (c) of FIG. 16, only the size of the image 423 is transformed. Then, the affine transformed image 423 is overwritten so as to overlap with the synthesized image of the images 421 and 422 corresponding to the preceding frames. In particular, in a region in the region of the synthesis image of the images 421 and 422 which overlaps with the image 423, the image of the image 423 is overwritten. In this instance, since the image 423 overlaps with the entire region of the images 421 and 422, the entire image of the image 423 is overwritten on the synthesized image of the images 421 and 422. On the other hand, in regions 432 and 433 in the region of the synthesized image of the images 421 and 422 which do not overlap with the image 423, the synthesized image of the images 421 and 422 is synthesized. In particular, where the image 423 corresponding to the third frame is to be displayed, an image wherein the entire portion of the image 423, the portion of the image 421 which corresponds to the region 432 and the portion of the image 422 which corresponds to the region 433 are synthesized is displayed as shown in (c) of FIG. 16. On the other hand, where an image framework representing that the image therein is the latest image from among the displayed images is to be displayed around the image corresponding to the current frame, the image framework is displayed on the image 423 shown in (c) of FIG. 16. Further, the affine transformation parameters used in the affine transformation of the image 423 are stored into the image transformation section 150. In other words, the affine transformation parameters determined using the affine transformation parameters corresponding to the images 422 and 423 are stored into the image transformation section 150.

Now, a case wherein, upon image pickup of the camera, the camera is rotated around the image pickup direction although the direction or the magnification of the lens of the camera is not varied is described.

Figure 17:
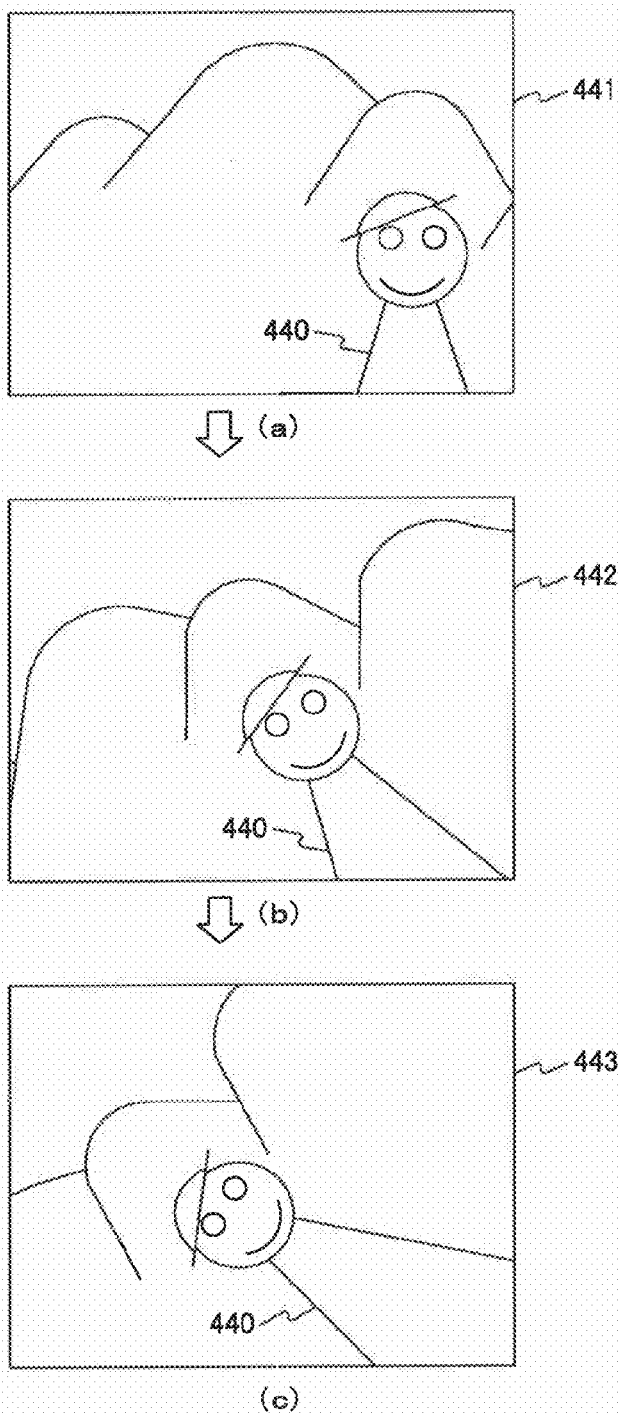
FIG. 17 is views illustrating an example of transition of dynamic pictures picked up by a camera.

FIG. 17 is views illustrating an example of transition of dynamic pictures picked up by the camera. FIG. 17 is views showing images 441 to 443 corresponding to successive frames included in the dynamic pictures where an image of a person 440 is picked up on the background of mountains. In this example, a case wherein the image pickup person carries out image pickup while rotating the camera around the image pickup direction is illustrated. In this instance, the person 440 included in the dynamic pictures picked up by the camera successively rotates on the images which form the dynamic pictures. It is to be noted that, although the position of the camera sometimes moves a little by the rotation of the camera, this example is described without taking the movement of the position of the camera into consideration.

Figure 18:
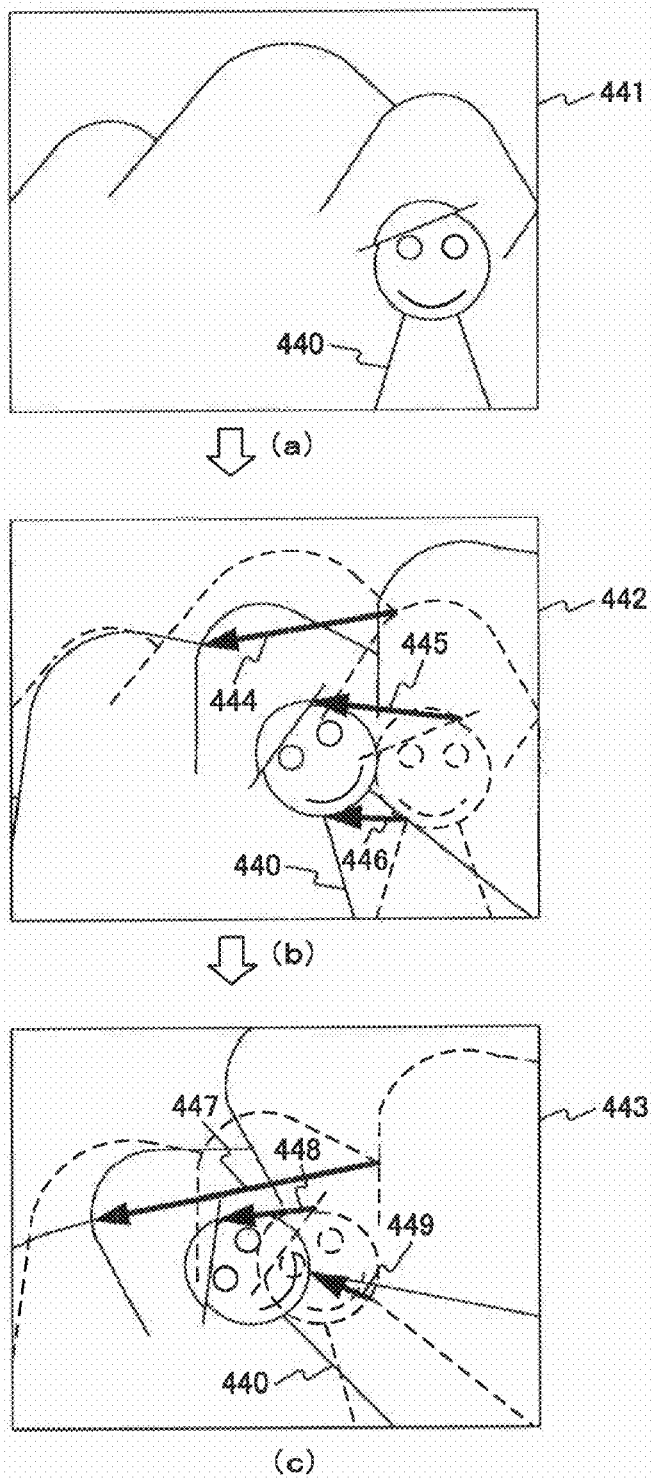
FIG. 18 is views showing images corresponding to immediately preceding frames regarding the images shown in FIG. 17 in broken lines and illustrating an optical flow detected.

FIG. 18 is views wherein an image corresponding to an immediately preceding frame in the images shown in FIG. 17 is indicated by broken lines and an example of optical flows detected is illustrated. An image 441 shown in (a) of FIG. 18 is the same as the image 441 shown in (a) of FIG. 17. Meanwhile, solid line portions of an image 442 shown in (b) of FIG. 18 are the same as those of the image 442 shown in (b) of FIG. 17 while broken line portions of the image 442 shown in (b) of FIG. 18 are the same as the solid line portions of the image 441 shown in (a) of FIG. 17. Further, arrow marks 444 to 446 on the image 442 shown in (b) of FIG. 18 indicate an example of optical flows detected from the image 442. Similarly, solid line portions of an image 443 shown in (c) of FIG. 18 are the same as those of the image 443 shown in (c) of FIG. 17 while broken line portions of the image 443 shown in (c) of FIG. 18 are the same as the solid line portions of the image 442 shown in (b) of FIG. 17. Further, arrow marks 447 to 449 on the image 443 shown in (c) of FIG. 18 indicate an example of optical flows detected from the image 443.

As shown in (b) and (c) of FIG. 18, the person 440 and the mountains of the background included in the images rotationally move in conformity with the rotation of the camera. Affine transformation parameters can be determined for each frame based on optical flows detected by the rotational movement.

Figure 19:
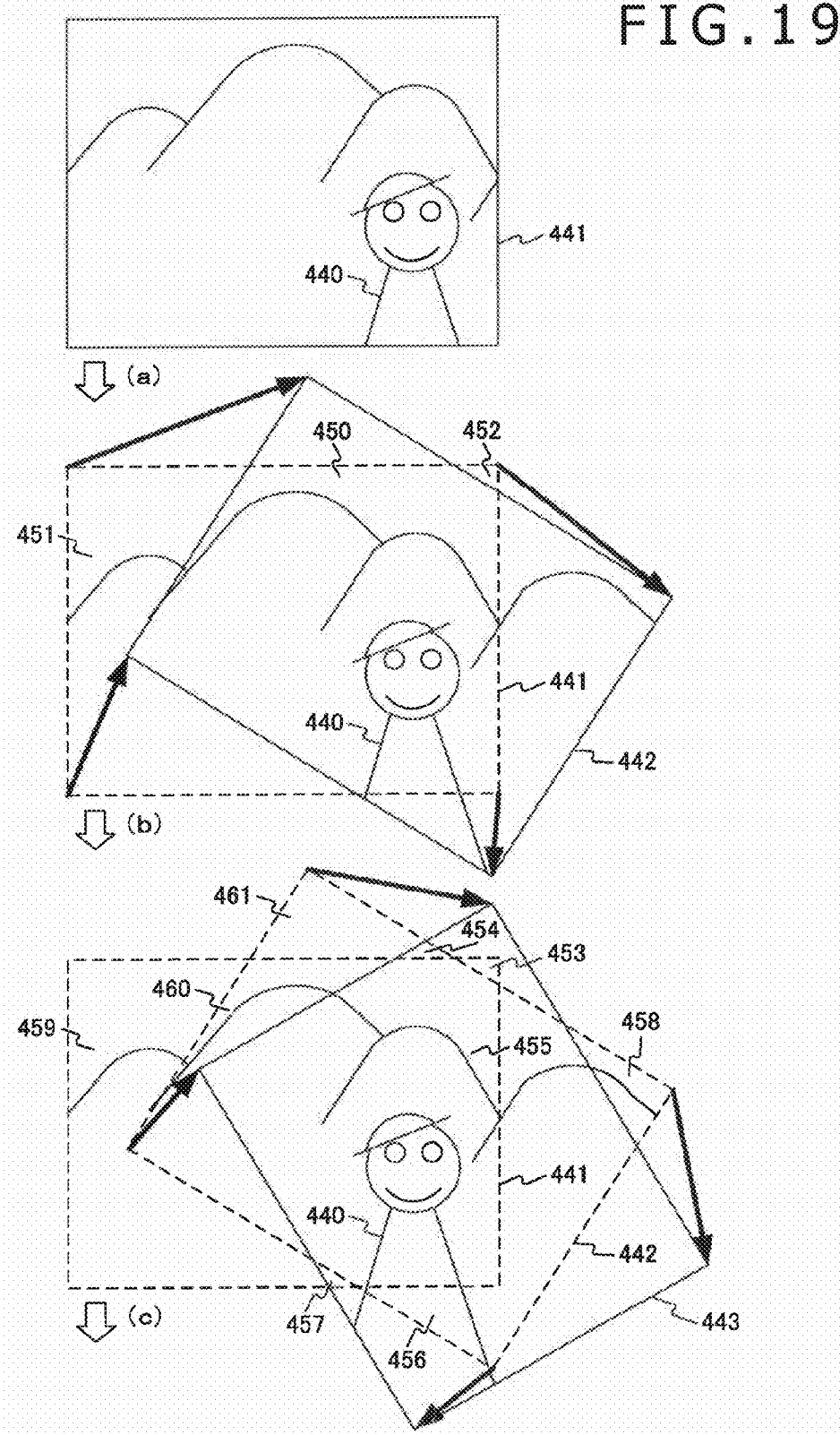
FIG. 19 is views illustrating an example of display images in a case wherein a dynamic picture including images 441 to 443 shown in FIG. 17 is reproduced.

FIG. 19 is views showing an example of display in a case wherein dynamic pictures including the images 441 to 443 shown in FIG. 17 are reproduced.

As shown in (a) of FIG. 19, only an image 441 corresponding to the top frame is displayed first. Then, where an image 442 corresponding to the next frame is to be displayed, the image 442 is affine transformed using affine transformation parameters associated with this frame. In the image shown in (b) of FIG. 19, only the angle of the image 442 is transformed. Then, the image 442 affine transformed with the affine transformation parameters is overwritten so as to overlap with the image 441 corresponding to the immediately preceding frame. In particular, in a region 450 in the region of the image 441 which overlaps with the image 442, the image of the image 442 is overwritten. Meanwhile, in regions 451 and 452 in the region of the image 441 which do not overlap with the image 442, the image of the image 441 is synthesized. In particular, where the image 442 corresponding to the second frame is to be displayed, an image wherein the entire portion of the image 442 and portions of the image 441 which correspond to the regions 451 and 452 are synthesized is displayed. Further, it is possible to display an image framework, which represents that the image therein is the latest image from among the displayed images, around the image corresponding to the current frame. In (b) of FIG. 19, the image framework is displayed on the image 442. Further, the affine transformation parameters obtained by the affine transformation of the image 442 are stored into the image transformation section 150.

Then, where an image 443 corresponding to the next frame is to be displayed, the image 443 is affine transformed using the affine transformation parameters associated with this frame. In other words, the image 443 is affine transformed using the matrix of the affine transformation parameters corresponding to the image 443 and the matrix of the affine transformation parameters corresponding to the image 442 used in the immediately preceding affine transformation. In the image shown in (c) of FIG. 19, only the angle of the image 443 is transformed. Then, the affine transformed image 443 is overwritten so as to overlap with the synthesized image of the images 441 and 442 corresponding to the preceding frames. In particular, in regions 453 to 457 in the region of the synthesized image of the images 441 and 442 which overlap with the image 443, the image of the image 443 is overwritten. On the other hand, in regions 458 to 461 in the region of the synthesized image of the images 441 and 442 which do not overlap with the image 443, the synthesized image of the images 441 and 442 is further synthesized. In particular, where the image 443 corresponding to the third frame is to be displayed, an image wherein the entire portion of the image 443, the portion of the image 441 which corresponds to the region 459 and portions of the image 442 which correspond to the regions 458 and 460 is displayed as shown in (c) of FIG. 19 is displayed. On the other hand, where an image framework representing that the image therein is the latest image from among the displayed images is to be displayed around the image corresponding to the current frame, the image framework is displayed on the image 443 shown in (c) of FIG. 19. Further, the affine transformation parameters used in the affine transformation of the image 443 are stored into the image transformation section 150. In other words, the affine transformation parameters determined using the affine transformation parameters corresponding to the images 442 and 443 are stored into the image transformation section 150.

Figure 20:
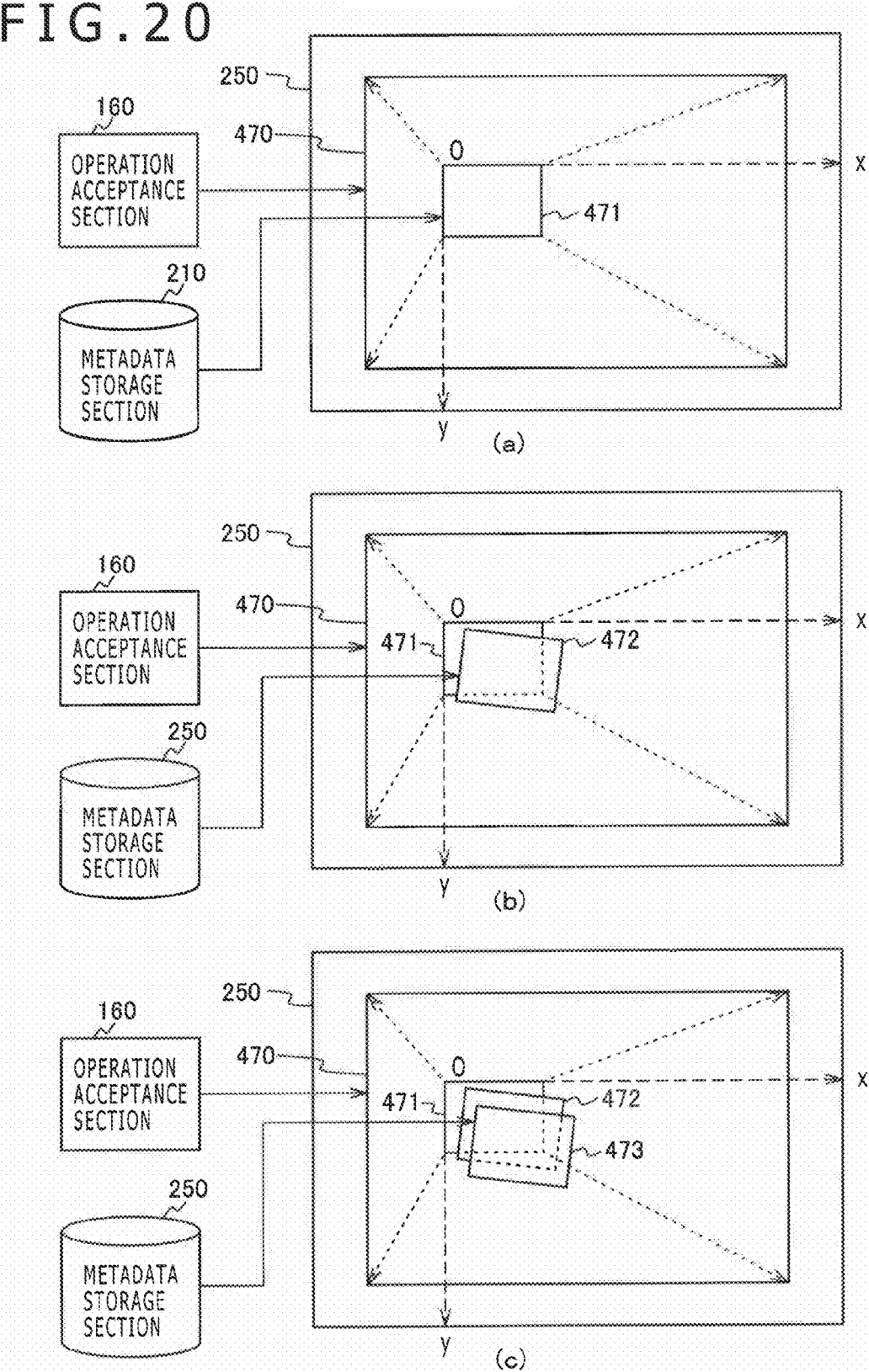
FIG. 20 is views schematically illustrating a relationship between frames of a dynamic picture file stored in the dynamic picture storage section 200 in the embodiment of the present invention and display regions.

FIG. 20 is views schematically illustrating a relationship between frames of dynamic image files stored in the dynamic picture storage section 200 in the embodiment of the present invention and the display region. Here, only the operation acceptance section 160, metadata storage section 210 and image memory 250 are displayed, but illustration of the components other than them is omitted. Further, description is given taking a case wherein a synthesized image is produced in the image memory 250 using the affine transformation parameters 217 stored in the metadata file 211 in regard to the frames "1" to "3" which form the dynamic picture file 201 shown in (b) of FIG. 4 as an example. It is to be noted that, in FIG. 20, a case wherein one dynamic picture is stored into the image memory 250 is illustrated as an example, also where a plurality of dynamic pictures are to be stored into the image memory 250, similar synthesis is carried out.

(a) of FIG. 20 illustrates a case wherein a frame 1 (205) which is the first frame from among frames which form the dynamic picture file 201 illustrated in (b) of FIG. 4 is stored into the image memory 250. For example, as shown in (a) of FIG. 20, an image 471 corresponding to the frame 1 (205) of the dynamic picture file 201 is stored into the image memory 250. Here, the position and the size of the image 471 corresponding to the first frame which is stored in the image memory 250 are the arrangement position and the size calculated by the arrangement information calculation section 230. It is to be noted that the following description is given assuming that the position of the left top of the image 471 disposed on the image memory 250 is determined as the origin, the horizontal direction (axis of abscissa) is the x axis and the vertical direction (axis of ordinate) is the y axis.

As shown in (a) of FIG. 20, the display region where the image 471 is disposed on the image memory 250 is determined as a display region 470. For example, if an affine transformed image is compressed and stored into the image memory 250, then the entire image memory 250 can be determined as the display region 470. In particular, the arrangement information calculation section 230 calculates an arrangement position and a size of the image 471 in the display region of the display section 290. On the other hand, for example, if an affine transformed image is stored without being compressed into the image memory 250, then the display region 470 can be determined such that it includes the entire final synthesized image produced from the dynamic picture being currently reproduced based on the arrangement position and the size calculated by the arrangement information calculation section 230. It is to be noted that the display region may be determined in response to the value of a display magnification accepted by the operation acceptance section 160. For example, the position of the display region 470 on the image 471 can be determined from affine transformation parameters. In particular, where the display magnification of "0.5" times that with which the current image is zoomed out is designated, those affine transformation parameters with which the zoom components in the x direction and the y direction are doubled are used to set the display region. Also in regard to a case wherein the display region is moved in parallel or is rotated with respect to the current image, the position and the range of the display region can be determined using affine transformation parameters.

(b) of FIG. 20 illustrates a case wherein a frame 2 (206) from among the frames which form the dynamic picture file 201 shown in (b) of FIG. 4 is stored into the image memory 250. In this instance, an image 472 corresponding to the frame 2 (206) is transformed using the affine transformation parameters 217 stored in the metadata file 211 in an associated relationship with "1" and "2" of the frame number 216 as described hereinabove and is synthesized with the image 471 by overwriting.

(c) of FIG. 20 illustrates a case wherein a frame 3 from among the frames which form the dynamic picture file 201 shown in (b) of FIG. 4 is stored into the image memory 250. Also in this instance, as described above, an image 473 corresponding to the frame 3 is transformed using the affine transformation parameters 217 stored in the metadata file 211 in an associated relationship with the frame numbers 216 "1" to "3" and is synthesized by overwriting with the images 471 and 352.

As described above, by displaying an image existing in a range of a display region disposed on the image memory 250, synthesized images during reproduction can be successively displayed. Here, when a current image is affine transformed and synthesized into the image memory 250, conversion of the picture quality such as a resolution conversion process, a compression process and so forth for conversion into a lower resolution is sometimes carried out. Therefore, where the display magnification is to be raised to display the current image in an enlarged scale, the synthesized image including the current image may possibly become blur. Therefore, in the present example, with regard to the current image being currently reproduced, an image before synthesized into the image memory 250 is used to display a synthesized image. In the following, this displaying method is described in detail with reference to the drawings.

Figure 21:
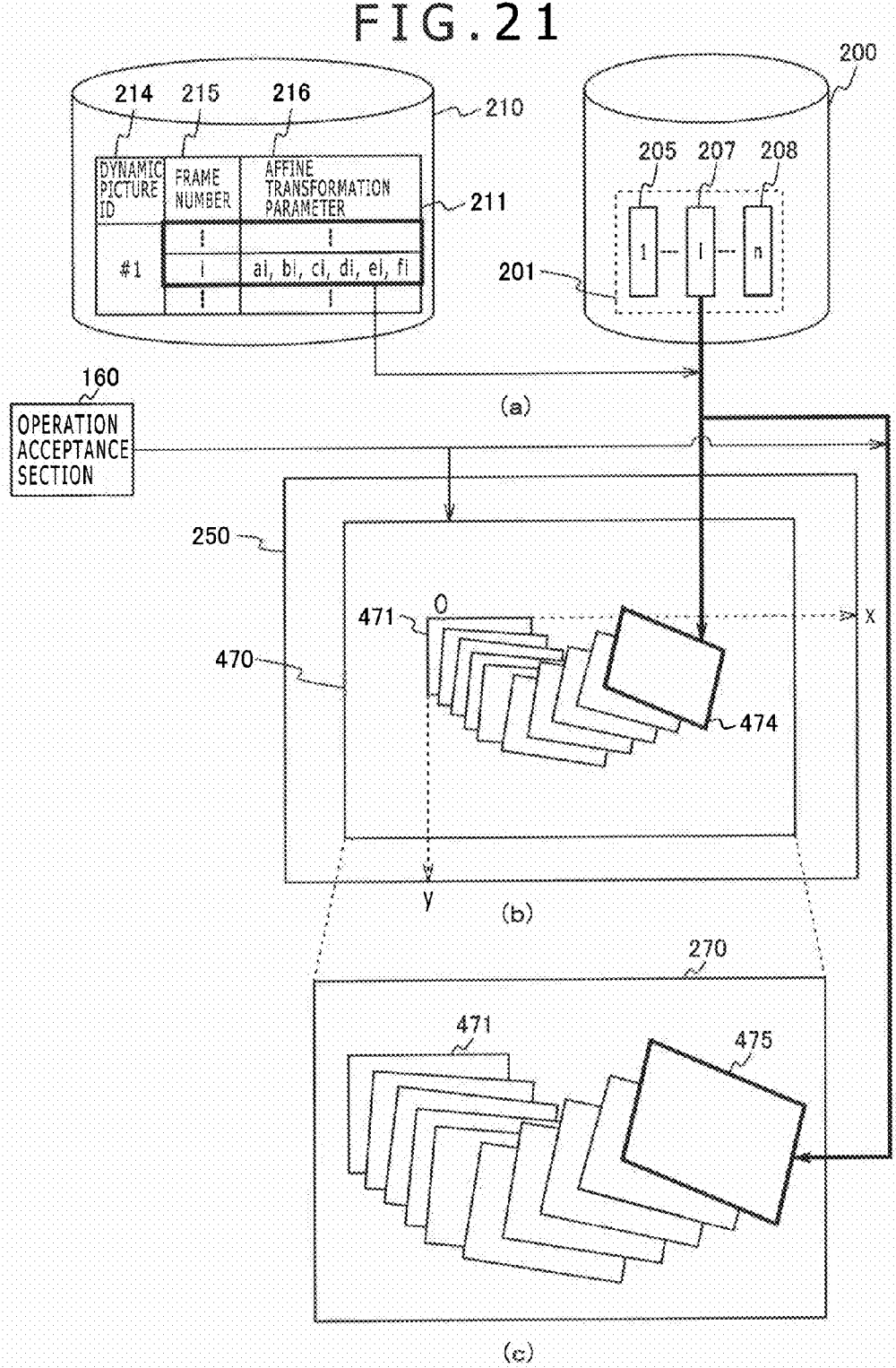
FIG. 21 is views schematically illustrating a flow of frames of the dynamic picture file stored in the dynamic picture storage section 200 in the embodiment of the present invention.

FIG. 21 is a view schematically illustrating a flow of frames of a dynamic picture file stored in the dynamic picture storage section 200 in the embodiment of the present invention. Here, only a relationship of the operation acceptance section 160, dynamic picture storage section 200, metadata storage section 210, image memory 250 and display memory 270 is illustrated while illustration of the other configuration is omitted. It is to be noted that, while FIG. 21 illustrates a case wherein one dynamic picture is displayed on the display section 290 as an example, also where a plurality of dynamic pictures are to be displayed on the display section 290, they are synthesized similarly.

(a) of FIG. 21 shows the dynamic picture file 201 and the metadata file 211 shown in (b) of FIG. 4 in a simplified form. In the following, an example wherein images corresponding to a frame i (207) which forms the dynamic picture file 201 is displayed is described. In other words, it is assumed that, with regard to the images which correspond to the frames 1 to "i−1" which form the dynamic picture file 201, a synthesized image is produced already.

(b) of FIG. 21 schematically shows the image memory 250 in which a synthesized image in which the images corresponding to the frames which form the dynamic picture file 201 are synthesized is stored. As shown in (b) of FIG. 20, an image 471 corresponding to a frame 1 (661) which forms the dynamic picture file 201 is first stored into the image memory 250. Then, after the image 471 is stored into the image memory 250, the images corresponding to the frames 2 to "i−1" which form the dynamic picture file 201 are successively affine transformed using the values of the affine transformation parameter 217 stored in the metadata file 211 in an associated relationship with the frames 2 to "i−1," and the affine transformed images are successively stored by overwriting into the image memory 250. Then, an image existing in the display region of the display region extraction section 260 is extracted from the synthesized image stored in the image memory 250 for each frame.

In the state wherein the synthesized image of the images corresponding to the frames 1 to "i−1" is stored in the image memory 250, the image corresponding to the frame i (207) which forms the dynamic picture file 201 is affine transformed using the affine transformation parameters 216 stored in the metadata file 211 in an associated relationship with the frames 1 to "i," and the affine transformed current image 474 is stored by overwriting into the image memory 250. Then, an image existing in the display region 470 is extracted from the synthesized image stored in the image memory 250 by the display region extraction section 260, and the extracted image is stored, for example, into the display memory 270 as illustrated in (c) of FIG. 21.

(c) of FIG. 21 schematically illustrates the display memory 270 in which images extracted by the display region extraction section 260 are stored. Here, for an current image 475 which corresponds to the current frame from among the images extracted by the display region extraction section 260, not the current image 474 extracted from the image memory 250 by the display region extraction section 260 but an image acquired from the dynamic picture storage section 200 and affine transformed by the image transformation section 150 is used. Here, the storage position of the current image 475 in the display memory 270 can be determined based on the position and the size of the current image 474 in the image memory 250 and the position and the size of the display region 470 in the image memory 250. For example, where the matrix of affine transformation parameters stored in an associated relationship with "1" to "i" of the frame number 216 in the metadata file 211 is represented by A1, . . . , Ai and the matrix of affine transformation parameters for determining the display region 470 (for example, a matrix with reference to the image memory 250) is represented by C, the storage position of the current image 475 in the display memory 270 can be determined using Inv(C)×A1× . . . ×Ai with reference to the position of the image 471.

As shown in (c) of FIG. 21, the images extracted by the display region extraction section 260 are stored into the display memory 270, and an image acquired from the dynamic picture storage section 200 and affine transformed by the image transformation section 150 is stored by overwriting on the images extracted by the display region extraction section 260. Then, the image stored in the display memory 270 is displayed on the display section 290. In this manner, as regards the current image, a comparatively clean current image can be displayed by using an image in a state before the image is subjected to such processing as reduction and stored into the image memory 250 after affine transformation. Further, also in a case wherein expansion or the like is carried out by an operation of the user, the current image can be displayed in a clean state.

As described above, since, for the current image, an image affine transformed after acquired from the dynamic picture storage section 200 can be used in place of a synthesized image stored in the image memory 250, a comparatively clean image can be viewed. This display example is described in detail with reference to FIGS. 22 and 23.

(a) of FIG. 22 is a view showing an example of display in a case wherein a dynamic picture picked up by a camera is reproduced. In this example, an image 480 during reproduction of a dynamic picture where an image of a parent and a child who are playing in an open space of a lawn on which a large building stands is picked up while the camera is moved principally in the leftward and rightward direction. Here, in the image 480, an image 481 synthesized from images corresponding to claims which form the dynamic picture is formed in a panorama fashion. Further, an image corresponding to the current frame in the image 480 is a current image 482.

Here, a case wherein an image region surrounded by a framework 483 is displayed in an enlarged scale is described. Where an image displayed on the display section 290 is to be displayed in an enlarged or reduced scale, the user can operate a display magnification designation key on the operation acceptance section 160 to designate a desired display magnification. For example, where the image 480 is displayed on the display section 290 as shown in (a) of FIG. 22, if an image region surrounded by the framework 483 is to be displayed in an enlarged scale, then the user can operate the display magnification designation key on the operation acceptance section 160 to designate a display magnification and designate a position to display the image region surrounded by the framework 483 in an enlarged scale.

(b) of FIG. 22 is a view showing an image 484 in a state before the current image 482 in the image 480 is affine transformed.

(a) of FIG. 23 is a view showing an image 485 in a case wherein the image region surrounded by the framework 483 shown in (a) of FIG. 22 is displayed in an enlarged scale. The image 485 shown in (a) of FIG. 23 is an image synthesized in the display memory 270 in a state before the current image after affine transformation is stored into the image memory 250. In this manner, in the region of a current image 486, a comparatively definite image in a state before stored into the image memory 250 is displayed in the region of the current image 486. Therefore, where the current image 486 and the region other than this region are compared with each other, the current image 486 which is cleaner than that in the other region can be observed. Meanwhile, an image 487 shown in (b) of FIG. 23 is an image stored in the display memory 270 in a state wherein the current image after affine transformation is stored in the image memory 250. Where the image 487 is displayed in this manner, also in the region of a current image 488, an image of a degree similar to that of an image in the other region is displayed. In particular, with the embodiment of the present invention, when images are synthesized and displayed, although a history image stored in the display memory 270 is sometimes compressed, for an image at present (current image), a non-compressed image or an image of a resolution higher than that of a history image can be used, and therefore, image synthesis display of high picture quality can be implemented.

While the foregoing description is given taking a case wherein images which form one dynamic picture are synthesized with each other as an example, in the following description, examples of synthesis in a case wherein images of two dynamic pictures are synthesized are described in detail with reference to the drawings.

FIG. 24 is views schematically illustrating an example of synthesis in a case wherein two dynamic pictures are synthesized. In this example, a case wherein images 501 to 508 which form a dynamic picture 500 and images 511 to 515 which form a dynamic picture 510 are synthesized is described. Further, it is assumed that images 505 and 513 indicated by oblique lines applied therein are images corresponding to frame numbers included in relative relationship metadata regarding the dynamic pictures 500 and 510.

In (a) of FIG. 24, a case wherein the images 501 to 508 which form the dynamic picture 500 are successively affine transformed using affine transformation parameters stored in an associated relationship with individual frames and synthesized on the image memory 250 is illustrated. For example, the image 501 which corresponds to the top frame is stored into the image memory 250 first. Then, the images 502 to 508 are successively affine transformed with reference to the image 501 and synthesized in the image memory 250. A flow of the current image by the affine transformation is indicated by an arrow mark 509. In other words, the images 501 to 508 are successively synthesized along the arrow mark 509.

In (b) of FIG. 24, a case wherein the images 511 to 515 which form the dynamic picture 510 are successively affine transformed using affine transformation parameters stored in an associated relationship with individual frames and synthesized on the image memory 250 is illustrated. Meanwhile, in (c) of FIG. 24, relative relationship positions of the image 505 and the image 513 in a case wherein the image 513 is affine transformed with reference to the image 501 with affine transformation parameters included in relative relationship metadata regarding the dynamic pictures 500 and 510 are shown. Here, the synthesized image shown in (b) of FIG. 24 shows an image synthesized from the images 511 to 515 with reference to the relative relationship positions of the image 505 and the image 513 shown in (c) of FIG. 24. A flow of the current image by the affine transformation in this instance is indicated by an arrow mark 516. In particular, the images 511 to 515 are successively synthesized along the arrow mark 516. An example of synthesis in a case wherein the synthesized image shown in (a) of FIG. 24 and the synthesized image shown in (b) of FIG. 24 are synthesized with reference to the relative relationship positions of the image 505 and the image 513 shown in (c) of FIG. 24. It is to be noted that, in the example shown in (d) of FIG. 24, an example wherein the images 505 and 513 are reproduced at the same time and the images reproduced at the same time are synthesized by overwriting the dynamic picture 510 on the dynamic picture 500 is illustrated.

Here, a particular calculation method regarding the storage positions of the individual dynamic pictures is described. First, the position of at least one dynamic picture which forms one of a plurality of dynamic pictures is calculated by the arrangement information calculation section 230. For example, the position of the image 501 corresponding to the top frame which forms the dynamic picture 500 is calculated. Then, the arrangement position of at least one of images which form another dynamic picture is calculated. For example, matrices of affine transformation parameters associated with the images 501 to 505 and 511 to 515 are represented by A1 to A5 and A11 to A15, respectively, and a matrix of affine transformation parameters included in the relative relationship metadata files relating to the dynamic pictures 500 and 510 is represented by AM3. Here, the reference image is the image 501. Where the arrangement position of the image 501 on the image memory 250 is determined as a reference, the arrangement position of the image 505 is calculated by multiplication of A1 to A5. In other words, the arrangement position of the image 505 is calculated using A1× . . . ×A5. Meanwhile, where the arrangement position of the image 501 on the image memory 250 is determined as a reference, the arrangement position of the image 513 is calculated by multiplication of A1 to A8 and AM3. In other words, the arrangement position of the image 501 is calculated using A1× . . . ×A5×AM3. Here, for example, where the arrangement position of the image 511 corresponding to the top frame of the dynamic picture 520 is to be calculated, it can be calculated by multiplication of A1 to A8 and AM3 and an inverse matrix of A11 to A13. In other words, the arrangement position of the image 511 can be calculated using "A1× . . . ×A5×AM3×Inv(A11× . . . ×A13)." Also the arrangement position of any other image which forms the dynamic picture 510 can be calculated using A1 to A8 and AM3 and an inverse matrix of A11 to A13 or A14 to A15.

On the other hand, where an image which forms a dynamic picture other than the dynamic picture which includes the reference image is to be affine transformed, it is carried out using a matrix used for calculation of the storage position of the image corresponding to the top frame and affine transformation parameters associated with the image. For example, where the image 512 of the dynamic picture 510 is to be affine transformed, it is transformed with a matrix of "A1× . . . ×A5×AM3×Inv(A13)" using a matrix A12 which corresponds to the image 512. Also where, for example, the image 515 of the dynamic picture 510 is to be affine transformed, it is transformed with the matrix of "A1× . . . ×A5×AM3×AM14×AM15" using a matrix A15 which corresponds to the image 515. Each image of the dynamic picture 520 is transformed similarly.

In the manner, where a plurality of dynamic pictures are to be synthesized and reproduced, after the position and the size of a reference image of one of the dynamic pictures on the image memory 250 is determined, the position and the size of each image can be calculated using metadata files individually associated with the dynamic pictures and relative relationship metadata files associated with the individual dynamic pictures. Therefore, where a plurality of dynamic pictures are to be synthesized and reproduced, it is possible to reproduce the dynamic pictures from any position. For example, for the synthesized image illustrated in (d) of FIG. 24, an example wherein the image 511 which forms the dynamic picture 510 is synthesized after the images 501 to 503 which form the dynamic picture 500 are synthesized is illustrated. In particular, the images 503 and 511 are synthesized simultaneously, and then the images 504 and 512 are synthesized simultaneously. Also thereafter, synthesis is carried out similarly. It is to be noted that, while this example illustrates an example wherein images reproduced at the same time are synthesized by overwriting the dynamic picture 510 on the dynamic picture 500, the dynamic picture to be overwritten may be designated through the operation acceptance section 160.

Now, a calculation method regarding the position and the size at and with which an image corresponding to the top frame is to be stored is described in detail with reference to the drawings.

Figure 25:
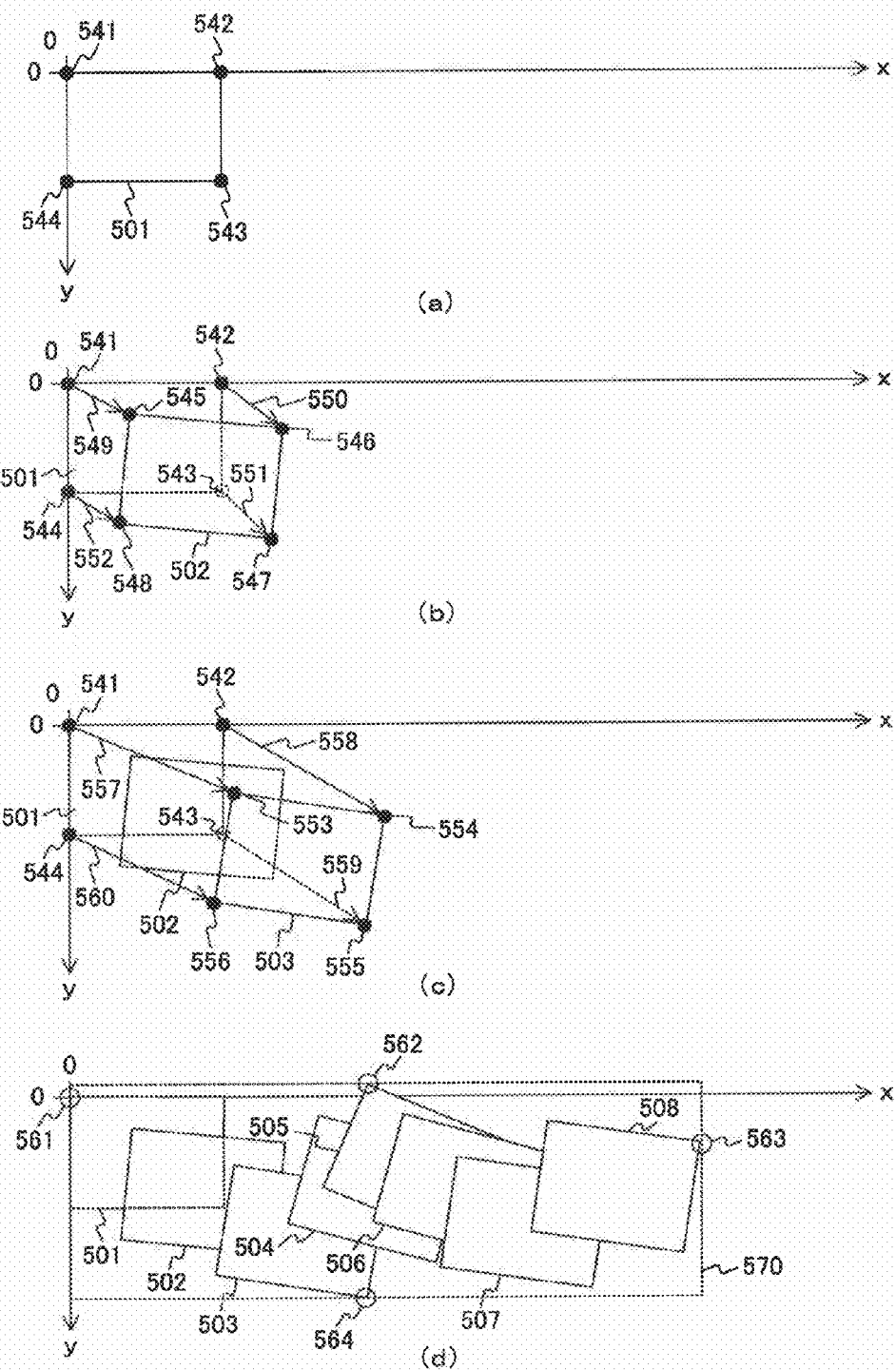
FIG. 25 is views illustrating an outline of a size calculation method of a synthesized image produced by synthesis of images which form a dynamic picture in a case wherein the size of the synthesized image is calculated.

FIG. 25 is views illustrating an outline of a size calculation method of a synthesized image produced by synthesis of images which form a dynamic picture in a case wherein the size of the synthesized image is calculated. In the description of this size calculation method of a synthesized image, an example wherein affine transformation parameters associated with images which form one dynamic picture are used to successively affine transform the four apexes of the top image to calculate the size of a synthesized image produced from this dynamic picture is described. It is to be noted that, while reference numerals 501 to 508 shown in FIG. 25 are reference numerals representative of rectangles formed from points after the four apexes of the image 501 shown in FIG. 24 are affine transformed, the rectangles are described with the same reference numerals as those of the images 501 to 508 applied thereto because the size of the rectangles is the same as the size of the images 501 to 508 shown in FIG. 24.

In a case wherein the size of a synthesized image to be produced in regard to one dynamic picture is to be calculated as illustrated in (a) of FIG. 25, one of images which form the dynamic picture is determined as a reference image. Then, at least one of the apexes of the reference image is set to the origin, and an xy coordinate system having an x axis and a y axis which are set as two sides of the reference image which are tangent to the apex corresponding to the origin is set. For example, an xy coordinate system wherein the left upper apex of the reference image is set as the origin and the upper end side of the reference image is set as the x axis while the left end side of the reference image is set as the y axis is set. On this xy coordinate system, a maximum value of the reference image in the y axis direction is determined as the position of the upper end side of the reference image, and a minimum value is determined as the position of the lower end side of the reference image. Similarly, a maximum value of the reference image in the x axis direction is determined as the position of the right end side of the reference image and a minimum value is determined as the position of the left end side of the reference image.

Then, affine transformation parameters associated with the images which form the dynamic picture are used to successively affine transform the four apexes of the reference image on the xy coordinate system to successively produce vectors (transition vectors) having start points at the four apexes of the reference image and having end points at four points after the affine transformation. Then, the maximum values and the minimum values in the x axis direction and the y axis direction are successively updated based on the positions of the end points of the transition vectors produced successively in this manner, and the size of the synthesized images on the xy coordinate system is calculated.

For example, in a case wherein the image 501 corresponding to the top frame which forms the dynamic picture 500 illustrated in (a) of FIG. 24 is set to the reference image, an xy coordinate system having the origin at the left upper apex of the image 501 is set as illustrated in (a) of FIG. 25, and start points 541 to 544 of displacement vectors are set to positions corresponding to the four apexes of the image 501 on the xy coordinate system. For example, where the resolution of the image 501 is 640×480 pixels, the coordinate of the start point 541 is (0, 0); the coordinate of the start point 542 is (640, 0); the coordinate of the start point 543 is (640, 480); and the coordinate of the start point 544 is (0, 480). In this instance, the maximum value in the x axis direction is "640" and the minimum value in the x axis direction is "0," and the maximum value in the y axis direction is "480" and the minimum value in the y axis direction is "0." In short, on this xy coordinate system, the lower side in the y axis direction is the positive.

On the xy coordinate system set in this manner, affine transformation parameters associated with the reference image 501 and the next image 502 are used to affine transform the four apexes of the reference image 501. For example, where the matrix of affine transformation parameters associated with the image 501 is represented by A1 (unit matrix) and the matrix of affine transformation parameters associated with the image 502 is represented by A2, the matrix of A1×A2 is used to affine transform the four apexes of the reference image 501. By this affine transformation, the four apexes of the image 501 are transformed to positions corresponding to the four apexes of the image 502 as shown in (b) of FIG. 25. Then, the four points after this affine transformation are determined as end points 545 to 548 to produce displacement vectors 549 to 552 from the start points 541 to 544, respectively.

Thereafter, the maximum values and the minimum values in the x axis direction and the y axis direction are updated based on the displacement vectors 549 to 552. For example, since the end points 545 to 548 of the displacement vectors 549 to 552 are positioned on the lower side than the upper end side of the image 501, the minimum value in the y axis direction is not changed. Further, from among the end points 545 to 548 of the displacement vectors 549 to 552, the end points 547 and 548 are positioned on the lower side than the lower end side of the image 501 and the end point 547 becomes the point which exists on the lowermost side. Therefore, the maximum value in the y axis direction is updated to the value on the y axis of the end point 547 of the displacement vector 551. Further, since the end points 545 to 548 of the displacement vectors 549 to 552 are positioned on the right side with respect to the left end side of the image 501, the minimum value on the x axis is not changed. On the other hand, from among the end points 545 to 548 of the displacement vectors 549 to 552, the end points 546 and 547 are positioned on the right side with respect to the right end side of the image 501 and the end point 546 becomes a point existing on the rightmost position. Therefore, the maximum value in the x axis direction is updated to the value on the x axis of the end point 546 of the displacement vector 550.

Similarly, on the xy coordinate system, affine transformation parameters associated with the reference images 501 to 503 are used to affine transform the four apexes of the reference image 501. For example, where the matrices of the affine transformation parameters associated with the images 501 to 503 are represented by A1, A2 and A3, respectively, the matrix of A1×A2×A3 is used to affine transform the four apexes of the reference image 501. By this affine transformation, the four apexes of the image 501 are transformed into positions corresponding to the four apexes of the image 503 as shown in (c) of FIG. 25. Then, the four points after this affine transformation are determined as end points 553 to 556 to produce displacement vectors 557 to 560 from the start points 541 to 544, respectively.

Then, the maximum values and the minimum values in the x axis direction and the y axis direction are updated based on the displacement vectors 557 to 560. For example, since the end points 553 to 556 of the displacement vectors 557 to 560 are positioned on the lower side with respect to the upper end side of the image 501, the minimum value in the y axis direction is not changed. Meanwhile, from among the end points 553 to 556 of the displacement vectors 557 to 560, the end points 555 and 556 are positioned on the lower side with respect to the point 547 of the image 502 and the end point 555 becomes a point existing on the lowermost side. Therefore, the maximum value in the y direction is updated to the value on the y axis of the end point 555 of the displacement vector 559. Furthermore, since the end points 553 to 556 of the displacement vectors 557 to 560 are positioned on the right side with respect to the left end side of the image 501, the minimum value on the x axis is not changed. Further, from among the end points 553 to 556 of the displacement vectors 557 to 560, the end points 554 and 555 are positioned on the right side with respect to the point 546 of the image 502, and the end point 554 becomes a point which exists on the rightmost position. Therefore, the maximum value in the x axis direction is updated to the value on the x axis of the end point 554 of the displacement vector 558.

Also with regard to the image 504 and so forth, affine transformation parameters associated with the images of an object are similarly used to affine transform the four apexes of the reference image 501 on the xy coordinate system to successively transform the four apexes of the reference image 501 into the positions corresponding to the four apexes of the image of an object. Then, the four points after the affine transformation are determined as end points to successively produce displacement vectors from the start points 541 to 544. Then, the maximum values and the minimum values in the x axis direction and the y axis direction are successively updated based on the displacement vectors.

For example, if the updating process for the maximum values and the minimum values described above is repeated for the images 501 to 508, as illustrated in (d) of FIG. 25, then since the minimum value in the x axis direction is not updated, the minimum value in the x axis direction becomes the value (that is, "0") on the x axis of one (for example, the point 561) of the two apexes at the left end of the image 501. Further, since the apex 563 of the image 508 becomes a point which exists on the rightmost side, the maximum value in the x axis direction is updated to the value on the x axis of the apex 563. Furthermore, since the apex 562 of the image 505 becomes a point which exists on the uppermost side, the minimum value in the y axis direction is updated to the value on the y axis of the apex 562. Further, since the apex 564 of the image 503 (that is, the start point 555) becomes a point which exists on the lowermost side, the maximum value in the y axis direction is updated to the value on the y axis of the apex 564.

A rectangle formed from the maximum values and the minimum values in the x axis direction and the y direction calculated in this manner is calculated as the display region of the synthesized image produced in regard to the dynamic picture 500. For example, a synthesized image display region 570 is calculated as illustrated in (d) of FIG. 25.

FIG. 26 is views illustrating an outline of a size calculation method of a synthesized image in a case wherein the magnitude of a synthesized image produced by synthesis of images which form a dynamic picture is calculated. In the description of this size calculation method of a synthesized image, an example wherein affine transformation parameters associated with images which form each of two dynamic pictures and affine transformation parameters stored in a relative relationship metadata file relating to the dynamic pictures are used to successively affine transform the four apexes of the top image to calculate the size of a synthesized image to be produced in regard to the dynamic pictures is described. It is to be noted that the following description is given using reference characters 501 to 508 and 511 to 515 shown in FIG. 26 which are same reference numerals for the images 501 to 508 and 511 to 515.

As shown in (a) of FIG. 26, for the images 501 to 505, a process similar to the updating process illustrated in FIG. 25 is repeated. Here, the image 505 is an image corresponding to a frame number included in the relative relationship metadata file regarding the dynamic pictures 500 and 510. Therefore, in order to carry out an updating process in regard to the dynamic picture 510, affine transformation parameters associated with the images 501 to 505 and affine transformation parameters included in the relative relationship metadata files regarding the dynamic pictures 500 and 510 are used to affine transform the four apexes of the reference image 501. For example, where the matrices of affine transformation parameters associated with the images 501 to 505 are represented by A1 to A5, respectively, and the matrix of affine transformation parameters included in the relative relationship metadata regarding the dynamic pictures 500 and 510 is represented by AM3, the matrix of A1×A2× . . . ×A5×AM3 is used to affine transform the four apexes of the image 501. By this affine transformation, the four apexes of the reference image 501 are transformed into positions corresponding to the four apexes of the image 513. Then, the four points after the affine transformation are determined as end points 565 to 568 to produce displacement vectors 569 to 572 from the start points 541 to 544. Thereafter, the maximum values and the minimum values in the x axis direction and the y axis direction are updated based on the displacement vectors 569 to 572.

Then, a process similar to the updating process illustrated in FIG. 25 is repeated for the images 511 and 512 preceding to the image 513 illustrated in (b) of FIG. 26 and the images 514 and 515 following the image 513. In this instance, one image preceding to the image 513 and one image following the image 513 may be subjected simultaneously to the updating process, or one image preceding to the image 513 and one image following the image 513 may be subjected alternately one by one to the updating process. Or, the images preceding to the image 513 may be subjected one by one to the updating process, whereafter the images following the image 513 are subjected one by one to the updating process, or the updating process may be carried out reversing the order. For example, where the matrices of affine transformation parameters associated with the images 501 to 505 and 511 to 515 are represented by A1 to A5 and A11 to A15 respectively, and the matrix of affine transformation parameters included in the relative relationship metadata regarding the dynamic pictures 500 and 510 is represented by AM3, in a case wherein affine transformation is to be carried out in regard to the image 512, the matrix of A1×A2× . . . ×A5×AM3×Inv(A12) is used to affine transform the four apexes of the image 501. On the other hand, in a case wherein affine transformation is to be carried out in regard to the image 514, the matrix of A1× A2× . . . ×A5×AM3×A14 is used to affine transform the four apexes of the image 501.

Then, if the updating process is completed with regard to the images 511, 512, 514, and 515 preceding to and succeeding the image 513, then the updating process is carried out with regard to the image 506 next to the image 505 which relates to the relative relationship metadata in regard to the dynamic pictures 500 and 510. In other words, when the updating process is completed with regard to the dynamic picture 510, the processing object returns to the dynamic picture 500 and the updating process regarding the dynamic picture 500 is repeated. In other words, the updating process is carried out with regard to the images 506 to 508.

Then, if the updating process of the maximum values and the minimum values described above is repeated for the images 501 to 508 and 511 to 515, then since the apex 573 of the image 511 of the dynamic picture 510 becomes a point which exists on the uppermost side, the minimum value in the y axis direction is updated to the value on the y axis of the apex 573. It is to be noted that the maximum value in the y axis direction and the maximum value and the minimum value in the x axis direction are similar to those shown in (d) of FIG. 25. A rectangle formed from the maximum values and the minimum values in the x axis direction and the y axis direction calculated in this manner is calculated as the display range of a synthesized image produced with regard to the dynamic pictures 500 and 510. For example, a synthesized image display range 574 is calculated as illustrated in (c) of FIG. 26. A reduction ratio and so forth of the images which form the dynamic picture which makes an object of reproduction are calculated based on the synthesized image display range calculated in this manner and the size of the image memory 250. For example, if the calculated synthesized image display range is greater than the size of the image memory 250, then the images which form the dynamic picture which makes an object of reproduction are compressed and reduced so that the calculated synthesized image display range may be within the range of the image memory 250. In particular, the reduction ratio of the images which form the dynamic picture which makes an object of reproduction is calculated so that the calculated synthesized image display range may be within the range of the image memory 250, and the size and the arrangement position of the image of the top frame are calculated based on the reduction ratio. Further, if, during synthesis reproduction of a dynamic picture, synthesis reproduction of a different dynamic picture is selected, then the reproduction ratio of the already synthesized image is calculated based on the arrangement position and the size of the calculated reference image, and the already synthesized image is reduced based on the reduction ratio. Then, synthesis reproduction of the dynamic picture which already is an object of synthesis reproduction and the dynamic picture selected newly is carried out.

On the other hand, where the calculated synthesized image display range is smaller than the size of the image memory 250, the reproduction process for the images which form the dynamic picture which makes an object of reproduction is not carried out. Where the images which make an object of reproduction are not reduced in this manner, the display magnification is changed so that the synthesized image to be produced with regard to the dynamic picture may have a suitable size in the display region.

While an example wherein affine transformation parameters stored in the relative relationship metadata file regarding two dynamic pictures are used to calculate the size of a synthesized image to be produced with regard to the two dynamic pictures, it is possible to place affine transformation parameters regarding three or more dynamic pictures into one relative relationship metadata file and use the affine transformation parameters to calculate the size of a synthesized image to be produced with regard to the three or more dynamic pictures. In the following, an example wherein the size of a synthesized image to be produced with regard to three or more dynamic pictures is calculated is described in detail with reference to the drawings.

Figure 27:
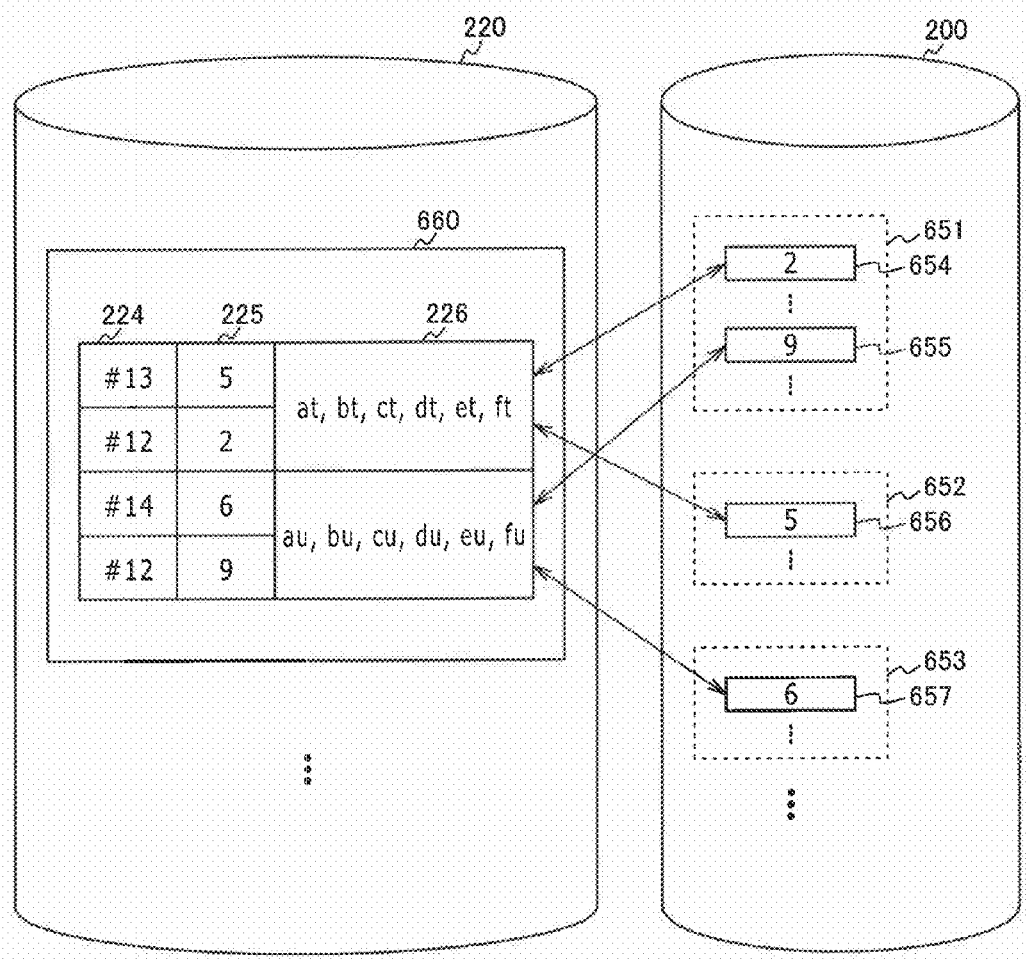
FIG. 27 is a view schematically showing files recorded in the dynamic picture storage section 200 and the relative relationship information storage section 220 in the embodiment of the present invention.

FIG. 27 is a view schematically showing files recorded in the dynamic picture storage section 200 and the relative relationship information storage section 220 in the embodiment of the present invention. FIG. 27 in this example is a view schematically showing dynamic picture files (#12) 651 to (#14) 653 stored in the dynamic picture storage section 200 and a relative relationship metadata file 660 stored in the relative relationship information storage section 220 in an associated relationship with the dynamic picture files (#12) 651 to (#14) 653. In this example, an example wherein affine transformation parameters regarding the three dynamic picture files (#12) 651 to (#14) 653 are stored in the one relative relationship metadata file 660 is described. It is to be noted that description of the configuration of the dynamic picture files stored in the dynamic picture storage section 200 is omitted here because the configuration is similar to that of the dynamic picture files shown in FIGS. 4 and 5 and so forth. Further, description of the configuration of the relative relationship metadata file stored in the relative relationship information storage section 220 is omitted here because the configuration is similar to that of the relative relationship metadata file shown in FIG. 5 except that affine transformation parameters regarding three or more dynamic pictures are stored in the one relative relationship metadata file.

In the relative relationship metadata file 660, a dynamic picture ID 224, a frame number 225 and an affine transformation parameter 226 are stored in an associated relationship with each other. Further, affine transformation parameters regarding a relative relationship of each two images among images which form the dynamic picture files (#12) 651 to (#14) 653 are stored in a relative relationship metadata file 630. In particular, affine transformation parameters "at, bt, ct, dt, et, ft" for calculating the position of the frame "5" 656 which forms the dynamic picture file (#13) 652 in a case wherein the frame "2" 654 which forms the dynamic picture file (#12) 651 is determined as a reference and affine transformation parameters "au, bu, cu, du, eu, fu" for calculating the position of the frame "6" 657 which forms the dynamic picture file (#14) 653 in a case wherein the frame "9" 655 which forms the dynamic picture file (#12) 651 is determined as a reference are stored in the relative relationship metadata file 630. Consequently, where three dynamic pictures are reproduced while being synthesized, the dynamic pictures can be reproduced with the relative relationship of the three dynamic pictures taken into consideration.

FIG. 28 is views schematically illustrating an example of synthesis in a case wherein three dynamic pictures are synthesized. In this example, a case wherein images 501 to 508 which form a dynamic picture 500, images 511 to 515 which form another dynamic picture 510 and images 521 to 526 which form a further dynamic picture 520 are synthesized is described. Further, the images 505 and 513, and images 507 and 523 indicated by slanting lines applied in the inside thereof are images corresponding to frame numbers included in the relative relationship metadata regarding the dynamic pictures 500, 510, and 520.

(a) of FIG. 28 is similar to (a) of FIG. 24 and illustrates a case wherein the images 501 to 508 which form the dynamic picture 500 are successively affine transformed using affine transformation parameters stored in an associated relationship with individual frames to synthesize the images 501 to 508 on the image memory 250.

(b) of FIG. 28 illustrates a case wherein images 521 to 526 which form a dynamic picture 520 are successively affine transformed using affine transformation parameters stored in an associated relationship with individual frames to synthesize the images 521 to 526 on the image memory 250. Here, a case is described wherein the image 523 having the inside indicated by slanting lines is affine transformed with affine transformation parameters included in the relative relationship metadata regarding the dynamic pictures 500 and 520 using the image 501 as a reference image. Further, the synthesized image shown in (b) of FIG. 28 is an image in a case wherein the images 521 to 526 are synthesized with reference to relative relationship positions of the image 507 and the image 523 having the inside indicated by slanting lines. A flow of a current image by the affine transformation in this instance is indicated by an arrow mark 527. In particular, the images 521 to 526 are successively synthesized as along the arrow mark 527. An example of synthesis in a case wherein the dynamic pictures 500, 510 and 520 are synthesized with reference to relative relationship positions of the image 505 and the image 513 and the relative relationship positions of the image 507 and the image 523 are illustrated in (c) of FIG. 28. It is to be noted that the example illustrated in (c) of FIG. 28 illustrates a case wherein the images 507 and 523 are reproduced at the same time after the images 505 and 513 are reproduced at the same time and another case wherein, with regard to the images to be reproduced at the same time, the dynamic picture 510 is synthesized by overwriting on the dynamic picture 500 and the dynamic picture 520 is synthesized by overwriting on the dynamic picture 510. It is to be noted that, even where relative relationship metadata regarding a plurality of dynamic pictures which make an object of reproduction do not exist, relative relationship metadata regarding other dynamic pictures can be used to synthesize and reproduce the plural dynamic pictures which make an object of reproduction. For example, where, from among the dynamic picture 500, dynamic picture 510 and dynamic picture 520 shown in (c) of FIG. 28, the dynamic picture 510 and the dynamic picture 520 are to be synthesized, relative relationship metadata regarding the dynamic pictures 500 and 510 and relative relationship metadata regarding the dynamic pictures 500 and 520 can be used to calculate the position of another dynamic picture in a case wherein one of the dynamic picture 510 and the dynamic picture 520 is used as the reference dynamic picture. For example, where the dynamic picture 510 is used as a reference dynamic picture, the position of the image 505 which forms the dynamic picture 500 can be calculated using the relative relationship positions of the image 505 and the image 513. Further, the position of the image 507 can be calculated based on the image 505. Then, the position of each of the images which form the dynamic picture 520 in a case wherein the image 501 is determined as a reference can be calculated using the relative relationship positions of the image 507 and the image 523. In this manner, also the dynamic picture 510 and the dynamic picture 520 with regard to which no common relative relationship metadata exists can be synthesized and reproduced through the dynamic picture 500. Further, this can be applied similarly also to a case wherein a plurality of dynamic pictures are synthesized through two or more dynamic pictures and reproduced.

FIG. 29 is views illustrating an outline of a size calculation method of a synthesized image produced by synthesis of images which form a dynamic picture in a case wherein the size of the synthesized image is calculated. In the description of this size calculation method of a synthesized image, an example wherein affine transformation parameters associated with images which form three dynamic pictures and affine transformation parameters placed in relative relationship metadata regarding the dynamic pictures are used to successively affine transform the four apexes of the top image to calculate the size of a synthesized image produced with regard to the dynamic pictures is described. It is to be noted that the following description is given using reference characters 501 to 508, 511 to 515 and 521 to 526 shown in FIG. 29 which are same reference numerals for the images 501 to 508, 511 to 515 and 521 to 526.

As illustrated in (a) of FIG. 29, a process similar to the updating process illustrated in FIG. 26 is repeated with regard to the images 501 to 507 and the images 511 to 515. Here, the image 507 is an image corresponding to a frame number included in the relative relationship metadata regarding the dynamic pictures 500 and 520. Thus, in order to carry out an updating process for the dynamic picture 520, affine transformation parameters associated with the images 501 to 507 and affine transformation parameters included in the relative relationship metadata regarding the dynamic pictures 500 and 520 are used to affine transform the four apexes of the image 501. For example, where the matrices of affine transformation parameters associated with the images 501 to 507 are represented by A1 to A7, respectively, and the matrix of affine transformation parameters included in relative relationship metadata regarding the dynamic pictures 500 and 520 is represented by AM4, the matrix of A1×A2× . . . ×A7×AM4 is used to affine transform the four apexes of the image 501. By this affine transformation, the four apexes of the reference image 501 are transformed into positions corresponding to the four apexes of the image 523 as illustrated in (a) of FIG. 29. Then, the four points after this affine transformation are determined as end points to produce four displacement vectors from the start points 541 to 544. Then, the maximum values and the minimum values in the x axis direction and the y axis direction are updated based on the four displacement vectors.

Thereafter, similarly as in the updating process illustrated in (b) of FIG. 26, an updating process is repeated with regard to the images 521 and 522 preceding to the image 523 and the images 524 to 526 following the image 523 is repeated. Then, when the updating process is completed with regard to the images 521, 522 and 524 to 526 preceding to and following the image 523, an updating process is carried out with regard to the image 508 next to the image 507 regarding the relative relationship metadata regarding the dynamic pictures 500 and 520. In particular, when the updating process is ended with regard to the dynamic picture 520, the object of the updating process is returned to the dynamic picture 500 so that the updating process regarding the dynamic picture 500 is repeated.

Then, in a case wherein the updating process of the maximum values and the minimum values described above is repeated with regard to the images 501 to 508, 511 to 515 and 521 to 526, since the apex 577 of the image 521 of the dynamic picture 520 becomes a point which exists on the lowermost side as shown in (b) of FIG. 29, the maximum value in the y axis direction is updated to the value on the y axis of the apex 577. Further, since the apex 576 of the image 526 of the dynamic picture 520 becomes a point which exists on the rightmost side, the maximum value in the x axis direction is updated to the value on the x axis of the apex 576. It is to be noted that the minimum value in the y axis direction and the minimum value in the x axis direction are similar to those shown in (c) of FIG. 26. A rectangle formed from the maximum values and the minimum values in the x axis direction and the y axis direction calculated in this manner is calculated as the display range of a synthesized image produced with regard to the dynamic pictures 500, 510 and 520. For example, a synthesized image display range 575 is calculated as shown in (b) of FIG. 29.

FIG. 30 is views schematically illustrating an example of synthesis in a case wherein four dynamic pictures are synthesized. In the description of this example, an example wherein images 501 to 508 which form a dynamic picture 500, images 511 to 515 which form another dynamic picture 510, images 521 to 526 which form a further dynamic picture 520 and images 531 to 535 which form a still further dynamic picture 530 are synthesized is described. Further, the images 505 and 513, images 507 and 523 and images 525 and 532 having the inside indicated by slanting lines are images corresponding to frame numbers included in relative relationship metadata regarding the dynamic pictures 500, 510, 520 and 530.

(a) of FIG. 30 is similar to (b) of FIG. 28 and illustrates a case wherein the images 521 to 526 which form the dynamic picture 520 are successively affine transformed using affine transformation parameters stored in an associated relationship with the frames to synthesize them on the image memory 250.

(b) of FIG. 30 illustrates a case wherein the images 531 to 535 which form the dynamic picture 530 are successively affine transformed using affine transformation parameters stored in an associated relationship with frames to synthesize them on the image memory 250. Here, a case wherein the image 532 having the inside indicated by slanting lines is affine transformed using affine transformation parameters included in relative relationship metadata regarding the dynamic pictures 520 and 530 using the image 501 as a reference image. Further, (b) of FIG. 30 shows a synthesized image in a case wherein the images 531 to 535 are synthesized with reference to the relative relationship positions of the image 525 and the image 532 having the inside indicated by slanting lines. A flow of a current image by the affine transformation in this instance is indicated by an arrow mark 536. In particular, the images 531 to 535 are successively synthesized as along the arrow mark 536. In this manner, an example of synthesis in a case wherein the dynamic pictures 500, 510, 520 and 530 are synthesized with reference to the relative relationship positions of the image 505 and the image 513, the relative relationship positions of the image 507 and the image 523 and the relative relationship positions of the image 525 and the image 532 is illustrated in (c) of FIG. 30. It is to be noted that, in the example illustrated in (c) of FIG. 30, the images 505 and 513 are reproduced at the same time and then the images 507 and 523 are reproduced at the same time, whereafter the images 525 and 532 are reproduced at the same time. In the example illustrated, the images which are reproduced at the same time are synthesized such that the dynamic picture 510 is synthesized by overwriting on the dynamic picture 500 and the dynamic picture 520 is synthesized by overwriting on the dynamic picture 510 and then the dynamic picture 530 is synthesized by overwriting on the dynamic picture 520.

Figure 31:
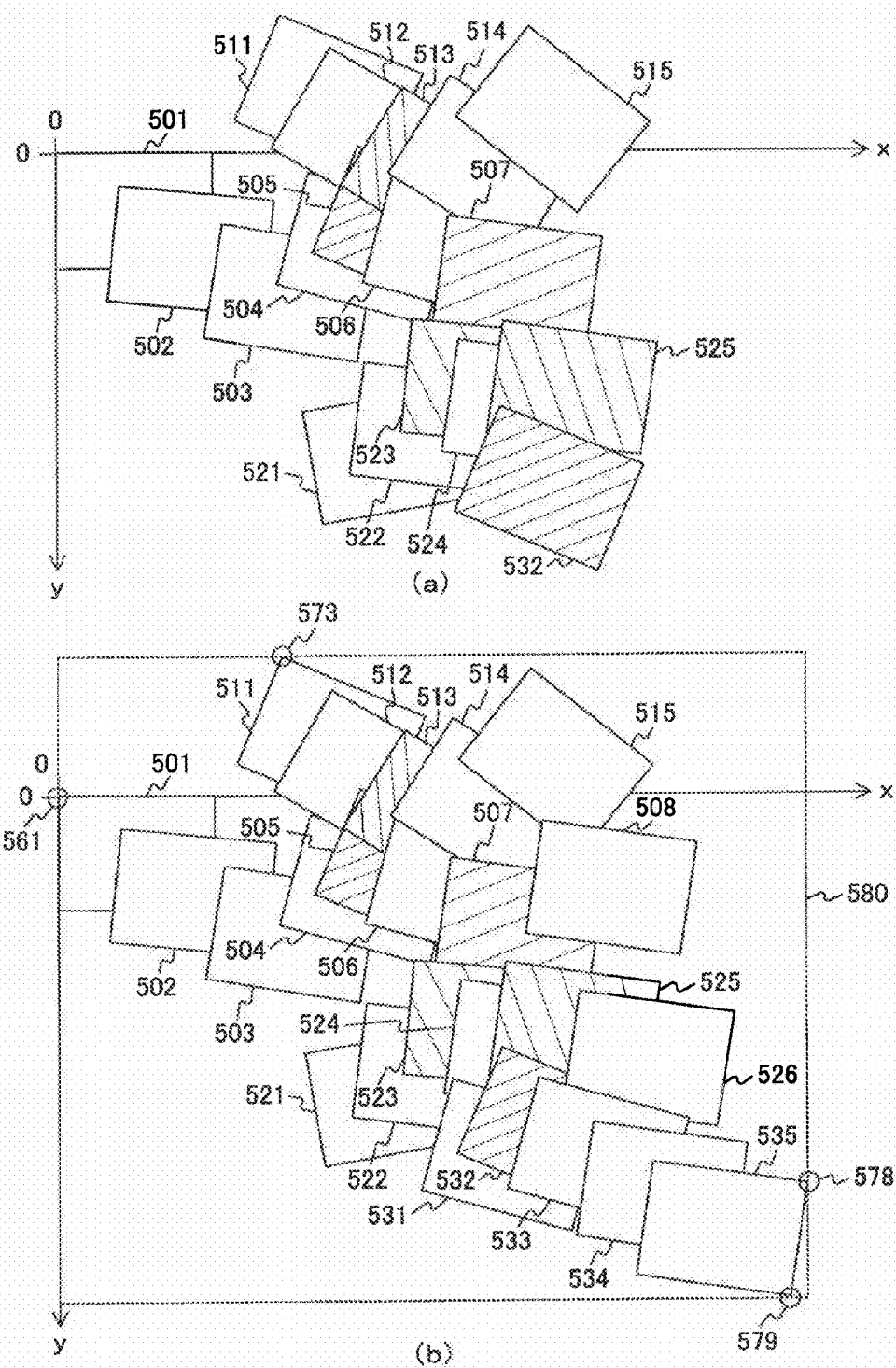
FIG. 31 is views illustrating an outline of a size calculation method of a synthesized image produced by synthesis of images which form a dynamic picture in a case wherein the size of the synthesized image is calculated.

FIG. 31 is views illustrating an outline of a size calculation method of a synthesized image in a case wherein the size of a synthesized image produced by synthesis of images which form a dynamic picture is calculated. In the description of this size calculation method of a synthesized image, an example wherein affine transformation parameters associated with images which form four dynamic pictures and affine transformation parameters placed in relative relationship metadata regarding the dynamic pictures are used to successively affine transform the four apexes of the top image to calculate the size of a synthesized image to be produced regarding the dynamic pictures is described. It is to be noted that also the following description is given using reference characters 501 to 508, 511 to 515, 521 to 526 and 531 to 535 shown in FIG. 31 which are same reference numerals for the images 501 to 508, 511 to 515, 521 to 526 and 531 to 535.

As shown in (a) of FIG. 31, a process similar to the updating process illustrated in FIG. 29 is repeated with regard to images 501 to 507, images 511 to 515 and images 521 to 525. Here, the image 525 is an image corresponding to a frame number included in the relative relationship metadata regarding the dynamic pictures 520 and 530. Thus, in order to carry out an updating process with regard to the dynamic picture 530, affine transformation parameters associated with the images 501 to 507, affine transformation parameters included in the relative relationship metadata regarding the dynamic pictures 500 and 520, affine transformation parameters associated with the images 523 to 525 and affine transformation parameters associated with the dynamic pictures 520 and 530 are used to affine transform the four apexes of the reference image 501. For example, where the matrices of affine transformation parameters associated with the images 501 to 507 and 523 to 525 are represented by A1 to A7 and A23 to A25, respectively, and the matrix of affine transformation parameters included in the relative relationship metadata regarding the dynamic pictures 500 and 520 is represented by AM4 while the matrix of affine transformation parameters included in the relative relationship metadata regarding the dynamic pictures 520 and 530 is represented by AM5, the matrix of A1×A2× ... ×A7×AM4×B4×B5×AM5 is used to affine transform the four apexes of the image 501. By this affine transformation, the four apexes of the reference image 501 are transformed into positions corresponding to the four apexes of the image 523 as shown in (a) of FIG. 31. Then, the four points after the affine transformation are used as end points to produce four displacement vectors from the start points 541 to 544. Then, based on the four displacement vectors, the maximum values and the minimum values in the x axis direction and the y axis direction are updated.

Thereafter, similarly as in the updating process illustrated in (b) of FIG. 26, the updating process is repeated with regard to the image 531 preceding to the image 532 and the images 533 to 535 following the image 532. Then, when the updating process is completed with regard to the images 531 and 533 to 535 preceding to and following the image 532, the updating process is carried out regarding the image 526 next to the image 525 according to the relative relationship metadata regarding the dynamic pictures 520 and 530. In this manner, when the updating process is completed with regard to the dynamic picture 530, the object of the processing returns to the dynamic picture 520 to repeat the updating process regarding the dynamic picture 520. Further, when the updating process is completed with regard to the dynamic picture 520, the object of the processing returns to the dynamic picture 500 to repeat the updating process with regard to the dynamic picture 500. In short, when the updating process is completed with regard to the dynamic pictures other than the reference dynamic picture, the object of the processing returns to a dynamic picture with regard to which the updating process has just been carried out to repeat the updating process of this dynamic picture. Then, the updating process is carried out until the updating process regarding the last frame of the reference dynamic picture is completed.

Then, if the updating process of the maximum values and the minimum values described above is repeated with regard to the images 501 to 508, 511 to 515, 521 to 526 and 531 to 535, then since the apex 579 of the image 535 of the dynamic picture 530 becomes a point which exists on the lowermost side as shown in (b) of FIG. 31, the maximum value in the y axis direction is updated to the value on the y axis of the apex 579. Further, since the apex 578 of the image 535 of the dynamic picture 530 becomes a point which exists on the rightmost side, the maximum value in the x axis direction is updated to the value on the x axis of the apex 578. It is to be noted that the minimum value in the y axis direction and the minimum value in the x axis direction are similar to those illustrated in (c) of FIG. 26. A rectangle formed from the maximum values and the minimum values in the x axis direction and the y axis direction calculated in this manner is calculated as the display range of a synthesized image to be produced with regard to the dynamic pictures 500, 510, 520 and 530. For example, a synthesized image display range 580 is calculated as shown in (b) of FIG. 31.

FIG. 32 is views schematically illustrating a relationship between a representative image representative of a dynamic picture and a synthesized image produced in regard to the dynamic picture and showing a synthesized image produced in regard to a plurality of dynamic pictures. (a) to (c) of FIG. 32 are views showing representative images 606, 614 and 624 of the dynamic pictures and synthesized images 600, 610 and 620 produced from the dynamic pictures.

(a) of FIG. 32 shows a representative image 606 of one dynamic picture and a synthesized image 600 produced from the dynamic picture. The representative image 606 is an image corresponding to the top frame of the dynamic picture. Further, in the synthesized image 600, a framework 601 indicates the position of the image corresponding to the top frame. In other words, the image in the framework 601 corresponds to the representative image 606. Further, in the synthesized image 600, a framework 602 indicates the position of an image which includes coincident points with an image corresponding to the synthesized image 610 shown in (b) of FIG. 32. As such coincident points, for example, three locations (positions indicated by a void round mark) including a roof portion of a house 604 and two lower portions of the house 604 are selected. In particular, the relative relationship metadata file regarding the image in the framework 602 can be used to synthesize the synthesized images 600 and 610. Further, in the synthesized image 600, a framework 603 indicates the position of an image which includes coincident points with the image corresponding to the synthesized image 620 shown in (c) of FIG. 32. As such coincident points, for example, three locations (positions indicated by a void round mark) including a roof portion of a house 605 and two lower portions of the house 605 are selected. In short, the relative relationship metadata file regarding the image in the framework 603 can be used to synthesize the synthesized images 600 and 620.

(b) of FIG. 32 shows a representative image 614 of one dynamic picture and a synthesized image 610 produced from the dynamic picture. The representative image 614 is, for example, an image corresponding to the top frame of this dynamic picture. Further, in the synthesized image 610, a framework 611 indicates the position of the image corresponding to the top frame. In other words, the image in the framework 611 corresponds to the representative image 614. Further, in the synthesized image 610, another framework 612 indicates the position of the image which includes coincident points with the image corresponding to the synthesized image 600 shown in (a) of FIG. 32. As such coincident points, for example, three locations (positions indicated by a void round mark) including a roof portion of a house 613 and two lower portions of the house 613 are selected. In short, the relative relationship metadata file regarding the image in the framework 612 can be used to synthesize the synthesized images 600 and 610.

(c) of FIG. 32 shows a representative image 624 of one dynamic picture and a synthesized image 620 produced from the dynamic picture. The representative image 624 is an image corresponding to the top frame of this dynamic picture. Further, in the synthesized image 620, a framework 621 indicates the position of the image corresponding to the top frame. In other words, the image in the framework 621 corresponds to the representative image 624. Further, in the synthesized image 620, another framework 622 indicates the position of the image which includes coincident points with the image corresponding to the synthesized image 600 shown in (a) of FIG. 32. As the coincident points, for example, three locations (positions indicated by a void round mark) including a roof portion of a house 623 and two locations of a lower portion of the house 623 are selected. In particular, the relative relationship metadata file regarding the image in the framework 622 can be used to synthesize the synthesized images 600 and 620.

(d) of FIG. 32 shows a synthesized image 630 in a case wherein a relative relationship metadata file regarding the dynamic pictures corresponding to the synthesized images 600, 610 and 620 shown in (a) to (c) of FIG. 32 is used to synthesize the synthesized images 600, 610 and 620. It is to be noted that the synthesized image 630 shown in (d) of FIG. 32 is obtained by reducing an image synthesized from the synthesized images 600, 610 and 620. In the synthesized image 630, frameworks 601, 611 and 621 indicate the positions of representative images regarding the dynamic pictures, and frameworks 602, 603, 612 and 622 indicate the positions of images according to the relative relationship metadata file. In particular, the image in the framework 602 and the image in the framework 612 are placed one on the other so as to be synthesized, and the image in the framework 603 and the image in the framework 622 are placed one on the other so as to be synthesized. In this manner, where images of a plurality of dynamic pictures are synthesized, the synthesized image has a great size in comparison with those in an alternative case wherein one dynamic picture is used for synthesis. Therefore, even where a synthesized image produced from one dynamic picture can be entirely displayed on the display section 290, there may be a case wherein a synthesized image produced from a plurality of dynamic pictures cannot entirely be displayed with the same size on the display section 290. Therefore, a synthesized image display range described hereinabove is used to calculate in advance the size of a synthesized image to be displayed finally, and a reduction process or the like is carried out so that the synthesized image of the calculated size may entirely be displayed on the display section 290. Then, the reduced synthesized image is recorded into the image memory 250.

Now, an example of display of a synthesized image to be displayed based on a calculated display range is described in detail with reference to the drawings.

FIGS. 33 to 39 are views showing an example of a display screen image displayed on the display section 290 in the embodiment of the present invention. The display screen image shown in FIGS. 33 to 39 includes a representative image table display region 640 and a synthesis reproduction display region 651.

Figure 33:
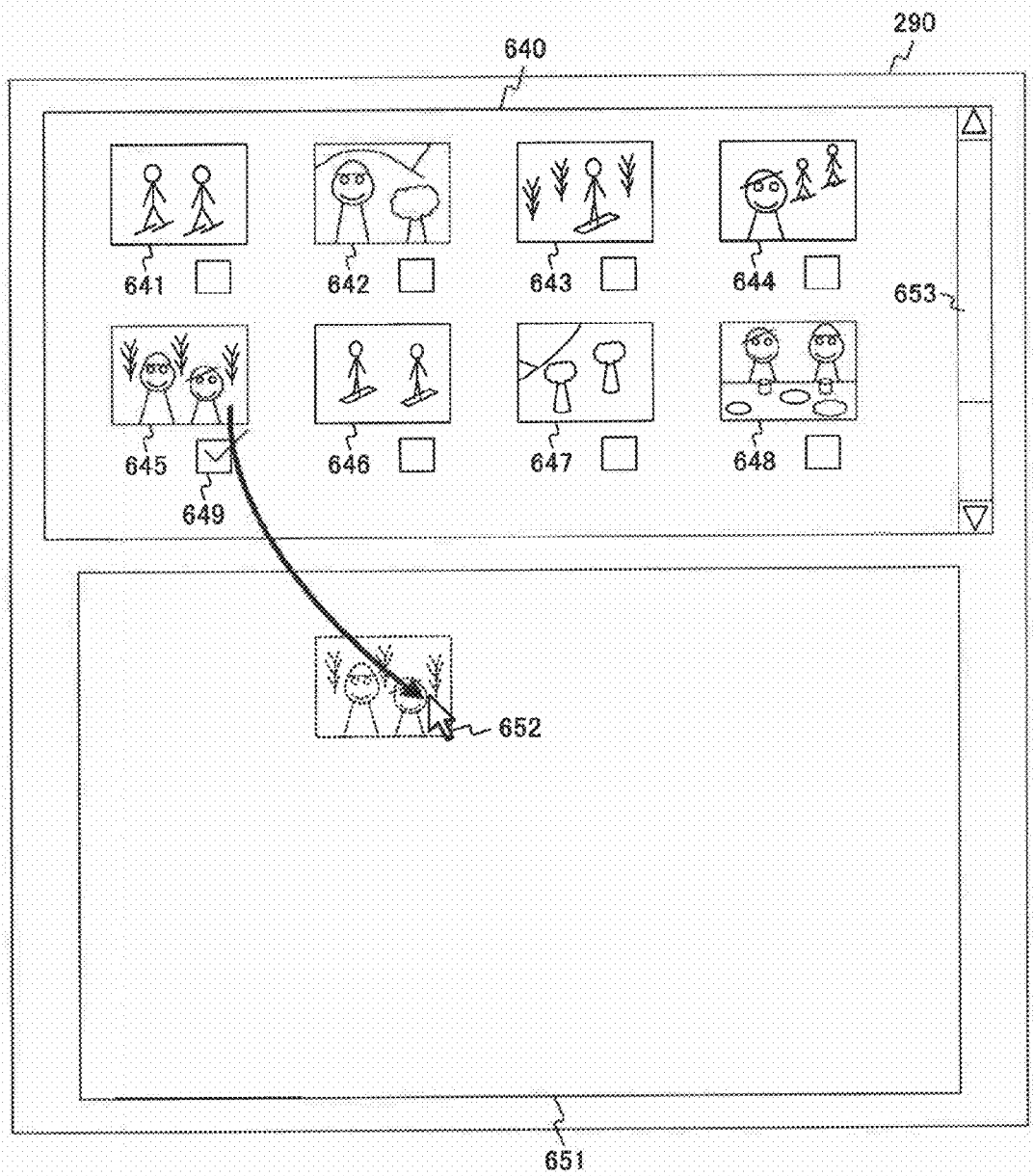
FIG. 33 is a view showing an example of a display screen image displayed on the display section 290 in the embodiment of the present invention.

The representative image table display region 640 is a region in which representative images included in metadata files stored in the metadata storage section 210 are to be displayed, and, for example, representative images 641 to 648 are displayed. It is to be noted that the representative image 642 corresponds to the representative image 624 shown in (c) of FIG. 32, and the representative image 645 corresponds to the representative image 606 shown in (a) of FIG. 32 while the representative image 647 corresponds to the representative image 614 shown in (b) of FIG. 32. Further, a scroll bar 653 is provided in the representative image table display region 640, and by using the cursor 652 to move the scroll bar 653 in an upward or downward direction, a representative image displayed in the representative image table display region 640 can be moved in the upward or downward direction to allow another representative image to be displayed in the representative image table display region 640. Further, a check button is provided at a location below each representative image, and if a left click operation of the mouse is carried out in a state wherein the cursor 652 is positioned in an overlapping relationship with the location of the check button, then a check mark is displayed on the check button. FIG. 33 shows an example wherein a check mark is displayed at the check button 649 of the representative image 645.

The synthesis reproduction display region 651 is a region in which a dynamic picture corresponding to a representative image displayed in the representative image table display region 640 is to be synthesized and displayed. Here, a selection method for selecting a dynamic picture which makes an object of synthesis reproduction in the synthesis reproduction display region 651 is described. Where a dynamic picture which makes an object of synthesis reproduction in the synthesis reproduction display region 651 is to be selected, a selection operation is carried out from among representative images displayed in the representative image table display region 640. For example, a desired dynamic picture can be selected by carrying out an input operation to cause a check mark to be displayed at a check button of a representative image corresponding to the desired dynamic picture. For example, if, in a state wherein the cursor 652 is positioned in an overlapping relationship with the region of a representative image corresponding to a desired dynamic picture, a left drag operation is carried out to the representative image table display region 640 and then a drop operation is carried out in the representative image table display region 640, then a desired dynamic picture can be selected. It is to be noted that, in the synthesis reproduction display region 651 shown in FIGS. 33 to 39, an entire synthesized image produced in regard to a selected dynamic picture is indicated by broken lines while a synthesized image being reproduced is omitted.

For example, if a representative image corresponding to a desired dynamic picture is the representative image 645 from among the representative images 641 to 648 displayed in the representative image table display region 640 shown in FIG. 33, then the cursor 652 is used to display a check mark at the check button 649. Or, in a state wherein the cursor 652 is positioned in an overlapping relationship in the region of the representative image 645, a left drag operation is carried out to the representative image table display region 640 as indicated by an arrow mark shown in FIG. 33 and a drop operation is carried out in the representative image table display region 640. Images of the dynamic picture corresponding to the representative image selected by carrying out such selection operations are affine transformed and reproduced while being synthesized. An example of display of the synthesized image in a case wherein the images are selected in this manner is shown in FIG. 34.

Figure 34:
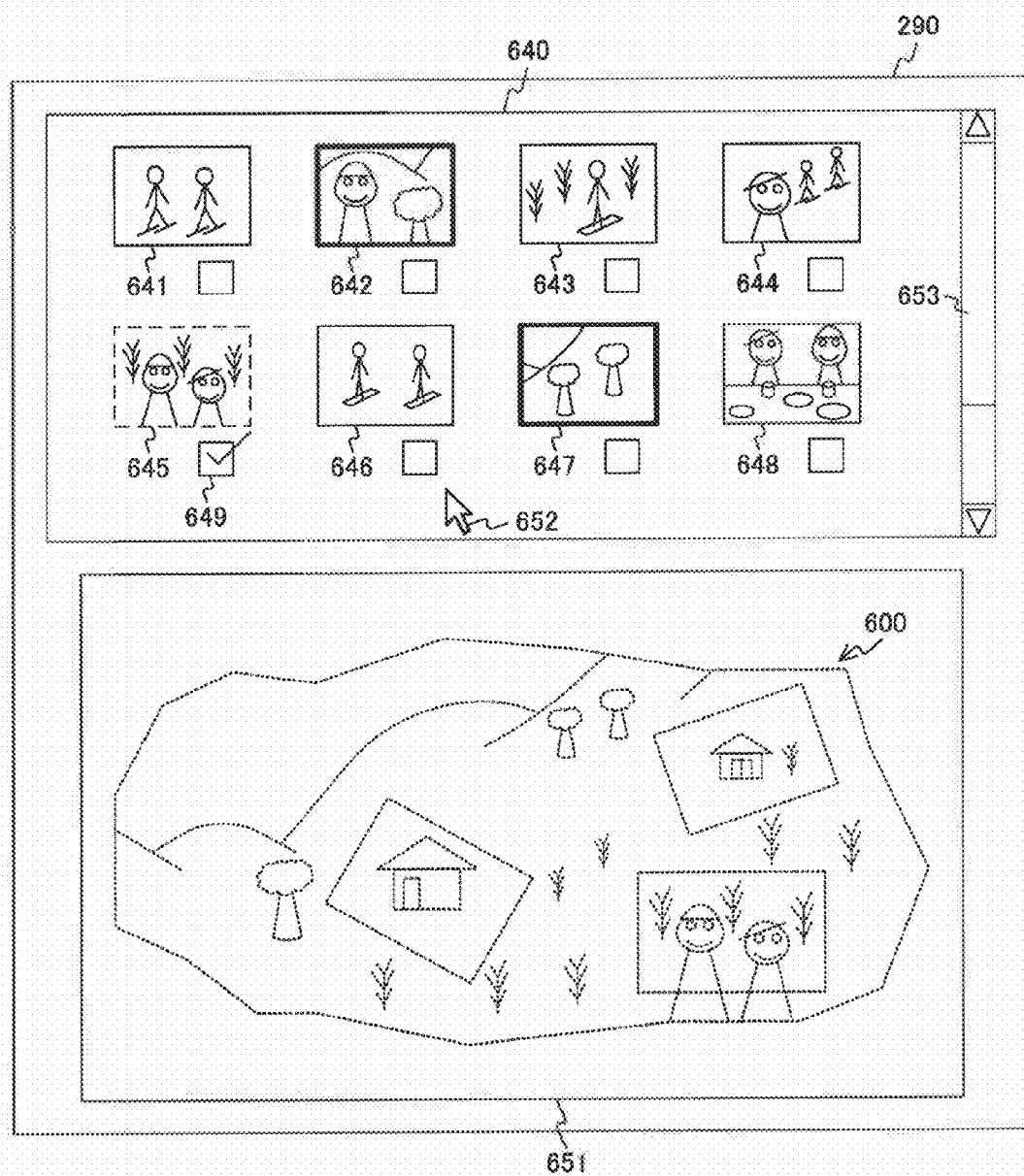
FIG. 34 is a view showing another example of a display screen image displayed on the display section 290 in the embodiment of the present invention.

The display screen image shown in FIG. 34 illustrates, in a simplified form, a case wherein a selection operation is carried out with regard to the representative image 645 and reproduction of the dynamic picture corresponding to the representative image 645 is being carried out. It is to be noted that, in the synthesis reproduction display region 651 shown in the figure, an entire synthesized image 600 produced from the dynamic picture corresponding to the representative image 645 is indicated by broken lines, and a synthesized image being reproduced is omitted. Here, where reproduction is carried out with regard to the selected dynamic picture, the size of a synthesized image to be produced from the selected dynamic picture is calculated as the synthesized image display range, and images which form the dynamic picture which makes an object of reproduction are subjected to a reduction process and so forth based on the synthesized image display range. Therefore, the entire synthesized image is displayed in the synthesis reproduction display region 651. Further, where a selection operation of the dynamic picture which makes a reproduction object is carried out, the file acquisition section 140 searches the relative relationship metadata files stored in the relative relationship information storage section 220 for a relative relationship metadata file regarding the selected dynamic picture. Then, dynamic picture IDs of the other dynamic pictures included in the searched out relative relationship metadata file are acquired, and a predetermined mark is applied to representative images corresponding to the dynamic picture IDs.

For example, if the representative image 645 is selected as shown in FIG. 33, then a relative relationship metadata file regarding the dynamic picture corresponding to the representative image 645 is searched out. Here, as illustrated in FIG. 32, in the relative relationship information storage section 220, a relative relationship metadata file regarding a dynamic picture corresponding to the representative image 645 and a dynamic picture corresponding to the representative image 642 and a relative relationship metadata file regarding the dynamic picture corresponding to the representative image 645 and the dynamic picture corresponding to the representative image 647 are stored. Therefore, dynamic picture IDs corresponding to the representative images 642 and 647 are included in the relative relationship metadata file regarding the searched out representative image 645. Thus, from among the representative images 641 to 648 displayed in the representative image table display region 640, a thick framework is displayed additionally around the representative images 642 and 647. Consequently, the dynamic picture which can be synthesized with the dynamic picture being currently reproduced by the user can be recognized readily. It is to be noted that only a representative image which corresponds to a dynamic picture which can be synthesized with a dynamic picture being currently reproduced may be displayed in the representative image table display region 640. Further, the selected representative image 645 may be displayed in a different manner from that of the other representative images. For example, in FIG. 34, the framework around the representative image 645 is indicated by broken lines. It is to be noted that, as a display method of a selected representative image and a display method of a marker, they may be distinguished from the other representative images depending upon the thickness, a broken line or the like of a framework, or else they may be distinguished by changing the color or a transmission factor of a framework of a representative image.

Figure 35:
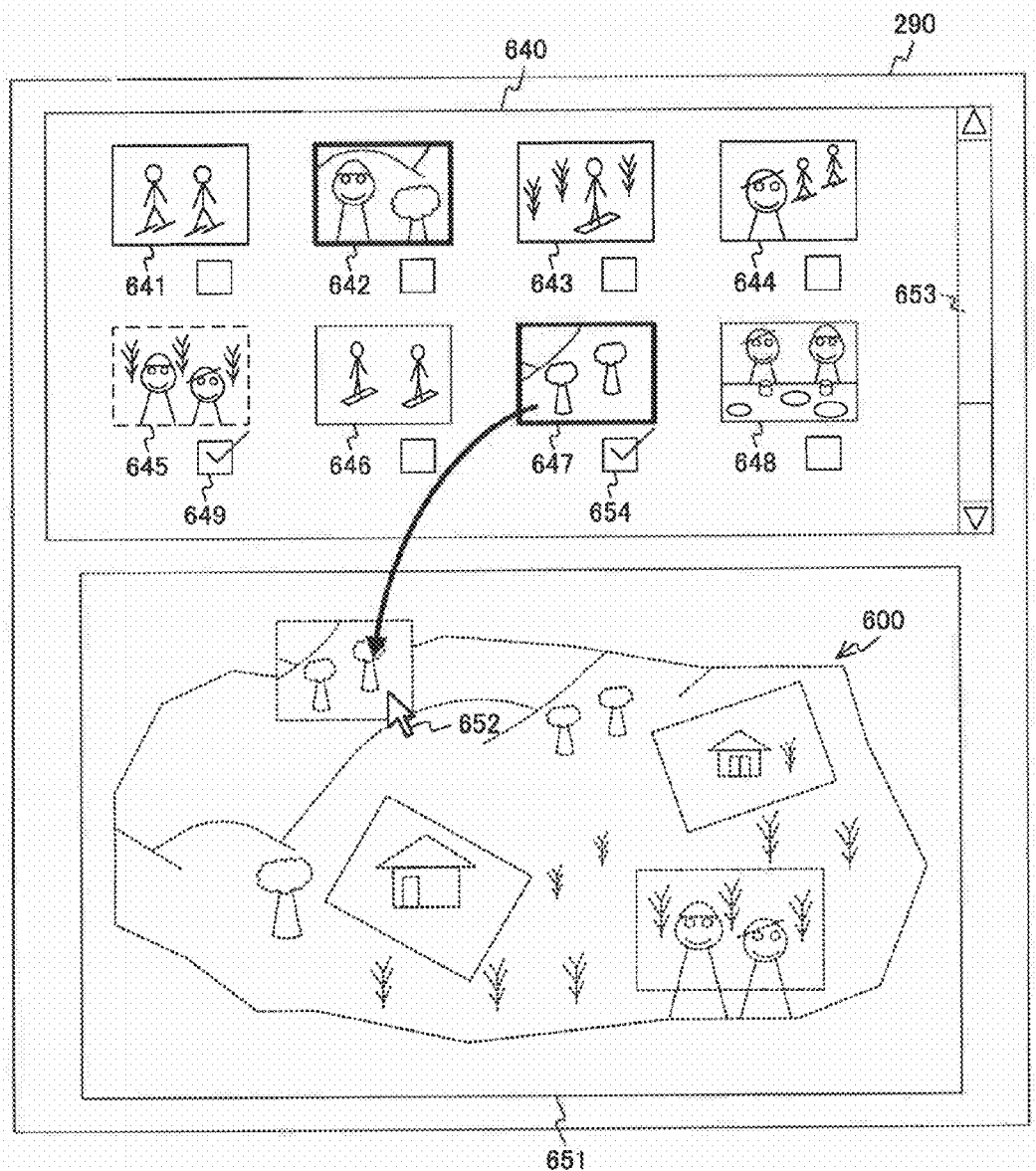
FIG. 35 is a view showing a further example of a display screen image displayed on the display section 290 in the embodiment of the present invention.

The display screen image shown in FIG. 35 illustrates, in a simplified form, a case wherein the representative image 647 is selected in a state wherein reproduction of the dynamic picture corresponding to the representative image 645 is being carried out. Also in a case wherein synthesis reproduction of a dynamic picture is being carried out in this manner, it is possible to select a different dynamic picture and synthesize the different dynamic picture with the dynamic picture being synthesized and reproduced. It is to be noted that description of a selection operation of the representative image 647 is omitted here because it is similar to the selection operation illustrated in FIG. 33.

If a selection operation for a different dynamic picture is carried out in a state wherein synthesis reproduction of a dynamic picture is being carried out as illustrated in FIG. 35, similarly as in the case wherein a dynamic picture is selected first, then the size of a synthesized image to be produced with regard to the selected dynamic picture and the dynamic picture being reproduced is calculated as the synthesized image display range. Then, the images which form the plural dynamic pictures which make an object of reproduction are subjected to a reproduction process and so forth based on the calculated synthesized image display range. In this instance, the reduction process and so forth are applied also to a synthesized image corresponding to the representative image 645 synthesized before the selection operation is carried out and stored in the image memory 250. For example, the top image which forms the dynamic picture corresponding to the representative image 645 is determined as a reference image, and the arrangement position and the size of the reference image are calculated. Then, affine transformation parameters associated with the images already stored in the image memory 250 from among the images which form the dynamic picture corresponding to the representative image 645 are used to calculate the compression ratio of the current synthesized image from the calculated arrangement position and size of the reference image, and the synthesized image stored in the image memory 250 is reduced with the compression ratio of the synthesized image at present.

Since the size of the entire synthesized image to be produced from a plurality of dynamic pictures is calculated and the arrangement position and the size of the images which form the plural dynamic pictures are determined based on the size in this manner, all of the synthesized images are displayed in the synthesis reproduction display region 651. Further, similarly as in the case wherein a dynamic picture is selected first, in a case wherein a selection operation of a dynamic picture which makes an object of reproduction is carried out by a plural number of times, the file acquisition section 140 searches the relative relationship metadata files stored in the relative relationship information storage section 220 for a relative relationship metadata file regarding the selected dynamic picture. Then, the dynamic picture ID of any other dynamic picture included in the searched out relative relationship metadata file is acquired, and a predetermined marker is applied to the representative images corresponding to the dynamic picture IDs.

Figure 36:
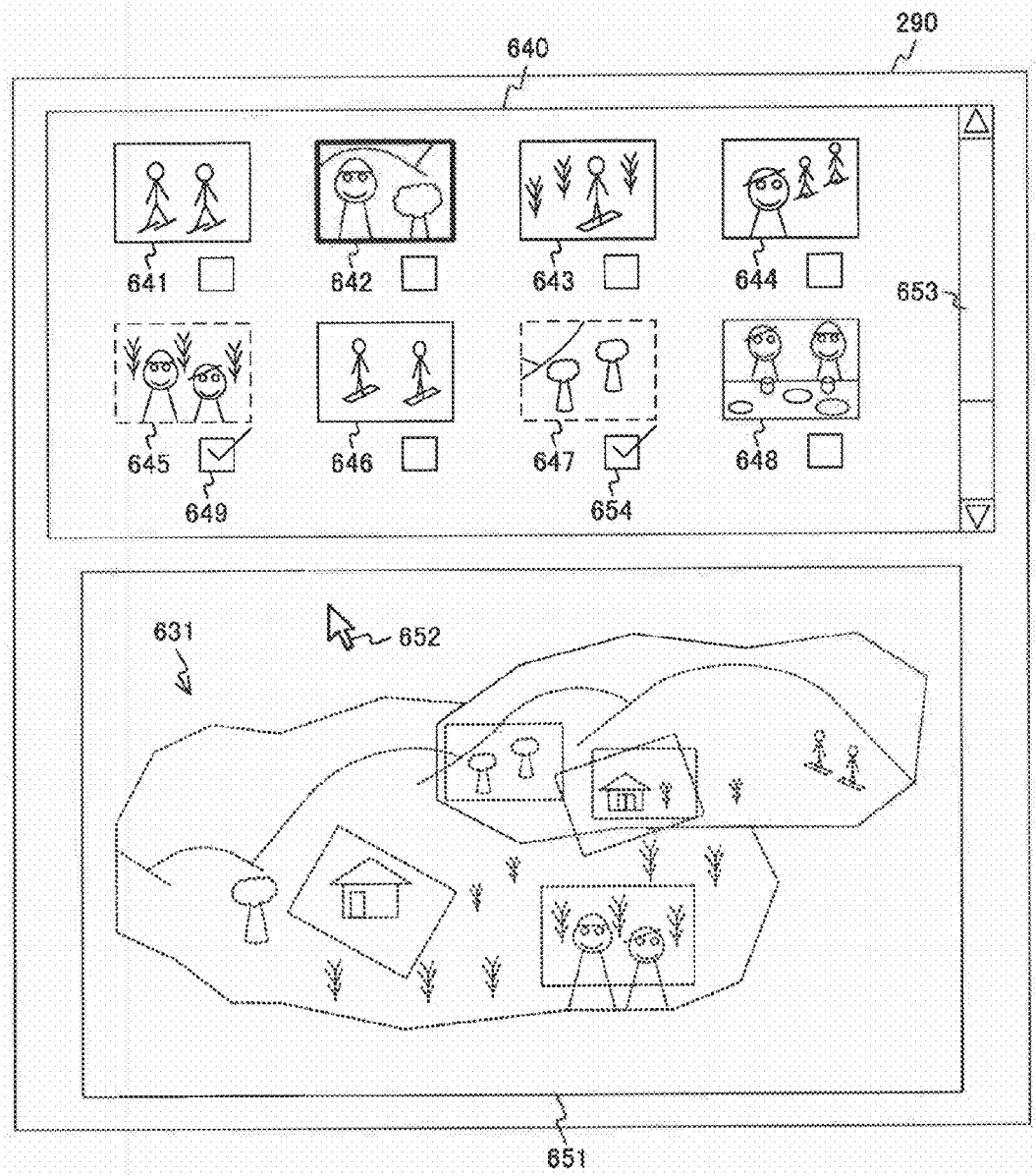
FIG. 36 is a view showing yet another example of a display screen image displayed on the display section 290 in the embodiment of the present invention.

A display example of a synthesized image in a case wherein the representative image 647 is selected in a state wherein synthesis reproduction is being carried out regarding the dynamic picture corresponding to the representative image 645 in this manner is shown in FIG. 36. As shown in FIG. 36, an entire synthesized image 631 produced regarding the dynamic pictures corresponding to the representative images 645 and 647 is displayed in the synthesis reproduction display region 651.

Figure 37:
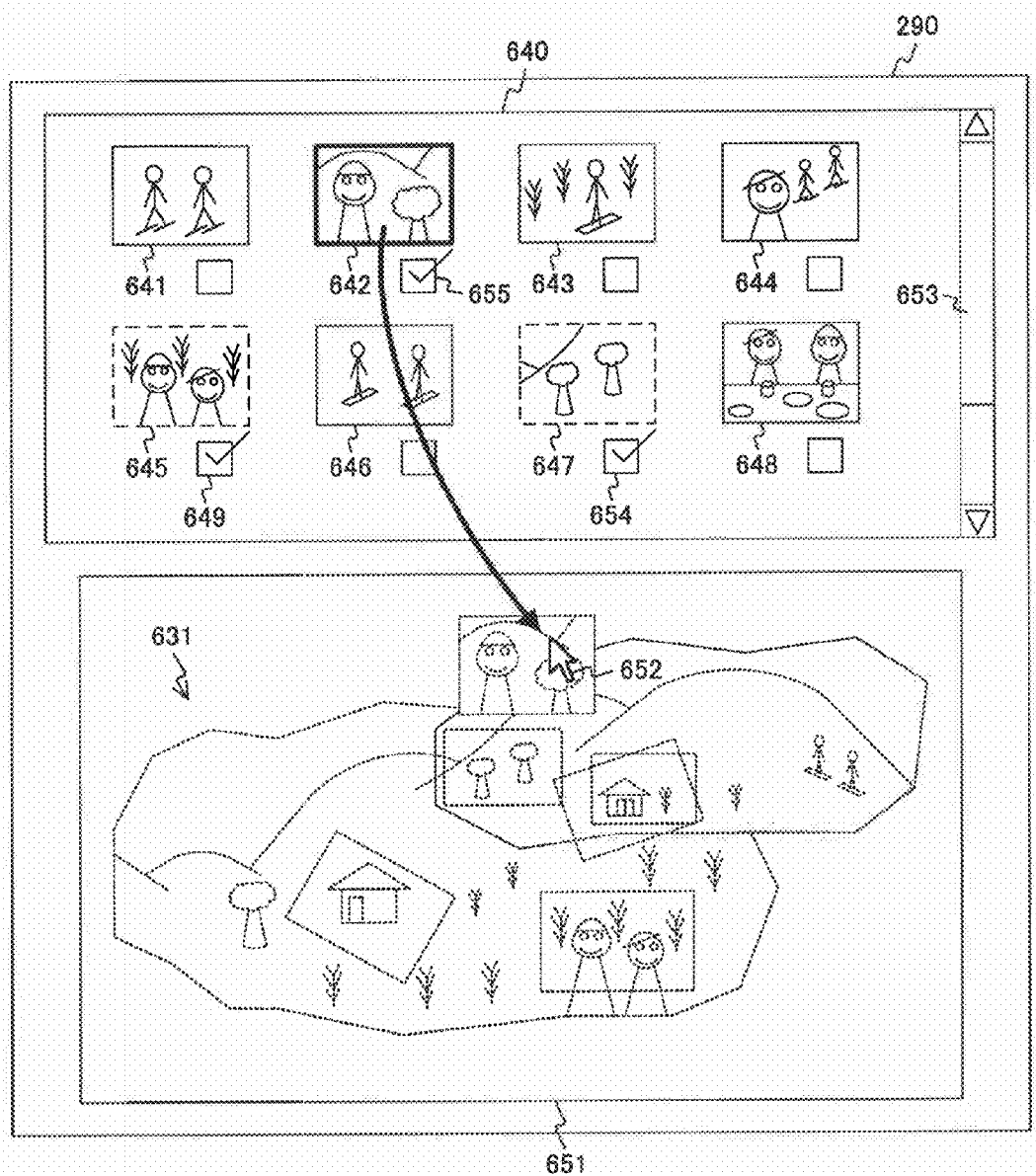
FIG. 37 is a view showing a yet further example of a display screen image displayed on the display section 290 in the embodiment of the present invention.

The display screen image shown in FIG. 37 illustrates, in a simplified form, a case wherein the representative image 642 is selected in a state wherein reproduction is being carried out regarding the dynamic pictures corresponding to the representative images 645 and 647. It is to be noted that description of the selection operation of the representative image 642 is omitted here because the selection operation is similar to the selection operation illustrated in FIG. 33. Further, description of the size calculation method of a synthesized image in a case wherein a selection operation of a different dynamic picture is carried out in a state wherein synthesis reproduction of a dynamic picture is being carried out or the search method for a different dynamic picture included in a relative relationship metadata file is omitted here since they are similar to those in the case illustrated in FIG. 35.

Figure 38:
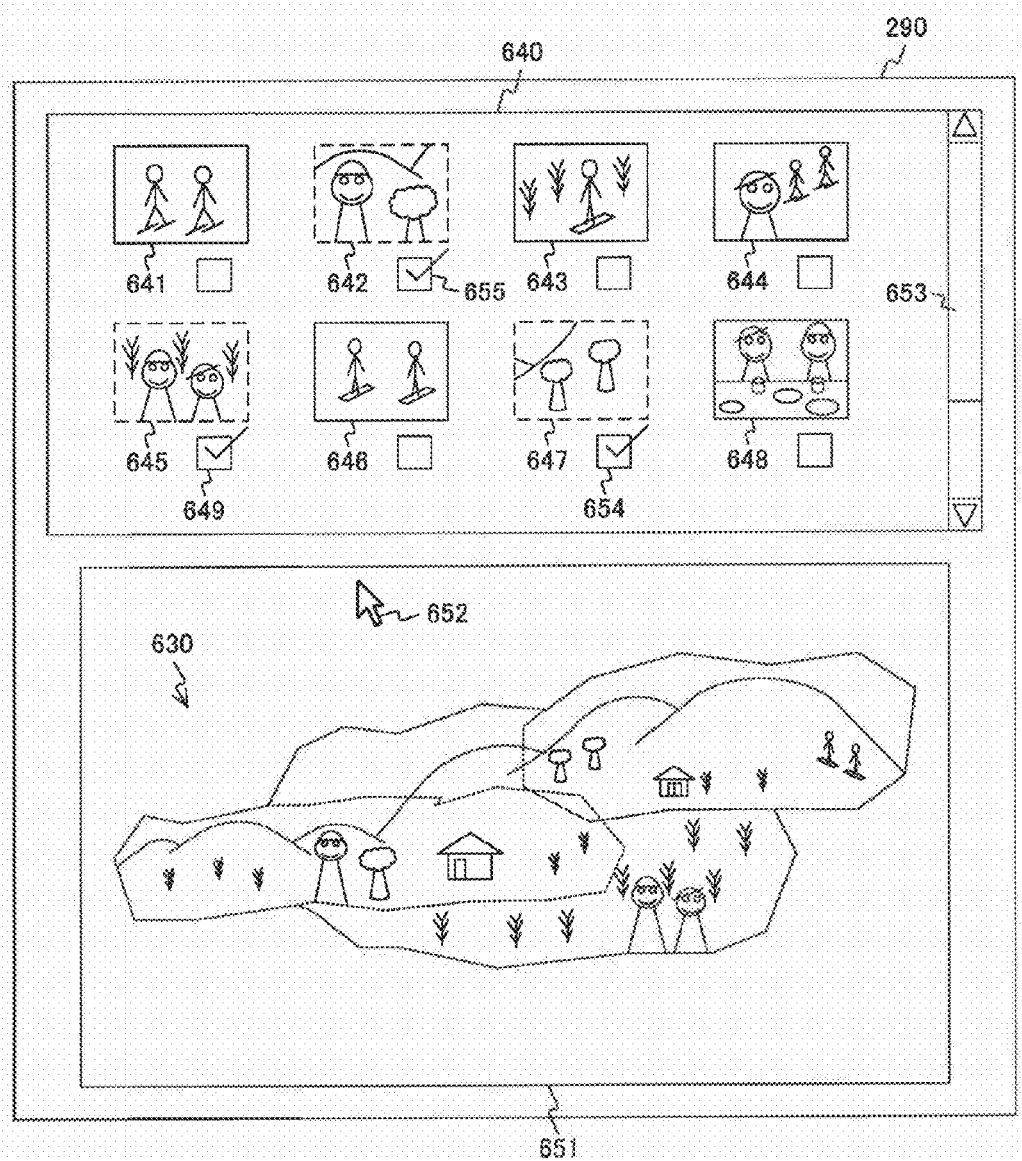
FIG. 38 is a view showing still another example of a display screen image displayed on the display section 290 in the embodiment of the present invention.

In this manner, a display example of a synthesized image produced through selection of the representative image 642 in a state wherein synthesis reproduction is being carried out with regard to dynamic pictures corresponding to the representative images 645 and 647 is shown in FIG. 38. As shown in FIG. 38, an entire synthesized image 630 produced with regard to the dynamic pictures corresponding to the representative images 642, 645 and 647 is displayed in the synthesis reproduction display region 651.

In the foregoing description, an example wherein, where a different dynamic picture is selected while one dynamic picture is being synthesized and reproduced, the different dynamic picture is successively overlapped on a dynamic picture being synthesized and reproduced when the selection operation is carried out to continue the synthesis reproduction is described. However, images corresponding to frame numbers included in a relative relationship metadata file regarding the dynamic picture of an object of reproduction may be reproduced at the same time.

Further, in the foregoing description, an example wherein a second dynamic picture which is a different dynamic picture is selected after a first dynamic picture which is the earliest dynamic picture is selected and the second dynamic picture is synthesized and reproduced with a synthesized image produced already with regard to the first dynamic picture is described. However, the present invention can be applied similarly also where a first dynamic picture and a second dynamic picture are selected simultaneously and synthesized and displayed. For example, the present invention can be applied to a case wherein the representative images 642, 645 and 647 are selected simultaneously and the dynamic pictures corresponding to the representative images 642, 645 and 647 are reproduced simultaneously. Further, as regards a plurality of dynamic pictures selected simultaneously, the reproduction starting timings of the dynamic pictures may be set such that images corresponding to a frame number included in a relative relationship metadata file regarding the dynamic pictures may be reproduced at the same time as described above. Further, while, in the foregoing description, an example wherein, as a representative image representative of a dynamic picture, an image corresponding to the top frame among images which form the dynamic picture is determined as a representative image is described, for example, a synthesized image produced regarding the dynamic picture may be used as a representative image. For example, it is possible to store synthesized images produced regarding dynamic pictures into metadata files and store the metadata files into the metadata storage section 210 and then use the synthesized images to select a desired dynamic picture. This display example is shown in FIG. 39.

Figure 39:
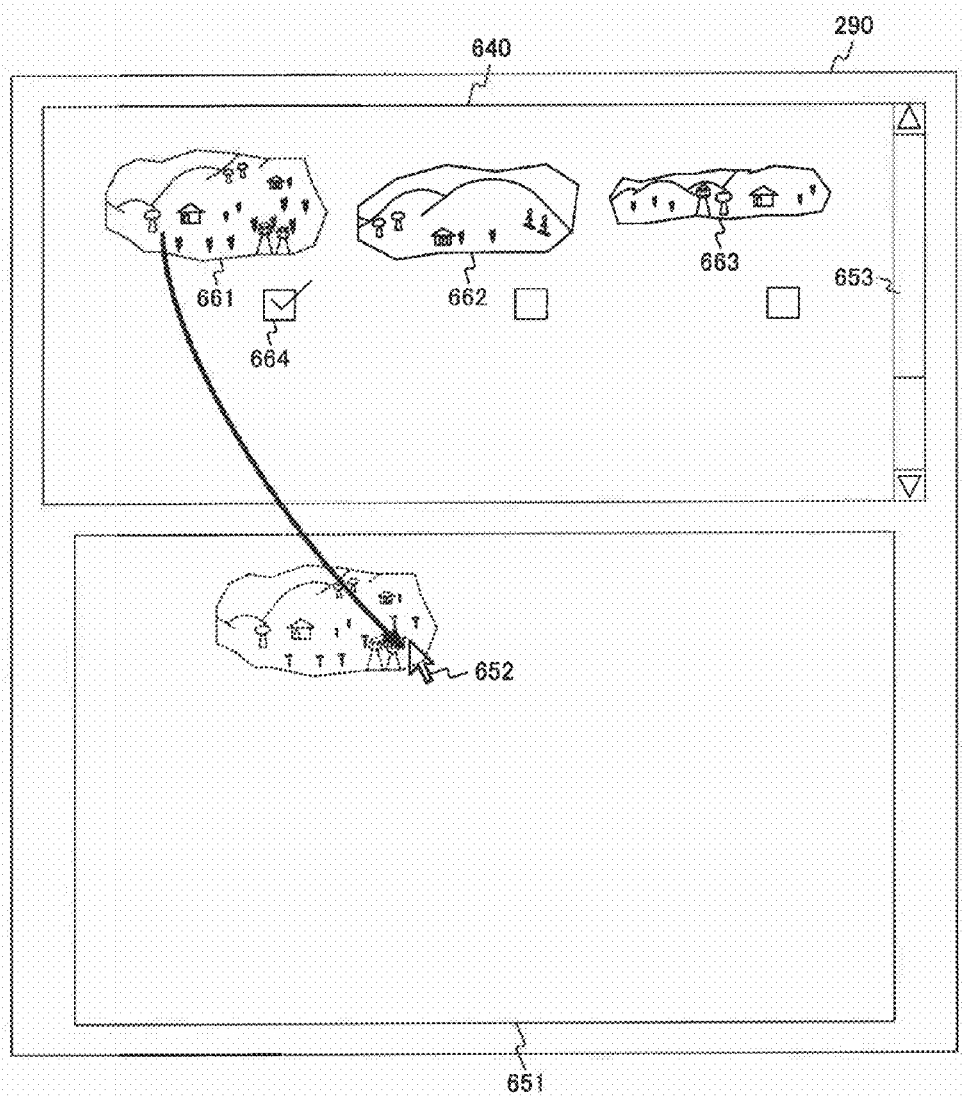
FIG. 39 is a view showing a still further example of a display screen image displayed on the display section 290 in the embodiment of the present invention.

The display screen image shown in FIG. 39 illustrates, in a simplified form, a case wherein the representative image 661 is selected in a state wherein representative images 661 to 663 corresponding to the synthesized images 600, 610 and 620 shown in (a) to (c) of FIG. 32 are displayed in the representative image table display region 640. It is to be noted that description of the selection operation of the representative image 661 is omitted here because the selection operation is similar to the selection operation illustrated in FIGS. 33 to 38. By using a synthesized image as a representative image in this manner, it becomes easy to grasp the entire dynamic picture to be selected.

Now, an image synthesis method for synthesizing two dynamic pictures is described in detail with reference to the drawings.

Figure 40:
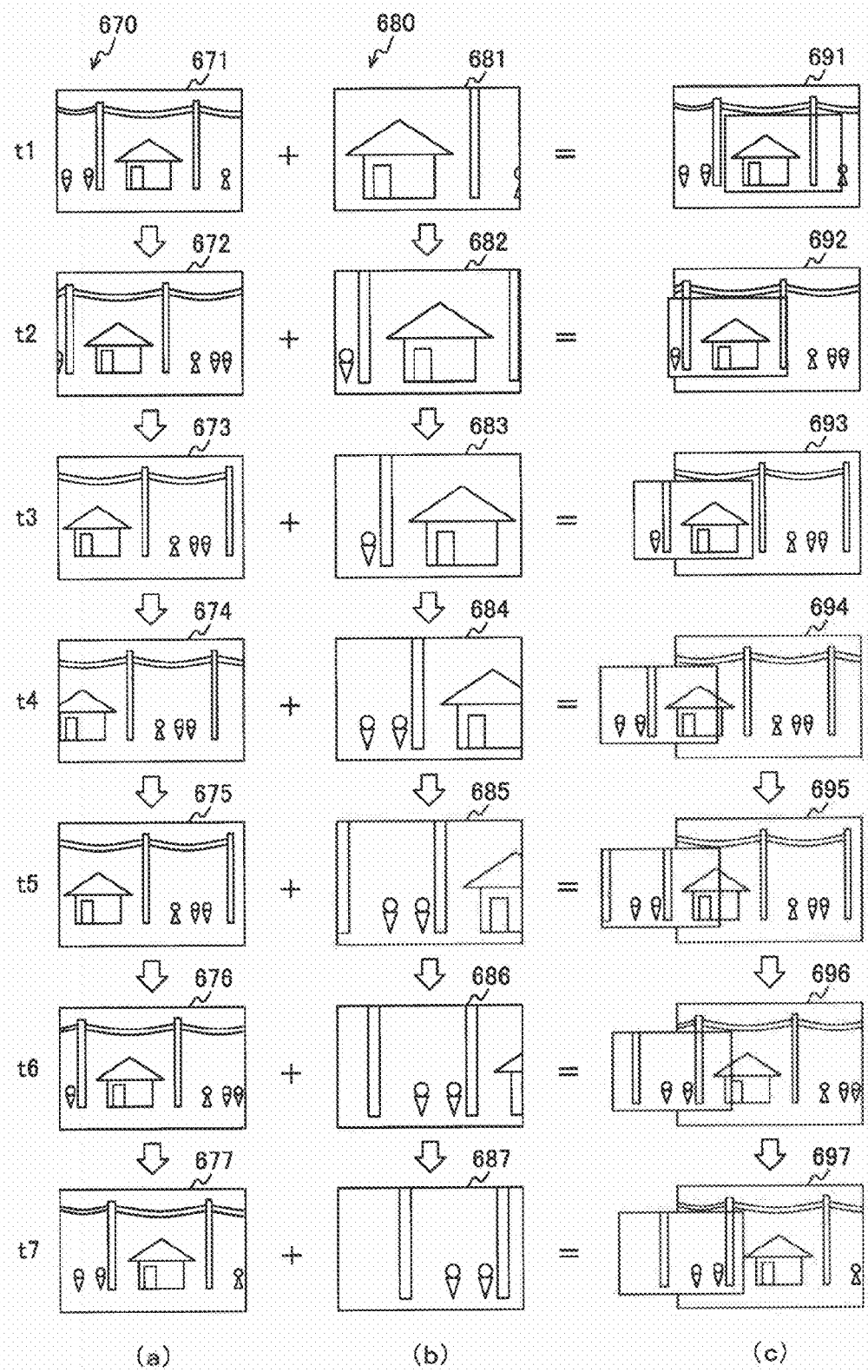
FIG. 40 is views schematically illustrating an example of synthesis where two dynamic pictures are synthesized.

FIG. 40 is views schematically illustrating an example of synthesis in a case wherein two dynamic pictures are synthesized. In (a) of FIG. 40, transition of images 671 to 677 which form a dynamic picture 670 is illustrated, and in (b) of FIG. 40, transition of images 681 to 687 which form another dynamic picture 680 is illustrated while (c) of FIG. 40 illustrates transition of images 691 to 697 which are synthesized images where the dynamic pictures 670 and 680 are synthesized. It is to be noted that it is assumed that the dynamic pictures 670 and 680 are dynamic pictures recorded at time t1 to time t7. Further, it is assumed that the images 673 and 683 at time t3 are images corresponding to the images 370 and 376 shown in FIG. 9 and a selection operation of coincident points shown in FIG. 9 has been carried out with regard to the images 673 and 683. Further, it is assumed that the dynamic pictures 670 and 680 are synthesized using relative relationship metadata calculated by the selection operation.

Figure 41:
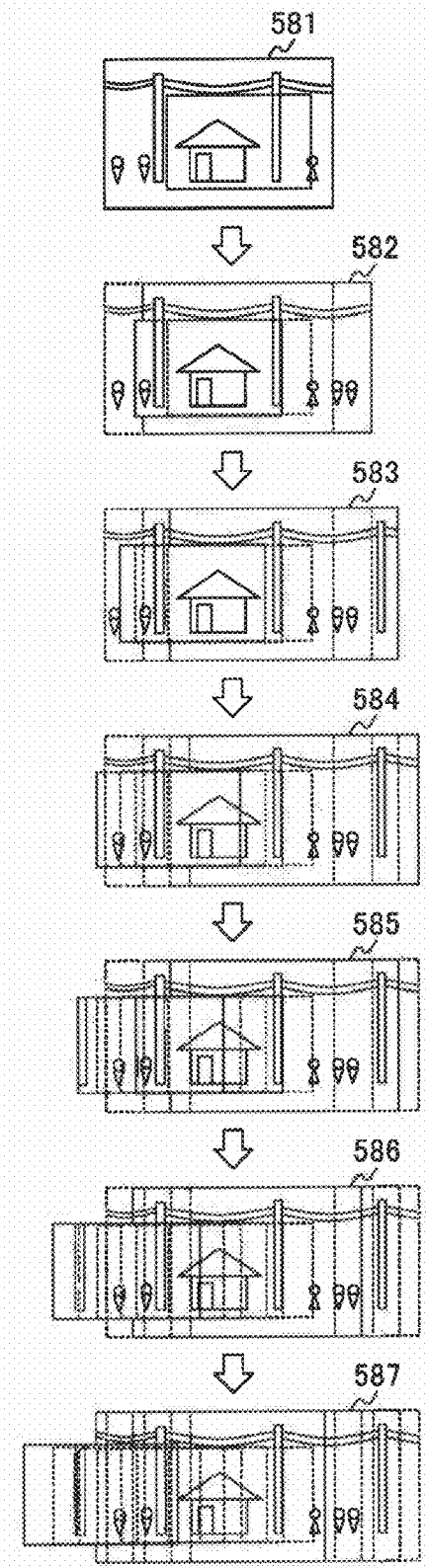
FIG. 41 is views illustrating display examples in a case wherein the synthesized image shown in FIG. 40 is displayed on a display section 290.

FIG. 41 is views illustrating an example of display in a case wherein the synthesized images shown in FIG. 40 are displayed on the display section 290. Images 581 to 587 are images representative of transition of the synthesized image synthesized from the dynamic pictures 670 and 680, and solid lines indicate a current image while broken lines indicate a region of each image preceding to the current image. As seen in FIG. 41, the background around the house 371 shown in FIG. 9 is displayed in an expanding fashion from the house 371. Where the dynamic pictures 670 and 680 picked up at a substantially same location using different cameras are to be reproduced at the same time in this manner, by synthesizing the dynamic pictures 670 and 680, the two dynamic pictures can be reproduced and enjoyed while watching the background and so forth, which cannot not usually be observed on an ordinary dynamic picture. Further, by synthesizing the dynamic pictures 670 and 680, the relative relationship of the image pickup locations of the dynamic pictures 670 and 680 can be grasped readily. While this example illustrates an example wherein, as regards images picked up at the same time, an image which forms the dynamic picture 670 is synthesized by overwriting on an image which forms the dynamic picture 680, which one of the images should be overwritten may be selected in response to an operation input from the operation acceptance section 160. Further, while an example wherein images of the same image pickup time are synthesized in accordance with the time, images of different time points may be successively synthesized from a position corresponding to an operation input from the operation acceptance section 160.

Now, an example of display in a case wherein a plurality of dynamic pictures picked up by a camera actually are synthesized and reproduced is described. In the display example described below, an example wherein a synthesized image is displayed only in a region in which images corresponding to a current frame which forms at least one of a plurality of dynamic pictures and a preceding frame from within a display region of the display section 290 while the other region is displayed dark are described. Further, a framework is displayed around images corresponding to the current frame. In other words, a framework for a number of dynamic pictures which make an object of reproduction is displayed. It is to be noted that, in the display example described below, a display example from midway during reproduction of two dynamic pictures is shown. Further, although actually a synthesized image is successively displayed for every frame, in the figures described below, a display example for every predetermined number of frame intervals is shown in the figure while illustration of a synthesized image displayed between the frames is omitted. Therefore, the movement of the framework corresponding to the current frame is illustrated in an exaggerated fashion in the figures.

FIGS. 42 to 46 are views illustrating an example of transition of a plurality of dynamic pictures picked up by a camera. In the figures, images 730 to 744 which form dynamic pictures in a case wherein an image of members of a family who are enjoying in an open space of a park is successively picked up at the same time by two cameras while the cameras are being moved are shown. While, in this example, an example wherein dynamic pictures at the same image pickup time are reproduced at the same time is described, the dynamic pictures may be reproduced with the reproduction time displaced therebetween independently of the image pickup time.

Among the images 730 to 744 shown in the figures, the images which correspond to the current frame are the images 750 and 751. It is to be noted that, among the images 730 to 744 shown in the figures, the current images are denoted by the same reference characters 750 and 751 even if synthesized images of them are different from each other. As shown in the figures, image pickup object substances (open space of the park and so forth) included in a picked up image are fixed on the screen, and the images 750 and 751 corresponding to the current frames move on the screen in accordance with the movement of each camera. By using such display, two images corresponding to the current frames can be shown to an accessing person such that they move in accordance with the movement of the two cameras in the display region displayed dark on the display section 290. Further, since the two dynamic pictures are synthesized in an associated relationship using relative relationship information, the synthesized image produced from the two dynamic pictures is displayed as if it were formed from one dynamic picture. Also where a current image moves on the synthesized image, it moves such that the position on the synthesized image and the position on the current image are synchronized with each other. Further, since all of the synthesized images produced from the two dynamic pictures can be displayed within the range of the display region of the display section 290, the viewer can watch the same readily.

Now, operation of the image processing apparatus 100 in the embodiment of the present invention is described with reference to the drawings.

Figure 47:
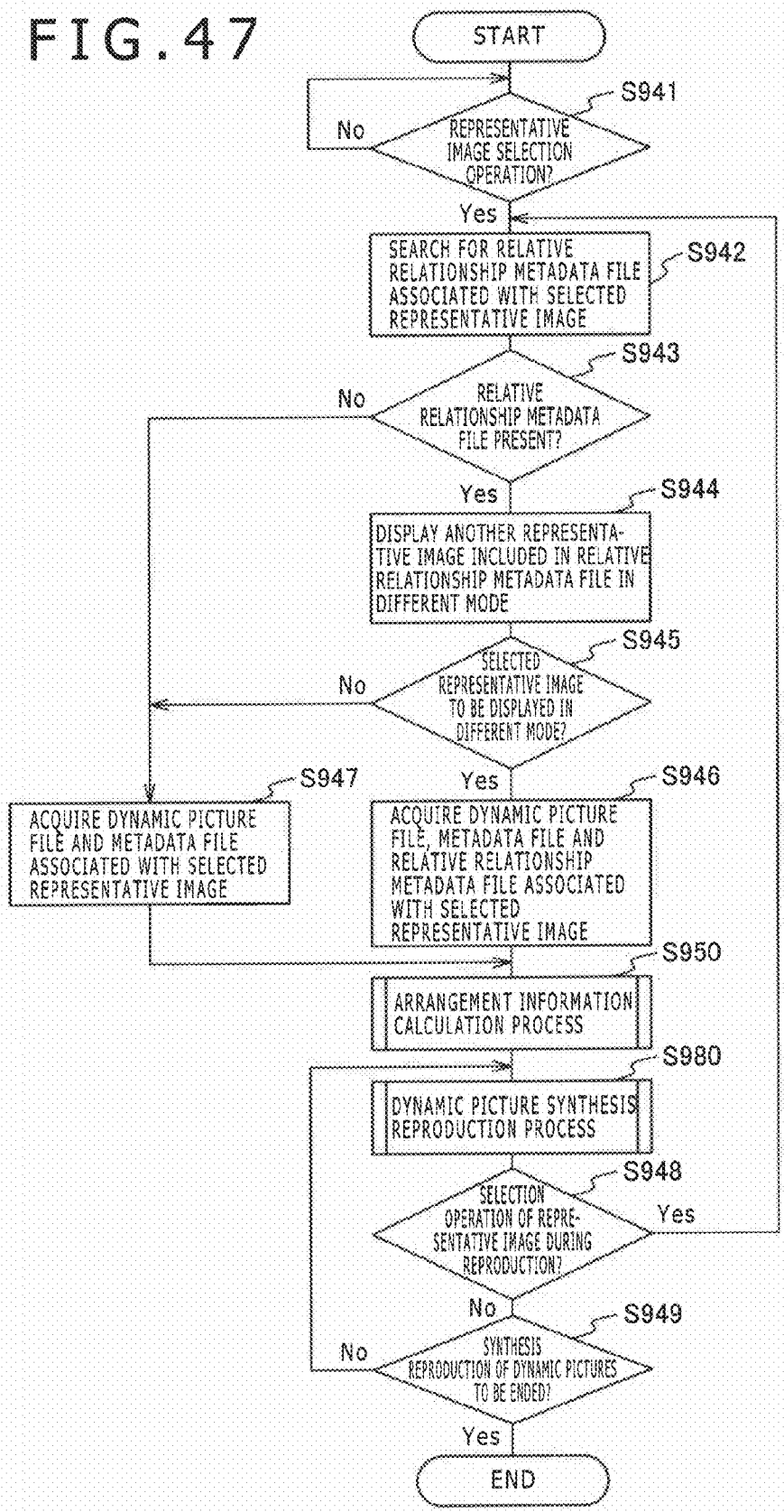
FIG. 47 is a flow chart illustrating a processing procedure of a reproduction process of a dynamic picture by the image processing apparatus 100 in the embodiment of the present invention.

FIG. 47 is a flow chart illustrating a processing procedure of a reproduction process of a dynamic picture by the image processing apparatus 100 in the embodiment of the present invention. In the description of this example, description is given taking a case wherein representative images representative of dynamic pictures stored in the dynamic picture storage section 200 are displayed in the representative image table display region 640 shown in FIG. 34 and so forth as an example.

First, it is decided whether or not a selection operation to select a representative image displayed in the representative image table display region 640 is accepted by the operation acceptance section 160 (step S941). If a selection operation of a representative image is not accepted (step S941), then it is supervised that a selection operation of a representative image is accepted. Where a selection operation of a representative image is accepted (step S941), the file acquisition section 140 searches the relative relationship metadata file stored in the relative relationship information storage section 220 for a relative relationship metadata file which includes a dynamic picture ID corresponding to the selected representative image (step S942). Then, it is decided whether or not a relative relationship metadata file which includes the dynamic picture ID corresponding to the selected representative image exists in the relative relationship metadata files stored in the relative relationship information storage section 220 (step S943). If a relative relationship metadata file which includes the dynamic picture ID corresponding to the selected representative image exists in the relative relationship metadata files stored in the relative relationship information storage section 220 (step S943), then representative images corresponding to the different dynamic pictures ID stored in the relative relationship metadata file which includes the dynamic picture ID corresponding to the selected representative image are displayed in a mode different from that of the other representative images (step S944). For example, a framework of a thick line is applied around the representative image so that the representative image which makes an object is displayed such that it can be identified.

Then, it is decided whether or not the selected representative image is a representative image displayed in a mode different from that of the other representative images (step S945). It is to be noted that, where a representative image is selected first at step S941, a representative image displayed in a mode different from that of the other representative images does not exist. On the other hand, if the selected representative image is a representative image displayed in a mode different from that of the other representative images, then this is a case wherein a different selected representative image exists already.

If the selected representative image is a representative image displayed in a mode different from that of the other representative images (step S945), then the file acquisition section 140 acquires the dynamic picture files corresponding to the representative image selected in the present selection operation and those representative images selected in the preceding selection operations from the dynamic picture storage section 200 and acquires the metadata files stored in the metadata storage section 210 in an associated relationship with the dynamic picture files, and further acquires the relative relationship metadata file common to the representative images from the relative relationship information storage section 220 (step S946). On the other hand, if the selected representative image is not a representative image displayed in a mode different from that of the other representative images (step S945), then the file acquisition section 140 acquires the dynamic picture file corresponding to the representative image selected in the present selection operation from the dynamic picture storage section 200 and acquires the metadata file stored in the metadata storage section 210 in an associated relationship with the dynamic picture file (step S947).

Thereafter, an arrangement information calculation process is carried out based on the contents of the acquired files (step S950). The arrangement information calculation process is described in detail with reference to FIG. 47. Then, a dynamic picture synthesis reproduction process is carried out based on the calculated arrangement information (step S980). This dynamic picture synthesis reproduction process is described in detail with reference to FIG. 49.

Then, it is decided whether or not a selection operation to select a representative image displayed in the representative image table display region 640 is accepted by the operation acceptance section 160 during synthesis reproduction of a dynamic picture (step S948). If a selection operation of a representative image is accepted during synthesis reproduction of the dynamic picture (step S948), then the processing returns to step S942. On the other hand, if a selection operation of a representative image is not accepted during synthesis reproduction of the dynamic image (step S948), then it is decided whether or not the synthesis reproduction of the selected dynamic pictures ends (step S949). In other words, it is decided whether or not synthesis reproduction of each of the selected dynamic pictures up to the last frame ends. If the synthesis reproduction of the selected dynamic pictures ends (step S949), then the operation of the dynamic picture synthesis reproduction process is ended. On the other hand, if the synthesis reproduction of the selected dynamic pictures does not end (step S949), then the processing returns to step S980 to repeat the dynamic picture synthesis reproduction process.

Figure 48:
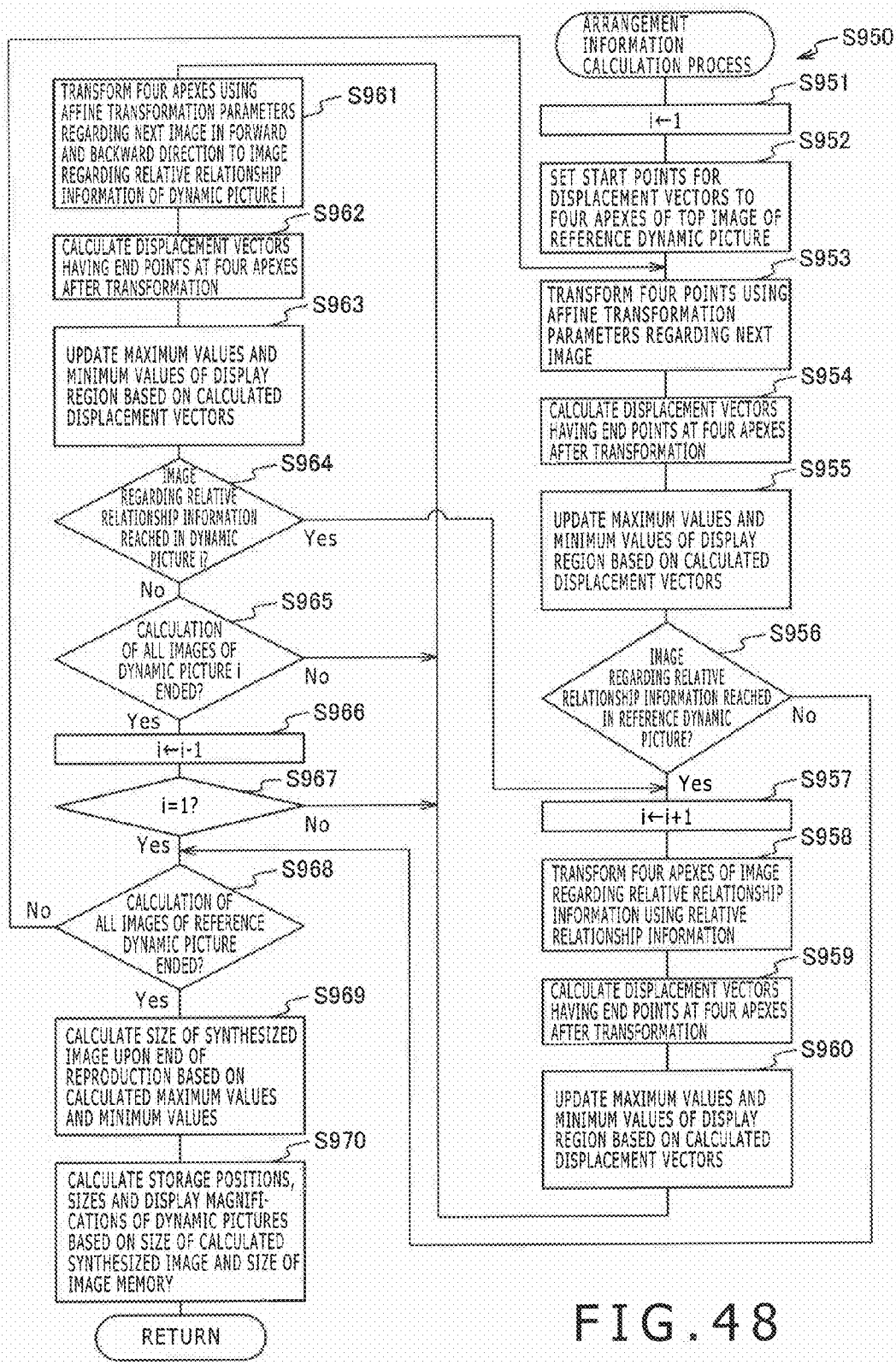
FIG. 48 is a flow chart illustrating the arrangement information calculation processing procedure by the image processing apparatus 100 in the embodiment of the present invention.

FIG. 48 is a flow chart illustrating the arrangement information calculation processing procedure from among the processing procedures of the dynamic picture reproduction process by the image processing apparatus 100 in the embodiment of the present invention (processing procedure at step S950 illustrated in FIG. 47). In the description of this example, an example wherein the top image from among images which form a dynamic picture which makes an object of reproduction is determined as a reference image is described.

First, a variable i is initialized to "1" (step S951). Then, an xy coordinate system wherein the origin is at least one of apexes of a reference image and the x axis and the y axis are two sides of the reference image which are tangent to the apex corresponding to the origin is set, and the four apexes of the reference image are set as start points for displacement vectors (step S952). Then, affine transformation parameters associated with those images from the reference image to an image which makes an object are used to affine transform the four apexes of the reference image on the xy coordinate system (step S953). Then, displacement vectors having start points at the four apexes of the reference image and end points at the four points after the affine transformation are calculated (step S954). Then, the maximum values and the minimum values in the x axis direction and the y axis direction are updated based on the calculated positions of the end points of the displacement vectors (step S955).

Then, it is decided whether or not the position of the image of the frame number included in the relative relationship metadata file is reached in the reference dynamic picture (step S956). If the position of the image of the frame number included in the relative relationship metadata file is reached (step S956), the variable i is incremented by "1" (step S957), and affine transformation parameters associated with the images from the reference image to the image regarding the relative relationship metadata file and affine transformation parameters included in the relative relationship metadata file are used to affine transform the four apexes of the reference image on the xy coordinate system (step S958). Then, displacement vectors having start points at the four apexes of the reference image and end points at the four points after the affine transformation are calculated (step S959). Thereafter, the maximum values and the minimum values in the x axis direction and the y axis direction are updated based on the calculated positions of the end points of the displacement vectors (step S960).

Then, affine transformation parameters associated with the images from the reference image to the image regarding the relative relationship metadata file in the reference dynamic picture, affine transformation parameters included in the relative relationship metadata file, and affine transformation parameters associated with the images from the image regarding the relative relationship metadata file in the dynamic picture i to the image which makes an object in the dynamic picture are used to affine transform the four apexes of the reference image on the xy coordinate system (step S961). In particular, the four apexes of the reference image are successively affine transformed in the forward and backward directions of the image of the frame number included in the relative relationship metadata file common to the reference dynamic pictures in the dynamic picture i. It is to be noted that the dynamic picture i is a dynamic picture other than the reference dynamic picture and is a dynamic picture with regard to which a relative relationship metadata file common to the reference dynamic picture exists. Then, displacement vectors having start points at the four apex points of the reference image and end points at the four points after the affine transformation are calculated (step S962). Then, the maximum values and the minimum values in the x axis direction and the y axis direction are updated based on the calculated positions of the end points of the displacement vectors (step S963).

Then, it is decided whether or not the position of the image of the frame number included in the relative relationship metadata file is reached in the dynamic picture i (step S964). The position of the image which makes an object of this decision is a position different from the position of the image after the transformation at step S5958. If the position of the image of the frame number included in the relative relationship metadata file is reached in the dynamic picture i (step S964), then the processing returns to step S957 to carry out an updating process of the maximum values and the minimum values of a different dynamic picture than the dynamic picture i and the reference dynamic picture. On the other hand, if the position of the image of the frame number included in the relative relationship metadata file is not reached in the dynamic picture i (step S964), then it is decided whether or not an updating process of the maximum values and the minimum values has been carried out with regard to all of the images which form the dynamic picture i (step S965). If the updating process of the maximum values and the minimum values has not been carried out for all of the images which form the dynamic picture i (step S965), then the processing returns to step S961 to repeat the updating process of the maximum values and the minimum values regarding the dynamic picture i. On the other hand, if the updating process of the maximum values and the minimum values has been carried out with regard to all of the images which form the dynamic picture i (step S965), then the variable i is decremented by "1" (step S966), and it is decided whether or not the variable i is "1" (step S967). If the variable is not "1" (step S967), then the processing returns to step S961 to repeat the updating process of the maximum values and the minimum values regarding the dynamic picture i.

On the other hand, if the variable i is "1" (step S967), then it is decided whether or not the updating process of the maximum values and the minimum values has been carried out with regard to all of the images which form the reference dynamic picture (step S968). If the updating process of the maximum values and the minimum values has not been carried out with regard to all of the images which form the reference dynamic picture (step S968), then the processing returns to step S953 to repeat the updating process of the maximum values and the minimum values with regard to the reference dynamic picture.

On the other hand, if the updating process of the maximum values and the minimum values has been carried out with regard to all of the images which form the reference dynamic picture (step S968), then the size of a synthesized image when the synthesis reproduction of the selected one or plural dynamic pictures is calculated based on the maximum values and the minimum values in the x axis direction and the y axis direction calculated by the updating process regarding the dynamic pictures is calculated (step S969). Then, the arrangement position of at least one image which forms the dynamic pictures and the size when the image is stored as well as the display magnification are calculated based on the calculated size of the synthesized image and the size of the image memory 250 (step S970).

Figure 49:
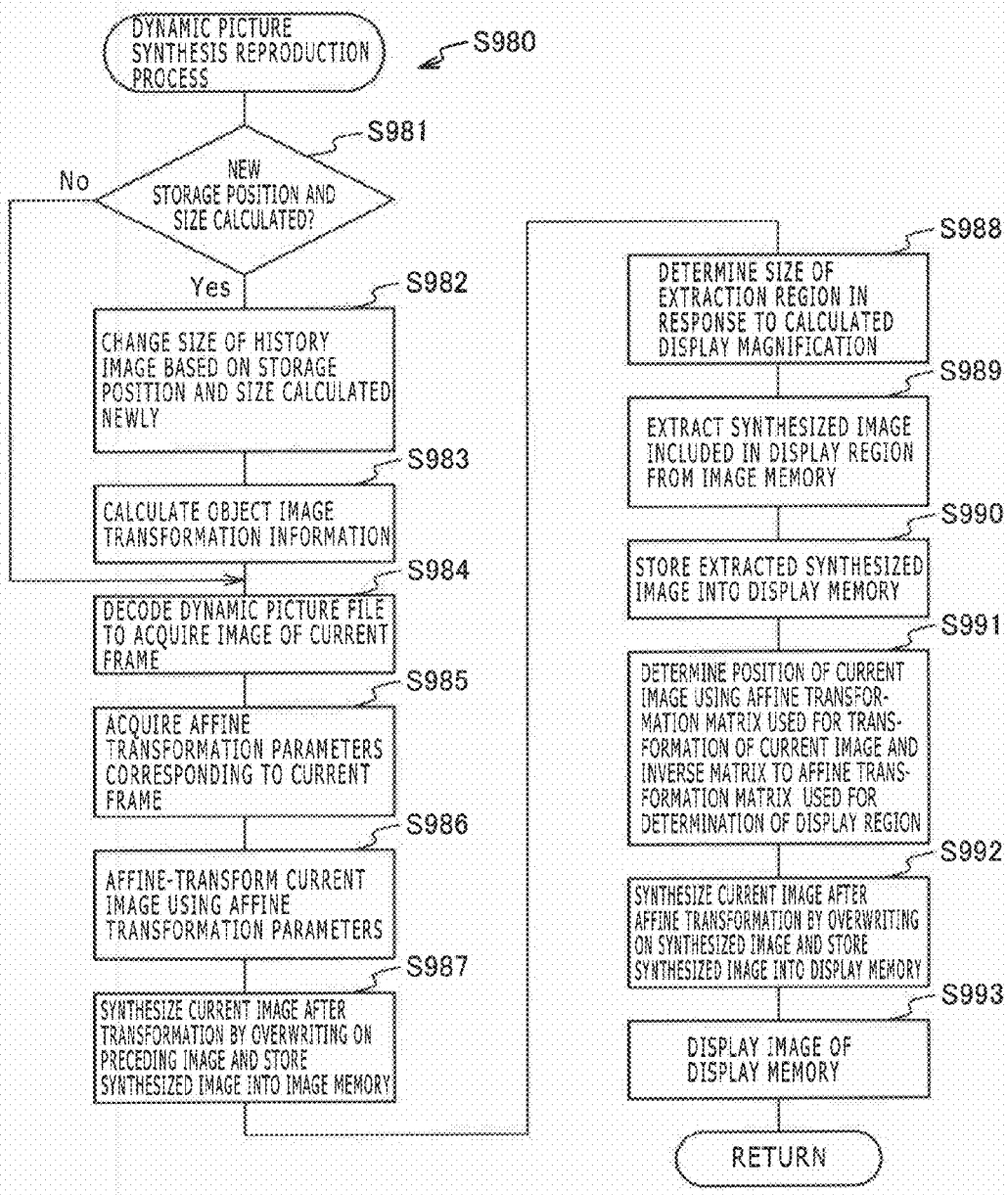
FIG. 49 is a flow chart illustrating the dynamic picture synthesis reproduction processing procedure by the image processing apparatus 100 in the embodiment of the present invention.

FIG. 49 is a flow chart illustrating the dynamic picture synthesis reproduction processing procedure from among processing procedures of the dynamic picture reproduction process by the image processing apparatus 100 in the embodiment of the present invention (processing procedure at step S980 illustrated in FIG. 47).

First, it is decided whether or not a new arrangement position and a new size are calculated (step S981). If a new arrangement position and a new size are not calculated (step S981), then the processing advances to step S984. On the other hand, if a new arrangement position and a new size are calculated (step S981), then the image synthesis section 240 changes the position and the size of the synthesized image stored in the image memory 250 based on the arrangement position and the size newly calculated (step S982). Then, the object image transformation information calculation section 190 calculates object image transformation information based on the contents of the files acquired at step S946 (step S983).

Then, the file acquisition section 140 decodes the dynamic picture file and acquires a current frame which is one of frames which form the dynamic picture file (step S984). It is to be noted that, where a plurality of dynamic pictures are selected, a current frame of each of the dynamic pictures is acquired. Then, the file acquisition section 140 acquires affine transformation parameters corresponding to the acquired current frame from the metadata file (step S985).

Then, the image transformation section 150 uses the acquired affine transformation parameters to affine transform the current image corresponding to the current frame (step S986). It is to be noted that, where a plurality of dynamic pictures are selected, the affine transformation is carried out for each of the current dynamic pictures. Thereafter, the image synthesis section 240 stores the affine transformed current image by overwriting on the synthesized image stored in the image memory 250 (step S987).

Then, the display region extraction section 260 determines the position and the size of the display region in response to the calculated display magnification (step S988). Then, the display region extraction section 260 takes out the synthesized image included in the display region from the image memory 250 (step S989). Then, the display region extraction section 260 stores the synthesized image taken out from the image memory 250 into the display memory 270 (step S990). Thereafter, the image synthesis section 240 uses the affine transformation matrix used for the transformation of the current image and an inverse matrix to the affine transformation matrix used for the determination of the display region to calculate the position of the current image (step S991). Thereafter, the current image before affine transformed and stored into the image memory 250 is synthesized by overwriting on the synthesized image stored in the display memory 270 based on the calculated position of the current image (step S992). Then, the display control section 280 controls the display section 290 to display the synthesized image stored in the display memory 270 (step S993).

Now, a case wherein a characteristic point extraction process and an optical flow calculation process are carried out by a multi-core processor in the embodiment of the present invention is described in detail with reference to the drawings.

Figure 50:
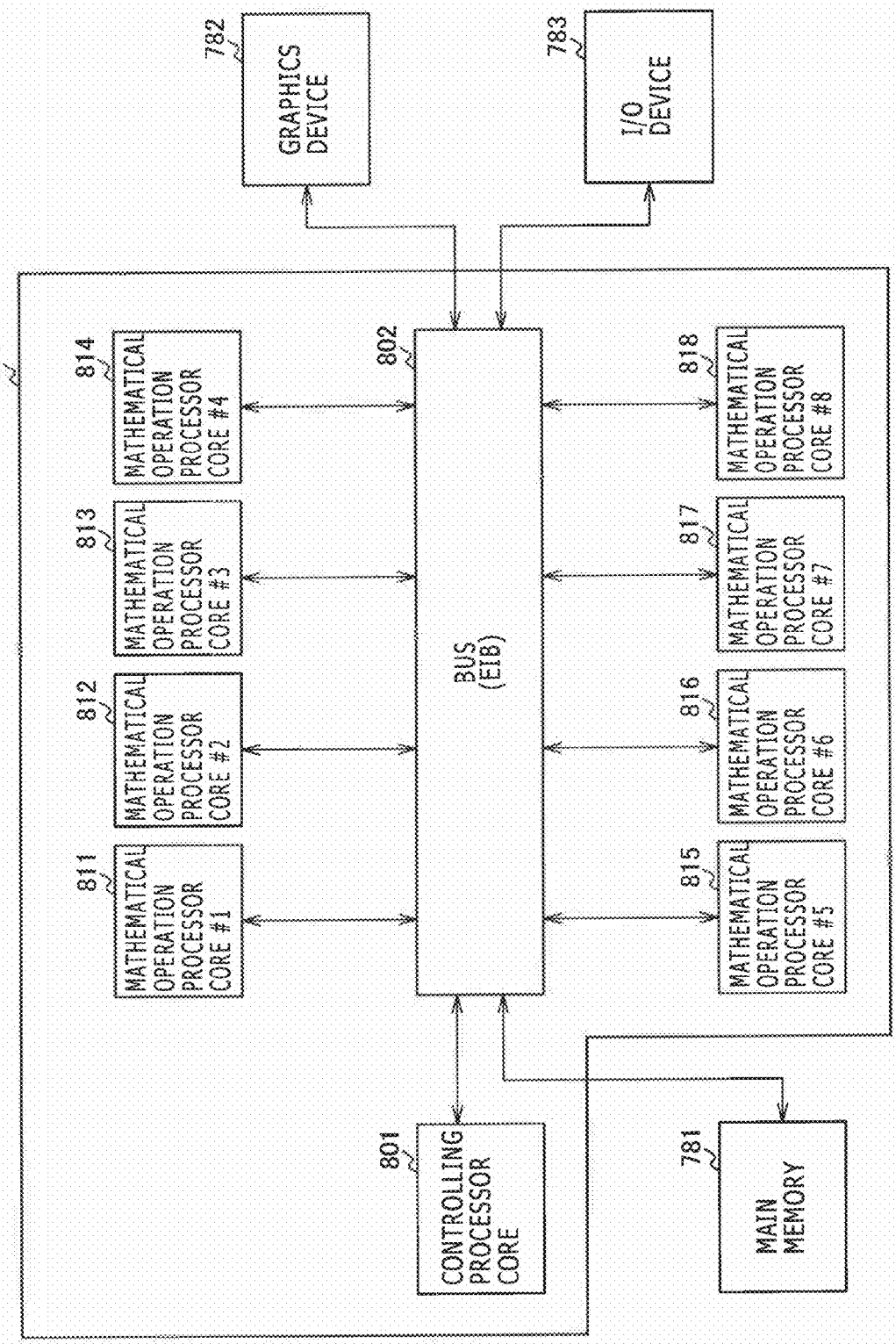
FIG. 50 is a view showing an example of a configuration of a multi-core processor 800 in the embodiment of the present invention.

FIG. 50 is a view showing an example of a configuration of a multi-core processor 800 in the embodiment of the present invention. The multi-core processor 800 is a processor wherein a plurality of processor cores of different types are incorporated in one CPU (Central Processing Unit) package. In particular, the multi-core processor 800 incorporates a plurality of processor cores of two different types including cores of one type corresponding to all uses (applications) and cores of another type optimized to some degree for a predetermined application in order to maintain the processing performance of each processor core item and achieve a simple configuration.

The multi-core processor 800 includes a controlling processor core 801, mathematical operation processor cores (#1) 811 to (#8) 818, and a bus 802, and is connected to a main memory 781. Further, the multi-core processor 800 is connected to other devices such as, for example, a graphics device 782 and an I/O device 783. As the multi-core processor 800, for example, the "Cell (cell: Cell Broadband Engine)" which is a microprocessor which has been developed by the assignee of the present invention and so forth can be adopted.

The controlling processor core 801 is a controlling processor core which principally carries out frequent thread changeover of an operating system or the like. It is to be noted that the controlling processor core 801 is described in detail with reference to FIG. 51.

The mathematical operation processor cores (#1) 811 to (#8) 818 are simple and small-sized mathematical operation processor cores which are good at processing of the multimedia type. It is to be noted that the mathematical operation processor cores (#1) 811 to (#8) 818 are described in detail with reference to FIG. 52.

The bus 802 is a high-speed bus called EIB (Element Interconnect Bus), and the controlling processor core 801 and the mathematical operation processor cores (#1) 811 to (#8) 818 are connected to each other by the bus 802 such that data accessing by each processor core is carried out through the bus 802.

The main memory 781 is connected to the bus 802 and is a main memory which stores various programs to be loaded into the processor cores and data necessary for processing of the processor cores and stores data processed by the processor cores.

The graphics device 782 is a graphics device connected to the bus 802, and the I/O device 783 is an external inputting/outputting device connected to the bus 802.

Figure 51:
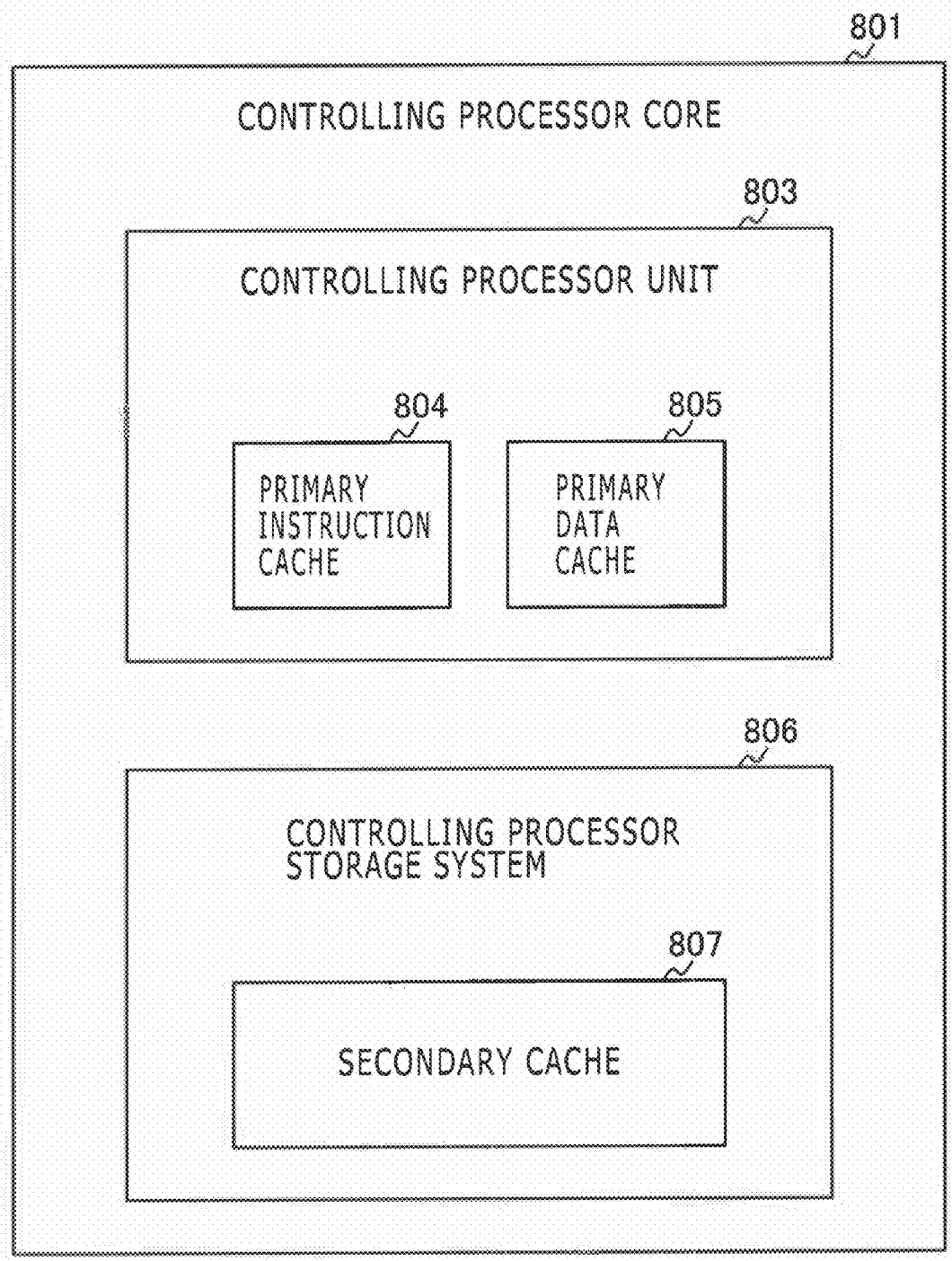
FIG. 51 is a view showing an example of a configuration of a controlling processor core 801 in the embodiment of the present invention.

FIG. 51 is a view showing an example of a configuration of the controlling processor core 801 in the embodiment of the present invention. The controlling processor core 801 includes a controlling processor unit 803 and a controlling processor storage system 806.

The controlling processor unit 803 is a unit which serves as a core for carrying out a mathematical operation process of the controlling processor core 801 and includes an instruction set based on an architecture of a microprocessor, and an instruction cache 804 and a data cache 805 are incorporated as primary caches in the controlling processor unit 803. The instruction cache 804 is an instruction cache of, for example, 32 KB, and the data cache 805 is a data cache of, for example, 32 KB.

The controlling processor storage system 806 is a unit for controlling data accessing to the main memory 781 from the controlling processor unit 803, and a secondary cache 807 of 512 KB is incorporated in the controlling processor storage system 806 in order to speed up memory accessing from the controlling processor unit 803.

Figure 52:
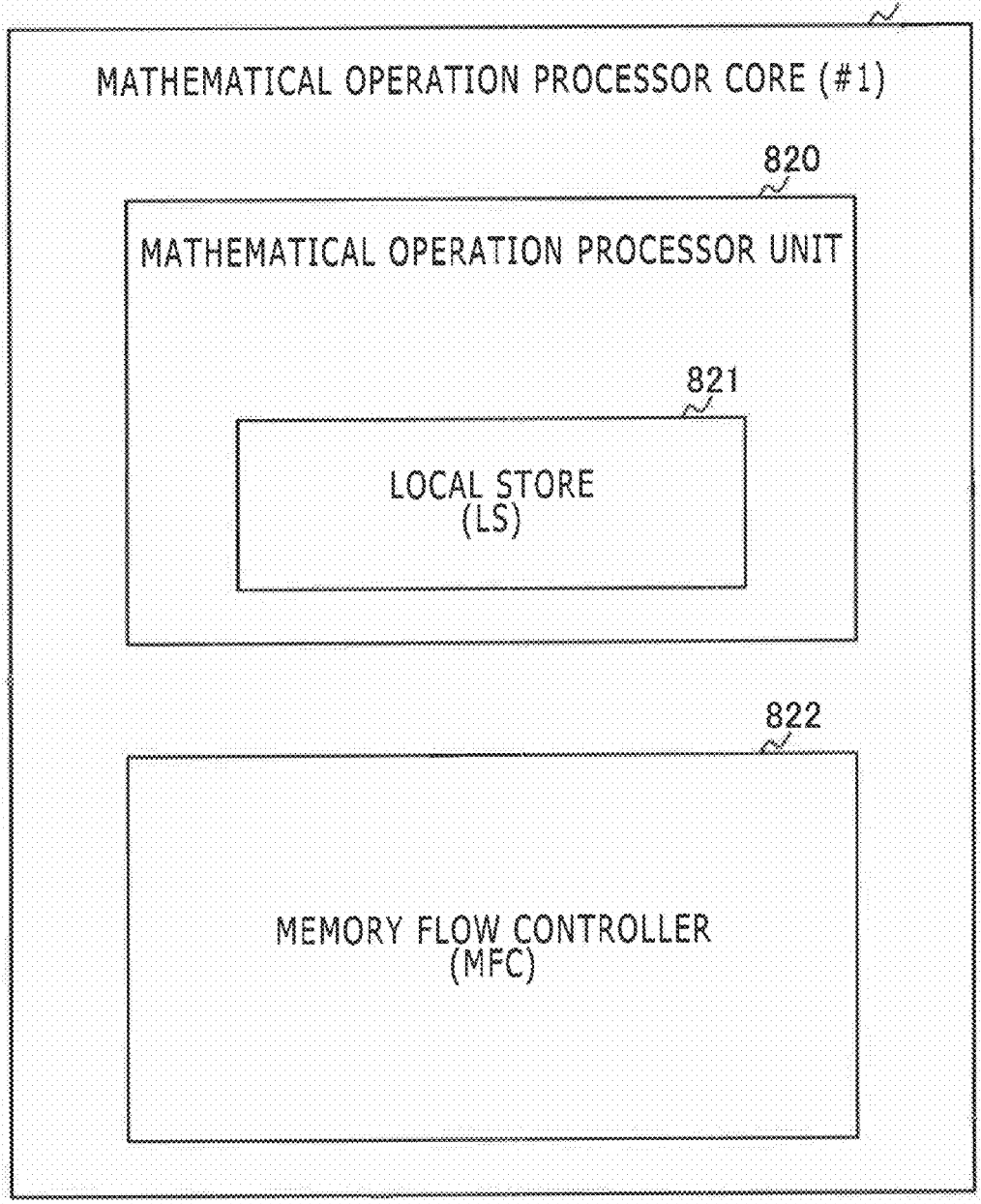
FIG. 52 is a view showing an example of a configuration of a mathematical operation processor core (#1) 811 in the embodiment of the present invention.

FIG. 52 is a view showing an example of a configuration of the mathematical operation processor core (#1) 811 in the embodiment of the present invention. The mathematical operation processor core (#1) 811 includes a mathematical operation processor unit 820 and a memory flow controller 822. It is to be noted that description of the mathematical operation processor cores (#2) 812 to (#8) 818 is omitted here because they have a configuration similar to that of the mathematical operation processor core (#1) 811.

The mathematical operation processor unit 820 is a unit which serves as a core for carrying out a mathematical operation process of the mathematical operation processor core (#1) 811 and includes a unique instruction set different from that of the controlling processor unit 803 of the controlling processor core 801. Further, a local store (LS: Local Store) 821 is incorporated in the mathematical operation processor unit 820.

The local store 821 is a memory for exclusive use for the mathematical operation processor unit 820 and is only one memory which can be referred to directly from the mathematical operation processor unit 820. As the local store 821, for example, a memory having a capacity of, for example, 256 Kbytes can be used. It is to be noted that, in order for the mathematical operation processor unit 820 to access a local store on the main memory 781 or the other mathematical operation processor cores (mathematical operation processor cores (#2) 812 to (#8) 818), it is necessary to utilize the memory flow controller 822.

The memory flow controller 822 is a unit for transferring data to and from the main memory 781, the other mathematical operation processor cores and so forth, and is a unit called MFC (Memory Flow Controller). Here, the mathematical operation processor unit 820 issues a request for data transfer or the like to the memory flow controller 822 through an interface called channel.

As a programming model of the multi-core processor 800 described above, various programming models have been proposed. As the most basic model among the programming models, a model wherein a main program is executed on the controlling processor core 801 and sub programs are executed on the mathematical operation processor cores (#1) 811 to (#8) 818 is known. In the embodiment of the present invention, a mathematical operation method of the multi-core processor 800 which uses this model is described in detail with reference to the drawings.

Figure 53:
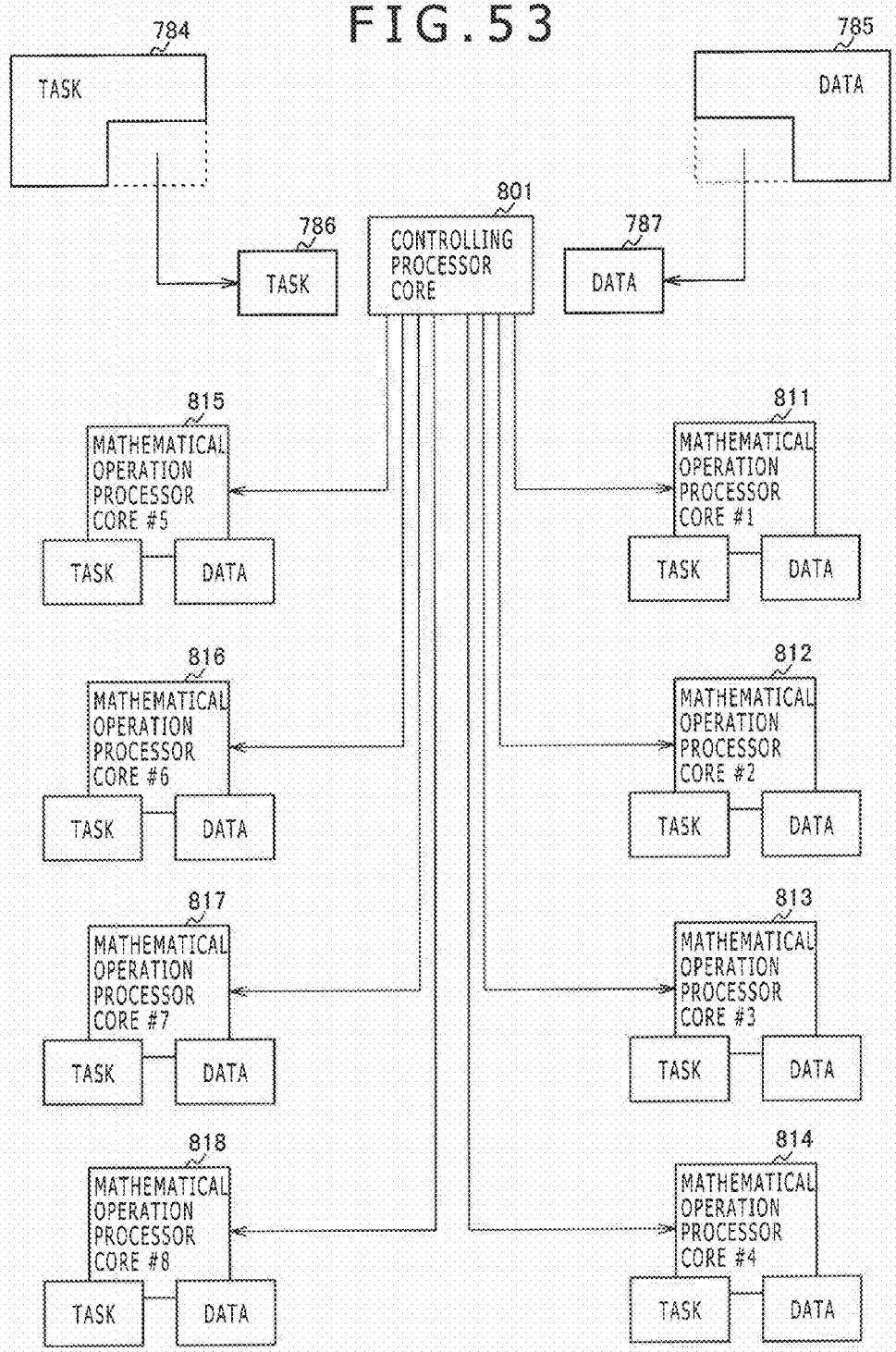
FIG. 53 is a view schematically illustrating a mathematical operation method of the multi-core processor 800 in the embodiment of the present invention.

FIG. 53 is a view schematically illustrating a mathematical operation method of the multi-core processor 800 in the embodiment of the present invention. In this example, a case wherein, where the controlling processor core 801 executes a task 784 using data 785, it uses data 787 (part of the data 785) necessary for processing of the task 784 which is part of the task 784 is described as an example.

As shown in the figure, where the controlling processor core 801 executes the task 784 using the data 785, it causes the mathematical operation processor cores to execute a task 786 using the data 787 (part of the data 785) necessary for processing of the task 786 which is part of the task 784. In the embodiment of the present invention, a mathematical operation process is carried out by each mathematical operation processor core for each of frames which form a dynamic picture.

Where the multi-core processor 800 carries out mathematical operation in such a manner as illustrated in the figure, a large amount of mathematical operation can be carried out in comparatively short time making use of the mathematical operation processor cores (#1) 811 to (#8) 818 in parallel, and a comparatively great number of mathematical operation processes can be carried out with a further reduced number of instructions making use of SIMD (Single Instruction/Multiple Data: single instruction/multiple data) mathematical operation on the mathematical operation processor cores (#1) 811 to (#8) 818. It is to be noted that the SIMD mathematical operation is described in detail with reference to FIGS. 57 to 60 and so forth.

Figure 54:
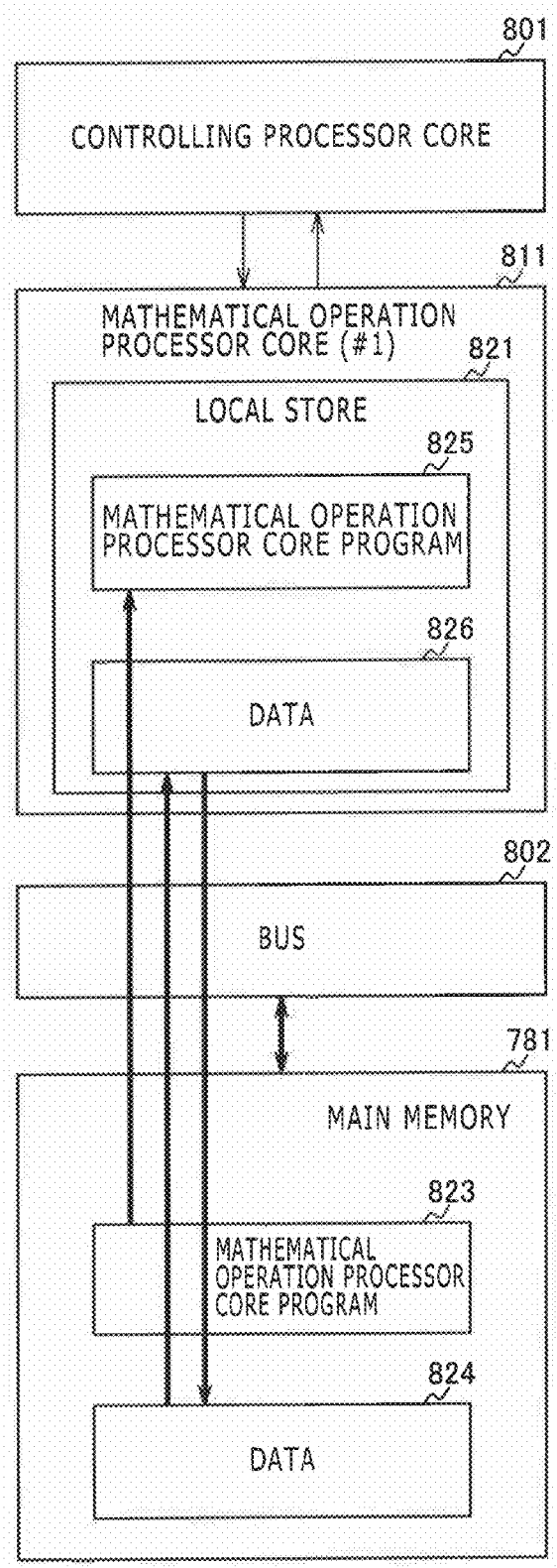
FIG. 54 is a view schematically illustrating flows of a program and data where mathematical operation is carried out by the multi-core processor 800 in the embodiment of the present invention.

FIG. 54 is a view schematically illustrating flows of programs and data in a case wherein mathematical operation is carried out by the multi-core processor 800 in the embodiment of the present invention. Here, while description is given taking the mathematical operation processor core (#1) 811 from among the mathematical operation processor cores (#1) 811 to (#8) 818 as an example, such mathematical operation as described above can be carried out similarly also by the mathematical operation processor cores (#2) 812 to (#8) 818.

First, the controlling processor core 801 sends an instruction to load a mathematical operation processor core program 823 stored in the main memory 781 into the local store 821 of the mathematical operation processor core (#1) 811 to the mathematical operation processor core (#1) 811. Consequently, the mathematical operation processor core (#1) 811 loads the mathematical operation processor core program 823 stored in the main memory 781 into the local store 821.

Then, the controlling processor core 801 issues an instruction to execute a mathematical operation processor core program 825 stored in the local store 821 to the mathematical operation processor core (#1) 811.

Thereafter, the mathematical operation processor core (#1) 811 transfers data 824 necessary for an execution process of the mathematical operation processor core program 825 stored in the local store 821 from the main memory 781 to the local store 821.

Then, the mathematical operation processor core (#1) 811 works data 826 transferred from the main memory 781 based on the mathematical operation processor core program 825 stored in the local store 821, executes a process in accordance with a condition and stores a result of the process into the local store 821.

Then, the mathematical operation processor core (#1) 811 transfers a result of the process executed based on the mathematical operation processor core program 825 stored in the local store 821 from the local store 821 to the main memory 781.

Thereafter, the mathematical operation processor core (#1) 811 issues a notification of an end of the mathematical operation process to the controlling processor core 801.

Now, SIMD mathematical operation carried out using the multi-core processor 800 is described in detail with reference to the drawings. Here, the SIMD mathematical operation is a mathematical operation method wherein a process for a plurality of data is carried out by one instruction.

(a) of FIG. 55 is a view schematically illustrating an outline of the mathematical operation method wherein a instruction for a plurality of data is carried out by an operation for each of the data. The mathematical operation method illustrated in (a) of FIG. 55 is an ordinary mathematical operation method and is called, for example, scalar mathematical operation. For example, a processing result of data "C1" is determined by an instruction to add data "A1" and data "B1." Also with regard to the other three mathematical operations, an instruction to add data "A2," "A3" and "A4" and data "B2," "B3" and "B4" in the same rows is carried out for each process similarly, and by this instruction, the values in the individual rows are subjected to addition processing and results of the processing are determined as data "C2," "C3" and "C4." In this manner, in the scalar mathematical operation, as regards processing for a plurality of data, it is necessary to carry out an instruction for each of them.

(b) of FIG. 55 is a view schematically illustrating an outline of the SIMD mathematical operation which is a mathematical operation method wherein a process for a plurality of data is carried out by a single instruction. Here, data brought together for SIMD mathematical operation (data surrounded by each of broken lines 827 and 828) are sometimes called vector data. Further, SIMD mathematical operation carried out using such vector data is sometimes called vector mathematical operation.

For example, by one instruction to add vector data "A1," "A2," "A3" and "A4" surrounded by the broken line 827 and vector data "B1," "B2," "B3" and "B4" surrounded by the broken line 828, processing results of "C1," "C2," "C3" and "C4" (data surrounded by a further broken line 829) are determined. Since, in the SIMD mathematical operation, a process for a plurality of data can be carried out by a single instruction in this manner, a mathematical operation process can be carried out rapidly. Further, the instruction regarding the SIMD mathematical operations is issued by the controlling processor core 801 of the multi-core processor 800, and the mathematical operation process of the plural data according to the instruction is carried out in parallel by the mathematical operation processor cores (#1) 811 to (#8) 818.

On the other hand, for example, processing to add the data "A1" and "B1," subtract the data "A2" and "132," multiply by the data "A3" and "B3" and divide by the data "A4" and "B4" cannot be carried out by the SIMD mathematical operation. In other words, where different processes are to be carried out individually for a plurality of data, processing by the SIMD mathematical operation cannot be carried out.

Now, a particular mathematical operation method of the SIMD mathematical operation in a case wherein the characteristic point extraction process and the optical flow calculation process are carried out is described in detail with reference to the drawings.

Figure 56:
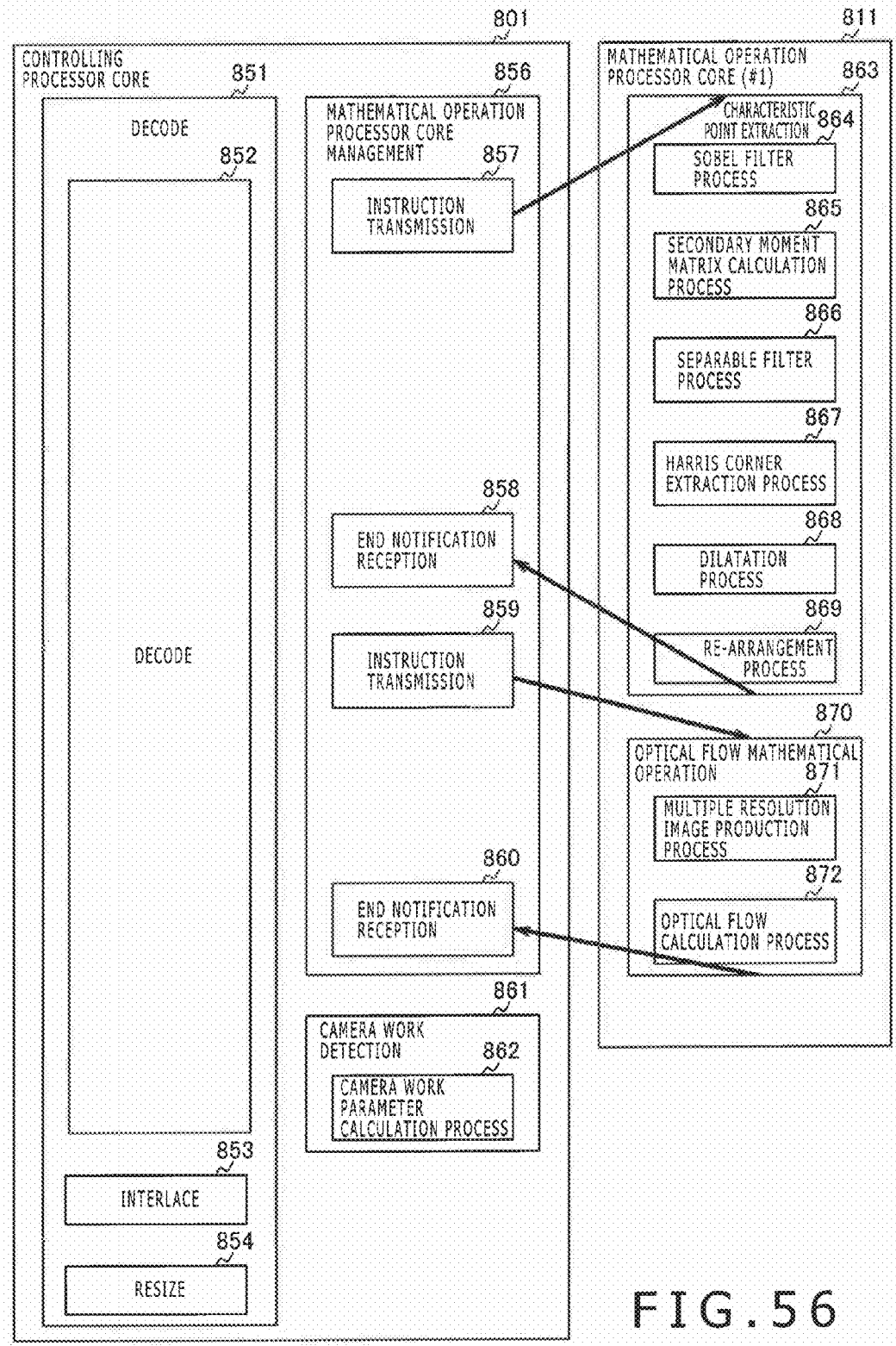
FIG. 56 is a view showing an example of a configuration of a program executed by the controlling processor core 801 or the mathematical operation processor core (#1) 811 in the embodiment of the present invention.

FIG. 56 is a view showing an example of a configuration of a program executed by the controlling processor core 801 or the mathematical operation processor core (#1) 811 in the embodiment of the present invention. While processing only by the mathematical operation processor core (#1) 811 is illustrated here, similar processing is carried out also by the mathematical operation processor cores (#2) 812 to (#8) 818.

The controlling processor core 801 executes, as a decode 851, a decode 852, an interlace 853 and a resize 854. The decode 852 is a process of decoding a dynamic picture file. The interlace 853 is a process of deinterlacing decoded frames. The resize 854 is a process of reducing the deinterlaced frames.

Further, the controlling processor core 801 executes, as mathematical operation processor core management 856, instruction transmission 857 and 859 and end notification reception 858 and 860. The instruction transmission 857 and 859 is a process of transmitting an execution instruction of SIMD mathematical operation to the mathematical operation processor cores (#1) 811 to (#8) 818, and the end notification reception 858 and 860 is a process of receiving an end notification of SIMD mathematical operation from the mathematical operation processor cores (#1) 811 to (#8) 818 responsive to the instruction described above. Further, the controlling processor core 801 executes, as camera work detection 861, a camera work parameter calculation process 862. The camera work parameter calculation process 862 is a process of calculating affine transformation parameters for each frame based on optical flows calculated by SIMD mathematical operation by the mathematical operation processor cores (#1) 811 to (#8) 818.

The mathematical operation processor core (#1) 811 executes, as a characteristic point extraction process 863, a Sobel filter (Sobel Filter) process 864, a second moment matrix (Second Moment Matrix) process 865, a separable filter (Separable Filter) process 866, a Harris corner point extraction (Calc Harris) process 867, a dilation process (Dilation) 868 and a re-arrangement section (Sort) 869.

The Sobel filter process 864 is a process of calculating a value dx in the x direction obtained using a filter of P2 (x direction) and a value dy in the y direction obtained using a filter in the Y direction. It is to be noted that the calculation of the value dx in the x direction is described in detail with reference to FIGS. 57 to 60.

The second moment matrix process 865 is a process of calculating the values of dx2, dy2 and dx·dy using dx and dy calculated by the Sobel filter process 864.

The separable filter process 866 is a process of applying a Gaussian filter (shading process) to images of dx2, dy2 and dx·dy calculated by the second moment matrix process 865.

The Harris corner point extraction process 867 is a process of calculating a score of the Harris corner using the values of dx2, dy2 and dx·dy for which the shading process has been carried out by the separable filter process 866. The score S of the Harris corner is calculated, for example, in accordance with the following expression:

$$S=(dx2 \times dy2 - dx \cdot dy \times dx \cdot dy)/(dx2+dy2+\epsilon)$$

The dilation process 868 is a process of carrying out a shading process for an image configured with the score of the Harris corner calculated by the Harris corner point extraction process 867.

The re-arrangement process 869 is a process of arranging pixels in the descending order of the Harris corner calculated by the Harris corner point extraction process 867, picking up a predetermined number of the pixels having comparatively high scores and extracting the picked up points as characteristic points.

The mathematical operation processor core (#1) 811 executes, as an optical flow (Optical Flow) mathematical operation process 870, a pyramid image (Make Pyramid Image) process 871 and an optical flow calculation (Calc Optical Flow) process 872.

The pyramid image process 871 is a process of successively producing images reduced to a predetermined number of stages from a picture size upon image pickup by a camera, and a produced image is called multiple resolution image.

The optical flow calculation process 872 is a process of calculating optical flows regarding the smallest image from among multiple resolution images produced by the pyramid image process 871 and calculating optical flows again regarding an image of a resolution higher by one rank using a result of the calculation, and the series of processes is carried out repetitively until the largest image is reached.

In this manner, for example, as regards the characteristic point extraction process carried out by the characteristic point extraction unit 121 shown in FIG. 2 and so forth and the optical flow calculation process carried out by the optical flow calculation unit 122, a processing result can be determined by parallel processing by SIMD mathematical operation using the multi-core processor 800. It is to be noted that the characteristic point extraction process and the optical flow calculation process illustrated in FIG. 56 and so forth are an example, and SIMD mathematical operation by the multi-core processor 800 may be carried out using some other process which is configured from various filter processes, threshold value processes and so forth for images which form a dynamic picture.

FIG. 57 is a view schematically illustrating a data structure and a flow of processes in a case wherein a filtering process is carried out using the Sobel filter 830 for image data stored in the main memory 781 in the embodiment of the present invention (image data corresponding to one frame which forms a dynamic picture picked up by a camera). It is to be noted that image data stored in the main memory 781 in the figure are illustrated in a simplified form wherein the number of pixels in the horizontal direction is 32. Further, the Sobel filter 830 is a 3×3 edge extraction filter. As shown in the figure, a filtering process using the Sobel filter 830 is carried out for image data stored in the main memory 781, and a result of the filtering process is outputted. In this example, an example wherein four filtering results are obtained at a time using SIMD mathematical operation is described.

Figure 58:
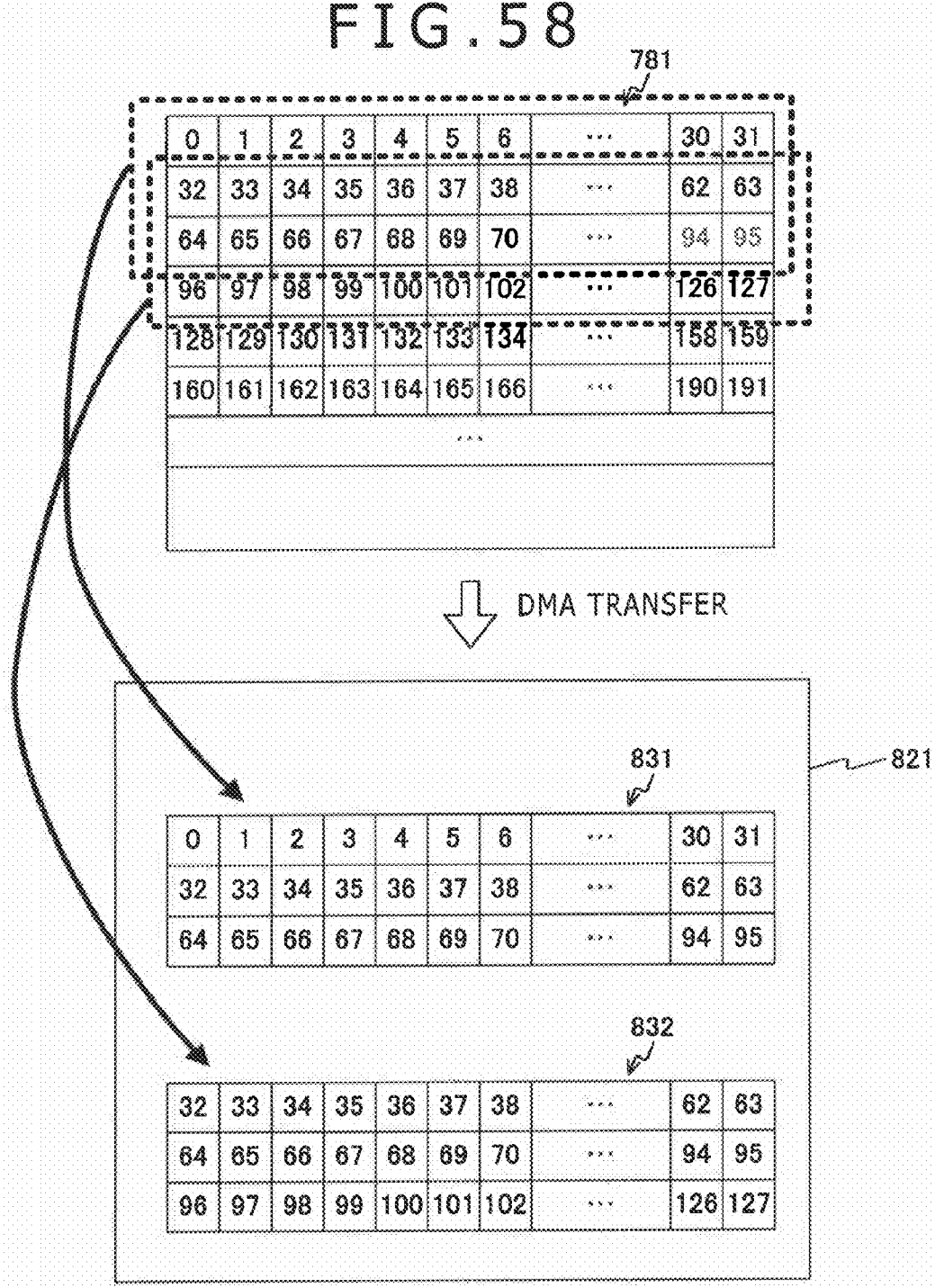
FIG. 58 is a view schematically illustrating a flow of data where SIMD mathematical operation is carried out for image data stored in the main memory 781 in the embodiment of the present invention using the Sobel filter 830.

FIG. 58 is a view schematically illustrating flows of data in a case wherein SIMD mathematical operation is carried out using the Sobel filter 830 for image data stored in the main memory 781 in the embodiment of the present invention. First, a predetermined number of lines (for example, three lines) including the first line of image data stored in the main memory 781 are DMA (Direct Memory Access) transferred to the first buffer 831 provided in the local store 821 of a mathematical operation processor core, and a predetermined number of lines displaced downwardly by one line from the lines DMA transferred to the first buffer 831 are DMA transferred to a second buffer 832. By using the double buffers in this manner, delay by the DMA transfer can be covered up.

Figure 59:
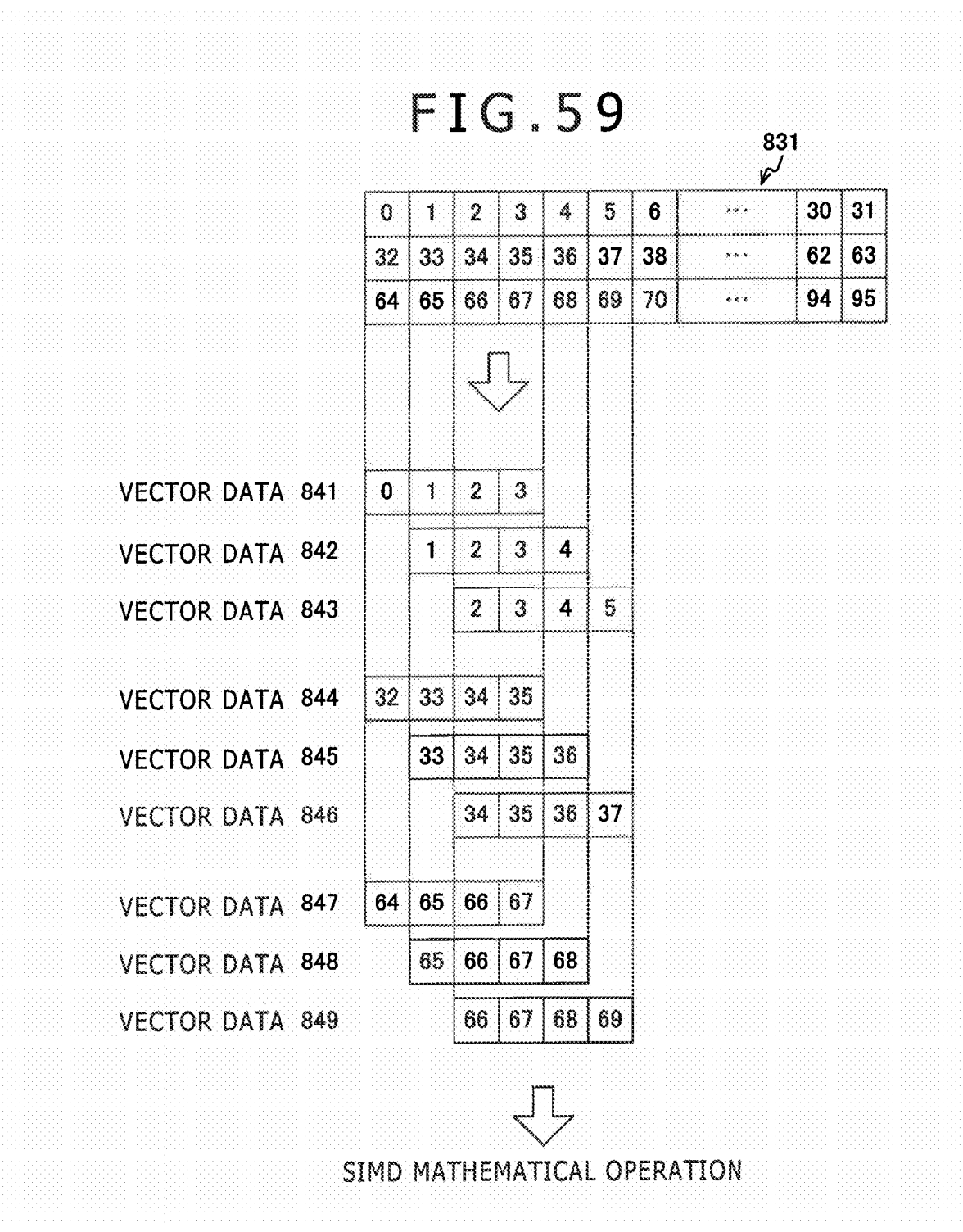

FIG. 59 is a view schematically illustrating a vector production method for producing nine vectors from image data stored in the first buffer 831 in a case wherein the Sobel filter 830 in the embodiment of the present invention is used to carry out a filtering process. After DMA transfer is carried out as illustrated in FIG. 58, nine vectors are produced from image data stored in the first buffer 831. In particular, vector data 841 is produced from four data from the left corner in one line of image data stored in the first buffer 831, and vector data 842 is produced from four data displaced by one to the right side from the four data. Similarly, vector data 843 is produced from four data displaced by one to the right side from the latter four data. Also in the second line and the third line, vector data 844 to 849 are produced each from four data similarly.

FIG. 60 is a view schematically illustrating a vector mathematical operation method for carrying out vector mathematical operation using a SIMD instruction with regard to the vector data 841 to 849 in a case wherein a filtering process is carried out using the Sobel filter 830 in the embodiment of the present invention. In particular, SIMD mathematical operation is carried out successively for the vector data 841 to 843 to determine a vector A. In this SIMD mathematical operation, SIMD mathematical operation of "'−1'ב'vector data 841'" is executed first. Then, SIMD mathematical operation of "'0'ב'vector data 842'" is executed, and then SIMD mathematical operation of "'1'ב'vector data 843'" is executed. Here, "'0'ב'vector data 842'" can be omitted because it is decided that the result of the mathematical operation is "0." Further, "'1'ב'vector data 843'" can be omitted because it is decided that the result of the mathematical operation has a value equal to that of the "vector data 843."

Then, an addition process of a result of the mathematical operation of "'−1'ב'vector data 841'" and a result of the mathematical operation of "'0'ב'vector data 842'" is executed by SIMD mathematical operation, and then an addition process of a result of the addition process and a result of the mathematical operation of "'1'ב'vector data 843'" is executed by SIMD mathematical operation. Here, mathematical operation of a data structure of, for example, "vector data 1"ב"vector data 2"+"vector data 3" can be executed by SIMD mathematical operation. Therefore, in the mathematical operation of the vector A, for example, the SIMD mathematical operation of "'0'ב'vector data 842'" and "'1'ב'vector data 843'" may be omitted while "'−1'ב'vector data 841'"+"vector data 843'" is executed by a single operation of SIMD mathematical operation.

Similarly, SIMD mathematical operation is carried out with regard to the vector data 844 to 846 to determine a vector B, and SIMD mathematical operation is carried out with regard to the vector data 847 to 849 to determine a vector C.

Then, SIMD mathematical operation is carried out with regard to the vectors A to C determined by the SIMD mathematical operation to determine a vector D. In this manner, by carrying out SIMD mathematical operation, a number of results equal to the number of vector components (in this example, four data) can be obtained at a time.

After the vector D is calculated, similar processing is repetitively executed while the position of data to be extracted from among image data stored in the first buffer 831 illustrated in FIG. 58 is successively shifted by one to the right side to successively carry out calculation of the vector D. Then, if the processing up to the right end of the image data stored in the first buffer 831 shown in FIG. 58 comes to an end, then results of the processing are DMA transferred to the main memory 781.

Then, the predetermined number of lines displaced by one line from the lines DMA transferred to the second buffer 832 from among the image data stored in the main memory 781 are DMA transferred to the first buffer 831, and the processing described above is carried out repetitively for the image data stored in the second buffer 832. Then, similar processing is carried out repetitively until the lower end line from among the lines of the image data stored in the main memory 781 is reached.

Similarly, speeding up of the processing for characteristic point extraction and optical flow calculation can be implemented by carrying out most part of the processing by SIMD mathematical operation.

Figure 61:
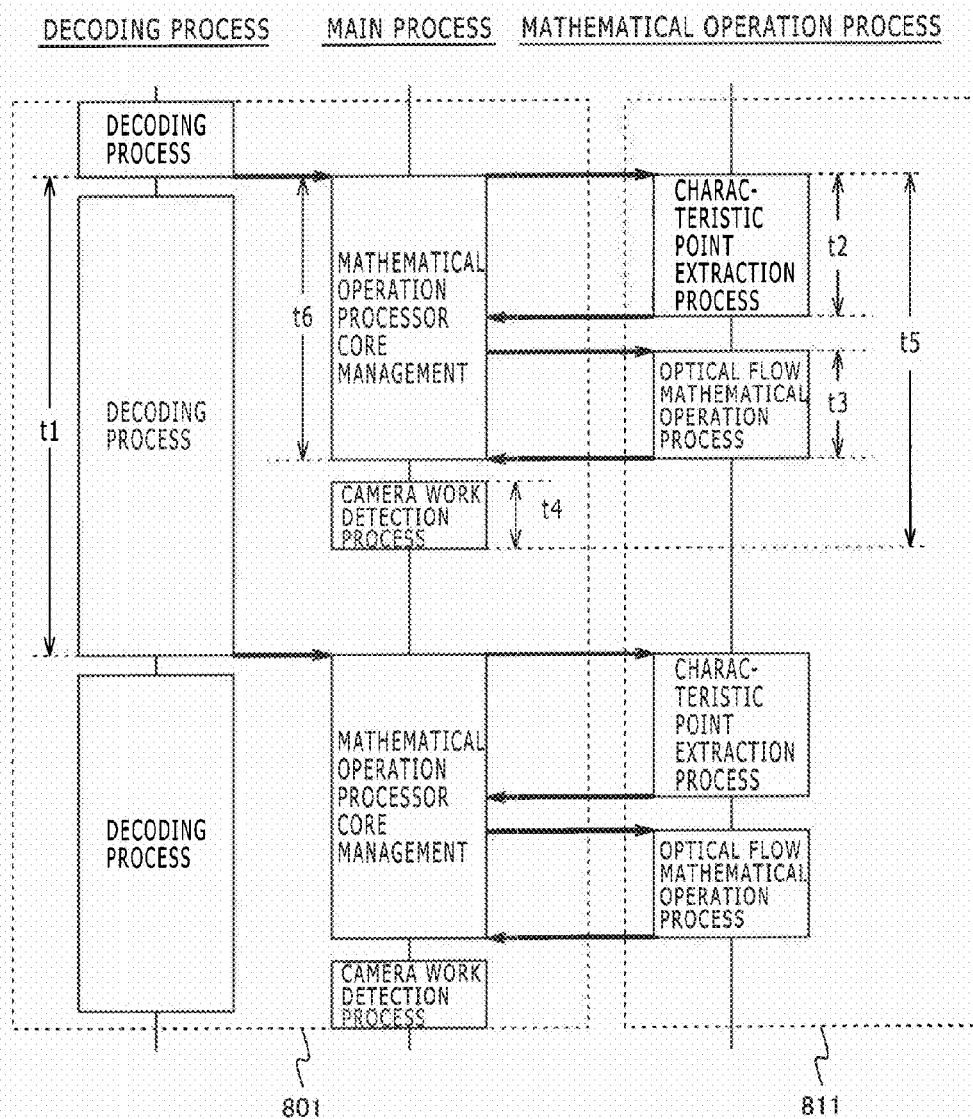
FIG. 61 is a view schematically illustrating a flow of a camera work parameter calculation process in the embodiment of the present invention in a time series.

FIG. 61 is a view schematically illustrating flows of a camera work parameter calculation process in the embodiment of the present invention in a time series. For example, by carrying out SIMD mathematical operation using the multi-core processor 800 as described above, decoding and analysis processes regarding a dynamic picture can be carried out in parallel. Therefore, it is possible to reduce the analysis time for one frame which forms a dynamic picture in comparison with the decoding time.

For example, in the figure, t1 denotes a period of time required for a decoding process of one frame, which forms a dynamic picture, by the controlling processor core 801, t2 a period of time required for a characteristic point extraction process of one frame, which forms a dynamic picture, by the mathematical operation processor cores (#1) 811 to (#8) 818, t3 a period of time required for an optical flow calculation process for one frame, which forms a dynamic picture, by the mathematical operation processor cores (#1) 811 to (#8) 818, and t4 a period of time required for a camera work detection process of one frame, which forms a dynamic picture, by the controlling processor core 801. It is to be noted that t5 denotes a period of time required for a camera work detection process for one frame, which forms a dynamic picture, by the controlling processor core 801 and the mathematical operation processor cores (#1) 811 to (#8) 818. Further, t6, t6 denotes a period of time required for a process for managing the mathematical operation processor cores (#1) 811 to (#8) 818 by the controlling processor core 801. For example, t1 can be set to "25.0 ms," t2 to "7.9 ms," t3 to "6.7 ms," t4 to "1.2 ms," and t5 to "15.8 ms."

Now, a case wherein a dynamic picture content which uses a data file in the embodiment of the present invention is reproduced is described in detail with reference to the drawings.

Figure 62:
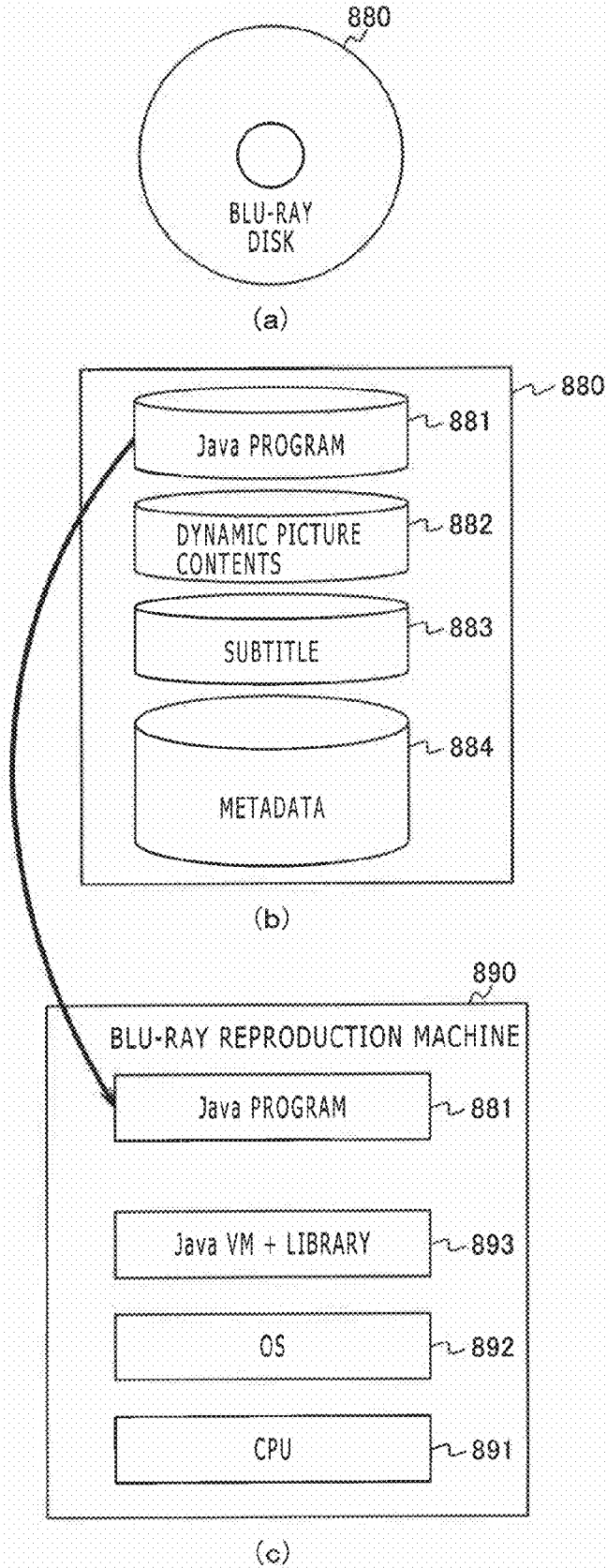
FIG. 62 is views schematically showing a blu-ray disk 880 which is an example of a recording medium, data 881 to 884 recorded on the blu-ray disk 880 and an internal configuration of a blu-ray reproduction machine 890 which can reproduce the blu-ray disk 880.

(a) of FIG. 62 is a top plan view schematically showing a blu-ray disk (Blu-ray Disc (registered trademark)) 880 which is an example of a recording medium, and (b) of FIG. 62 is a view schematically showing data 881 to 884 recorded on the blu-ray disk 880. On the blu-ray disk 880, for example, together with the dynamic picture content 882 which is a dynamic picture picked up by a camera or the like, the subtitle 883 of the dynamic picture content 882 and the metadata 884 obtained by analysis of the dynamic picture content 882 (for example, the metadata file illustrated in (b) of FIG. 4 and the relative relationship metadata file illustrated in FIG. 5), the Java (registered trademark) program 881 for dynamic picture reproduction in the embodiment of the present invention is recorded.

(c) of FIG. 62 is a view schematically showing an internal configuration of a blu-ray reproduction machine (Blu-ray Disc Player) 890 which can reproduce the blu-ray disk 880. Here, since the blu-ray reproduction machine 890 which can reproduce a blu-ray disk incorporates a Java (registered trademark) VM (Java (registered trademark) virtual machine) and a library 893 as a standard function together with a CPU 891 and an OS 892, it can execute a Java (registered trademark) program. Therefore, if the blu-ray disk 880 is loaded into the blu-ray reproduction machine 890, then the blu-ray reproduction machine 890 can load and execute the Java (registered trademark) program 881. Consequently, in a case wherein the blu-ray reproduction machine 890 reproduces the dynamic picture content 882, the metadata 884 can be used to carry out dynamic picture production in the embodiment of the present invention. In other words, dynamic picture production in the embodiment of the present invention can be implemented on all blu-ray reproduction machines without using PC software for exclusive use or the like.

As described above, in the embodiment of the present invention, when a plurality of dynamic pictures are reproduced, since images corresponding to frames preceding to an image displayed currently are displayed while being synthesized with the current image, the background or the like picked up within at least a partial time zone can be accessed readily together with an object centered in the image pickup. Therefore, for example, if it is desired to watch the background or the like picked up within at least a partial time zone again, then even if a rewinding operation, a search operation or the like is not carried out, the background or the like can be watched simultaneously with the image currently displayed. Further, when a dynamic picture picked up by a camera is accessed, the contents of the dynamic picture can be grasped readily. Furthermore, where a dynamic picture which includes the same object, since, at a location of the object, a plurality of dynamic pictures are displayed in an overlapping relationship, a relative relationship of the plural dynamic pictures can be grasped readily. Further, since an image corresponding to a preceding frame is fixed, an accessing person can recognize a spatial expanse readily. Further, since an entire synthesized image produced from a dynamic picture can be displayed on the display section 290, the image can be displayed with an appropriate size when the dynamic picture is synthesized and reproduced. Consequently, since such a situation that part of a synthesized image is not displayed during synthesis reproduction can be prevented, the contents of the dynamic picture can be grasped readily.

In particular, a plurality of dynamic pictures can be developed spatially and enjoyed making use of frames in the past. Consequently, since such an enjoying method as, for example, to complete a panorama image while a plurality of dynamic pictures are reproduced can be provided, the accessing person can enjoy the dynamic pictures with much interest. Further, since, as regards a current image, images in states before the current image is stored into the image memory 250 can be successively displayed, a comparatively clean image can be displayed.

Further, while, in the description of the embodiment of the present invention, an example wherein affine transformation parameters detected in advance are used to carry out reproduction and display is described, affine transformation parameters may be calculated upon reproduction such that the calculated affine transformation parameters are used for reproduction and display. For example, by calculating affine transformation parameters by SIMD mathematical operation using a multi-core processor, it is possible to calculate affine transformation parameters for one frame within processing time for decoding of one frame. Consequently, even where a dynamic picture with regard to which affine transformation parameters are not calculated is to be reproduced, it is possible to carry out dynamic picture reproduction while affine transformation parameters are calculated, and therefore, enjoyment in spatial development of a dynamic picture can be carried out rapidly.

Further, in the description of the embodiment of the present invention, an example is described wherein a plurality of dynamic picture files are stored into the dynamic picture storage section 200 and affine transformation parameters corresponding to the dynamic pictures are stored as a metadata file in an associated relationship with the corresponding dynamic pictures and frames into the metadata storage section 210 and besides relative relationship information regarding the plural dynamic pictures is stored into the relative relationship information storage section 220, a dynamic picture, affine transformation parameters corresponding to the dynamic picture and relative relationship information regarding the dynamic picture may be recorded in an associated relationship with each other as a dynamic picture file into a dynamic picture storage section such that, upon reproduction, the information is extracted from the dynamic picture file and used.

Further, for example, in a case wherein a dynamic picture picked up with SD (Standard Definition) picture quality is enjoyed or a dynamic picture picked up using a dynamic picture storage function of a digital still camera or a portable telephone set or the like is enjoyed on a high definition TV (television) receiver, if the dynamic picture is displayed in a state of an original image size, then the number of pixels of the high definition TV system cannot sometimes be made most of. Further, if enlarged display is carried out, then roughness of an image frequently stands out. Thus, if the display described in the description of the embodiment of the present invention is used, then roughness of an image does not stand out and enjoyment which makes use of the number of pixels of the high definition TV system can be achieved.

It is to be noted that a synthesized image synthesized by the image synthesis section 240 may be recorded on a recording medium or the like such that it is used for other reproduction or display. Further, while, in the description of the embodiment of the present invention, an example wherein synthesized images corresponding to frames preceding to a current frame are displayed is described, such synthesized images may be successively erased as time passes. In this instance, such arrangement as to erase the synthesized images leaving afterimages may be applied. Further, such arrangement as to display an image corresponding to a current frame in color but display synthesized images corresponding to frames preceding to the current frame such that the display thereof gradually changes from the color display to sepia color display as time passes may be applied.

Further, while, in the description of the embodiment of the present invention, description is given taking an image processing apparatus wherein an image synthesized by the image synthesis section is displayed on the display section as an example, the embodiment of the present invention can be applied to an image processing apparatus which includes image outputting means for outputting image information for allowing the image synthesized by the image synthesis section to be displayed on another image display apparatus. Further, the embodiment of the present invention can be applied to a dynamic picture reproduction apparatus which can reproduce a dynamic picture, an image pickup apparatus such as a digital video camera which can reproduce a picked up dynamic picture and so forth.

Further, while, in the description of the embodiment of the present invention, a dynamic picture picked up by a camera is described, the embodiment of the present invention can be applied, for example, also to a dynamic picture after edited in a case wherein a dynamic picture picked up by a camera is edited, a dynamic picture in which an animation or the like is synthesized and so forth. Further, while, in the description of the embodiment of the present invention, an example wherein some or all of history images are displayed is described, only a plurality of transformed current images may be displayed. In other words, only a plurality of current images stored last into the image memory may be successively displayed.

It is to be noted that the embodiment of the present invention indicates an example for carrying out the present invention and has a corresponding relationship to invention specifying matters in the claims as described below. However, the present invention is not limited to this, but various modifications can be applied without departing from the subject matter of the present invention.

In particular, in claim 1, the dynamic picture storage means corresponds, for example, to the dynamic picture storage section 200. Meanwhile, the transformation information storage means corresponds, for example, to the metadata storage section 210. Further, the image storage means corresponds, for example, to the image memory 250. Further, the arrangement information calculation means corresponds, for example, to the arrangement information calculation section 230. Further, the image transformation means corresponds, for example, to the image transformation section 150. Further, the image synthesis means corresponds, for example, to the image synthesis section 240.

Further, in claim 2, the relative relationship information storage means corresponds, for example, to the relative relationship information storage section 220. Further, the object image transformation information calculation means corresponds, for example, to the object image transformation information calculation section 190.

Further, in claim 3, the display means corresponds, for example, to the display section 290. Further, the operation acceptance means corresponds, for example, to the operation acceptance section 160. Further, the display control means corresponds, for example, to the display control section 280.

Further, in claim 7, the image synthesis means corresponds, for example, to the image transformation section 150 and the image synthesis section 240. Further, the display means corresponds, for example, to the display section 290. Further, the arrangement information calculation means corresponds, for example, to the arrangement information calculation section 230.

Further, in claim 8, the dynamic picture storage means corresponds, for example, to the dynamic picture storage section 200. Further, the transformation information storage means corresponds, for example, to the metadata storage section 210. Further, the image storage means corresponds, for example, to the image memory 250. Further, the arrangement information calculation means corresponds, for example, to the arrangement information calculation section 230. Further, the image transformation means corresponds, for example, to the image transformation section 150. Further, the image synthesis means corresponds, for example, to the image synthesis section 240. Further, the display control means corresponds, for example, to the display control section 280.

Further, in claim 9 or 10, the arrangement information calculation step corresponds, for example, to the step S950. Further, the image transformation step corresponds, for example, to the step S986. Further, the image synthesis step corresponds, for example, to the step S986.

It is to be noted that the processing procedure described in the description of the embodiment of the present invention may be grasped as a method which has the series of steps described above or may be grasped as a program for causing a computer to execute the series of steps or a recording medium on which the program is stored.

The invention claimed is:

1. An image processing apparatus, comprising:
    dynamic picture storage means for storing a picked up dynamic picture, including picked up images, picked up by an image pickup apparatus;
    transformation information storage means for storing transformation information for transforming a second picked up image which is positioned, with reference to a first picked up image which forms the picked up dynamic picture, following the first picked up image on a time axis of the picked up dynamic picture for each picked up image;
    image storage means for storing history images including the picked up images positioned preceding to the second picked up image on the time axis;
    arrangement information calculation means for calculating a display range formed from the picked up images to be transformed based on the transformation information regarding the picked up images which form the picked up dynamic picture and calculating arrangement information of a third picked up image, which is at least one of the picked up images, on the image storage means based on the display range;
    image transformation means for transforming the second picked up image based on the transformation information; and
    image synthesis means for synthesizing the transformed second picked up image on the history images including the third picked up image arranged in the image storage means based on the calculated arrangement information and storing the synthesized second picked up image as a new history image into the image storage means.

2. The image processing apparatus according to claim 1, wherein
    the dynamic picture storage means stores a first picked up dynamic picture and a second picked up dynamic picture as the picked up dynamic picture, and
    the transformation information storage means stores first transformation information which is the transformation information regarding the first picked up dynamic picture and second transformation information which is the transformation information regarding the second picked up dynamic picture for each picked up image, the image processing apparatus further comprising:

relative relationship information storage means for storing relative relationship information representative of a relative positional relationship between at least one of the picked up images which form the first picked up dynamic picture and at least one of the picked up images which form the second picked up dynamic picture; and object image transformation information calculation means for calculating object image transformation information to be used, where at least one of the picked up images which form the first picked up dynamic picture is determined as a reference image and the picked up images which form the second dynamic picture are determined as object images, for transformation of the object images based on the relative relationship information, first transformation information, and second transformation information, the image transformation means transforming the object image based on the object image transformation information and the second transformation information and transforming the picked up images which form the first picked up dynamic picture based on the first transformation information, the arrangement information calculation means calculating the display range based on the object image transformation information, first transformation information, and second transformation information and calculating the arrangement information based on the display range, the image synthesis means synthesizing the picked up images which form the transformed first picked up dynamic picture and the object images into the history image.

3. The image processing apparatus according to claim 2, wherein the dynamic picture storage means stores a plurality of picked up dynamic pictures including the first picked up dynamic picture and the second picked up dynamic picture, and further comprising:

display means for displaying the new history image;

operation acceptance means for accepting a selection operation for selecting at least one of the picked up dynamic pictures stored in the dynamic picture storage means; and display control means for controlling, when a selection operation to select the first picked up dynamic picture or the second picked up dynamic picture is accepted by the operation acceptance means, the display means to display that synthesis by the image synthesis means of the first picked up dynamic picture and the second picked up dynamic picture is possible.

4. The image processing apparatus according to claim 3, wherein the display control means controls the display means to display marks representative of the picked up dynamic pictures stored in the dynamic picture storage means individually for the picked up dynamic pictures, controls, when a selection operation to select the first picked up dynamic picture is accepted by the operation acceptance means, the display means to display the mark representative of the second picked up dynamic picture in a mode different from that of the other marks, and controls, when a selection operation to select the second picked up dynamic picture is accepted by the operation acceptance means, the display means to display the mark representative of the first picked up dynamic picture in a mode different from that of the other marks.

5. The image processing apparatus according to claim 1, wherein the arrangement information calculation means calculates the arrangement information based on the size of a storage region of the image storage means and the display range.

6. The image processing apparatus according to claim 5, wherein the arrangement information calculation means calculates the arrangement position and the size of the third picked up image in the image storage means such that the display range is smaller than the size of the storage region in the image storage means.

7. An image processing apparatus, comprising:

image synthesis means for synthesizing, based on movement information of an image pickup apparatus upon image pickup, picked up images which form a picked up dynamic picture picked up by the image pickup apparatus, to form a synthesized image;

display control means for controlling a display to display the synthesized image in a display region, the display region being proportional in size to the synthesized image, the size of the display region varying based on a relationship between each of the picked up images to each another, in the synthesized image; and arrangement information calculation means for calculating arrangement information of at least one of the picked up images in the display region based on the movement information, the image synthesis means synthesizing the picked up images based on the calculated arrangement information.

8. A dynamic picture reproduction apparatus, comprising:

dynamic picture storage means for storing a picked up dynamic picture, including picked up images, picked up by an image pickup apparatus;

transformation information storage means for storing transformation information for transforming a second picked up image which is positioned, with reference to a first picked up image which forms the picked up dynamic picture, following the first picked up image on a time axis of the picked up dynamic picture for each picked up image;

image storage means for storing history images including the picked up images positioned preceding to the second picked up image on the time axis of the picked up dynamic picture;

arrangement information calculation means for calculating a display range formed from the picked up images to be transformed based on the transformation information regarding the picked up images which form the picked up dynamic picture and calculating arrangement information of a third picked up image, which is at least one of the picked up images, on the image storage means based on the display range;

image transformation means for transforming the second picked up image based on the transformation information;

image synthesis means for synthesizing the transformed second picked up image on the history images including the third picked up image arranged in the image storage means based on the calculated arrangement information and storing the synthesized second picked up image as a new history image into the image storage means; and display control means for controlling display means to successively display the new history image.

9. An image processing method for an image processing apparatus which includes dynamic picture storage means for storing a picked up dynamic picture, including picked up images, picked up by an image pickup apparatus, transformation information storage means for storing transformation information for transforming a second picked up image which is positioned, with reference to a first picked up image which forms the picked up dynamic picture, following the first picked up image on a time axis of the picked up dynamic picture for each picked up image, and image storage means for storing history images including the picked up images positioned preceding to the second picked up image on the time axis, the method comprising:

an arrangement information calculation step of calculating a display range formed from the picked up images to be transformed based on the transformation information regarding the picked up images which form the picked up dynamic picture and calculating arrangement information of a third picked up image, which is at least one of the picked up images, on the image storage means based on the display range;

an image transformation step of transforming the second picked up image based on the transformation information; and an image synthesis step of synthesizing the transformed second picked up image on the history images including the third picked up image arranged in the image storage means based on the calculated arrangement information and storing the synthesized second picked up image as a new history image into the image storage means.

10. A computer-readable storage medium including computer executable instructions, wherein the instructions, when executed by a computer, cause the computer to perform a method for an image processing apparatus which includes dynamic picture storage means for storing a picked up dynamic picture, including picked up images, picked up by an image pickup apparatus, transformation information storage means for storing transformation information for transforming a second picked up image which is positioned, with reference to a first picked up image which forms the picked up dynamic picture, following the first picked up image on a time axis of the picked up dynamic picture for each picked up image, and image storage means for storing history images including the picked up images positioned preceding to the second picked up image on the time axis, the method comprising:

an arrangement information calculation step of calculating a display range formed from the picked up images to be transformed based on the transformation information regarding the picked up images which form the picked up dynamic picture and calculating arrangement information of a third picked up image, which is at least one of the picked up images, on the image storage means based on the display range;

an image transformation step of transforming the second picked up image based on the transformation information; and an image synthesis step of synthesizing the transformed second picked up image on the history images including the third picked up image arranged in the image storage means based on the calculated arrangement information and storing the synthesized second picked up image as a new history image into the image storage means.

11. An image processing apparatus, comprising:

a dynamic picture storage unit configured to store a picked up dynamic picture, including picked up images, picked up by an image pickup apparatus;

a transformation information storage unit configured to store transformation information for transforming a second picked up image which is positioned, with reference to a first picked up image which forms the picked up dynamic picture, following the first picked up image on a time axis of the picked up dynamic picture for each picked up image;

an image storage unit configured to store history images including the picked up images positioned preceding to the second picked up image on the time axis;

an arrangement information calculation unit configured to calculate a display range formed from the picked up images to be transformed based on the transformation information regarding the picked up images which form the picked up dynamic picture and to calculate arrangement information of a third picked up image, which is at least one of the picked up images, on the image storage unit based on the display range;

an image transformation unit configured to transform the second picked up image based on the transformation information; and an image synthesis unit configured to synthesize the transformed second picked up image on the history images including the third picked up image arranged in the image storage unit based on the calculated arrangement information and to store the synthesized second picked up image as a new history image into the image storage unit.

12. The image processing apparatus according to claim 11, wherein the dynamic picture storage unit is configured to store a first picked up dynamic picture and a second picked up dynamic picture as the picked up dynamic picture, and the transformation information storage unit is configured to store first transformation information which is the transformation information regarding the first picked up dynamic picture and second transformation information which is the transformation information regarding the second picked up dynamic picture for each picked up image, the image processing apparatus further comprising:

a relative relationship information storage unit configured to store relative relationship information representative of a relative positional relationship between at least one of the picked up images which form the first picked up dynamic picture and at least one of the picked up images which form the second picked up dynamic picture; and an object image transformation information calculation unit configured to calculate object image transformation information to be used, where at least one of the picked up images which form the first picked up dynamic picture is determined as a reference image and the picked up images which form the second dynamic picture are determined as object images, for transformation of the object images based on the relative relationship information, first transformation information, and second transformation information, the image transformation unit is configured to transform the object image based on the object image transformation information and the second transformation information and to transform the picked up images which form the first picked up dynamic picture based on the first transformation information, the arrangement information calculation unit is configured to calculate the display range based on the object image transformation information, first transformation information, and second transformation information and to calculate the arrangement information based on the display range, the image synthesis unit is configured to synthesize the picked up images which form the transformed first picked up dynamic picture and the object images into the history image.

13. The image processing apparatus according to claim 12, wherein the dynamic picture storage unit is configured to store a plurality of picked up dynamic pictures including the first picked up dynamic picture and the second picked up dynamic picture, and further comprising:
   a display unit configured to display the new history image;
   an operation acceptance unit configured to accept a selection operation for selecting at least one of the picked up dynamic pictures stored in the dynamic picture storage unit; and
   a display control unit configured to control, when a selection operation to select the first picked up dynamic picture or the second picked up dynamic picture is accepted by the operation acceptance unit, the display unit to display that synthesis by the image synthesis unit of the first picked up dynamic picture and the second picked up dynamic picture is possible.

14. The image processing apparatus according to claim 13, wherein the display control unit is configured to control the display unit to display marks representative of the picked up dynamic pictures stored in the dynamic picture storage unit individually for the picked up dynamic pictures, to control, when a selection operation to select the first picked up dynamic picture is accepted by the operation acceptance unit, the display unit to display the mark representative of the second picked up dynamic picture in a mode different from that of the other marks, and to control, when a selection operation to select the second picked up dynamic picture is accepted by the operation acceptance unit, the display unit to display the mark representative of the first picked up dynamic picture in a mode different from that of the other marks.

15. The image processing apparatus according to claim 11, wherein the arrangement information calculation unit is configured to calculate the arrangement information based on the size of a storage region of the image storage unit and the display range.

16. The image processing apparatus according to claim 15, wherein the arrangement information calculation unit is configured to calculate the arrangement position and the size of the third picked up image in the image storage unit such that the display range is smaller than the size of the storage region in the image storage unit.

17. A dynamic picture reproduction apparatus, comprising:
   a dynamic picture storage unit configured to store a picked up dynamic picture, including picked up images, picked up by an image pickup apparatus;
   a transformation information storage unit configured to store transformation information for transforming a second picked up image which is positioned, with reference to a first picked up image which forms the picked up dynamic picture, following the first picked up image on a time axis of the picked up dynamic picture for each picked up image;
   an image storage unit configured to store history images including the picked up images positioned preceding to the second picked up image on the time axis of the picked up dynamic picture;
   an arrangement information calculation unit configured to calculate a display range formed from the picked up images to be transformed based on the transformation information regarding the picked up images which form the picked up dynamic picture and calculating arrangement information of a third picked up image, which is at least one of the picked up images, on the image storage unit based on the display range;
   an image transformation unit configured to transform the second picked up image based on the transformation information;
   an image synthesis unit configured to synthesize the transformed second picked up image on the history images including the third picked up image arranged in the image storage unit based on the calculated arrangement information and store the synthesized second picked up image as a new history image into the image storage unit; and
   a display control unit configured to control a display unit to successively display the new history image.

18. An image processing apparatus, comprising:
   an arrangement information calculation unit configured to calculate arrangement information based on movement information for each frame of at least one of a dynamic picture; and
   an image synthesis unit configured to sequentially synthesize each frame of the dynamic picture to a previously synthesized image based on the movement information and the arrangement information, so that all of the synthesized images of the dynamic picture are arranged within a display range.

19. The image processing apparatus according to claim 18, wherein the arrangement information calculation unit calculates the arrangement information for more than one dynamic pictures based on each of the movement information of each of the dynamic pictures and relative relationship information between each of the dynamic pictures, and
   the image synthesis unit synthesizes the more than one dynamic pictures.

20. The image processing apparatus according to claim 18, wherein the arrangement information calculation unit calculates the display range based on transformation information calculated according to the movement information.

21. The image processing apparatus according to claim 18, wherein the arrangement information calculation unit re-calculates the arrangement information when another dynamic picture is selected by a user when the image synthesis unit sequentially synthesizes each frame of the dynamic picture.

22. An image processing method, comprising:
   calculating arrangement information based on movement information for each frame of at least one of a dynamic picture; and
   sequentially synthesizing each frame of the dynamic picture to a previously synthesized image based on the movement information and the arrangement information, so that all of the synthesized images of the dynamic picture are arranged within a display range.

23. A computer-readable storage medium including computer executable instructions, wherein the instructions, when executed by a computer, cause the computer to perform a method for image processing, the method comprising:
   calculating arrangement information based on movement information for each frame of at least one of a dynamic picture; and
   sequentially synthesizing each frame of the dynamic picture to a previously synthesized image based on the movement information and the arrangement information, so that all of the synthesized images of the dynamic picture are arranged within a display range.

* * * * *